US008892249B2

(12) United States Patent
Holman et al.

(10) Patent No.: US 8,892,249 B2
(45) Date of Patent: Nov. 18, 2014

(54) SUBSTANCE CONTROL SYSTEM AND METHOD FOR DISPENSING SYSTEMS

(75) Inventors: Paul Holman, Seattle, WA (US); Royce A. Levien, Lexington, MA (US); Mark A. Malamud, Seattle, WA (US); Neal Stephenson, Seattle, WA (US); Christopher Charles Young, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/200,113

(22) Filed: Sep. 16, 2011

(65) Prior Publication Data

US 2013/0054018 A1 Feb. 28, 2013

Related U.S. Application Data

(63) Continuation-in-part of application No. 13/199,361, filed on Aug. 26, 2011, and a continuation-in-part of application No. 13/199,481, filed on Aug. 30, 2011, and a continuation-in-part of application No. 13/199,544, filed on Aug. 31, 2011, and a continuation-in-part of application No. 13/199,545, filed on Aug. 31, 2011.

(51) Int. Cl.

| | |
|---|---|
| ***G07F 9/00*** | (2006.01) |
| ***G07F 11/62*** | (2006.01) |
| ***G07F 13/06*** | (2006.01) |
| ***G07F 9/02*** | (2006.01) |
| ***G06F 17/00*** | (2006.01) |

(52) U.S. Cl.

CPC ................ *G06F 17/00* (2013.01); *G07F 11/62* (2013.01); *G07F 13/065* (2013.01); *G07F 9/026* (2013.01); *G07F 9/00* (2013.01)

USPC .......................................... 700/233; 700/235

(58) Field of Classification Search

CPC .... G07F 17/0064; G07F 13/065; G07F 9/026

USPC ................................................. 700/233, 235

See application file for complete search history.

(56) References Cited

U.S. PATENT DOCUMENTS

| | | | |
|---|---|---|---|
| 3,702,583 | A | 11/1972 | Rullman |
| 4,634,597 | A | 1/1987 | Spiel et al. |

(Continued)

FOREIGN PATENT DOCUMENTS

| | | | |
|---|---|---|---|
| NL | 2003661 C | | 4/2011 |
| WO | WO 03/056493 | A1 | 7/2003 |
| WO | WO 2006/095212 | A1 | 9/2006 |

OTHER PUBLICATIONS

U.S. Appl. No. 13/435,591, Holman et al.

(Continued)

*Primary Examiner* — Timothy Waggoner

(57) ABSTRACT

A substance control dispensing system which receives containers of ingestible material for use in dispensing ingestible products individually or in combination with other ingestibles available to the system. A container is sealed at a point of origin and maintains information regarding the origin, integrity of the container since packing, or substance contained by the containers among other types of information. The system is configured to acquire the information from the container upon the container being inserted into the system, and the information may be used to prepare a display of available selections which includes a status related to the information from the container or its insertion into the system, increasing confidence toward the integrity in labeling of ingestible products to be dispensed. Other sorts of ingestible products can include but are not limited to food bars, meal replacements, snacks, full meals, plant and/or animal based products, nutraceuticals, pharmaceuticals, smoothies, etc.

61 Claims, 55 Drawing Sheets

(56) References Cited

U.S. PATENT DOCUMENTS

| | | | | |
|---|---|---|---|---|
| 4,666,204 | A | 5/1987 | Reinholtz | |
| 4,723,614 | A | 2/1988 | Lahti | |
| 4,797,818 | A | 1/1989 | Cotter | |
| 4,974,747 | A | 12/1990 | Ahlström | |
| 5,176,922 | A | 1/1993 | Balsano et al. | |
| 5,197,376 | A | 3/1993 | Bird et al. | |
| 5,261,150 | A | 11/1993 | Grube et al. | |
| 5,408,443 | A | 4/1995 | Weinberger | |
| 5,417,989 | A | 5/1995 | Atwood et al. | |
| 5,511,594 | A | 4/1996 | Brennan et al. | |
| 5,522,310 | A | 6/1996 | Black, Sr. et al. | |
| 5,540,943 | A | 7/1996 | Naramura | |
| 5,583,129 | A | 12/1996 | Spona et al. | |
| 5,598,947 | A | 2/1997 | Smith | |
| 5,697,043 | A * | 12/1997 | Baskaran et al. | 264/621 |
| 6,105,818 | A | 8/2000 | Speranza | |
| 6,112,182 | A | 8/2000 | Akers et al. | |
| 6,194,017 | B1 | 2/2001 | Woodward et al. | |
| 6,202,923 | B1 | 3/2001 | Boyer et al. | |
| 6,236,974 | B1 | 5/2001 | Kolawa et al. | |
| 6,245,556 | B1 | 6/2001 | Sako et al. | |
| 6,268,004 | B1 | 7/2001 | Hayashi | |
| 6,280,784 | B1 | 8/2001 | Yang et al. | |
| 6,280,785 | B1 * | 8/2001 | Yang et al. | 425/112 |
| 6,280,786 | B1 | 8/2001 | Williams et al. | |
| 6,376,000 | B1 | 4/2002 | Waters | |
| 6,415,555 | B1 | 7/2002 | Montague | |
| 6,618,062 | B1 | 9/2003 | Brown et al. | |
| 6,622,064 | B2 * | 9/2003 | Bartholomew et al. | 700/233 |
| 6,637,432 | B2 | 10/2003 | Wakefield et al. | |
| 6,646,659 | B1 | 11/2003 | Brown et al. | |
| 6,660,317 | B1 | 12/2003 | Akutagawa | |
| 6,711,460 | B1 | 3/2004 | Reese | |
| 6,802,433 | B2 | 10/2004 | Leykin et al. | |
| 6,843,166 | B1 | 1/2005 | Li | |
| 6,859,215 | B1 | 2/2005 | Brown et al. | |
| 6,865,261 | B1 | 3/2005 | Rao et al. | |
| 6,998,087 | B1 | 2/2006 | Hanson et al. | |
| 7,006,893 | B2 | 2/2006 | Hart et al. | |
| 7,027,996 | B2 | 4/2006 | Levinson | |
| 7,054,909 | B1 | 5/2006 | Ohkubo et al. | |
| 7,080,597 | B2 | 7/2006 | Ando | |
| 7,110,964 | B2 | 9/2006 | Tengler et al. | |
| 7,183,518 | B2 | 2/2007 | Near et al. | |
| 7,188,082 | B2 | 3/2007 | Keane et al. | |
| 7,200,644 | B1 | 4/2007 | Flanagan | |
| 7,231,917 | B2 | 6/2007 | Frederiksen | |
| 7,243,789 | B2 | 7/2007 | Discko, Jr. | |
| 7,295,889 | B2 * | 11/2007 | Lahteenmaki | 700/233 |
| 7,343,174 | B2 | 3/2008 | Suryanarayana et al. | |
| 7,364,068 | B1 | 4/2008 | Strubbe et al. | |
| 7,392,193 | B2 | 6/2008 | Mault | |
| 7,395,134 | B2 * | 7/2008 | Bartholomew et al. | 700/233 |
| 7,415,375 | B2 | 8/2008 | Shakman et al. | |
| 7,451,015 | B2 * | 11/2008 | Mazur et al. | 700/239 |
| 7,457,685 | B2 * | 11/2008 | D'Silva | 700/239 |
| 7,555,360 | B1 * | 6/2009 | Green et al. | 700/233 |
| 7,571,586 | B1 | 8/2009 | Morales | |
| 7,625,198 | B2 | 12/2009 | Lipson et al. | |
| 7,630,790 | B2 * | 12/2009 | Handfield et al. | 700/236 |
| 7,680,690 | B1 | 3/2010 | Catalano | |
| 7,747,345 | B2 | 6/2010 | Ohmura et al. | |
| 7,762,181 | B2 | 7/2010 | Boland et al. | |
| 7,783,379 | B2 | 8/2010 | Beane et al. | |
| 7,818,089 | B2 * | 10/2010 | Hanna et al. | 700/233 |
| 7,842,323 | B1 | 11/2010 | White | |
| 7,884,953 | B1 | 2/2011 | Willcocks et al. | |
| 7,974,873 | B2 | 7/2011 | Simmons et al. | |
| 8,007,847 | B2 | 8/2011 | Biderman et al. | |
| 8,027,748 | B2 * | 9/2011 | Handfield et al. | 700/242 |
| 8,190,447 | B2 | 5/2012 | Hungerford et al. | |
| 8,204,757 | B2 | 6/2012 | Carlson et al. | |
| 8,306,655 | B2 * | 11/2012 | Newman | 700/233 |
| 8,370,176 | B2 | 2/2013 | Vespasiani | |
| 8,412,369 | B2 | 4/2013 | Ames, II et al. | |
| 2001/0005830 | A1 | 6/2001 | Kuroyanagi | |
| 2001/0028308 | A1 | 10/2001 | De La Huerga | |
| 2001/0036495 | A1 | 11/2001 | Ganan-Calvo | |
| 2002/0029149 | A1 | 3/2002 | Nishina | |
| 2002/0049652 | A1 | 4/2002 | Moore et al. | |
| 2002/0081356 | A1 | 6/2002 | Bebiak et al. | |
| 2002/0138201 | A1 | 9/2002 | Greensides | |
| 2003/0050854 | A1 | 3/2003 | Showghi et al. | |
| 2003/0051606 | A1 | 3/2003 | Cusenza et al. | |
| 2003/0071806 | A1 | 4/2003 | Annand | |
| 2003/0079612 | A1 | 5/2003 | Con | |
| 2003/0099157 | A1 | 5/2003 | Quine | |
| 2003/0105555 | A1 | 6/2003 | Lunak et al. | |
| 2003/0121929 | A1 | 7/2003 | Liff et al. | |
| 2003/0125836 | A1 | 7/2003 | Chirnomas | |
| 2003/0125963 | A1 | 7/2003 | Haken | |
| 2003/0125986 | A1 | 7/2003 | Collosi | |
| 2003/0197005 | A1 | 10/2003 | Huegerich et al. | |
| 2003/0208113 | A1 | 11/2003 | Mault et al. | |
| 2003/0208409 | A1 | 11/2003 | Mault | |
| 2003/0219527 | A1 | 11/2003 | Sasaki et al. | |
| 2003/0236706 | A1 | 12/2003 | Weiss | |
| 2004/0045579 | A1 | 3/2004 | Miki et al. | |
| 2004/0054554 | A1 | 3/2004 | Barts et al. | |
| 2004/0073448 | A1 | 4/2004 | Barts et al. | |
| 2004/0073449 | A1 | 4/2004 | Yang | |
| 2004/0091843 | A1 | 5/2004 | Albro et al. | |
| 2004/0093265 | A1 | 5/2004 | Ramchandani et al. | |
| 2004/0093268 | A1 | 5/2004 | Ramchandani et al. | |
| 2004/0131659 | A1 | 7/2004 | Gibson et al. | |
| 2004/0143503 | A1 | 7/2004 | Suthar | |
| 2004/0158350 | A1 | 8/2004 | Ostergaard et al. | |
| 2004/0158499 | A1 | 8/2004 | Dev et al. | |
| 2004/0193495 | A1 | 9/2004 | Kim | |
| 2004/0214597 | A1 | 10/2004 | Suryanarayana et al. | |
| 2004/0238555 | A1 | 12/2004 | Parks | |
| 2004/0246819 | A1 | 12/2004 | Quine | |
| 2004/0250842 | A1 | 12/2004 | Adams et al. | |
| 2005/0023710 | A1 | 2/2005 | Brodkin et al. | |
| 2005/0038719 | A1 | 2/2005 | Young et al. | |
| 2005/0059849 | A1 | 3/2005 | Liu | |
| 2005/0080650 | A1 | 4/2005 | Noel | |
| 2005/0098169 | A1 | 5/2005 | Frederiksen | |
| 2005/0114149 | A1 | 5/2005 | Rodriguez et al. | |
| 2005/0131738 | A1 | 6/2005 | Morris | |
| 2005/0157148 | A1 | 7/2005 | Baker et al. | |
| 2005/0171663 | A1 | 8/2005 | Mittelsteadt et al. | |
| 2005/0193901 | A1 | 9/2005 | Buehler | |
| 2005/0209915 | A1 | 9/2005 | Saluccio | |
| 2005/0230472 | A1 | 10/2005 | Chang | |
| 2005/0233011 | A1 | 10/2005 | Beavers | |
| 2005/0241497 | A1 | 11/2005 | Cantu | |
| 2005/0251289 | A1 | 11/2005 | Bonney et al. | |
| 2005/0267811 | A1 | 12/2005 | Almblad | |
| 2005/0280544 | A1 | 12/2005 | Mishelevich | |
| 2006/0015289 | A1 | 1/2006 | Shakman et al. | |
| 2006/0053184 | A1 | 3/2006 | Grana | |
| 2006/0081653 | A1 | 4/2006 | Boland et al. | |
| 2006/0108415 | A1 | 5/2006 | Thomas et al. | |
| 2006/0111976 | A1 | 5/2006 | Pompushko | |
| 2006/0191885 | A1 | 8/2006 | Near et al. | |
| 2006/0224419 | A1 | 10/2006 | Servizio et al. | |
| 2006/0237523 | A1 | 10/2006 | Carlson et al. | |
| 2006/0259188 | A1 | 11/2006 | Berg | |
| 2006/0263501 | A1 | 11/2006 | Oghafua et al. | |
| 2006/0277066 | A1 | 12/2006 | Hungerford et al. | |
| 2006/0278093 | A1 | 12/2006 | Biderman et al. | |
| 2006/0286218 | A1 | 12/2006 | Salzman | |
| 2007/0037567 | A1 | 2/2007 | Ungless et al. | |
| 2007/0038727 | A1 | 2/2007 | Bailey et al. | |
| 2007/0055550 | A1 | 3/2007 | Courtney et al. | |
| 2007/0061170 | A1 | 3/2007 | Lorsch | |
| 2007/0083494 | A1 | 4/2007 | Carlson et al. | |
| 2007/0150371 | A1 | 6/2007 | Gangji | |
| 2007/0150375 | A1 | 6/2007 | Yang | |
| 2007/0151984 | A1 | 7/2007 | Baker et al. | |
| 2007/0168205 | A1 | 7/2007 | Carlson et al. | |
| 2007/0185615 | A1 | 8/2007 | Bossi et al. | |
| 2007/0185785 | A1 | 8/2007 | Carlson et al. | |

(56) References Cited

U.S. PATENT DOCUMENTS

2007/0191689 A1 8/2007 Elitok
2007/0192715 A1 8/2007 Kataria et al.
2007/0208454 A1 9/2007 Forrester et al.
2007/0260487 A1 11/2007 Bartfeld et al.
2007/0275690 A1 11/2007 Hunter et al.
2008/0059226 A1 3/2008 Melker et al.
2008/0077440 A1 3/2008 Doron
2008/0084450 A1* 4/2008 Silverbrook .................... 347/42
2008/0125897 A1 5/2008 DiGianfilippo et al.
2008/0126220 A1 5/2008 Baril et al.
2008/0126985 A1 5/2008 Baril et al.
2008/0141315 A1 6/2008 Ogilvie
2008/0173711 A1 7/2008 Handfield et al.
2008/0195247 A1 8/2008 Mallett et al.
2008/0224823 A1 9/2008 Lawson et al.
2008/0260918 A1 10/2008 Lai et al.
2008/0272138 A1 11/2008 Ross et al.
2008/0288287 A1 11/2008 Stanners
2008/0314918 A1 12/2008 Nuriely
2009/0043176 A1 2/2009 Nakajima et al.
2009/0087819 A1 4/2009 Adachi et al.
2009/0099944 A1 4/2009 Robinson et al.
2009/0106313 A1 4/2009 Boldyga
2009/0130449 A1 5/2009 El-Siblani
2009/0132379 A1 5/2009 Baril et al.
2009/0164897 A1 6/2009 Amer-Yahia et al.
2009/0167553 A1 7/2009 Hong et al.
2009/0192898 A1 7/2009 Baril
2009/0198547 A1 8/2009 Sudak
2009/0199105 A1 8/2009 Kamada et al.
2009/0218363 A1 9/2009 Terzini
2009/0236333 A1 9/2009 Ben-Shmuel et al.
2009/0236334 A1 9/2009 Ben-Shmuel et al.
2009/0236335 A1 9/2009 Ben-Shmuel et al.
2009/0242620 A1 10/2009 Sahuguet
2009/0261175 A1 10/2009 Kauppinen et al.
2009/0267895 A1 10/2009 Bunch
2009/0294521 A1 12/2009 de la Huerga
2009/0295569 A1 12/2009 Corwin et al.
2009/0297668 A1 12/2009 Cantu
2009/0299645 A1 12/2009 Colby et al.
2009/0317519 A1 12/2009 Lavie et al.
2010/0017296 A1 1/2010 Spignesi, Jr. et al.
2010/0038416 A1 2/2010 Canora
2010/0038594 A1 2/2010 Bohlig et al.
2010/0042427 A1 2/2010 Graham et al.
2010/0045705 A1 2/2010 Vertegaal et al.
2010/0047410 A1 2/2010 Lichtenstein
2010/0052900 A1 3/2010 Covannon et al.
2010/0055257 A1 3/2010 Hervig
2010/0063889 A1 3/2010 Proctor, Jr. et al.
2010/0087155 A1 4/2010 Dubost
2010/0100237 A1 4/2010 Ratnakar
2010/0106523 A1 4/2010 Kalamas
2010/0106607 A1 4/2010 Riddiford et al.
2010/0121722 A1 5/2010 Vawter
2010/0136666 A1 6/2010 Kobayashi et al.
2010/0139992 A1 6/2010 Delia et al.
2010/0145506 A1 6/2010 Waugh et al.
2010/0161345 A1 6/2010 Cain et al.
2010/0167648 A1 7/2010 Doutriaux
2010/0189842 A1 7/2010 Toren
2010/0204676 A1 8/2010 Cardullo
2010/0206765 A1 8/2010 Fonte
2010/0235201 A1 9/2010 McEvoy
2010/0250384 A1 9/2010 Bhargava
2010/0256993 A1 10/2010 Vespasiani
2010/0268378 A1 10/2010 Sharpley
2010/0268380 A1 10/2010 Waugh et al.
2010/0275625 A1 11/2010 Lowenstein
2010/0286632 A1 11/2010 Dos Santos
2010/0291515 A1 11/2010 Pinnisi et al.
2010/0303972 A1 12/2010 Srivastava
2010/0305974 A1 12/2010 Patch et al.
2010/0312385 A1 12/2010 Deuber
2010/0332140 A1 12/2010 Joyce et al.
2010/0332250 A1 12/2010 Simpson et al.
2011/0000923 A1 1/2011 Morales
2011/0004624 A1 1/2011 Bansai et al.
2011/0031236 A1 2/2011 Ben-Shmuel et al.
2011/0040660 A1 2/2011 Allison et al.
2011/0055044 A1 3/2011 Wiedl
2011/0087076 A1 4/2011 Brynelsen et al.
2011/0124996 A1 5/2011 Reinke et al.
2011/0160902 A1 6/2011 Postins
2011/0166881 A1 7/2011 Brazzo et al.
2011/0173062 A1 7/2011 Chen et al.
2011/0208617 A1 8/2011 Weiland
2011/0231212 A1 9/2011 Hurley et al.
2011/0231266 A1 9/2011 Baril
2011/0282712 A1 11/2011 Amos et al.
2011/0300270 A1 12/2011 Koppens
2011/0313867 A9 12/2011 Silver
2011/0318717 A1 12/2011 Adamowicz
2011/0320037 A1 12/2011 Frugone
2012/0004770 A1 1/2012 Ooyen et al.
2012/0016745 A1 1/2012 Hendrickson
2012/0041778 A1 2/2012 Kraft
2012/0088212 A1 4/2012 Knaan
2012/0089249 A1 4/2012 Rosenblum
2012/0101914 A1 4/2012 Kumar et al.
2012/0131619 A1 5/2012 Ogilvie
2012/0136731 A1 5/2012 Kidron et al.
2012/0137325 A1 5/2012 Ogilvie
2012/0152125 A1 6/2012 Yoakim et al.
2012/0156337 A1 6/2012 Studor et al.
2012/0168985 A1 7/2012 Kläber
2012/0179665 A1 7/2012 Baarman et al.
2012/0233002 A1 9/2012 Abujbara
2012/0246004 A1 9/2012 Book et al.
2012/0251688 A1 10/2012 Zimmerman et al.
2012/0251689 A1 10/2012 Batchelder
2012/0258216 A1 10/2012 Wessels
2012/0284126 A1 11/2012 Giraud et al.
2012/0290412 A1 11/2012 Marovets
2012/0323707 A1 12/2012 Urban
2013/0006415 A1 1/2013 Paydar et al.
2013/0011529 A1 1/2013 Belzowski et al.
2013/0018356 A1 1/2013 Prince et al.
2013/0034633 A1 2/2013 von Hasseln
2013/0089642 A1 4/2013 Lipson et al.
2013/0151268 A1 6/2013 Fletcher
2013/0158705 A1 6/2013 Levy et al.
2013/0189405 A1 7/2013 Filliol et al.
2013/0196035 A1 8/2013 Passet et al.
2013/0238118 A1 9/2013 Haas
2013/0273217 A1 10/2013 Minvielle
2014/0050811 A1 2/2014 Lipton et al.

OTHER PUBLICATIONS

U.S. Appl. No. 13/435,550, Holman et al.
U.S. Appl. No. 13/432,525, Holman et al.
U.S. Appl. No. 13/432,507, Holman et al.
U.S. Appl. No. 13/385,690, Holman et al.
U.S. Appl. No. 13/385,687, Holman et al.
U.S. Appl. No. 13/385,129, Holman et al.
U.S. Appl. No. 13/385,128, Holman et al.
U.S. Appl. No. 13/373,847, Holman et al.
U.S. Appl. No. 13/373,846, Holman et al.
U.S. Appl. No. 13/373,675, Holman et al.
U.S. Appl. No. 13/373,674, Holman et al.
U.S. Appl. No. 13/317,979, Holman et al.
U.S. Appl. No. 13/317,978, Holman et al.
U.S. Appl. No. 13/317,546, Holman et al.
U.S. Appl. No. 13/317,545, Holman et al.
U.S. Appl. No. 13/200,907, Holman et al.
U.S. Appl. No. 13/200,906, Holman et al.
U.S. Appl. No. 13/200,830, Holman et al.
U.S. Appl. No. 13/200,829, Holman et al.
U.S. Appl. No. 13/200,106, Holman et al.
U.S. Appl. No. 13/199,545, Holman et al.

(56) References Cited

OTHER PUBLICATIONS

U.S. Appl. No. 13/199,544, Holman et al.
U.S. Appl. No. 13/199,481, Holman et al.
U.S. Appl. No. 13/199,361, Holman et al.
"3D food printing"; PharmacyEscrow.com; printed on Apr. 4, 2012; 2 pages.
Blain, Loz; "Cornucopia: Digital Gastronomy—could 3D printing be the next revolution in cooking?"; Gizmag; Jan. 14, 2010; 4 pages.
Broomfield, Mark; "The Future of Food Printing"; Fab@Home; Aug. 20, 2009; 1 page.
Coelho, Marcelo; "Cornucopia"; printed on Apr. 4, 2012; 1 page; located at fluid.media.mut.edu.
Cohen et al.; "Hydrocolloid Printing: A Novel Platform for Customized Food Production"; Twentieth Annual International Solid Freeform Fabrication Symposium, Austin, Texas; bearing a date of 2009; cover page and pp. 807-818.
Fawkes, Piers; "3D Food Printing", PSFK; Jan. 17, 2008; 8 pages.
Flatley, Joseph L.; "Ikea's kitchen of the future: 3D food printing, mood lighting, virtual Gordon Ramsay"; Engadget; printed on Apr. 4, 2012; 4 pages; AOL Inc.
McKendrick, Joe; "3D food 'printing': coming to a kitchen near you"; Smartplanet; Dec. 27, 2010; 6 pages; located at www.smartplanet.com/business/blog/business-brains.
Periard et al.; "Printing Food"; Cornell University; printed on Apr. 6, 2012; 11 pages; located at www.creativemachines.cornell.edu/papers/SFF07_Periard2.pdf.
"Printed Meats!"; Fabbaloo; Aug. 23, 2010; 5 pages; Fabbaloo.
"Prototypes and Concept Designs for a Digital Gastronomy"; Cornucopia; printed on Apr. 4, 2012; 5 pages.
Sandhana, Lakshmi; "The printed future of Christmas dinner"; BBC News Technology; Dec. 24, 2010; 4 pages; MMXI.
Seth, Radhika; "Printing My Food by the Molecule"; Yanko Design; Mar. 2, 2010; 7 pages.
Seth, Radhika; "Surreal Food Is Real and Printed"; Yanko Design; Aug. 26, 2009; 6 pages.
"The CandyFab 6000"; Evil Mad Scientist Laboratories; bearing a date of 2011; 7 pages; Evil Mad Scientist Laboratories.
"Welcome to the CandyFabProject"; CandyFab.org; Jan. 22, 2011; 3 pages; The CandyFab Project.
American Society of Hospital Pharmacists; "ASHP Technical Assistance Bulleting on Compounding Nonsterile Products in Pharmacies"; Am. J. Hosp. Pharm.; bearing a date of 1994, approved Apr. 27, 1994; pp. 73-79; vol. 51, No. 1441-8; American Society of Hospital Pharmacists, Inc.
"Scientests create 'inhalable' food?"; bearing a date of Aug. 29, 2012; snapshot taken Apr. 12, 2009; available at http://web.archive.org/web/20090412131937/ http://chowhound.chow.com/topics/611174.
"Transdermal Nutrient Delivery System"; U.S. Army Soldier and Biological Chemical Command; snapshot taken Jul. 21, 2004; available at http://web.archive.org/web/20040721134210 http://archives.tproc.org/www.sbccom.army.mil/products/food/tdnds.pdf.
"Airline Tickets and Airline Reservations from American Airlines"; AA.com; 1 page; retrieved from the internet wayback machine on Oct. 27, 2011; located at http://web.archieve.org/web.20101027131457/http://www.aa.com.
Williams, N.T.; "Medication administration through enteral feeding tubes"; Am J Health Syst Pharm.; bearing a date of Dec 15, 2008; 2 pages (abstract only); vol. 65, No. 24; located at http://www.ncbi.nlm.nih.gov/pubmed/19052281.
McDonald's; sample restaurant menu (as provided by examiner); Feb. 10, 2014; 1 page; located at: http://www.burgerbusiness.com/wp-content/uploads/McD_Calor . . . .

* cited by examiner 10
14
20
12
22
34
32
37

*Fig. 67* o11

Start electronically receiving status information regarding a particular ingestible material portion as related to a first engagement of an automated dispensing system with at least one manufacture, the first engagement occurring during a first condition including the at least one manufacture being united with the particular ingestible material portion, the first engagement to facilitate access by the automated dispensing system to the particular ingestible material portion for dispensing of the particular ingestible material portion, the electronically receiving status information to receive status information influenced by whether any disengagements of the automated dispensing system from the at least one manufacture occur during the first condition prior to the first engagement, the at least one manufacture arranged to inhibit access to the particular ingestible material portion prior to any engagements of the automated dispensing system with the at least o1146 electronically receiving status information related to the first engagement occurring during the first condition including the at least one manufacture being united with the particular ingestible material portion as a container enclosing the o1147 electronically receiving status information related to the first engagement occurring during the first condition including the at least one manufacture being united with the particular ingestible material portion as a vial containing a o1148 electronically receiving status information related to the first engagement occurring during the first condition including the at least one manufacture being united with the particular ingestible material portion as a syringe containing the o1149 electronically receiving status information related to the first engagement occurring during the first condition including the at least one manufacture being united with the particular ingestible material portion as a compressed aerosol o1150 electronically receiving status information related to the first engagement occurring during the first condition including the at least one manufacture being united with the particular ingestible material portion as part of an electronic End

*Fig. 69* o11

Start electronically receiving status information regarding a particular ingestible material portion as related to a first engagement of an automated dispensing system with at least one manufacture, the first engagement occurring during a first condition including the at least one manufacture being united with the particular ingestible material portion, the first engagement to facilitate access by the automated dispensing system to the particular ingestible material portion for dispensing of the particular ingestible material portion, the electronically receiving status information to receive status information influenced by whether any disengagements of the automated dispensing system from the at least one manufacture occur during the first condition prior to the first engagement, the at least one manufacture arranged to o1156 electronically receiving status information related to the first engagement to facilitate access by the automated dispensing system to the particular ingestible material portion via at least in part pouring the particular ingestible material o1157 electronically receiving status information related to the first engagement to facilitate access by the automated dispensing system to the particular ingestible material portion via at least o1158 electronically receiving status information related to the first engagement to facilitate access by the automated dispensing system to the particular ingestible material portion via at least in part vacuuming the o1159 electronically receiving status information related to the first engagement to facilitate access by the automated dispensing system to the particular ingestible material portion via at least in part augering to convey the particular ingestible o1160 electronically receiving status information related to the first engagement to facilitate access by the automated dispensing system to the particular ingestible material portion via at least in part dissolving the particular ingestible material portion in a solution End

*Fig. 71* o11

Start electronically receiving status information regarding a particular ingestible material portion as related to a first engagement of an automated dispensing system with at least one manufacture, the first engagement occurring during a first condition including the at least one manufacture being united with the particular ingestible material portion, the first engagement to facilitate access by the automated dispensing system to the particular ingestible material portion for dispensing of the particular ingestible material portion, the electronically receiving status information to receive status information influenced by whether any disengagements of the automated dispensing system from the at least one manufacture occur during the first condition prior to the first engagement, the at least one manufacture arranged to o1166 electronically receiving status information related to the first engagement to facilitate access by the automated dispensing system to the particular ingestible material portion via at least in part physical severing of a seal on a container holding the o1167 electronically receiving status information related to the first engagement to facilitate access by the automated dispensing system to the particular ingestible material portion via at least o1168 electronically receiving status information related to the first engagement to facilitate access by the automated dispensing system to the particular ingestible material portion via at least in part moving a sliding o1169 electronically receiving status information related to the first engagement to facilitate access by the automated dispensing system to the particular ingestible material portion via at least in part moving a hinged lid on a container holding the o1170 electronically receiving status information related to the first engagement to facilitate access by the automated dispensing system to the particular ingestible material portion via at least in part unscrewing a cap on a container holding the particular ingestible End

SUBSTANCE CONTROL SYSTEM AND METHOD FOR DISPENSING SYSTEMS

RELATED APPLICATIONS

For purposes of the USPTO extra-statutory requirements, the present application constitutes a continuation-in-part of U.S. patent application Ser. No. 13/199,361, entitled CONTROLLED SUBSTANCE AUTHORIZATION SYSTEM AND METHOD FOR INGESTIBLE PRODUCT PREPARATION SYSTEM AND METHOD, naming Paul Holman, Royce A. Levien, Mark A. Malamud, Neal Stephenson, and Christopher Charles Young as inventors, filed 26 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,481, entitled CONTROLLED SUBSTANCE AUTHORIZATION SYSTEM AND METHOD FOR INGESTIBLE PRODUCT PREPARATION SYSTEM AND METHOD, naming Paul Holman, Royce A. Levien, Mark A. Malamud, Neal Stephenson, and Christopher Charles Young as inventors, filed 30 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,544, entitled REPORTING SYSTEM AND METHOD FOR INGESTIBLE PRODUCT PREPARATION SYSTEM AND METHOD, naming Paul Holman, Royce A. Levien, Mark A. Malamud, Neal Stephenson, and Christopher Charles Young as inventors, filed 31 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,545, entitled REPORTING SYSTEM AND METHOD FOR INGESTIBLE PRODUCT PREPARATION SYSTEM AND METHOD, naming Paul Holman, Royce A. Levien, Mark A. Malamud, Neal Stephenson, and Christopher Charles Young as inventors, filed 31 Aug. 2011, which is currently co-pending or is an application of which a currently co-pending application is entitled to the benefit of the filing date.

For purposes of the USPTO extra-statutory requirements, the present application is related to U.S. patent application Ser. No. 13/200,106, entitled SUBSTANCE CONTROL SYSTEM AND METHOD FOR DISPENSING SYSTEMS, naming Paul Holman, Royce A. Levien, Mark A. Malamud, Neal Stephenson, and Christopher Charles Young as inventors, filed 16 Sep. 2011, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The present Applicant Entity (hereinafter "Applicant") has provided above a specific reference to the application(s)from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

SUMMARY

A method includes, but is not limited to electronically receiving status information regarding a particular ingestible material portion as related to a first engagement of an automated dispensing system with at least one manufacture, the first engagement occurring during a first condition including the at least one manufacture being united with the particular ingestible material portion, the first engagement to facilitate access by the automated dispensing system to the particular ingestible material portion for dispensing of the particular ingestible material portion, the electronically receiving status information to receive status information influenced by whether any disengagements of the automated dispensing system from the at least one manufacture occur during the first condition prior to the first engagement, the at least one manufacture arranged to inhibit access to the particular ingestible material portion prior to any engagements of the automated dispensing system with the at least one manufacture during the first condition and arranged to inhibit access to the particular ingestible material portion by other than the automated dispensing system during engagement of the automated dispensing system with the at least one manufacture during the first condition; and electronically outputting selection information associated with the particular ingestible material portion including information related to the received status information regarding the particular ingestible material portion and associated with ingestible material other than that associated with the particular ingestible material portion subsequent to electronically receiving the status information regarding the particular ingestible material portion.

In one or more various aspects, related machines, compositions of matter, or manufactures of systems may include, but are not limited to, virtually any combination of hardware, software, and/or firmware configured to effect the herein-referenced method aspects depending upon the design choices of the system designer (limited to patentable subject matter under 35 USC 101).

A system includes, but is not limited to: means for electronically receiving status information regarding a particular ingestible material portion as related to a first engagement of an automated dispensing system with at least one manufacture, the first engagement occurring during a first condition including the at least one manufacture being united with the particular ingestible material portion, the first engagement to facilitate access by the automated dispensing system to the particular ingestible material portion for dispensing of the particular ingestible material portion, the electronically receiving status information to receive status information influenced by whether any disengagements of the automated dispensing system from the at least one manufacture occur during the first condition prior to the first engagement, the at least one manufacture arranged to inhibit access to the particular ingestible material portion prior to any engagements of the automated dispensing system with the at least one manufacture during the first condition and arranged to inhibit access to the particular ingestible material portion by other than the automated dispensing system during engagement of the automated dispensing system with the at least one manufacture during the first condition; and means for electronically outputting selection information associated with the particular ingestible material portion including information related to the received status information regarding the particular ingestible material portion and associated with ingestible material other than that associated with the particular ingestible material portion subsequent to electronically receiving the status information regarding the particular ingestible material portion. In addition to the foregoing, other system aspects are described in the claims, drawings, and text forming a part of the present disclosure.

A system includes, but is not limited to a receiving status information electrical circuitry arrangement for electronically receiving status information regarding a particular ingestible material portion as related to a first engagement of an automated dispensing system with at least one manufacture, the first engagement occurring during a first condition including the at least one manufacture being united with the particular ingestible material portion, the first engagement to facilitate access by the automated dispensing system to the particular ingestible material portion for dispensing of the particular ingestible material portion, the electronically receiving status information to receive status information influenced by whether any disengagements of the automated dispensing system from the at least one manufacture occur during the first condition prior to the first engagement, the at least one manufacture arranged to inhibit access to the particular ingestible material portion prior to any engagements of the automated dispensing system with the at least one manufacture during the first condition and arranged to inhibit access to the particular ingestible material portion by other than the automated dispensing system during engagement of the automated dispensing system with the at least one manufacture during the first condition; and a outputting selection information electrical circuitry arrangement for electronically outputting selection information associated with the particular ingestible material portion including information related to the received status information regarding the particular ingestible material portion and associated with ingestible material other than that associated with the particular ingestible material portion subsequent to electronically receiving the status information regarding the particular ingestible material portion. In addition to the foregoing, other system aspects are described in the claims, drawings, and text forming a part of the present disclosure.

An article of manufacture including a non-transitory signal-bearing storage medium bearing one or more instructions for electronically receiving status information regarding a particular ingestible material portion as related to a first engagement of an automated dispensing system with at least one manufacture, the first engagement occurring during a first condition including the at least one manufacture being united with the particular ingestible material portion, the first engagement to facilitate access by the automated dispensing system to the particular ingestible material portion for dispensing of the particular ingestible material portion, the electronically receiving status information to receive status information influenced by whether any disengagements of the automated dispensing system from the at least one manufacture occur during the first condition prior to the first engagement, the at least one manufacture arranged to inhibit access to the particular ingestible material portion prior to any engagements of the automated dispensing system with the at least one manufacture during the first condition and arranged to inhibit access to the particular ingestible material portion by other than the automated dispensing system during engagement of the automated dispensing system with the at least one manufacture during the first condition; and one or more instructions for electronically outputting selection information associated with the particular ingestible material portion including information related to the received status information regarding the particular ingestible material portion and associated with ingestible material other than that associated with the particular ingestible material portion subsequent to electronically receiving the status information regarding the particular ingestible material portion. In addition to the foregoing, other computer program product aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 67 is a high-level flowchart including exemplary implementations of operation O11 of FIG. 57.

FIG. 69 is a high-level flowchart including exemplary implementations of operation O11 of FIG. 57.

FIG. 71 is a high-level flowchart including exemplary implementations of operation O11 of FIG. 57.

DETAILED DESCRIPTION

Figures 1, 2:
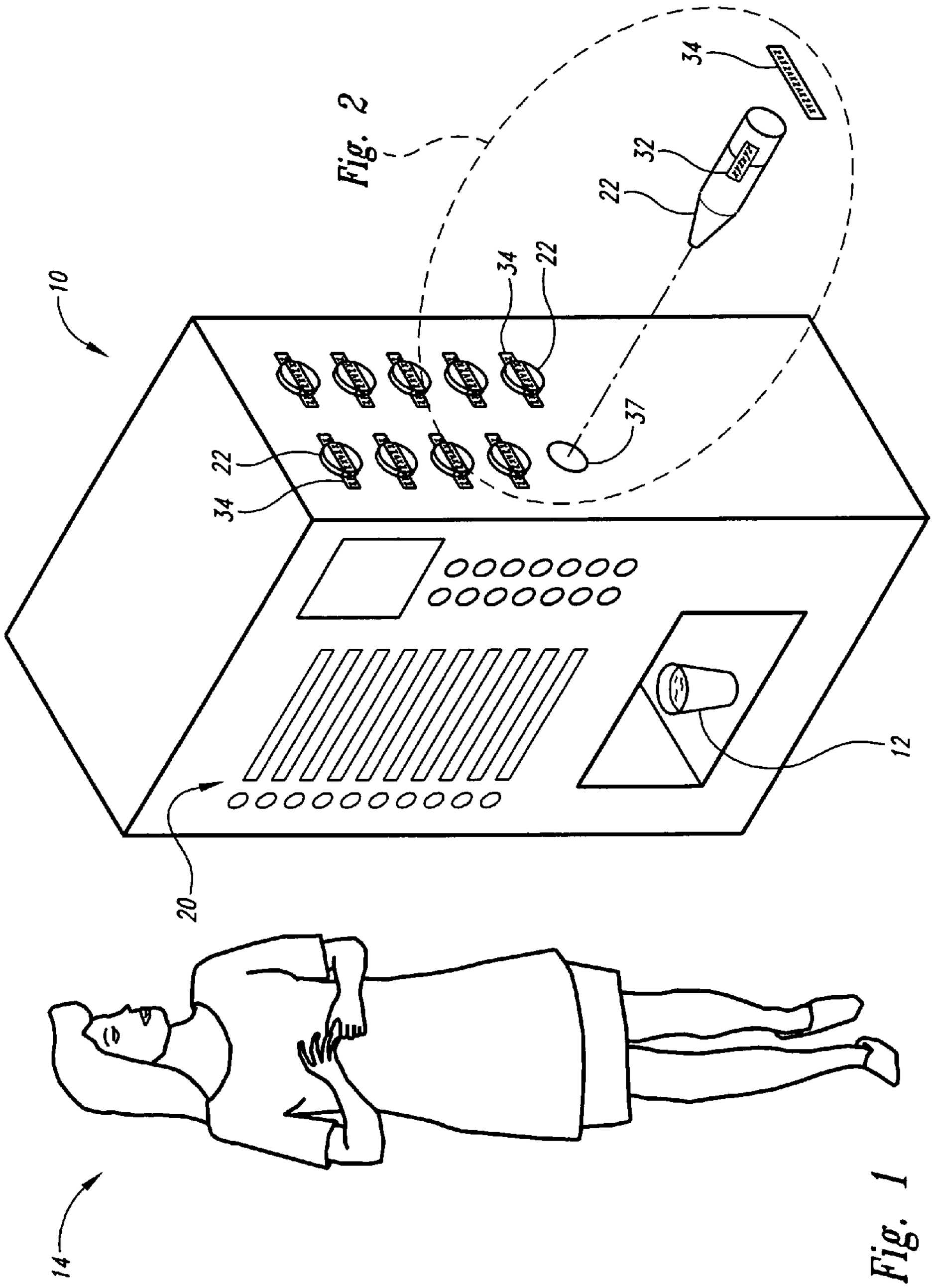
FIG. 1 is a schematic diagram depicting a first exemplary implementation of a substance control dispensing system 10.
FIG. 2 is an enlarged view of a portion of the dispensing control system depicted as part of the substance control dispensing system 10 in FIG. 1.
Figure 2:
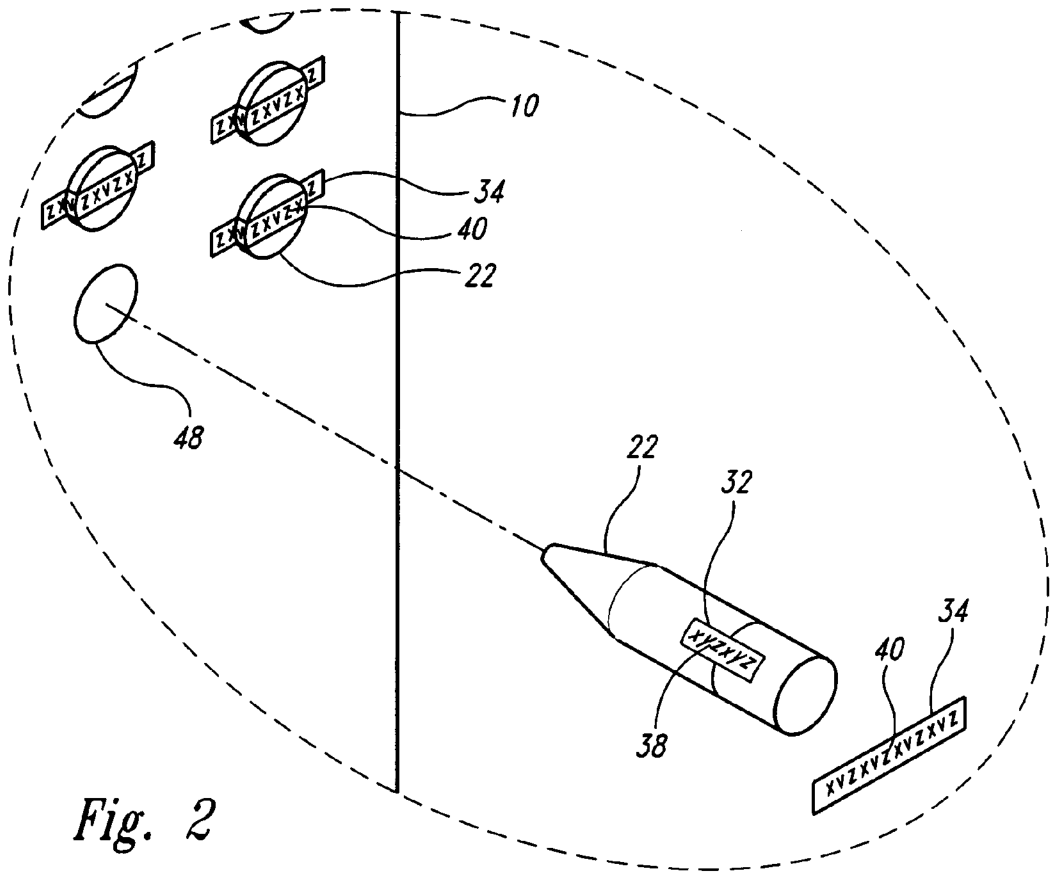

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Generally, automated and semi-automated machines to make, manufacture, fabricate, or otherwise prepare and/or dispense ingestible products to be ingested by living beings such as humans, animals, plants, etc are known to a degree with interest existing for future development as well. Automated and semi-automated preparation of the ingestible products can incorporate all known forms of preparation of food and other ingestible products including but not limited to all known forms of energy addition to one or more ingredients of the ingestible products (such as through various forms of thermal heating or adding microwave, infrared, or ultrasonic energy), extracting energy from one or more ingredients of the ingestible products (such as through thermodynamic-cycle based cooling or peltier cooling), deposition methods (including deposition by layering or at the pixel level), and combinational methods (such as blending, mixing, ingredient injection, kneading, stirring, ultrasonic agitation, other agitational methods, etc.), etc.

Although ingestible products made, fabricated, or otherwise prepared and/or dispensed by semi-automated and automated machines are presently limited in scope to a degree, it is envisioned that with future development, this will change. Ingestible products can take many forms including, but not limited to, solids, semi-solids, liquids, gases, dispersions (such as true solutions, colloid dispersions, emulsions, foams, and gels) and vast combinations thereof. Ingestion by the living beings can occur through many pathways including, but not limited to, oral ingestion, transdermal ingestion, pegtube ingestion, nasal ingestion, anal ingestion, injectable ingestion, tear-duct ingestion, and respiratory ingestion.

As depicted in FIG. 1, an exemplary implementation of an substance control dispensing system 10 is shown to dispense (and in some implementations to prepare) ingestible products such as a liquid drink 12 to be consumed by a particular individual living being, such as a human being 14 shown. Other sorts of ingestible products can include but are not limited to food bars, meal replacements, snacks, full meals, plant and/or animal based products, nutraceuticals, pharmaceuticals, smoothies, etc. The substance control dispensing system 10 is further depicted as showing selection indicators to inform users, such as the human being 14, what ingestible products are available to be dispensed. The selection indicators 20 or other display devices can display selection information including origin, type, certification, classification, etc. of ingestible ingredients and/or products available including information related to various implementations of substance control methods, systems, and articles of manufacture disclosed herein and discussed further below. Substance control methods and systems can be included with operation of the substance control dispensing system 10 to allow authorities and others to control substances supplied to be dispensed. Authorities can include but are not limited to pharmacists, nutritionists, health care centers, hospitals, fitness centers, other health care providers, growers, food distributors, manufacturers, etc. Substance control methods and systems allow for control of access to substances from point of origin to delivery into and dispensing by the substance control dispensing system 10 thereby increasing confidence toward the integrity in labeling of ingestible products to be dispensed.

Figure 3:
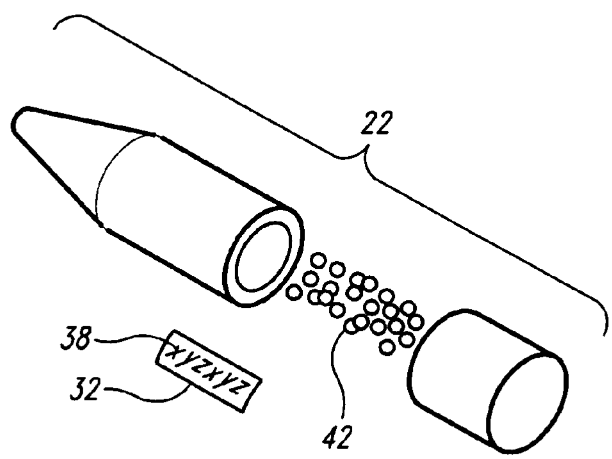
FIG. 3 is an exploded view of the portion of the dispensing control system depicted as part of the substance control dispensing system 10 in FIG. 1.

As shown in FIGS. 1-3, a representative controlled substance containing assembly 22 is secured by seal 32 to keep the contents therein from being tampered with. An additional seal 34 is used to secure the controlled substance containing assembly 22 as it is coupled with a controlled substance receiving assembly 37 of the substance control dispensing system 10. The seals 34 and 32 are used to hinder unauthorized access to the ingestible material contents of the controlled substance containing assembly 22. Also shown in FIG. 2, the seal 32 has identification information 38 and seal 34 has identification information 40 that can be used by the substance control dispensing system 10 to provide status information on the ingestible products through the selection indicators 20.

Figure 4:
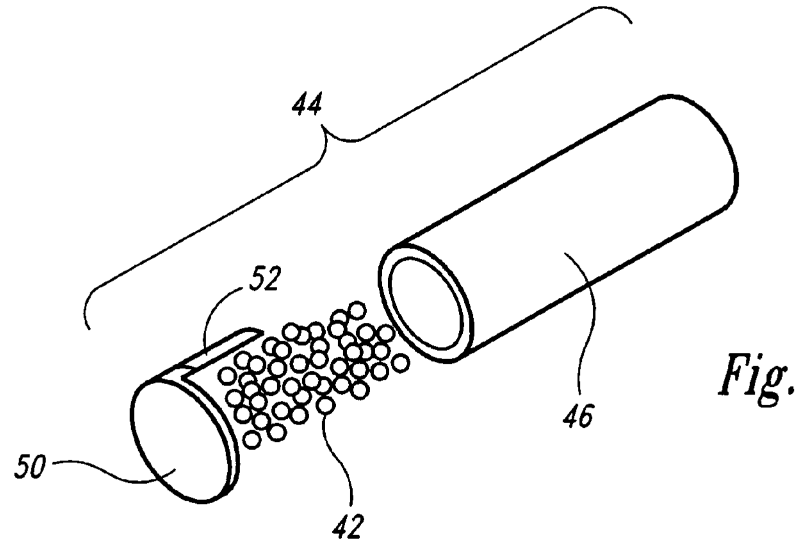
FIG. 4 is a schematic diagram depicting a first exemplary alternative implementation of the dispensing control system for the substance control dispensing system 10 of FIG. 1.
Figure 5:
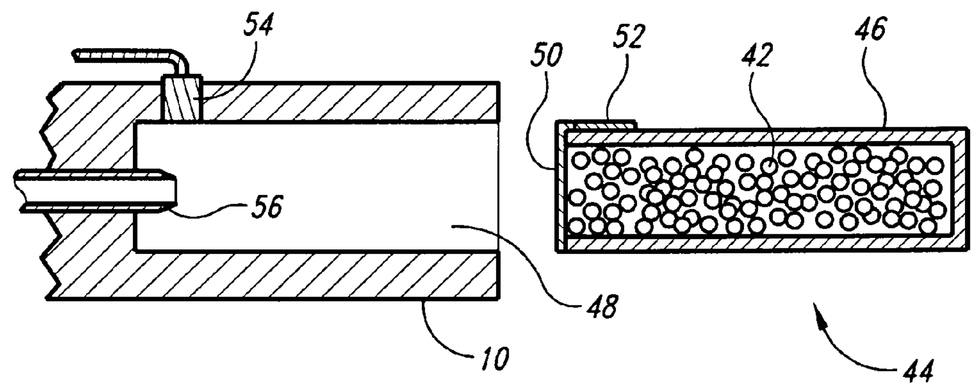
FIG. 5 is a cross-sectional view of the first exemplary alternative implementation of the dispensing control system for the substance control dispensing system 10 of FIG. 1.
Figure 6:
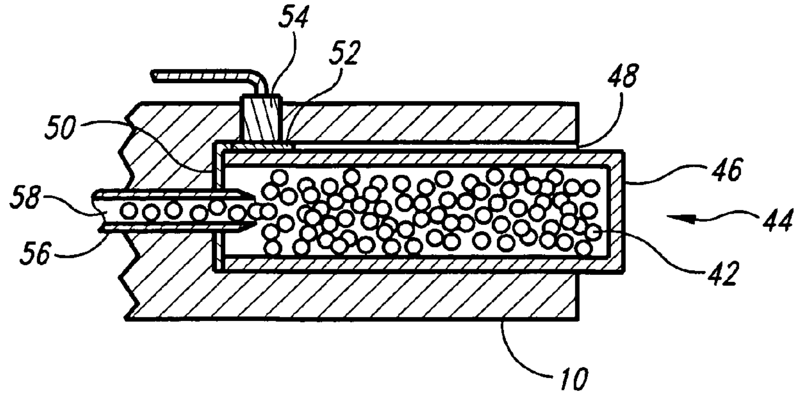
FIG. 6 is a cross-sectional view of the first exemplary alternative implementation of the dispensing control system for the substance control dispensing system 10 of FIG. 1.

As shown in FIGS. 4-6, a first exemplary alternative implementation of the dispensing control system for the substance control dispensing system 10 of FIG. 1 is depicted as holding ingestible material 42 with containing assembly 44 including container 46 with pierceable lid 50 integrated with electronic memory 52 that retains status information about the containing assembly. As the containing assembly 44 is inserted into receiving assembly 48 of the substance control dispensing system 10, protrusion 56 pierces lid 50 allowing ingestible material 42 to be collected through orifice 58 as encouraged by gravity, vacuum, or other means of force. Piercing of lid 50 is noted by an update to memory 52, which is read by receiver 54 with the information being passed on through the substance control dispensing system 10 to be reported through one or more of selection indicators 20.

Figure 7:
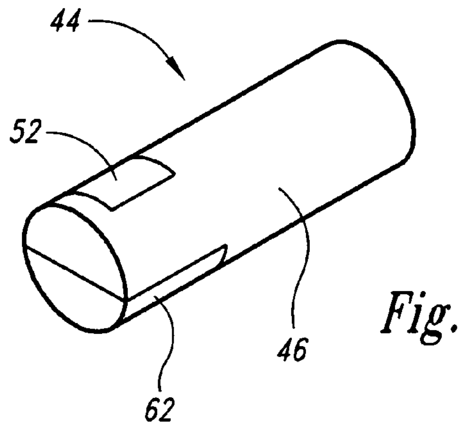
FIG. 7 is a schematic diagram depicting a second exemplary alternative implementation of the dispensing control system for the substance control dispensing system 10 of FIG. 1.
Figure 8:
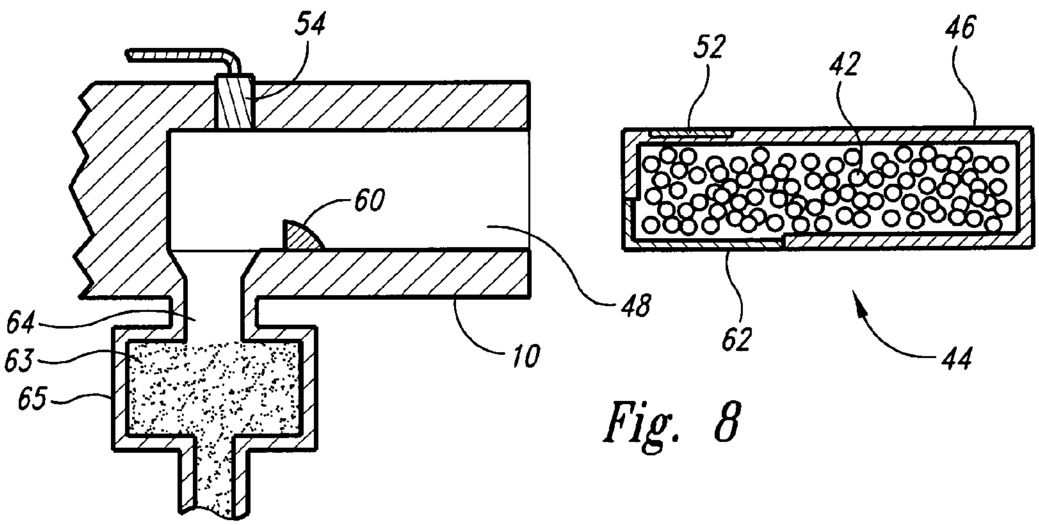
FIG. 8 is a cross-sectional view of the second exemplary alternative implementation of the dispensing control system for the substance control dispensing system 10 of FIG. 1.
Figure 9:
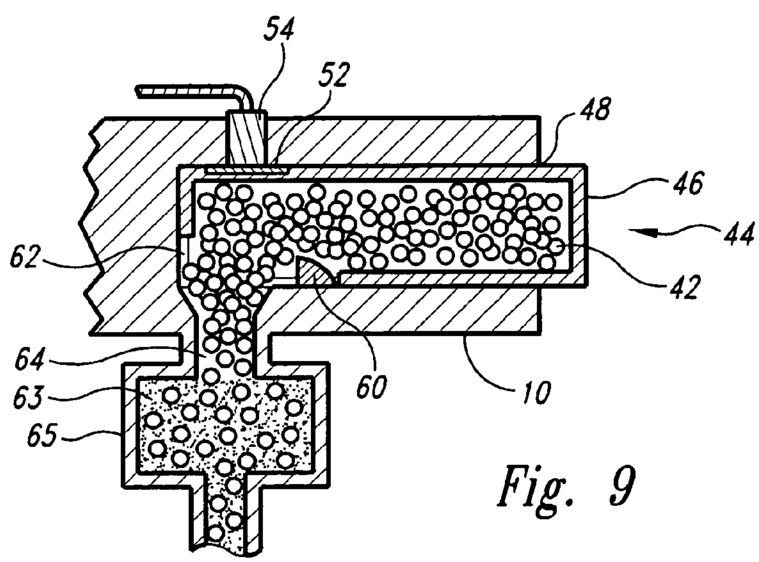
FIG. 9 is a cross-sectional view of the second exemplary alternative implementation of the dispensing control system for the substance control dispensing system 10 of FIG. 1.

As shown in FIGS. 7-9, a second exemplary alternative implementation of the dispensing control system for the substance control dispensing system 10 of FIG. 1 is depicted as holding ingestible material 42 with containing assembly 44 including container 46 with pierceable side portion 62 integrated with electronic memory 52 that retains status information about containing assembly. As containing assembly 44 is inserted into receiving assembly 48 of the substance control dispensing system 10, protrusion 60 pierces side portion 62 allowing ingestible material 42 to flow through orifice 64 to be dissolved in solution 63 held in chamber 65. Piercing of side portion 62 is noted by an update to memory 52, which is read by receiver 54 with information being passed on through the substance control dispensing system 10 to be reported through one or more of the selection indicators 20.

Figure 10:
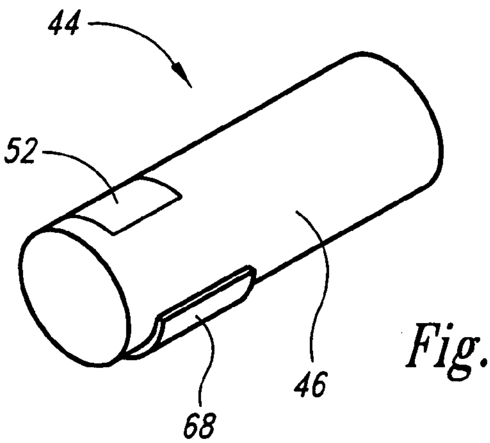
FIG. 10 is a schematic diagram depicting a third exemplary alternative implementation of the dispensing control system for the substance control dispensing system 10 of FIG. 1.
Figure 11:
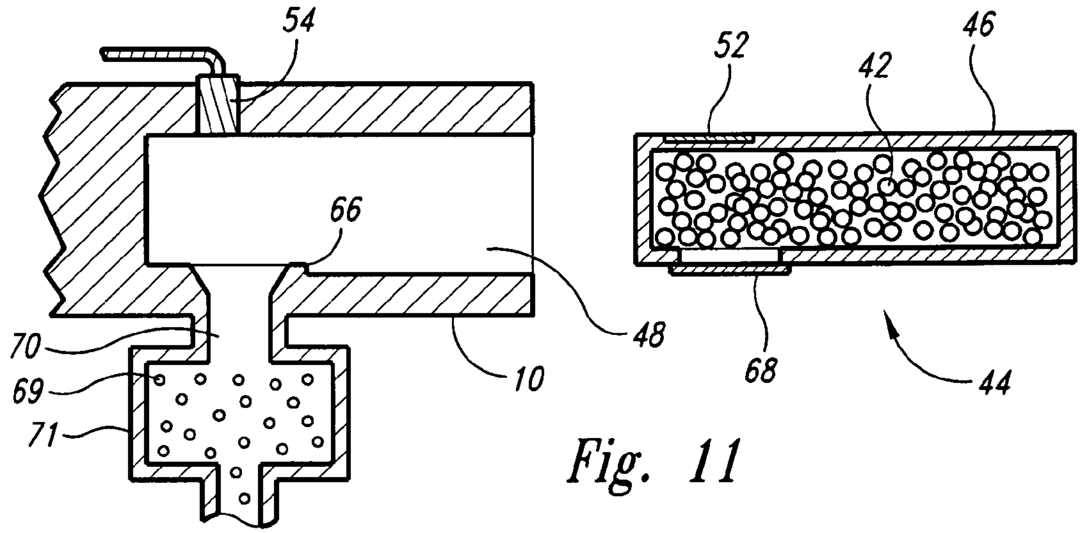
FIG. 11 is a cross-sectional view of the third exemplary alternative implementation of the dispensing control system for the substance control dispensing system 10 of FIG. 1.
Figure 12:
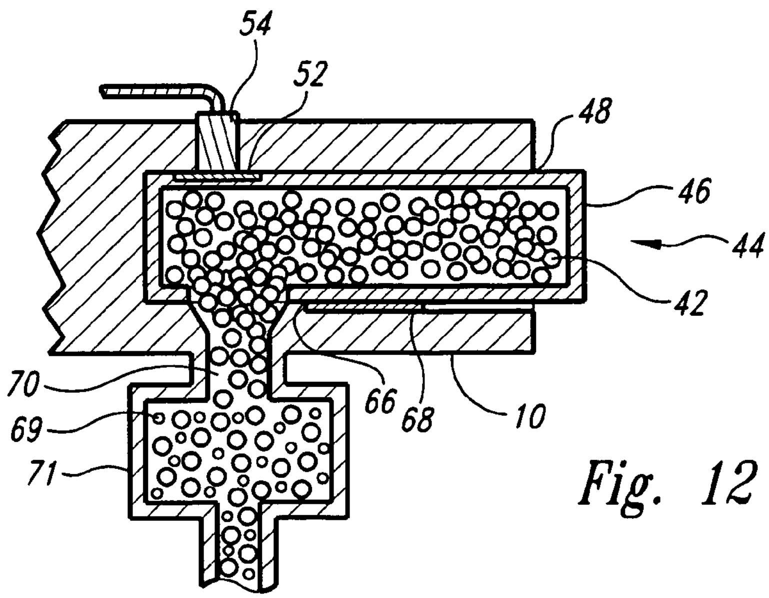
FIG. 12 is a cross-sectional view of the third exemplary alternative implementation of the dispensing control system for the substance control dispensing system 10 of FIG. 1.

As shown in FIGS. 10-12, a third exemplary alternative implementation of the dispensing control system for the substance control dispensing system 10 of FIG. 1 is depicted as holding ingestible material 42 with containing assembly 44 including container 46 with sliding barrier 68 integrated with electronic memory 52 that retains status information about the containing assembly. As containing assembly 44 is inserted into receiving assembly 48 of the substance control dispensing system 10, protrusion 66 pushes on sliding barrier 68 allowing ingestible material 42 to flow through orifice 70 to be poured into chamber 71 thereby mixing with other ingestible material 69. Sliding of sliding barrier 68 is noted by an update to the memory 52, which is read by receiver 54 with the information being passed on through the substance control dispensing system 10 to be reported through one or more of selection indicators 20.

Figure 13:
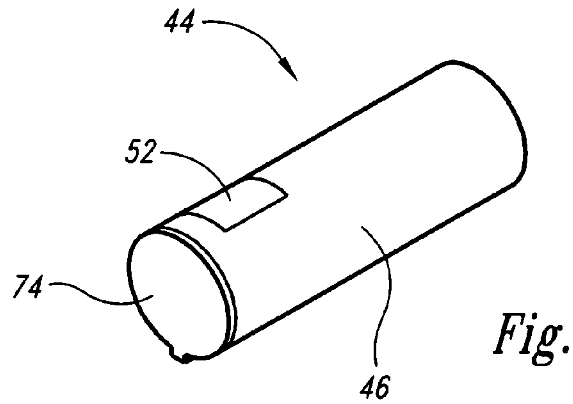
FIG. 13 is a schematic diagram depicting a fourth exemplary alternative implementation of the dispensing control system for the substance control dispensing system 10 of FIG. 1.
Figure 14:
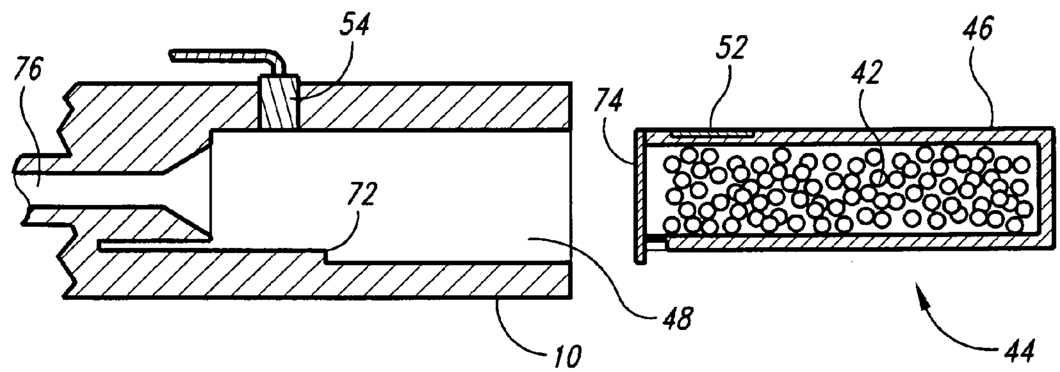
FIG. 14 is a cross-sectional view of the fourth exemplary alternative implementation of the dispensing control system for the substance control dispensing system 10 of FIG. 1.
Figure 15:
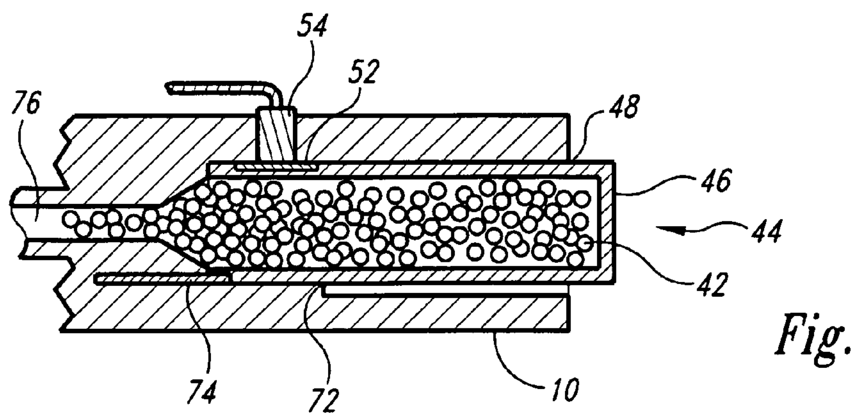
FIG. 15 is a cross-sectional view of the fourth exemplary alternative implementation of the dispensing control system for the substance control dispensing system 10 of FIG. 1.

As shown in FIGS. 13-15, a fourth exemplary alternative implementation of the dispensing control system for the substance control dispensing system 10 of FIG. 1 is depicted as holding ingestible material 42 with containing assembly 44 including container 46 with hinged lid 74 integrated with electronic memory 52 that retains status information about the containing assembly. As containing assembly 44 is inserted into receiving assembly 48 of the substance control dispensing system 10, protrusion 72 opens hinged lid 74 allowing ingestible material 42 to be collected through orifice 76 as encouraged by gravity, vacuum, or other means of force. Opening of hinged lid 74 is noted by an update to memory 52, which is read by receiver 54 with the information being passed on through the substance control dispensing system 10 to be reported through one or more of selection indictors indicators 20.

Figure 16:
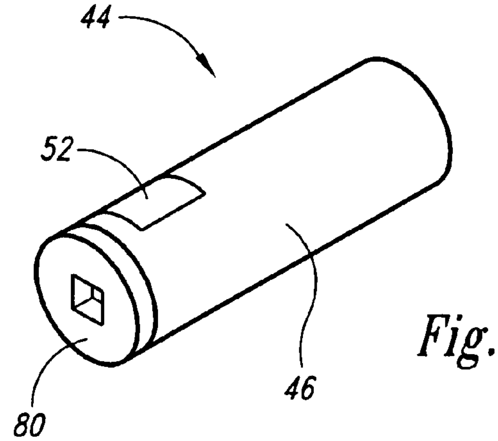
FIG. 16 is a schematic diagram depicting a fifth exemplary alternative implementation of the dispensing control system for the substance control dispensing system 10 of FIG. 1.
Figure 17:
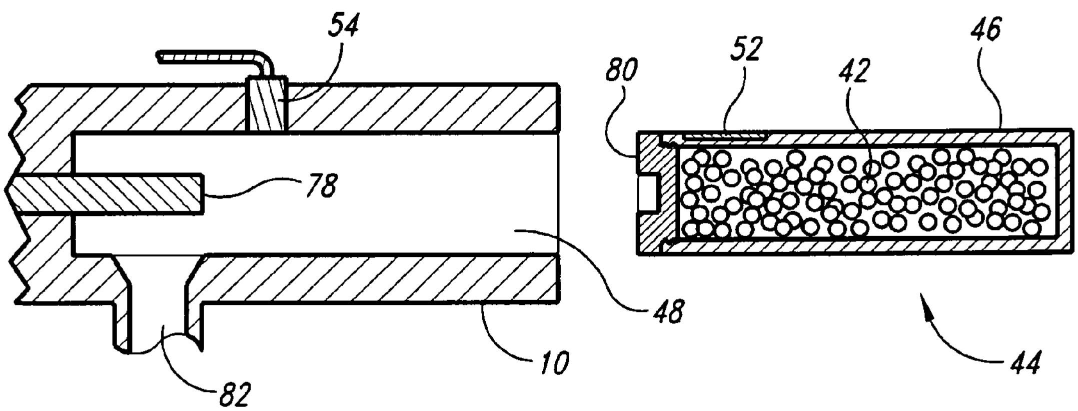
FIG. 17 is a cross-sectional view of the fifth exemplary alternative implementation of the dispensing control system for the substance control dispensing system 10 of FIG. 1.
Figure 18:
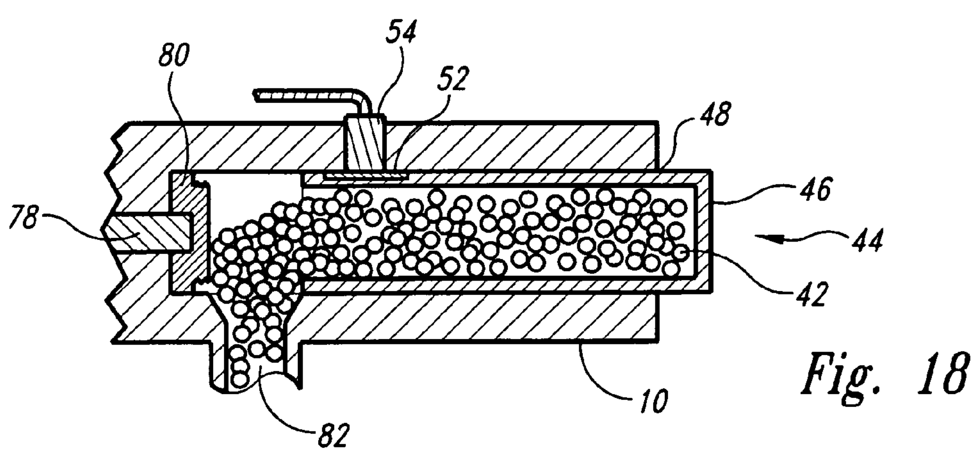
FIG. 18 is a cross-sectional view of the fifth exemplary alternative implementation of the dispensing control system for the substance control dispensing system 10 of FIG. 1.

As shown in FIGS. 16-18, a fifth exemplary alternative implementation of the dispensing control system for the substance control dispensing system 10 of FIG. 1 is depicted as holding ingestible material 42 with containing assembly 44 including container 46 with screw cap 80 integrated with electronic memory 52 that retains status information about the containing assembly. As containing assembly 44 is inserted into receiving assembly 48 of the substance control dispensing system 10, protrusion 78 receives, unscrews, and pulls off screw cap 80 from container 46 allowing ingestible material 42 to flow through orifice 82 as encouraged by an auger portion of the screw cap, gravity, vacuum, blower, or other means of force. Opening of screw cap 80 is noted by an update to memory 52, which is read by receiver 54 with the information being passed on through the substance control dispensing system 10 to be reported through one or more of the selection indicators 20.

Figure 19:
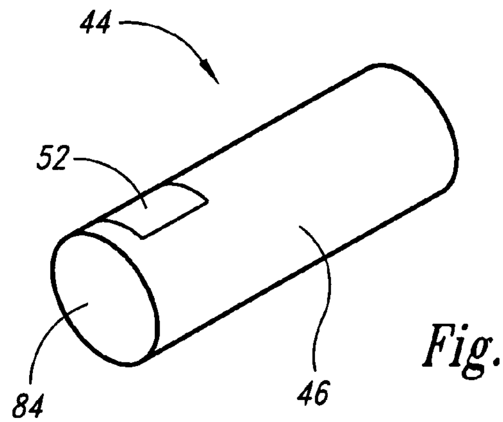
FIG. 19 is a schematic diagram depicting a sixth exemplary alternative implementation of the dispensing control system for the substance control dispensing system 10 of FIG. 1.
Figure 20:
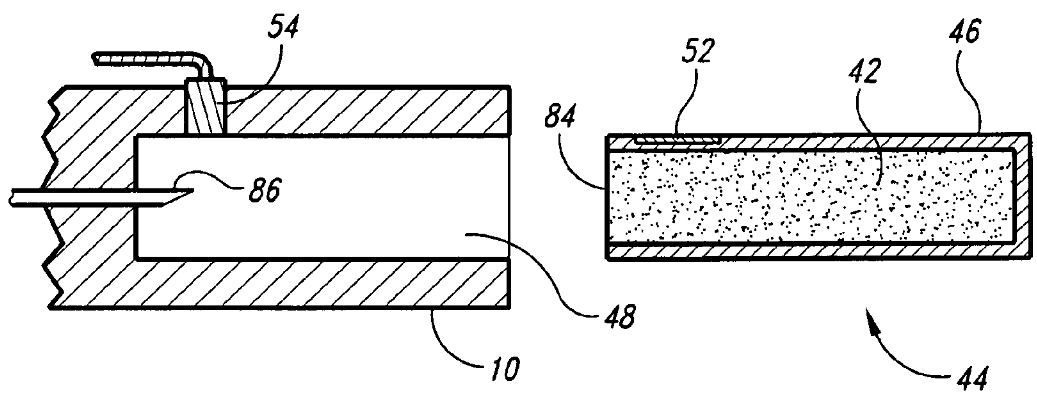
FIG. 20 is a cross-sectional view of the sixth exemplary alternative implementation of the dispensing control system for the substance control dispensing system 10 of FIG. 1.
Figure 21:
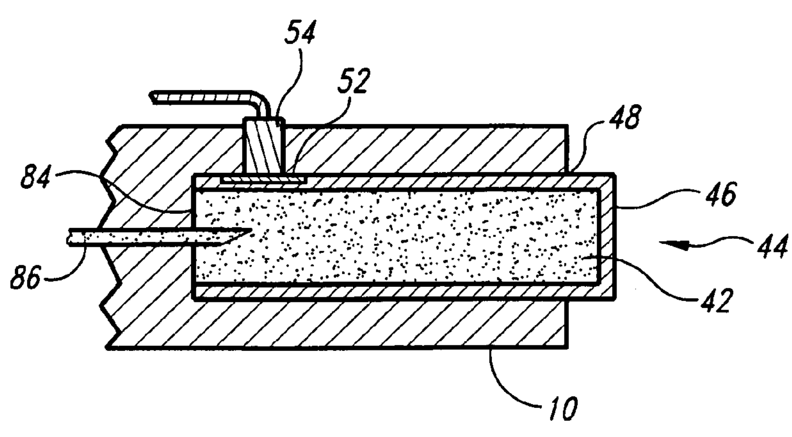
FIG. 21 is a cross-sectional view of the sixth exemplary alternative implementation of the dispensing control system for the substance control dispensing system 10 of FIG. 1.

As shown in FIGS. 19-21, a sixth exemplary alternative implementation of the dispensing control system for the substance control dispensing system 10 of FIG. 1 is depicted as holding ingestible material 42 with containing assembly 44 including container 46 with pierceable wall 84 integrated with electronic memory 52 that retains status information about the containing assembly. As containing assembly 44 is inserted into receiving assembly 48 of the substance control dispensing system 10, syringe needle 86 pierces pierceable wall 84 allowing ingestible material 42 to be sucked into the syringe needle. Piercing of pierceable wall 84 is noted by an update to memory 52, which is read by receiver 54 with the information being passed on through the substance control dispensing system 10 to be reported through one or more of selection indicators 20.

Figure 22:
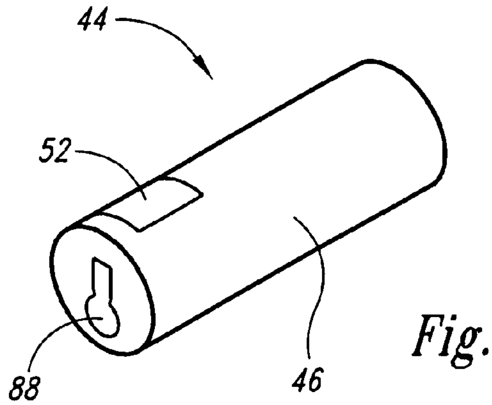
FIG. 22 is a schematic diagram depicting a seventh exemplary alternative implementation of the dispensing control system for the substance control dispensing system 10 of FIG. 1.
Figure 23:
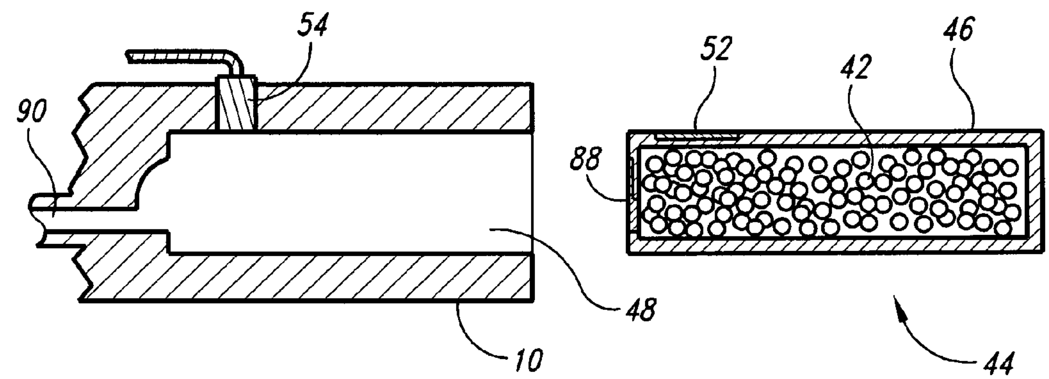
FIG. 23 is a cross-sectional view of the seventh exemplary alternative implementation of the dispensing control system for the substance control dispensing system 10 of FIG. 1.
Figure 24:
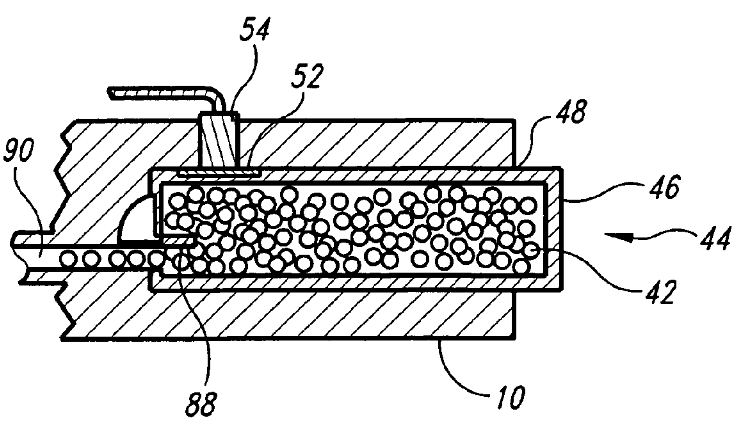
FIG. 24 is a cross-sectional view of the seventh exemplary alternative implementation of the dispensing control system for the substance control dispensing system 10 of FIG. 1.

As shown in FIGS. 22-24, a seventh exemplary alternative implementation of the dispensing control system for the substance control dispensing system 10 of FIG. 1 is depicted as holding ingestible material 42 with containing assembly 44 including container 46 with lifting tab 88 integrated with electronic memory 52 that retains status information about the containing assembly. As containing assembly 44 is inserted into receiving assembly 48 of the substance control dispensing system 10, lifting tab 88 is opened allowing ingestible material 42 to move through orifice 90. Opening lifting tab 88 is noted by an update to memory 52, which is read by receiver 54 with the information being passed on through the substance control dispensing system 10 to be reported through one or more of the selection indicators 20.

Figure 25:
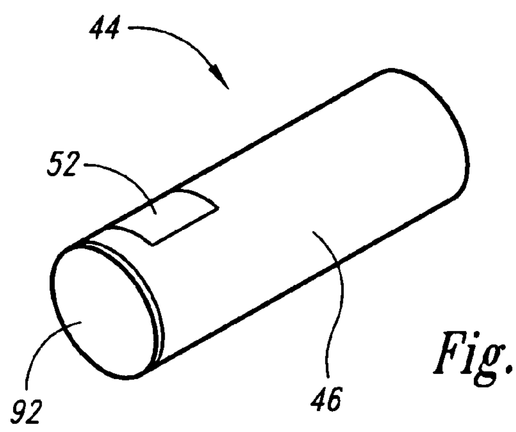
FIG. 25 is a schematic diagram depicting a eighth exemplary alternative implementation of the dispensing control system for the substance control dispensing system 10 of FIG. 1.
Figure 26:
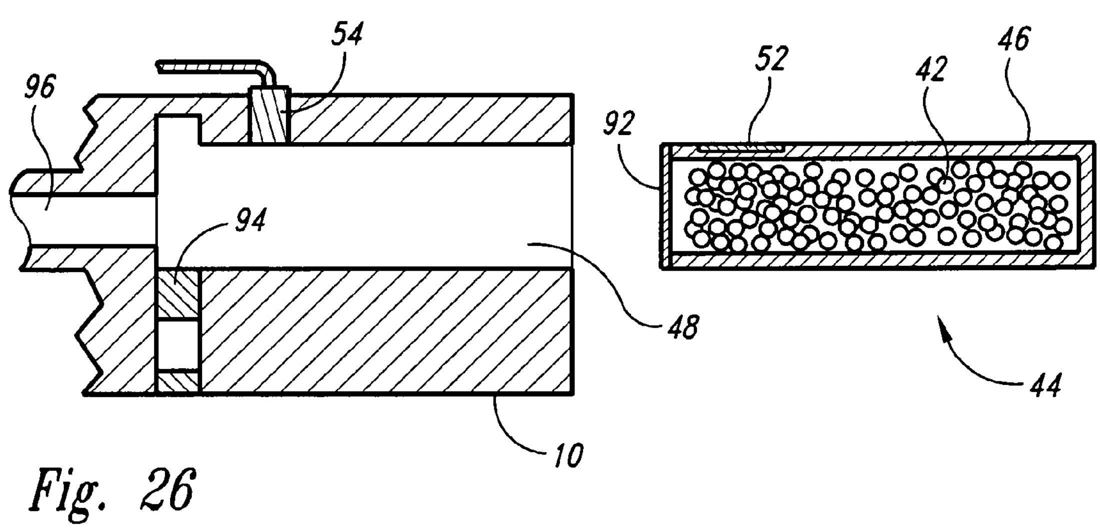
FIG. 26 is a cross-sectional view of the eighth exemplary alternative implementation of the dispensing control system for the substance control dispensing system 10 of FIG. 1.
Figure 27:
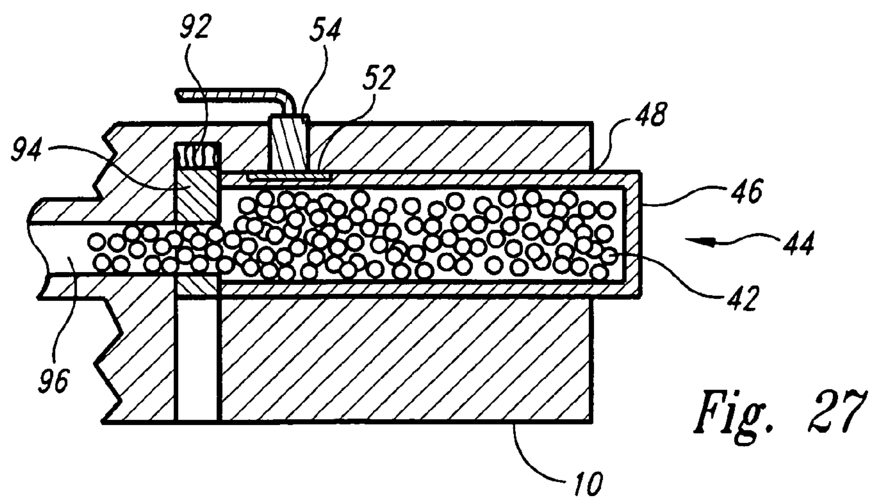
FIG. 27 is a cross-sectional view of the eighth exemplary alternative implementation of the dispensing control system for the substance control dispensing system 10 of FIG. 1.

As shown in FIGS. 25-27, an eighth exemplary alternative implementation of the dispensing control system for the substance control dispensing system 10 of FIG. 1 is depicted as holding ingestible material 42 with containing assembly 44 including container 46 with tear away barrier 92 integrated with electronic memory 52 that retains status information about the containing assembly. As containing assembly 44 is inserted into receiving assembly 48 of the substance control dispensing system 10, shearing member 94 scrapes across barrier 92 thereby tearing it away and allowing ingestible material 42 to move through orifice 96. Tearing of barrier 92 by shearing member 94 is noted by an update to memory 52, which is read by receiver 54 with the information being passed on through the substance control dispensing system 10 to be reported through one or more of the selection indicators 20.

Figure 28:
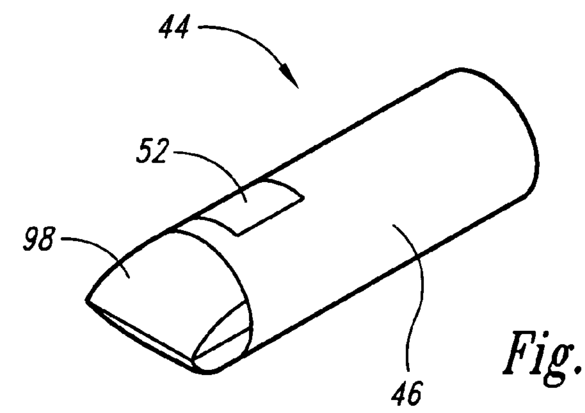
FIG. 28 is a schematic diagram depicting a ninth exemplary alternative implementation of the dispensing control system for the substance control dispensing system 10 of FIG. 1.
Figure 29:
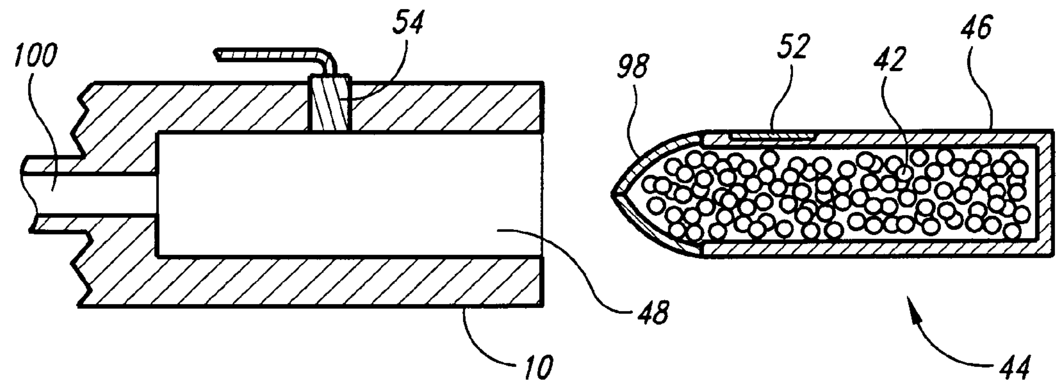
FIG. 29 is a cross-sectional view of the ninth exemplary alternative implementation of the dispensing control system for the substance control dispensing system 10 of FIG. 1.
Figure 30:
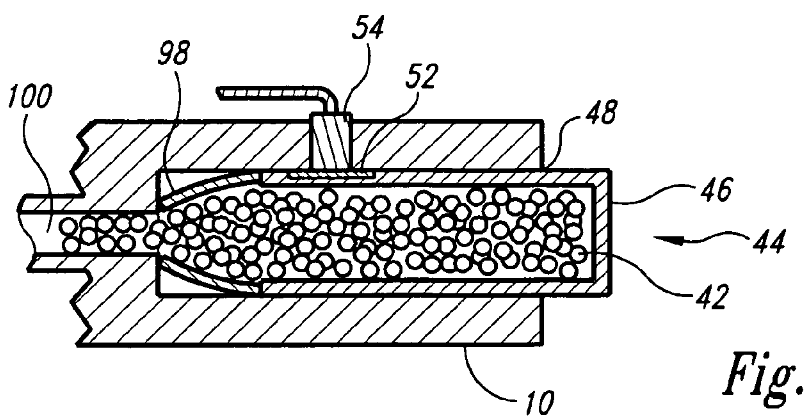
FIG. 30 is a cross-sectional view of the ninth exemplary alternative implementation of the dispensing control system for the substance control dispensing system 10 of FIG. 1.

As shown in FIGS. 28-30, a ninth exemplary alternative implementation of the dispensing control system for the substance control dispensing system 10 of FIG. 1 is depicted as holding ingestible material 42 with containing assembly 44 including container 46 with deformable portion 98 integrated with electronic memory 52 that retains status information about the containing assembly. As containing assembly 44 is inserted into receiving assembly 48 of the substance control dispensing system 10, deformable portion 98 is deformed to open thereby allowing ingestible material 42 to move through orifice 100. Deformation and consequential opening of deformable portion 98 is noted by an update to memory 52, which is read by receiver 54 with the information being passed on through the substance control dispensing system 10 to be reported through one or more of selection indicators 20.

Figure 31:
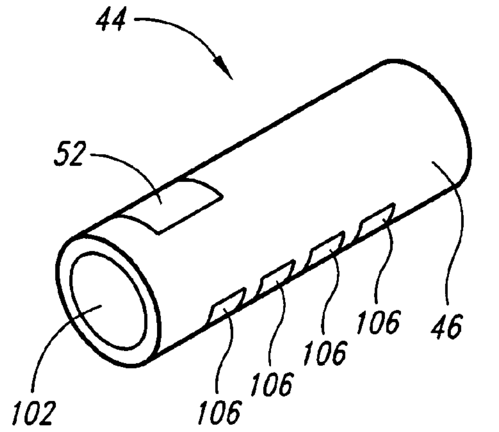
FIG. 31 is a schematic diagram depicting a tenth exemplary alternative implementation of the dispensing control system for the substance control dispensing system 10 of FIG. 1.
Figure 32:
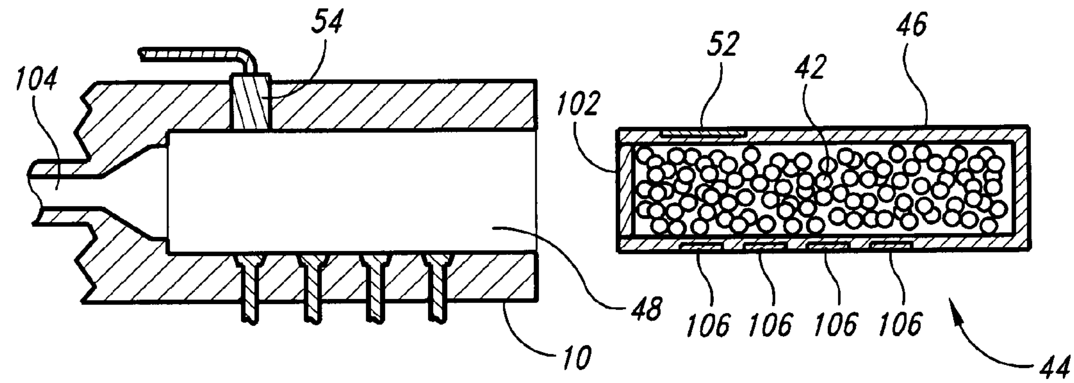
FIG. 32 is a cross-sectional view of the tenth exemplary alternative implementation of the dispensing control system for the substance control dispensing system 10 of FIG. 1.
Figure 33:
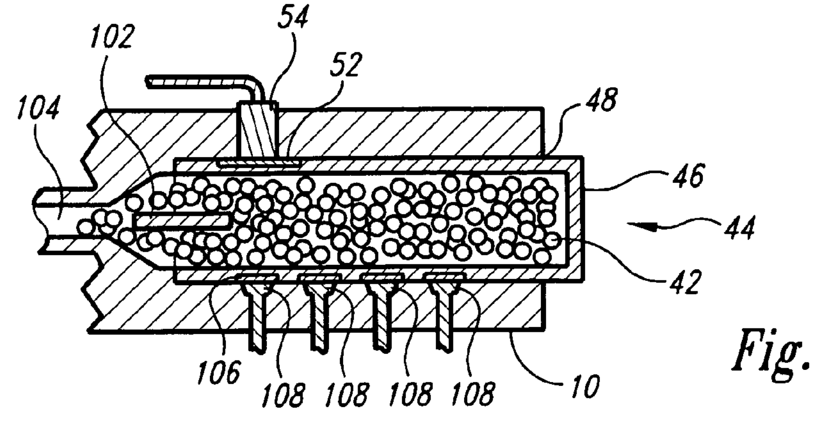
FIG. 33 is a cross-sectional view of the tenth exemplary alternative implementation of the dispensing control system for the substance control dispensing system 10 of FIG. 1.

As shown in FIGS. 31-33, a tenth exemplary alternative implementation of the dispensing control system for the substance control dispensing system 10 of FIG. 1 is depicted as holding ingestible material 42 with containing assembly 44 including container 46 with lockable portion 102 integrated with electronic memory 52 that retains status information about the containing assembly. As containing assembly 44 is inserted into receiving assembly 48 of the substance control dispensing system 10, lockable portion 102 is unlocked and opened upon verification by code verifiers 106 electronically coupling with code transmitters 108 that receiving assembly 48 is authorized to accept ingestible material 42. Opening of lockable portion 102 thereby allows ingestible material 42 to move through orifice 104. Unlocking and opening of lockable portion 102 is noted by an update to memory 52, which is read by receiver 54 with the information being passed on through the substance control dispensing system 10 to be reported through one or more of selection indicators 20.

Figure 34:
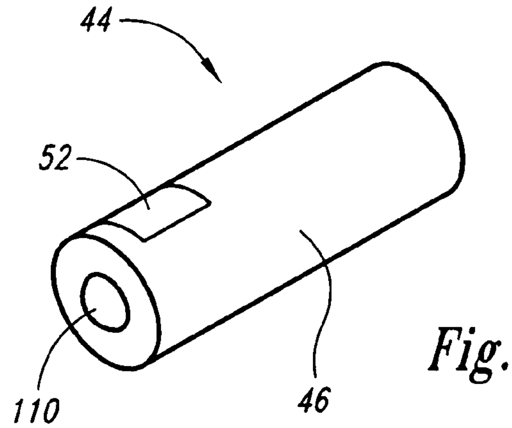
FIG. 34 is a schematic diagram depicting a eleventh exemplary alternative implementation of the dispensing control system for the substance control dispensing system 10 of FIG. 1.
Figure 35:
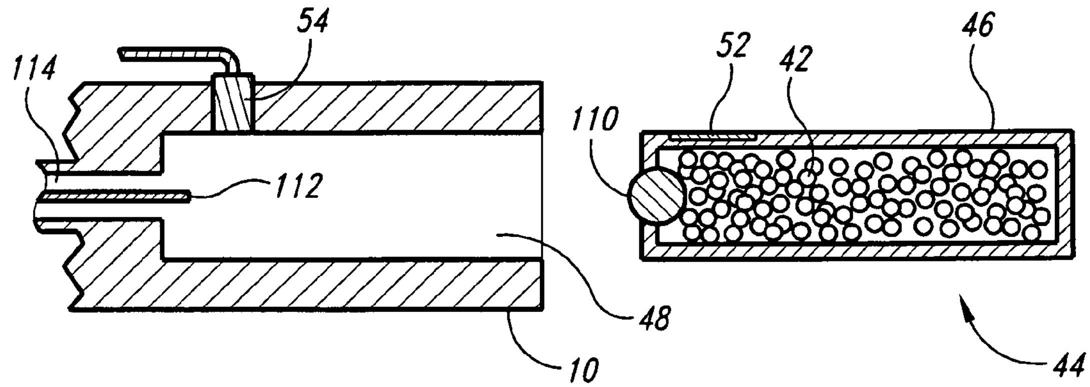
FIG. 35 is a cross-sectional view of the eleventh exemplary alternative implementation of the dispensing control system for the substance control dispensing system 10 of FIG. 1.
Figure 36:
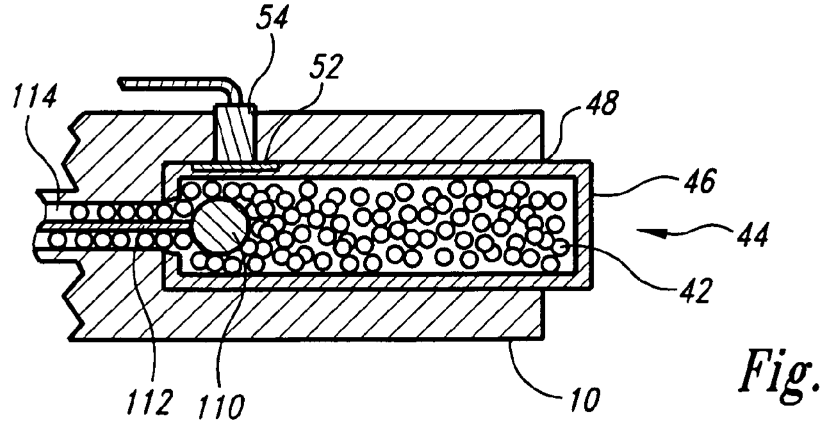
FIG. 36 is a cross-sectional view of the eleventh exemplary alternative implementation of the dispensing control system for the substance control dispensing system 10 of FIG. 1.

As shown in FIGS. 34-36, a eleventh exemplary alternative implementation of the dispensing control system for the substance control dispensing system 10 of FIG. 1 is depicted as holding ingestible material 42 with containing assembly 44 including container 46 with valve 110 integrated with electronic memory 52 that retains status information about the containing assembly. As containing assembly 44 is inserted into receiving assembly 48 of the substance control dispensing system 10, valve 110 is opened by member 112 thereby allowing ingestible material 42 to move through orifice 114. Opening of valve 110 is noted by an update to memory 52, which is read by receiver 54 with the information being passed on through the substance control dispensing system 10 to be reported through one or more of selection indicators 20.

Figure 37:
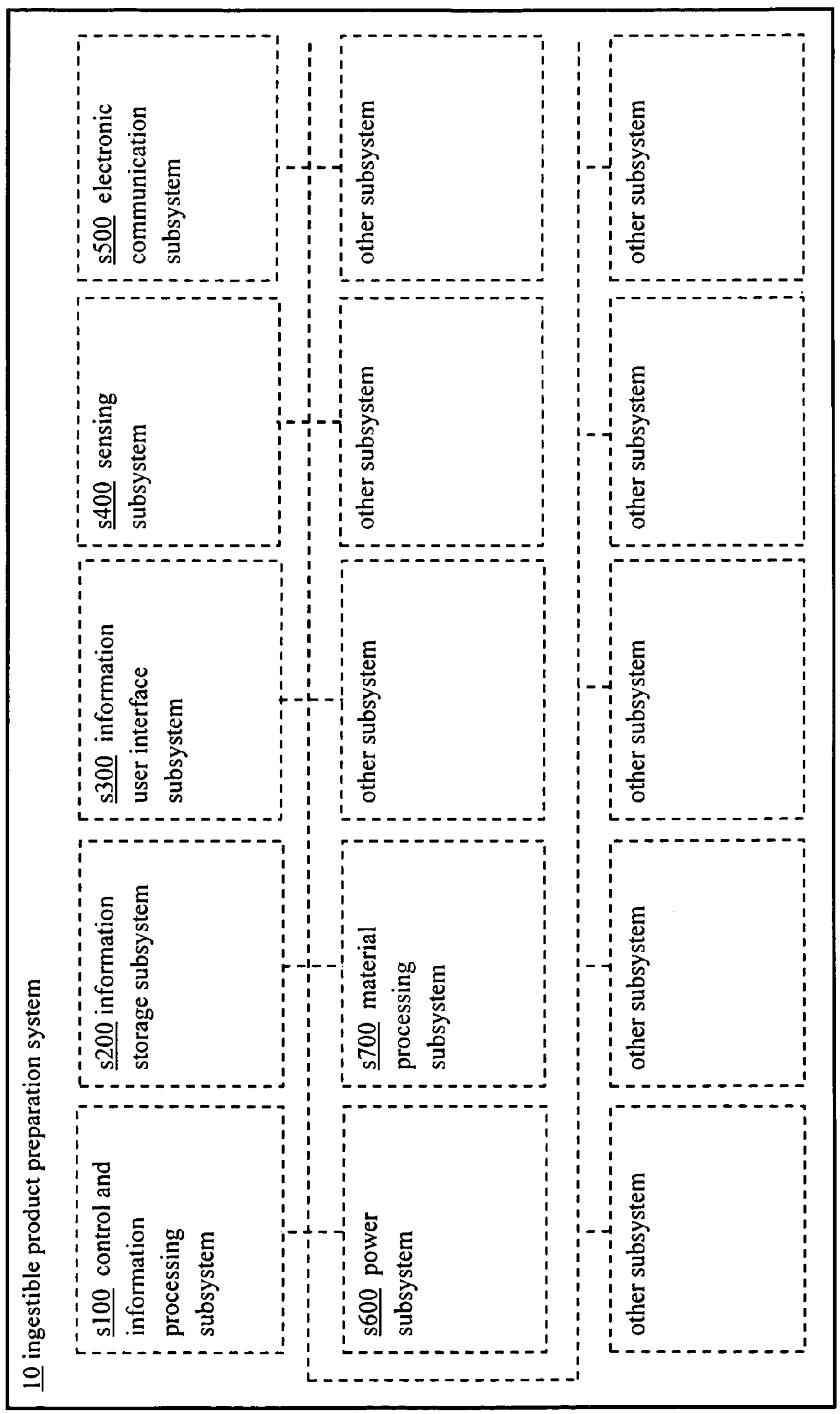
FIG. 37 is a block diagram depicting an exemplary implementation of the substance control dispensing system 10 including exemplary subsystems of FIG. 1.

An exemplary version of the substance control dispensing system 10 is shown in FIG. 37 to optionally include various subsystems such as control and information processing subsystem s100, information storage subsystem s200, information user interface subsystem s300, sensing subsystem s400, electronic communication subsystem s500, power subsystem s600, and material processing subsystem s700.

Figure 38:
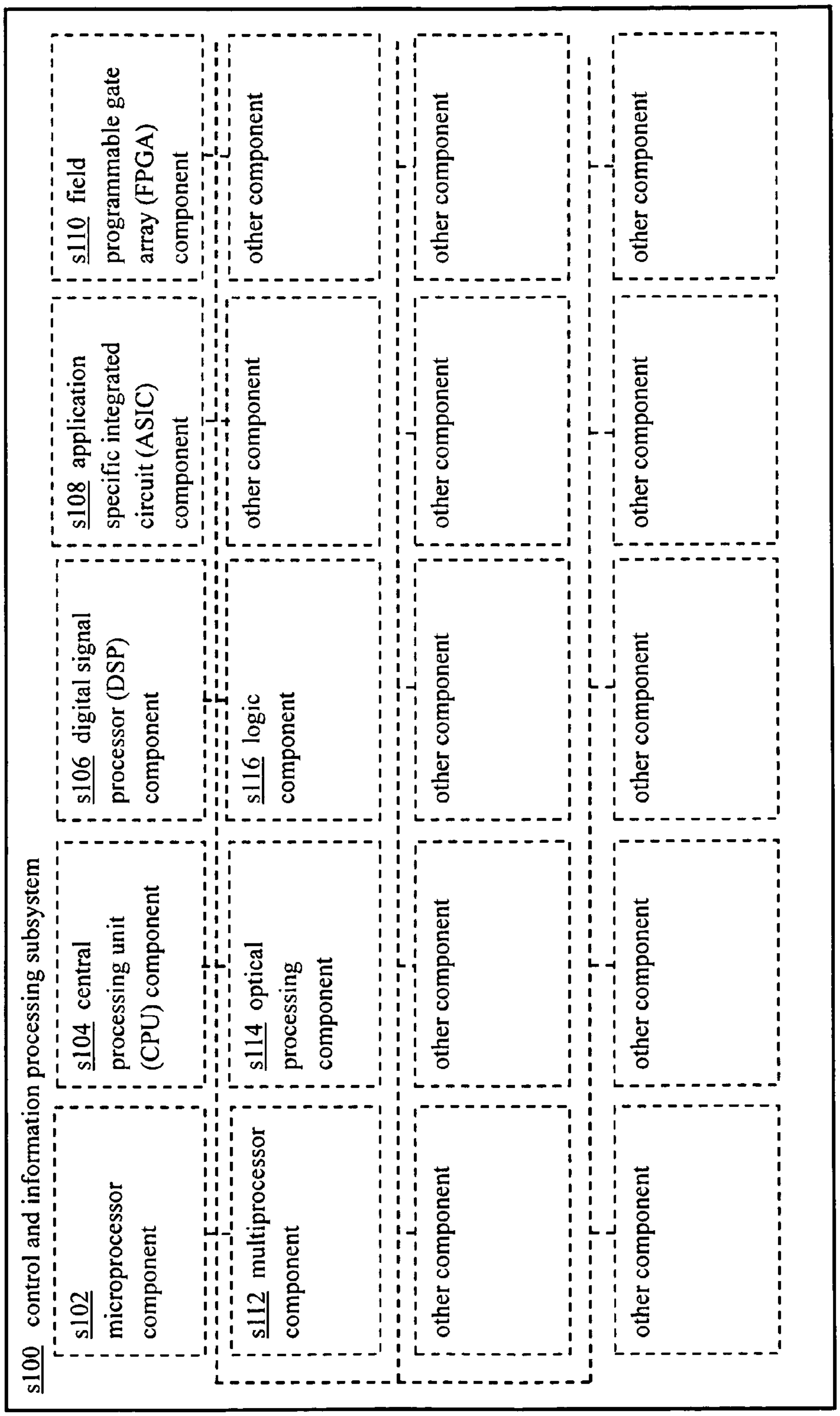
FIG. 38 is a block diagram depicting a control and information processing subsystem s100 of an exemplary implementation of the substance control dispensing system 10 of FIG. 1.

An exemplary implementation of the control and information processing subsystem s100 is shown in FIG. 38 to optionally include various components such as microprocessor component s102, central processing unit (CPU) component s104, digital signal processor (DSP) component s106, application specific integrated circuit (ASIC) component s108, field programmable gate array (FPGA) component s110, multiprocessor component s112, and optical processing component s114.

Figure 39:
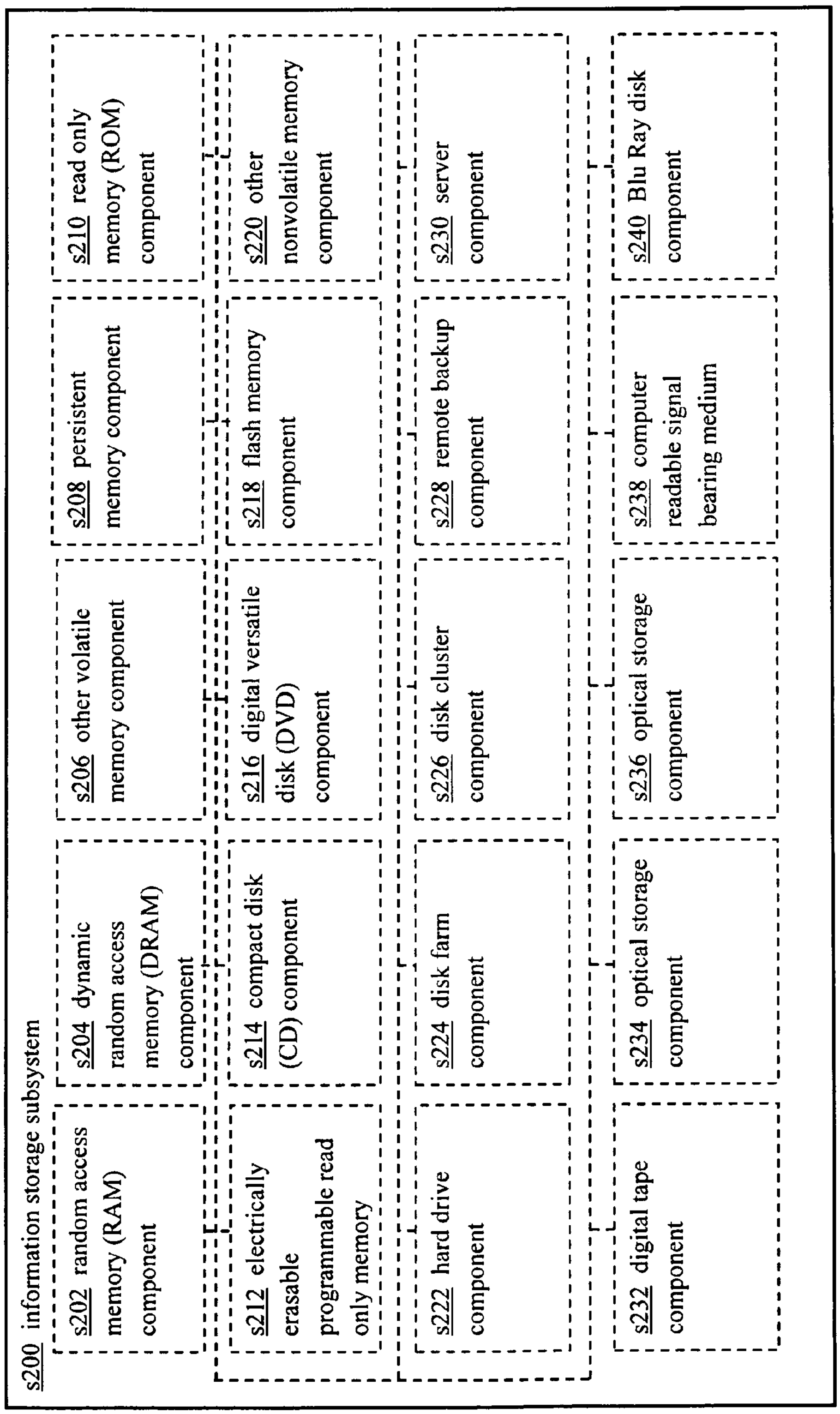
FIG. 39 is a block diagram depicting an information storage subsystem s200 of an exemplary implementation of the substance control dispensing system 10 of FIG. 1.

An exemplary implementation of the information storage subsystem s200 is shown in FIG. 39 to optionally include various components such as random access memory (RAM) component s202, dynamic random access memory (DRAM) component s204, other volatile memory component s206, persistent memory component s208, read only memory (ROM) component s210, electrically erasable programmable read only memory (EEPROM) component s212, compact disk (CD) component s214, digital versatile disk (DVD) component s216, flash memory component s218, other nonvolatile memory component s220, hard drive component s222, disk farm component s224, disk cluster component s226, remote backup component s228, server component s230, digital tape component s232, optical storage component s234, optical storage component s236, computer readable signal bearing medium s238, and Blu Ray disk component s240.

Figure 40:
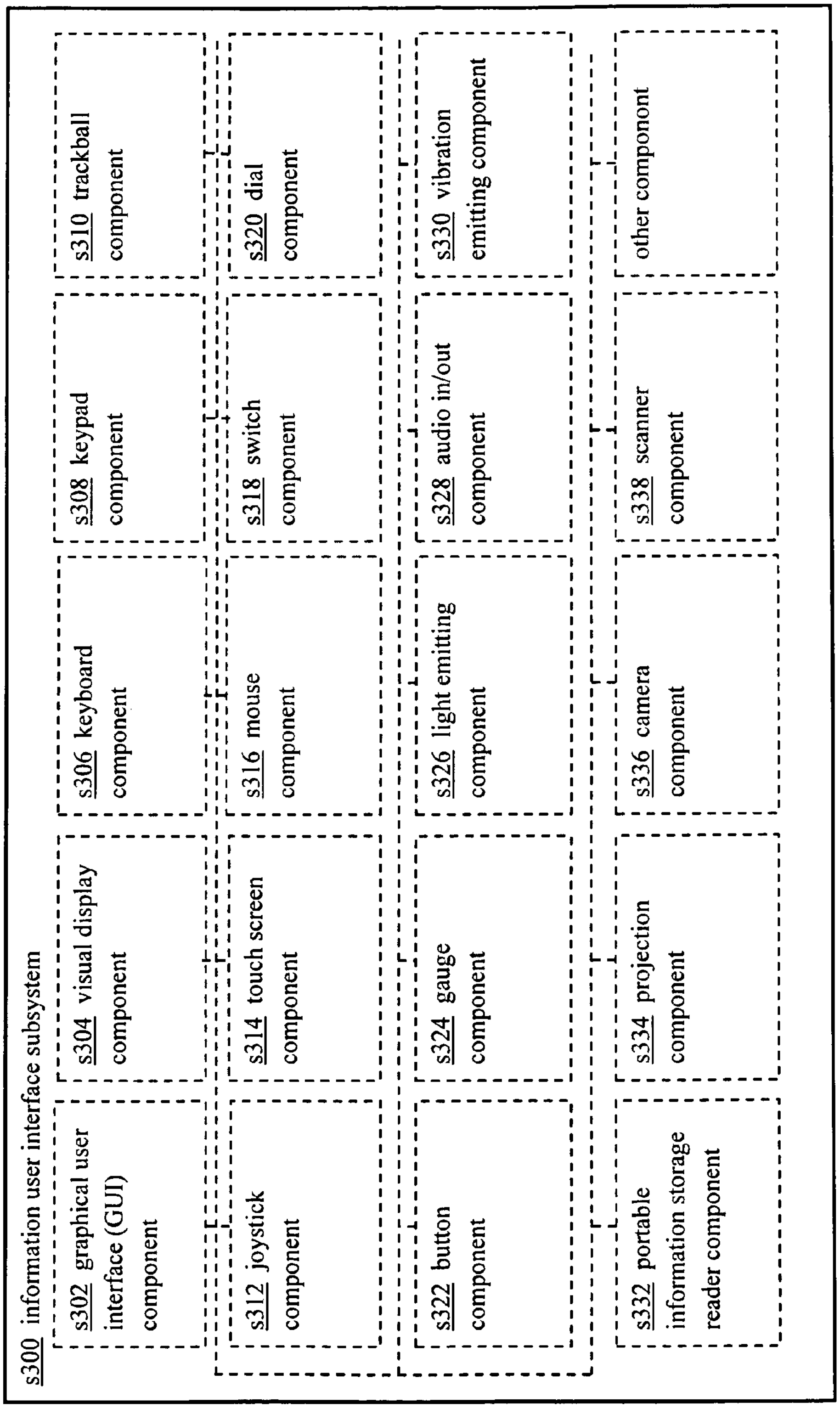
FIG. 40 is a block diagram depicting an information user interface subsystem s300 of an exemplary implementation of the substance control dispensing system 10 of FIG. 1.

An exemplary implementation of the information user interface subsystem s300 is shown in FIG. 40 to optionally include various components such as graphical user interface (GUI) component s302, visual display component s304, keyboard component s306, keypad component s308, trackball component s310, joystick component s312, touch screen component s314, mouse component s316, switch component s318, dial component s320, button component s322, gauge component s324, light emitting component s326, audio in/out component s328, vibration emitting component s330, portable information storage reader component s332, projection component s334, camera component s336, and scanner component s338.

Figure 41:
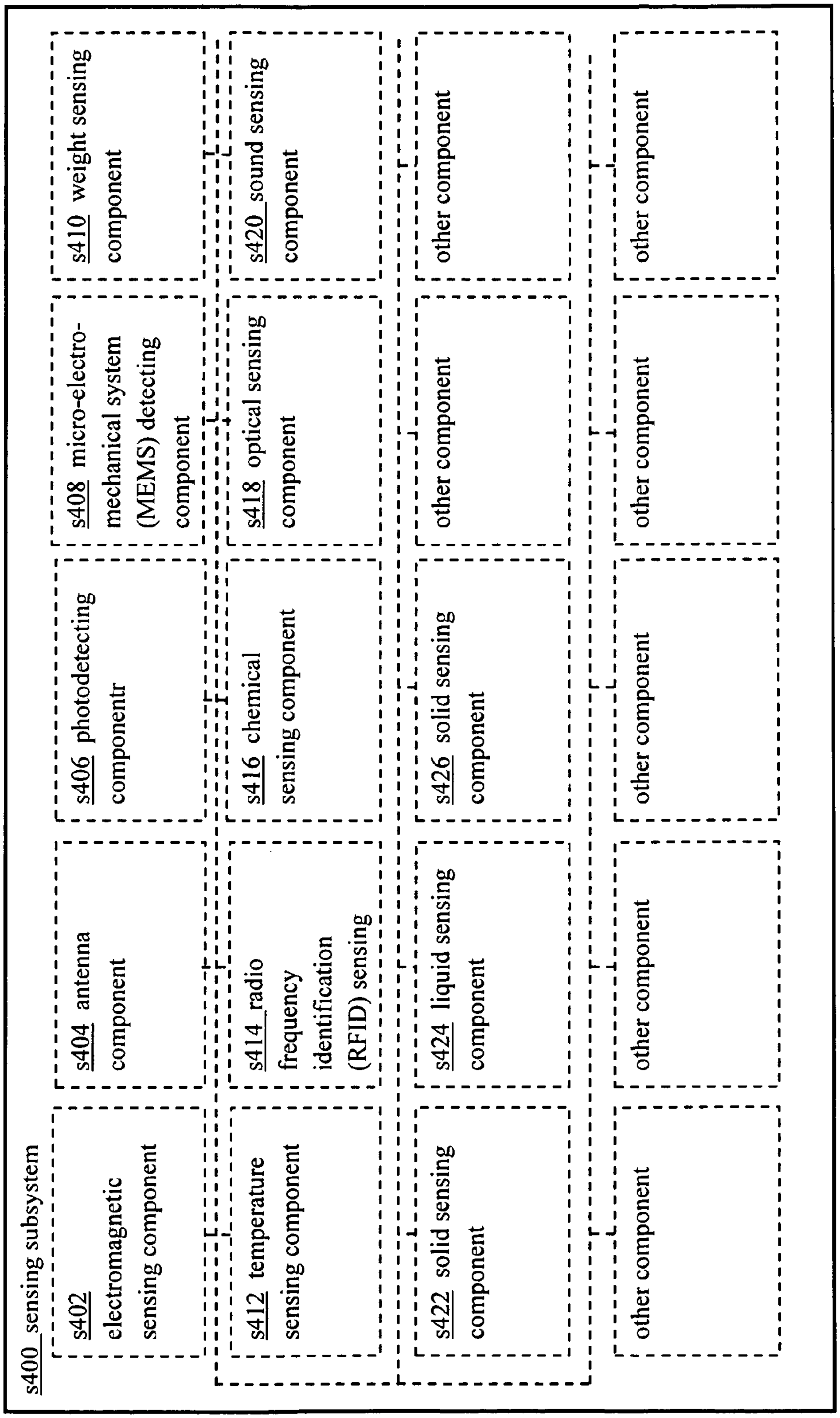
FIG. 41 is a block diagram depicting a sensing subsystem s400 of an exemplary implementation of the substance control dispensing system 10 of FIG. 1.

An exemplary implementation of the sensing subsystem s400 is shown in FIG. 41 to optionally include various components such as electromagnetic sensing component s402, antenna component s404, photodetecting s406, micro-electro-mechanical system (MEMS) detecting component s408, weight sensing component s410, temperature sensing component s412, radio frequency identification (RFID) sensing component s414, chemical sensing component s416, optical sensing component s418, sound sensing component s420, solid sensing component s422, liquid sensing component s424, and solid sensing component s426.

Figure 42:
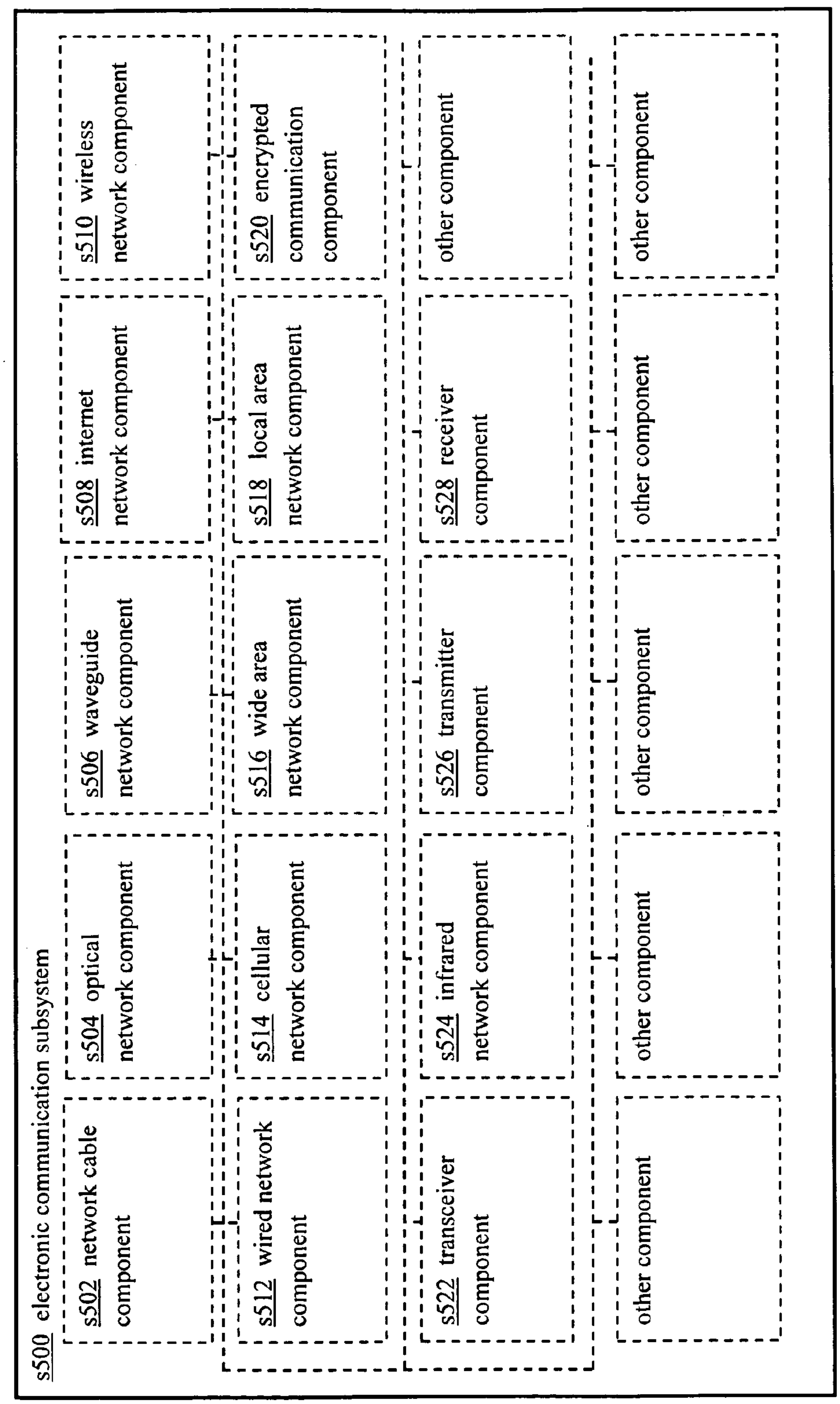
FIG. 42 is a block diagram depicting an electronic communication subsystem s500 of an exemplary implementation of the substance control dispensing system 10 of FIG. 1.

An exemplary implementation of the electronic communication subsystem s500 is shown in FIG. 42 to optionally include various components such as network cable component s502, optical network component s504, waveguide network component s506, internet network component s508, wireless network component s510, wired network component s512, cellular network component s514, wide area network component s516, local area network component s518, encrypted communication component s520, transceiver component s522, infrared network component s524, transmitter component s526, and receiver component s528.

Figure 43:
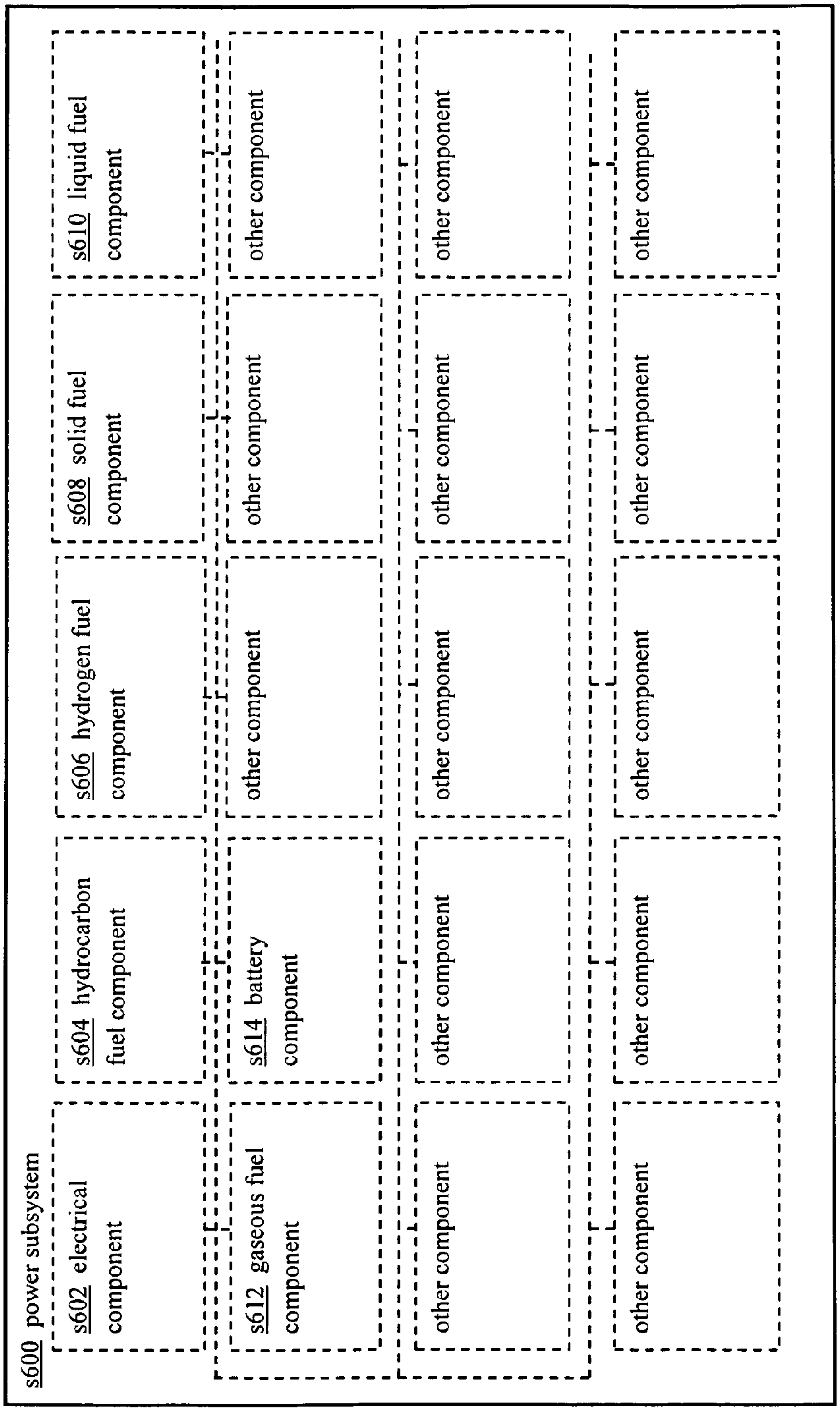
FIG. 43 is a block diagram depicting a power subsystem s600 of an exemplary implementation of the substance control dispensing system 10 of FIG. 1.

An exemplary implementation of the power subsystem s600 is shown in FIG. 43 to optionally include various components such as electrical component s602, hydrocarbon fuel component s604, hydrogen fuel component s606, solid fuel component s608, liquid fuel component s610, gaseous fuel component s612, and battery component s614.

Figure 44:
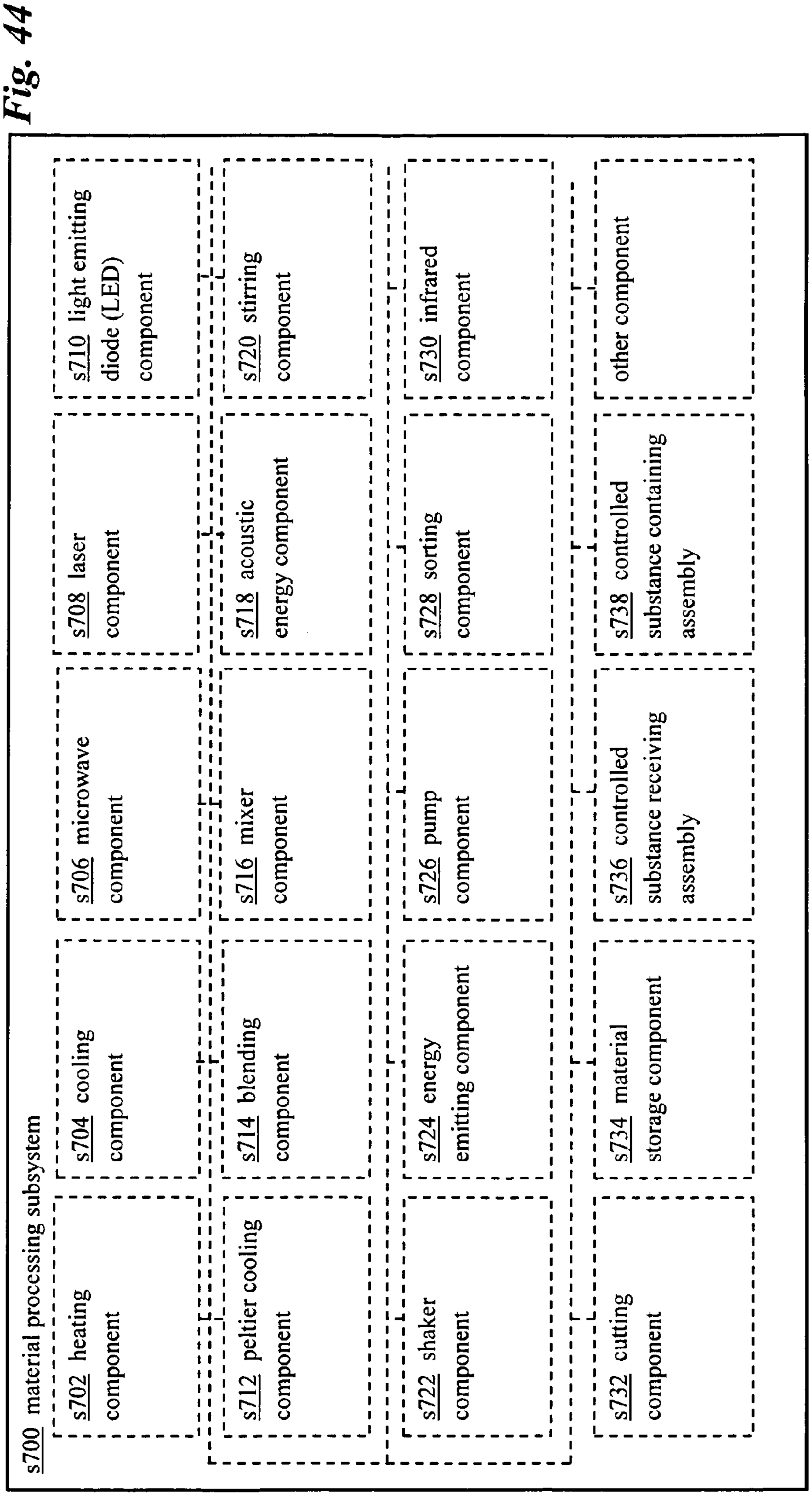
FIG. 44 is a block diagram depicting a material processing subsystem s700 of an exemplary implementation of the substance control dispensing system 10 of FIG. 1.

An exemplary implementation of the material processing subsystem s700 is shown in FIG. 44 to optionally include various components such as heating component s702, cooling component s704, microwave component s706, laser component s708, light emitting diode (LED) component s710, peltier cooling component s712, blending component s714, mixer component s716, acoustic energy component s718, stirring component s720, shaker component s722, energy emitting component s724, pump component s726, sorting component s728, infrared component s730, cutting component s732, material storage component s734, controlled substance receiving assembly s736, and controlled substance containing assembly s738.

Figure 45:
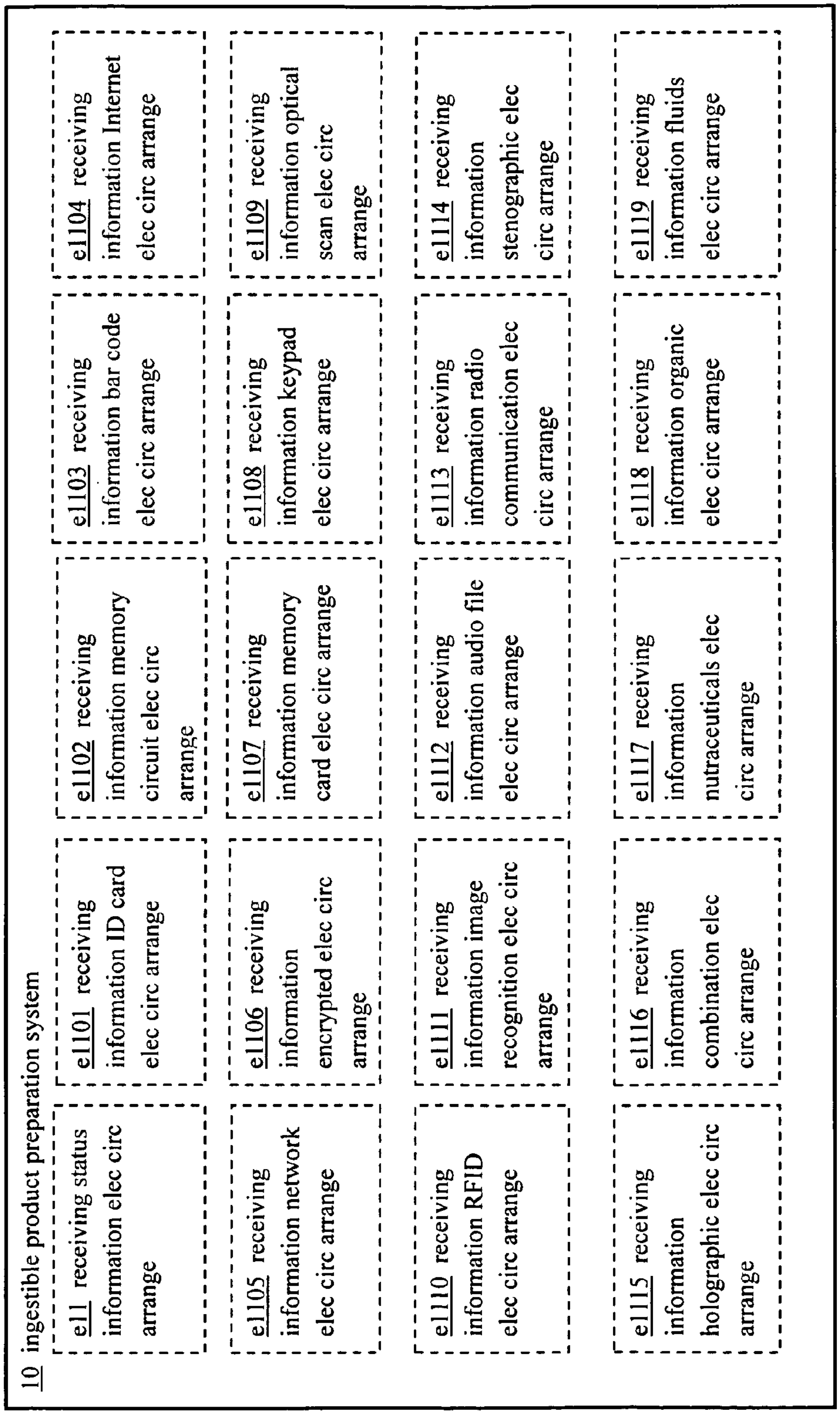
FIG. 45 is a block diagram depicting one or more exemplary electrical circuitry arrangements of the substance control dispensing system 10 of FIG. 1.

Implementations involve different combinations (otherwise known as "electrical circuitry arrangements") of components from the subsystems of the substance control dispensing system 10. Exemplary depictions of some of these electrical circuitry arrangements are shown in FIG. 45 to include receiving status information electrical circuitry arrangement e11, receiving information ID card electrical circuitry arrangement e1101, receiving information memory circuit electrical circuitry arrangement e1102, receiving information bar code electrical circuitry arrangement e1103, receiving information Internet electrical circuitry arrangement e1104, receiving information network electrical circuitry arrangement e1105, receiving information encrypted electrical circuitry arrangement e1106, receiving information memory card electrical circuitry arrangement e1107, receiving information keypad electrical circuitry arrangement e1108, receiving information optical scan electrical circuitry arrangement e1109, receiving information RFID electrical circuitry arrangement e1110, receiving information image recognition electrical circuitry arrangement e1111, receiving information audio file electrical circuitry arrangement e1112, receiving information radio communication electrical circuitry arrangement e1113, receiving information stenographic electrical circuitry arrangement e1114, receiving information holographic electrical circuitry arrangement e1115, receiving information combination electrical circuitry arrangement e1116, receiving information nutraceuticals electrical circuitry arrangement e1117, receiving information organic electrical circuitry arrangement e1118, and receiving information fluids electrical circuitry arrangement e1119.

Figure 46:
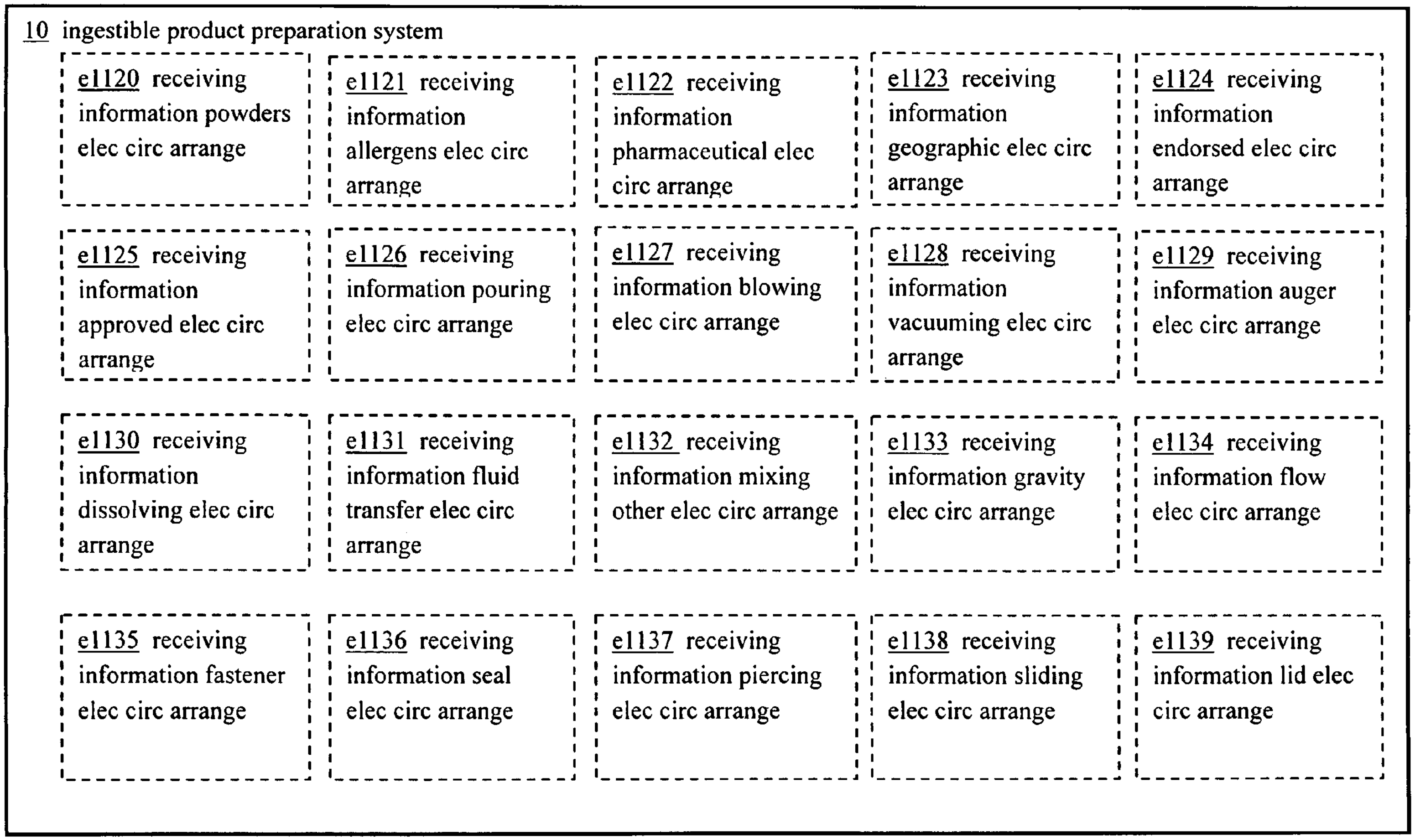
FIG. 46 is a block diagram depicting one or more exemplary electrical circuitry arrangements of the substance control dispensing system 10 of FIG. 1.

Some of these electrical circuitry arrangements are depicted in FIG. 46 to include receiving information powders electrical circuitry arrangement e1120, receiving information allergens electrical circuitry arrangement e1121, receiving information pharmaceutical electrical circuitry arrangement e1122, receiving information geographic electrical circuitry arrangement e1123, receiving information endorsed electrical circuitry arrangement e1124, receiving information approved electrical circuitry arrangement e1125, receiving information pouring electrical circuitry arrangement e1126, receiving information blowing electrical circuitry arrangement e1127, receiving information vacuuming electrical circuitry arrangement e1128, receiving information auger electrical circuitry arrangement e1129, receiving information dissolving electrical circuitry arrangement e1130, receiving information fluid transfer electrical circuitry arrangement e113, receiving information mixing other electrical circuitry arrangement e1132, receiving information gravity electrical circuitry arrangement e1133, receiving information flow electrical circuitry arrangement e1134, receiving information fastener electrical circuitry arrangement e1135, receiving information seal electrical circuitry arrangement e1136, receiving information piercing electrical circuitry arrangement e1137, receiving information sliding electrical circuitry arrangement e1138, and receiving information lid electrical circuitry arrangement e1139.

Figure 47:
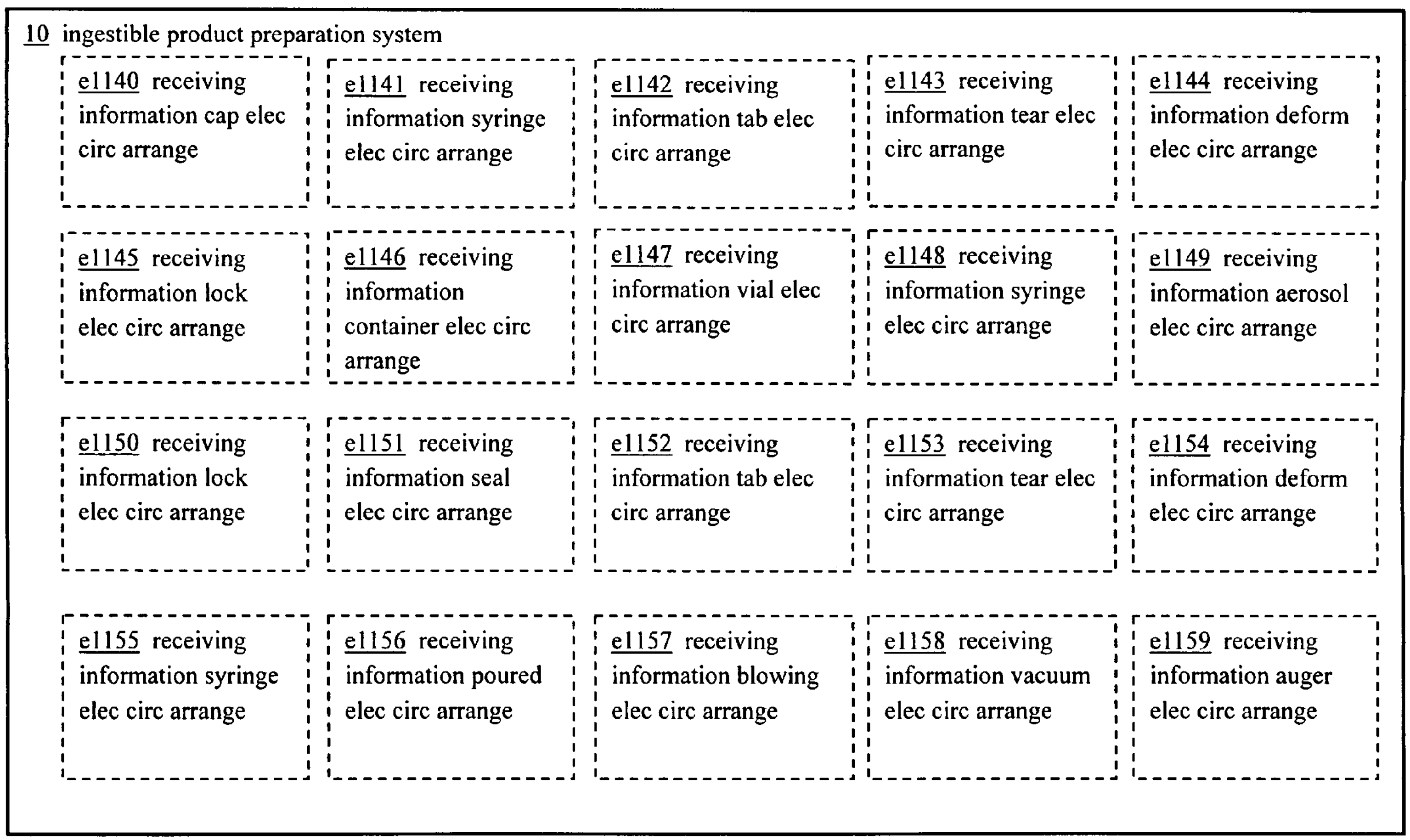
FIG. 47 is a block diagram depicting one or more exemplary electrical circuitry arrangements of the substance control dispensing system 10 of FIG. 1.

Some of these electrical circuitry arrangements are depicted in FIG. 47 to include receiving information cap electrical circuitry arrangement e1140, receiving information syringe electrical circuitry arrangement e1141, receiving information tab electrical circuitry arrangement e1142, receiving information tear electrical circuitry arrangement e1143, receiving information deform electrical circuitry arrangement e1144, receiving information lock electrical circuitry arrangement e1145, receiving information container electrical circuitry arrangement e1146, receiving information vial electrical circuitry arrangement e1147, receiving information syringe electrical circuitry arrangement e1148, receiving information aerosol electrical circuitry arrangement e1149, receiving information lock electrical circuitry arrangement e1150, receiving information seal electrical circuitry arrangement e1151, receiving information tab electrical circuitry arrangement e1152, receiving information tear electrical circuitry arrangement e1153, receiving information deform electrical circuitry arrangement e1154, receiving information syringe electrical circuitry arrangement e1155, receiving information poured electrical circuitry arrangement e1156, receiving information blowing electrical circuitry arrangement e1157, receiving information vacuum electrical circuitry arrangement e1158, and receiving information auger electrical circuitry arrangement e1159.

Figure 48:
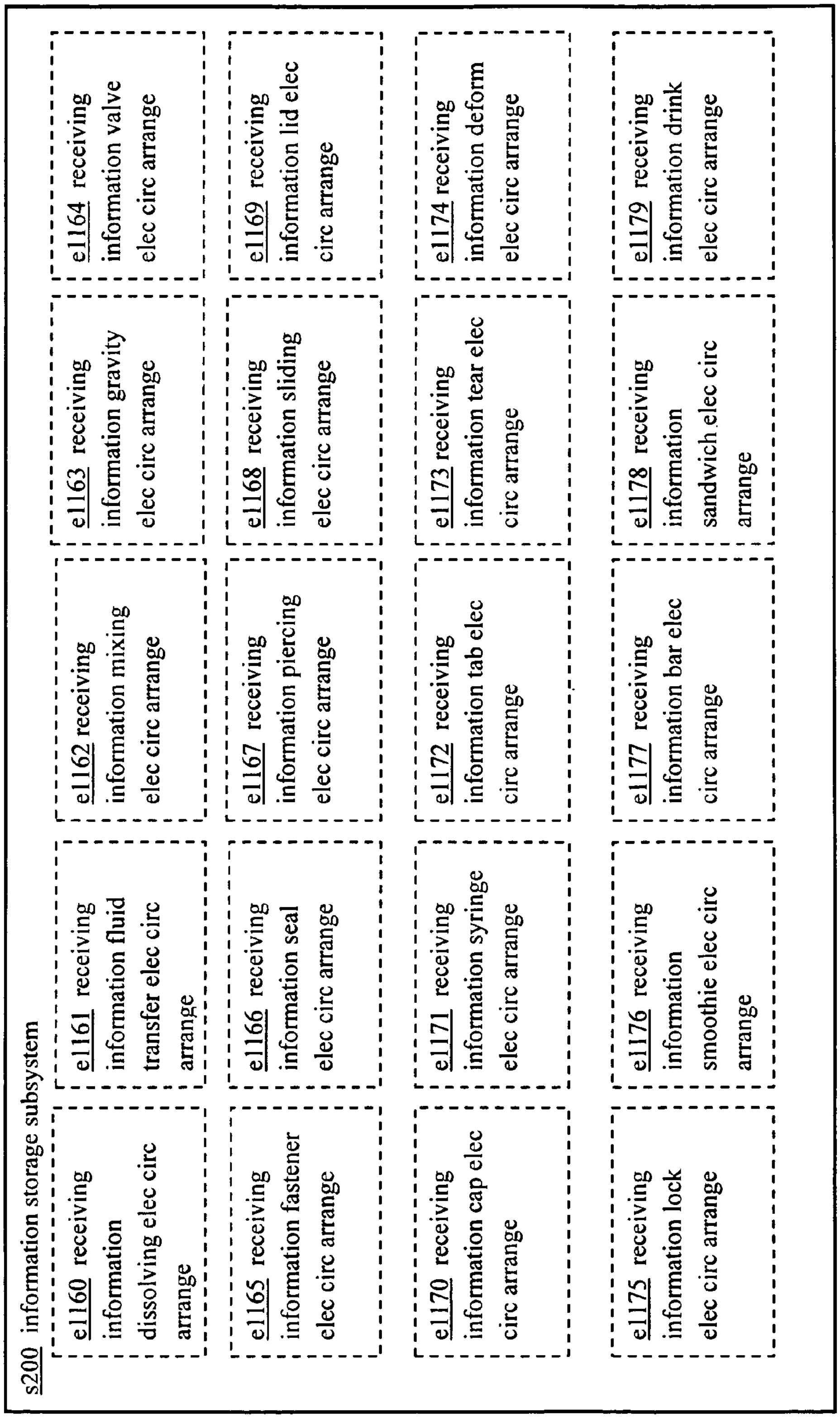
FIG. 48 is a block diagram depicting one or more exemplary electrical circuitry arrangements of the substance control dispensing system 10 of FIG. 1.

Some of these electrical circuitry arrangements are depicted in FIG. 48 to include receiving information dissolving electrical circuitry arrangement e1160, receiving information fluid transfer electrical circuitry arrangement e1161, receiving information mixing electrical circuitry arrangement e1162, receiving information gravity electrical circuitry arrangement e1163, receiving information valve electrical circuitry arrangement e1164, receiving information fastener electrical circuitry arrangement e1165, receiving information seal electrical circuitry arrangement e1166, receiving information piercing electrical circuitry arrangement e1167, receiving information sliding electrical circuitry arrangement e1168, receiving information lid electrical circuitry arrangement e1169, cap electrical circuitry arrangement e1170, receiving information syringe electrical circuitry arrangement e1171, receiving information tab electrical circuitry arrangement e1172, receiving information tear electrical circuitry arrangement e1173, receiving information deform electrical circuitry arrangement e1174, receiving information lock electrical circuitry arrangement e1175, receiving information smoothie electrical circuitry arrangement e1176, receiving information bar electrical circuitry arrangement e1177, receiving information sandwich electrical circuitry arrangement e1178, and receiving information drink electrical circuitry arrangement e1179.

Figure 49:
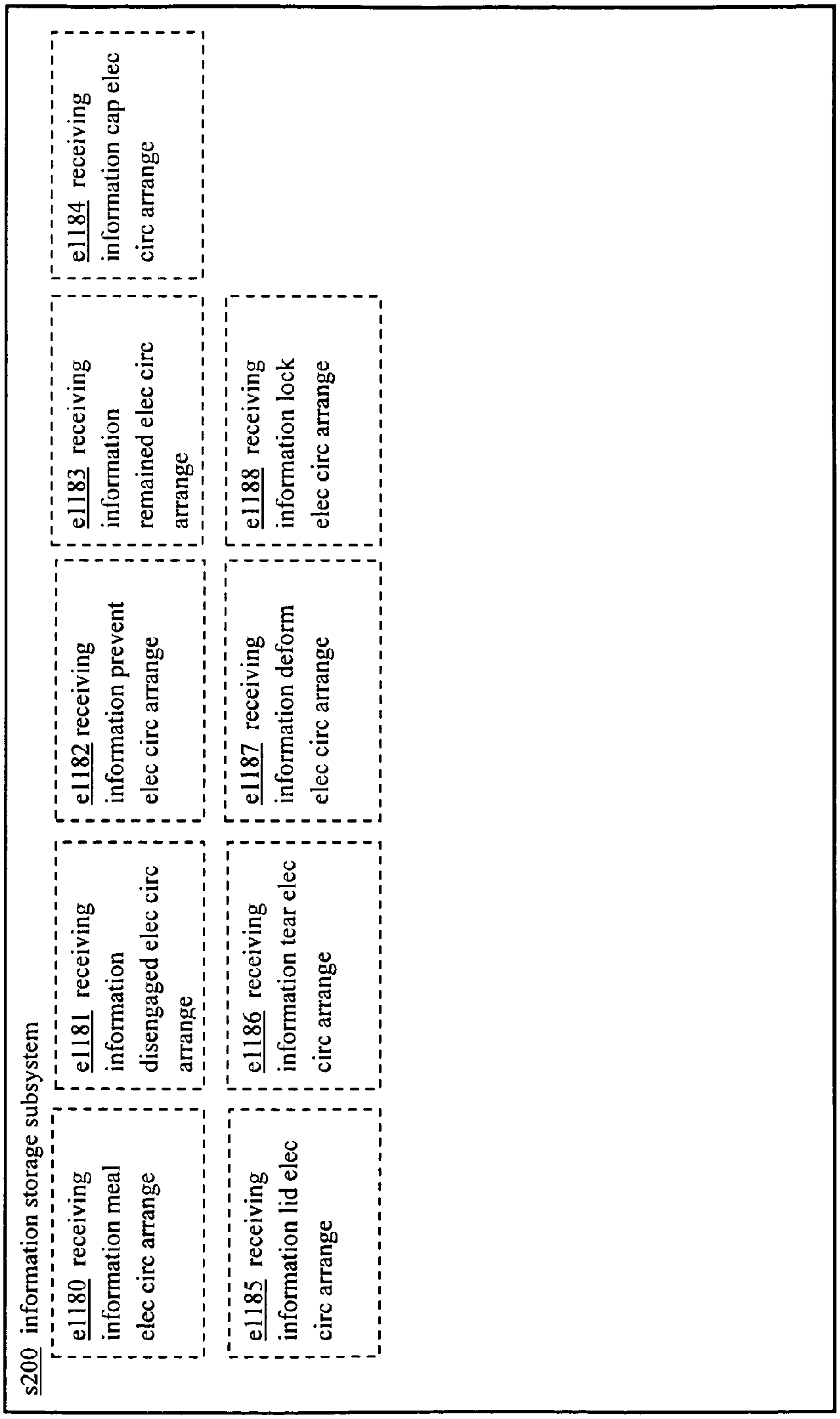
FIG. 49 is a block diagram depicting one or more exemplary electrical circuitry arrangements of the substance control dispensing system 10 of FIG. 1.

Some of these electrical circuitry arrangements are depicted in FIG. 49 to include receiving information meal electrical circuitry arrangement e1180, receiving information disengaged electrical circuitry arrangement e1181, receiving information prevent electrical circuitry arrangement e1182, receiving information remained electrical circuitry arrangement e1183, receiving information cap electrical circuitry arrangement e1184, receiving information lid electrical circuitry arrangement e1185, receiving information tear electrical circuitry arrangement e1186, receiving information deform electrical circuitry arrangement e1187, and receiving information lock electrical circuitry arrangement e1188.

Figure 50:
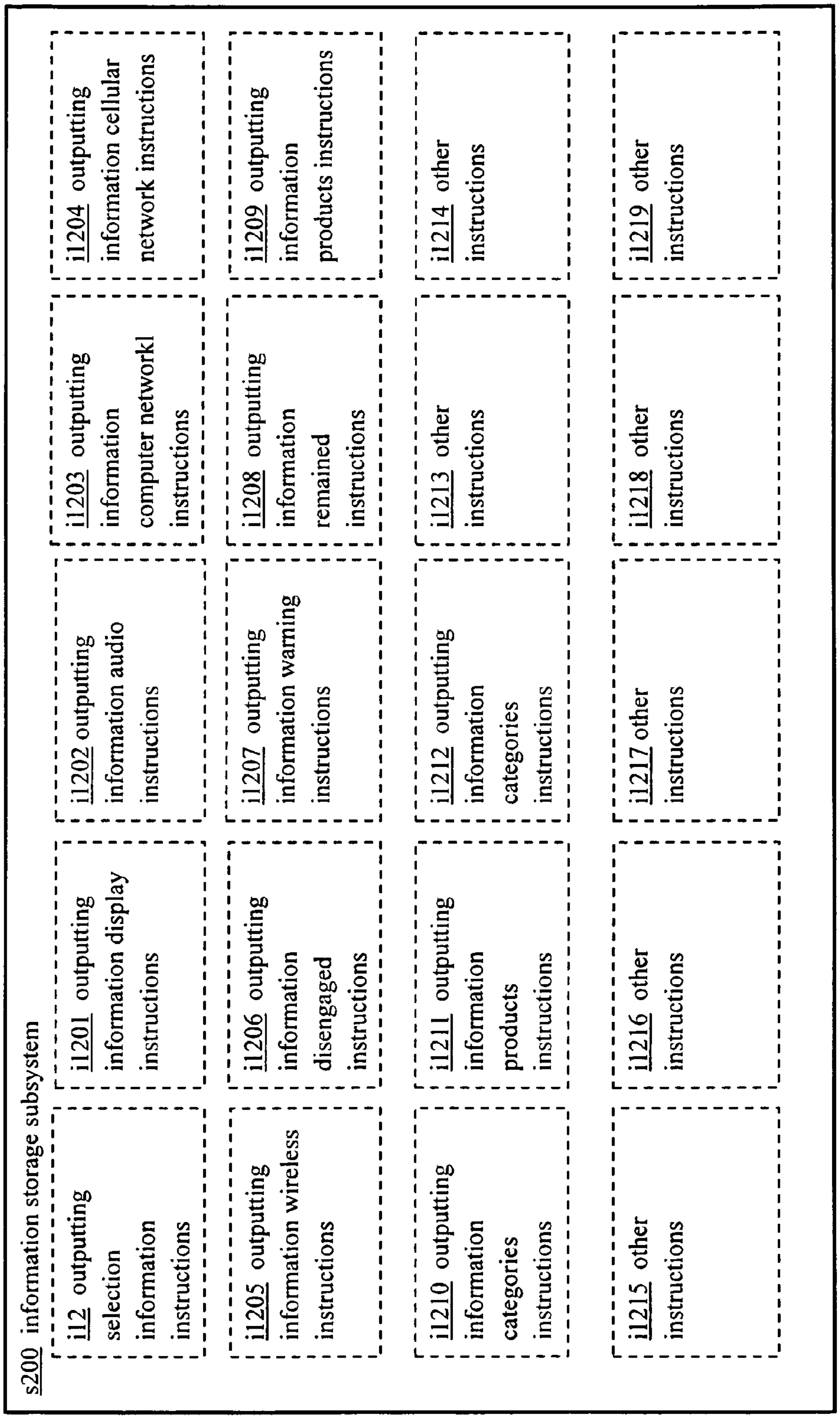
FIG. 50 is a block diagram depicting one or more exemplary electrical circuitry arrangements of the substance control dispensing system 10 of FIG. 1.

Some of these electrical circuitry arrangements are depicted in FIG. 50 to include outputting selection information electrical circuitry arrangement e12, outputting information display electrical circuitry arrangement e1201, outputting information audio electrical circuitry arrangement e1202, outputting information computer electrical circuitry arrangement e1203, outputting information cellular network electrical circuitry arrangement e1204, outputting information wireless electrical circuitry arrangement e1205, outputting information disengaged electrical circuitry arrangement e1206, outputting information warning electrical circuitry arrangement e1207, outputting information remained electrical circuitry arrangement e1208, outputting information products electrical circuitry arrangement e1209, outputting information categories electrical circuitry arrangement e1210, outputting information products electrical circuitry arrangement e1211, and outputting information categories electrical circuitry arrangement e1212.

Figure 51:
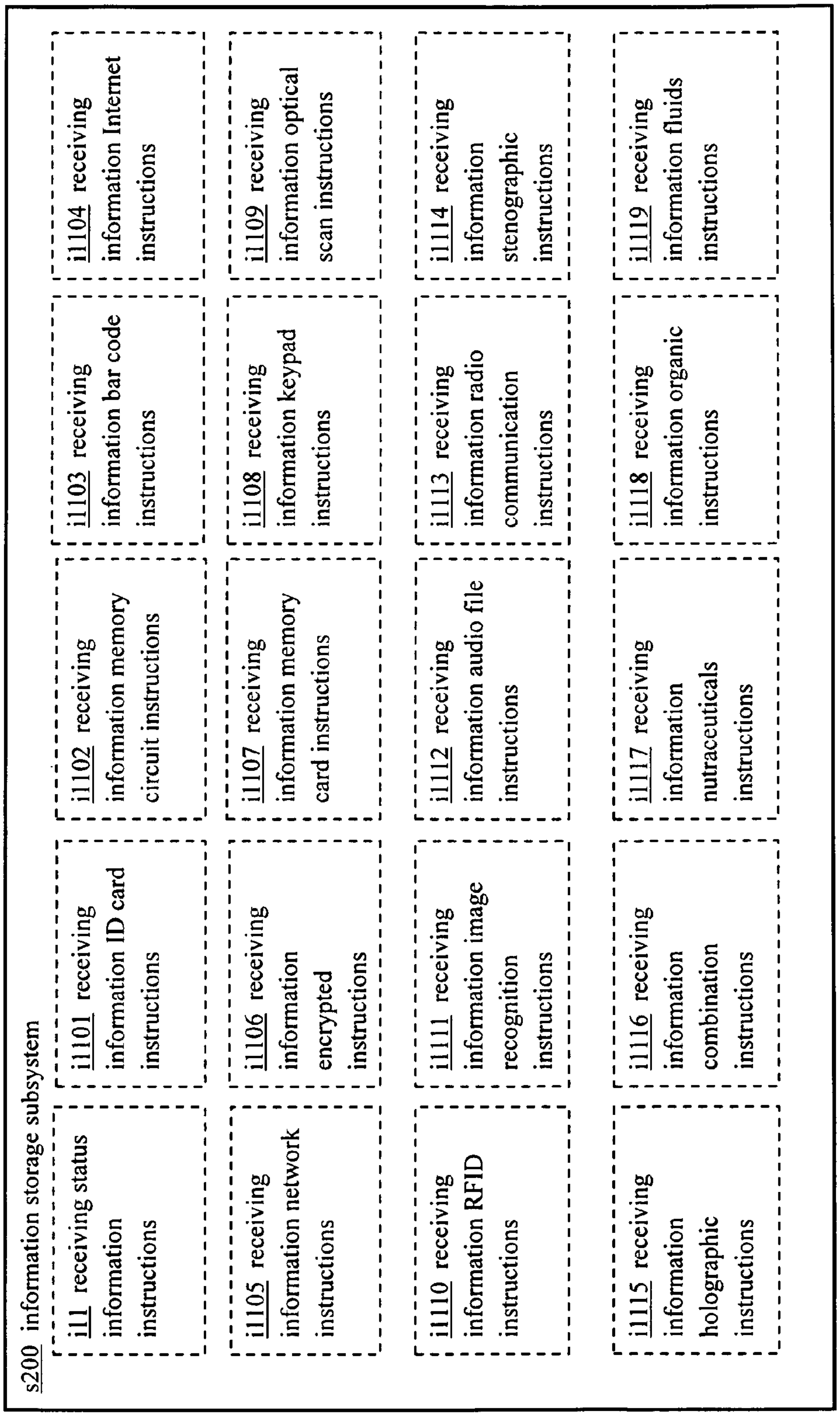
FIG. 51 is a block diagram depicting one or more exemplary instructions of the information storage subsystem s200 of the substance control dispensing system 10 of FIG. 1.

In implementations one or more instructions are stored and/or otherwise borne in various subsystems, components, and/or accessories of the substance control dispensing system 10 such as being borne in a non-transitory signal bearing medium n100. One or more exemplary instructions depicted in FIG. 51 as being borne in an exemplary version of the non-transitory signal bearing medium n100 include one or more receiving status information instructions i11, one or more receiving information ID card instructions i1101, one or more receiving information memory circuit instructions i1102, one or more receiving information bar code instructions i1103, one or more receiving information Internet instructions i1104, one or more receiving information network instructions i1105, one or more receiving information encrypted instructions i1106, one or more receiving information memory card instructions i1107, one or more receiving information keypad instructions i1108, one or more receiving information optical scan instructions i1109, one or more receiving information RFID instructions i1110, one or more receiving information image recognition instructions i1111, one or more receiving information audio file instructions i1112, one or more receiving information radio communication instructions i1113, one or more receiving information stenographic instructions i1114, one or more receiving information holographic instructions i1115, one or more receiving information combination instructions i1116, one or more receiving information nutraceuticals instructions i1117, one or more receiving information organic instructions i1118, and one or more receiving information fluids instructions i1119.

Figure 52:
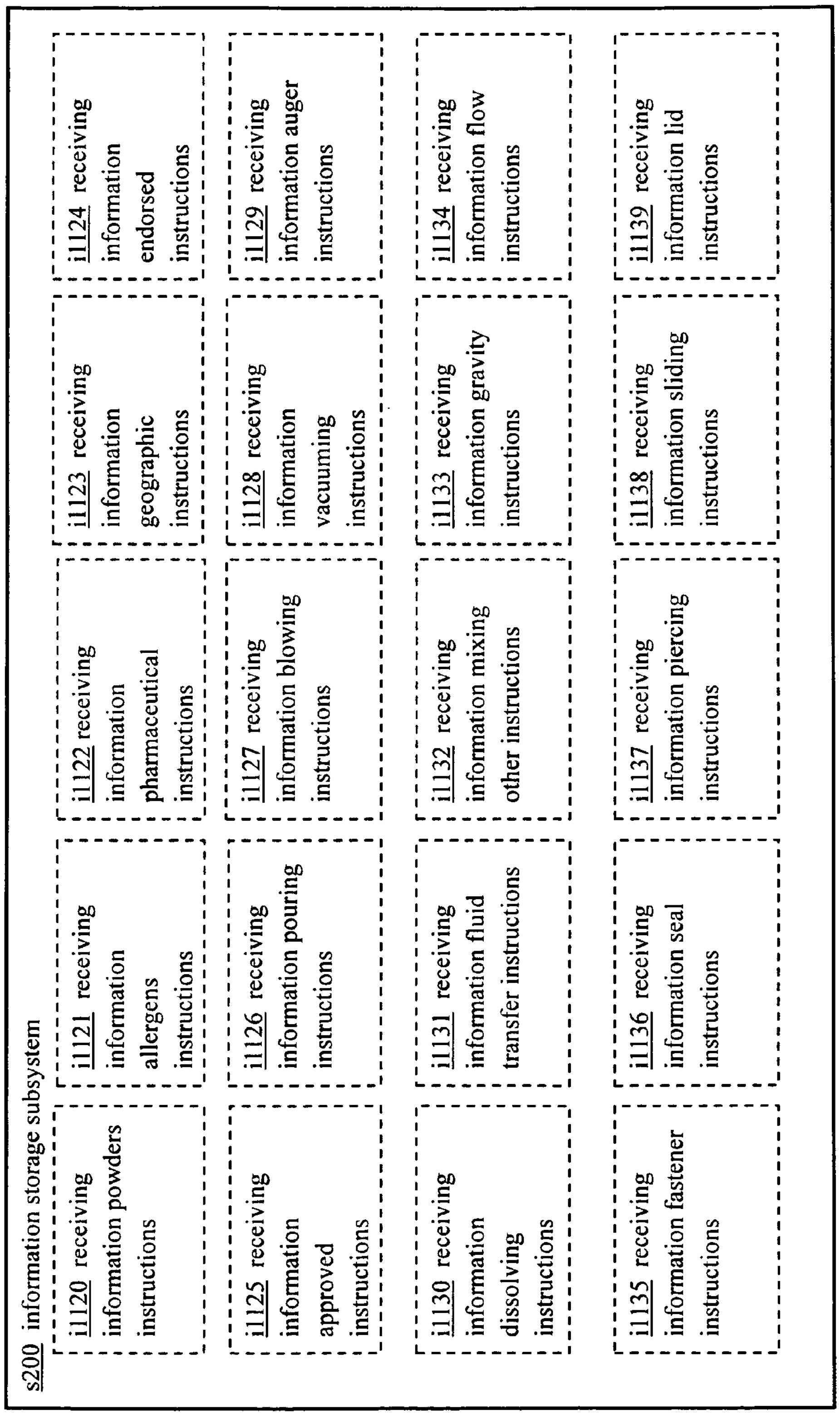
FIG. 52 is a block diagram depicting one or more exemplary instructions of the information storage subsystem s200 of the substance control dispensing system 10 of FIG. 1.

One or more exemplary instructions depicted in FIG. 52 as being borne in an exemplary version of the non-transitory signal bearing medium n100 include one or more receiving information powders instructions i1120, one or more receiving information allergens instructions i1121, one or more receiving information pharmaceutical instructions i1122, one or more receiving information geographic instructions i1123, one or more receiving information endorsed instructions i1124, one or more receiving information approved instructions i1125, one or more receiving information pouring instructions i1126, one or more receiving information blowing instructions i1127, one or more receiving information vacuuming instructions i1128, one or more receiving information auger instructions i1129, one or more receiving information dissolving instructions i1130, one or more receiving information fluid transfer instructions i1131, one or more receiving information mixing other instructions i1132, one or more receiving information gravity instructions i1133, one or more receiving information flow instructions i1134, one or more receiving information fastener instructions i1135, one or more receiving information seal instructions i1136, one or more receiving information piercing instructions i1137, one or more receiving information sliding instructions i1138, and one or more receiving information lid instructions i1139.

Figure 53:
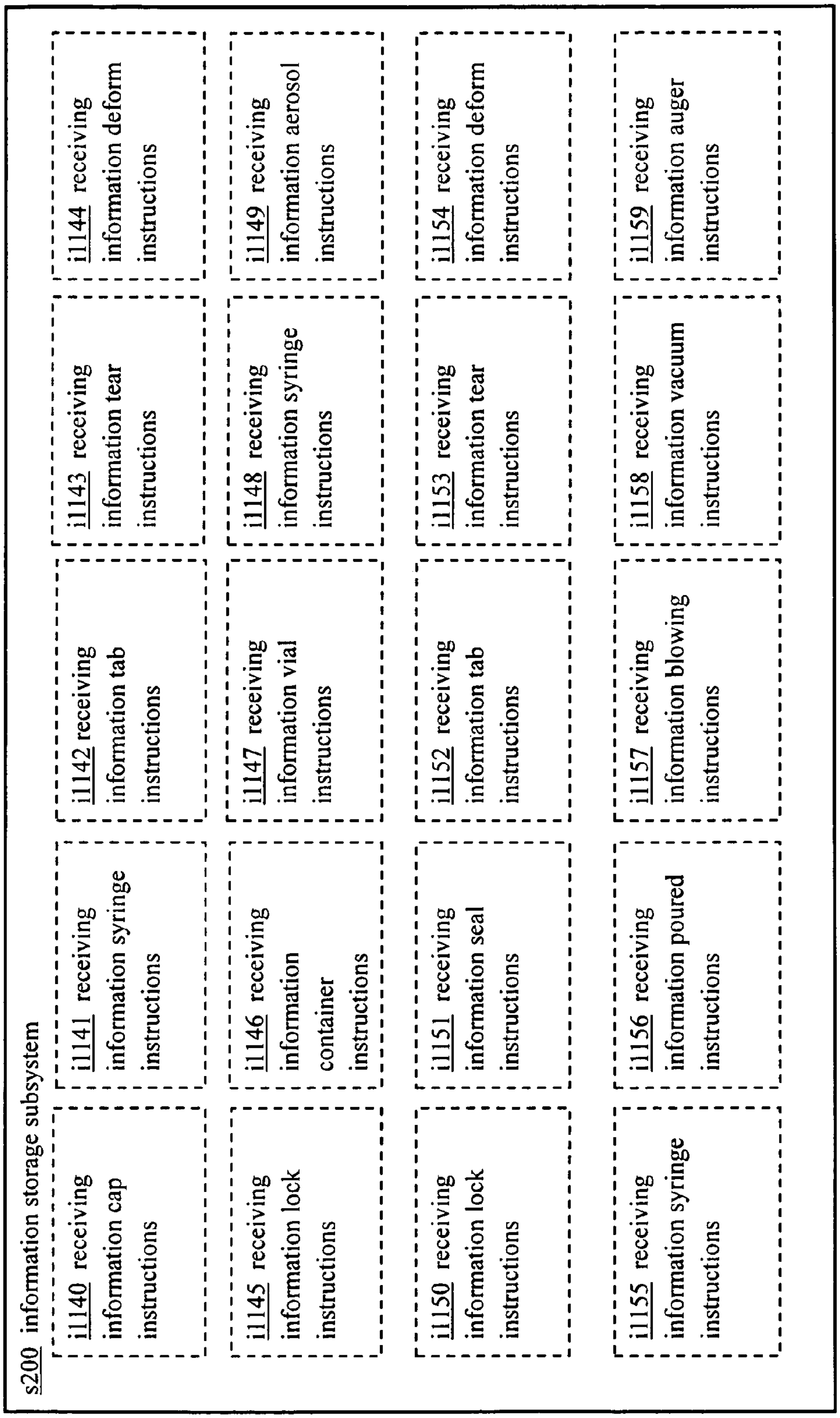
FIG. 53 is a block diagram depicting one or more exemplary instructions of the information storage subsystem s200 of the substance control dispensing system 10 of FIG. 1.

One or more exemplary instructions depicted in FIG. 53 as being borne in an exemplary version of the non-transitory signal bearing medium n100 include one or more receiving information cap instructions i1140, one or more receiving information syringe instructions i1141, one or more receiving information tab instructions i1142, one or more receiving information tear instructions i1143, one or more receiving information deform instructions i1144, one or more receiving information lock instructions i1145, one or more receiving information container instructions i1146, one or more receiving information vial instructions i1147, one or more receiving information syringe instructions i1148, one or more receiving information aerosol instructions i1149, one or more receiving information lock instructions i1150, one or more receiving information seal instructions i1151, one or more receiving information tab instructions i1152, one or more receiving information tear instructions i1153, one or more receiving information deform instructions i1154, one or more receiving information syringe instructions i1155, one or more receiving information poured instructions i1156, one or more receiving information blowing instructions i1157, one or more receiving information vacuum instructions i1158, and one or more receiving information auger instructions i1159.

Figure 54:
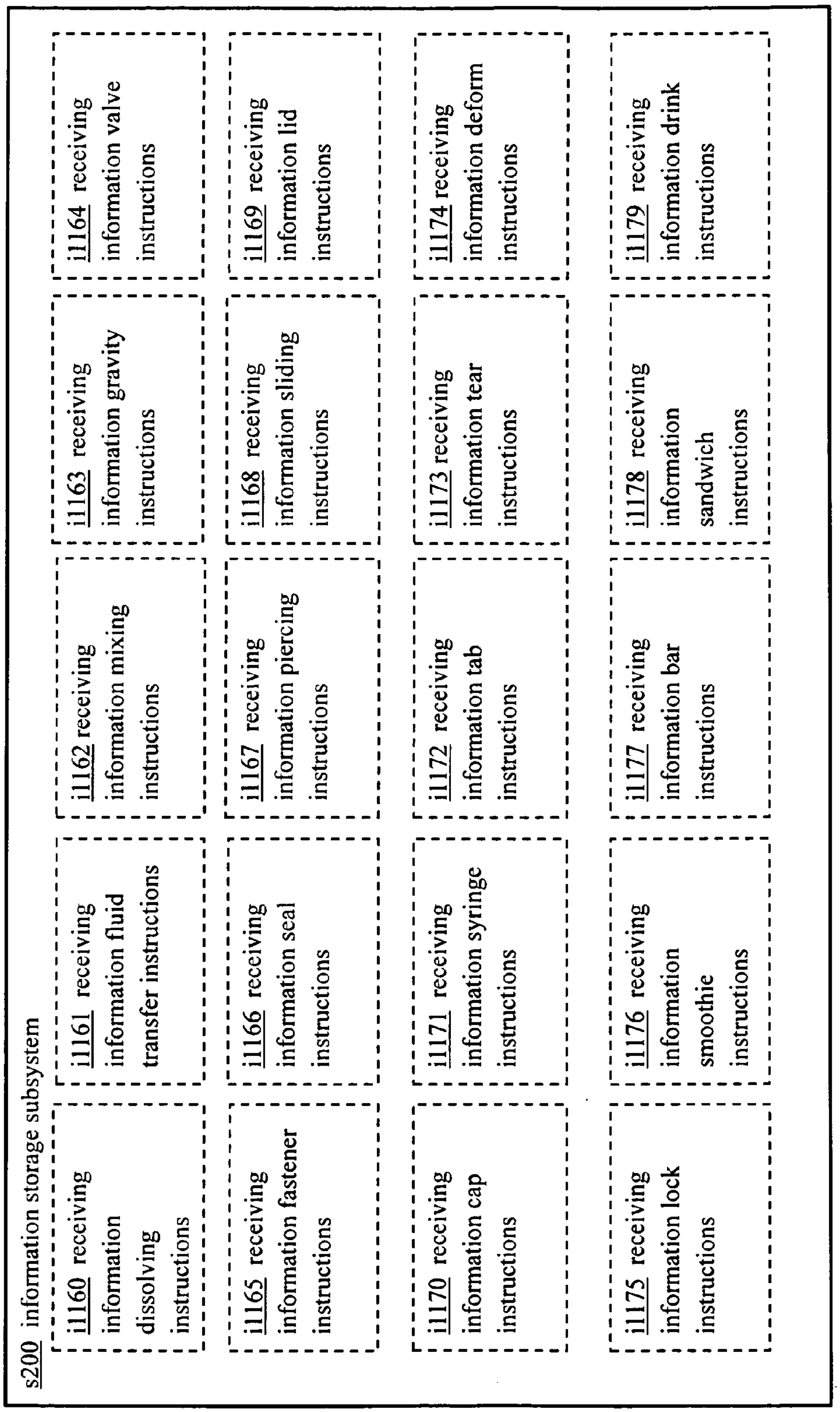
FIG. 54 is a block diagram depicting one or more exemplary instructions of the information storage subsystem s200 of the substance control dispensing system 10 of FIG. 1.
Figure 55:
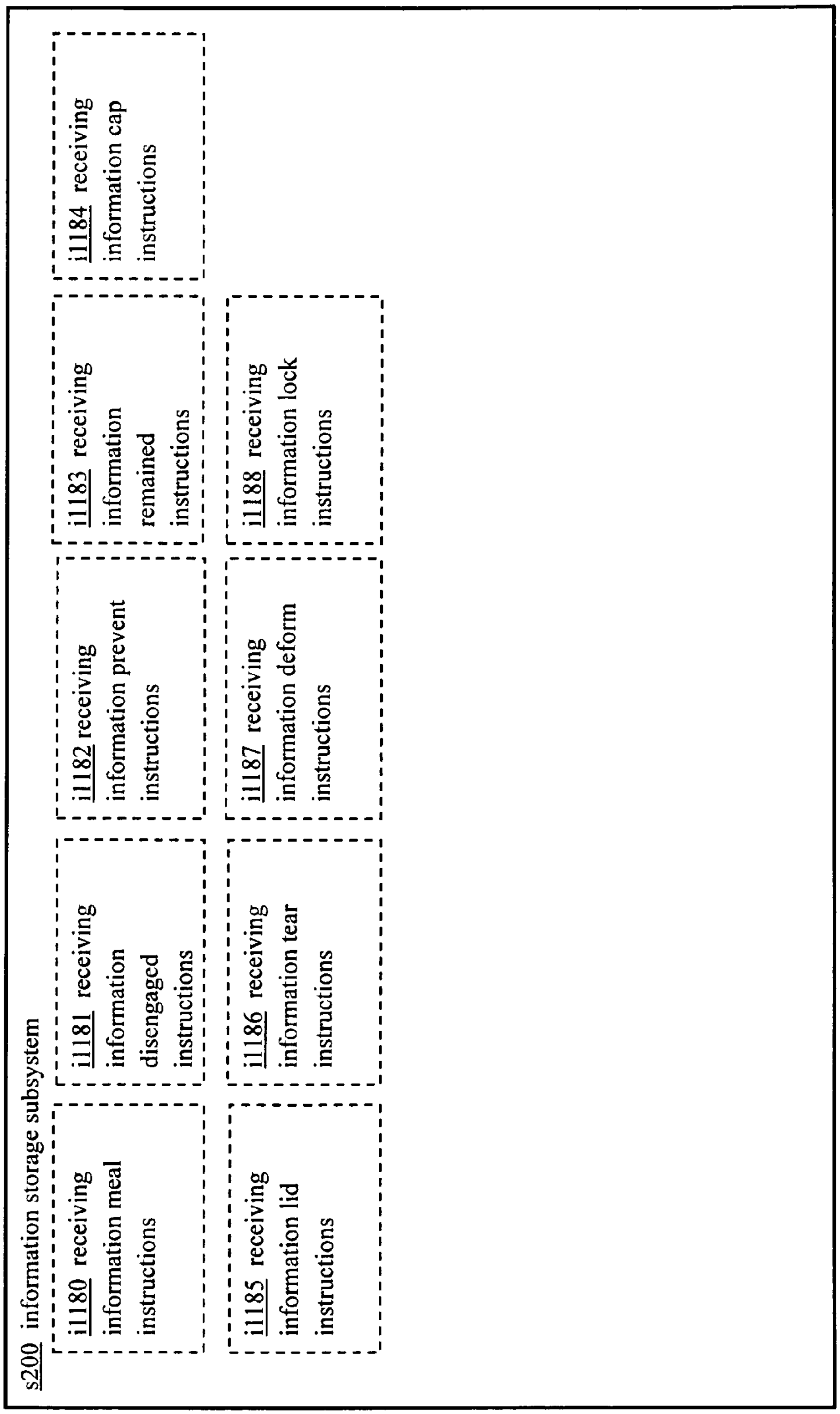
FIG. 55 is a block diagram depicting one or more exemplary instructions of the information storage subsystem s200 of the substance control dispensing system 10 of FIG. 1.

One or more exemplary instructions depicted in FIG. 54 as being borne in an exemplary version of the non-transitory signal bearing medium n100 include one or more receiving information dissolving instructions i1160, one or more receiving information fluid transfer instructions i1161, one or more receiving information mixing instructions i1162, one or more receiving information gravity instructions i1163, one or more receiving information valve instructions i1164, one or more receiving information fastener instructions i1165, one or more receiving information seal instructions i1166, one or more receiving information piercing instructions i1167, one or more receiving information sliding instructions i1168, one or more receiving information lid instructions i1169, one or more cap instructions i1170, one or more receiving information syringe instructions i1171, one or more receiving information tab instructions i1172, one or more receiving information tear instructions i1173, one or more receiving information deform instructions i1174, one or more, one or more receiving information lock instructions i1175, one or more receiving information smoothie instructions i1176, one or more receiving information bar instructions i1177, one or more receiving information sandwich instructions i1178, and one or more receiving information drink instructions i1179.

Some of these electrical circuitry arrangements are depicted in FIG. 49 to include receiving information meal instructions i1180, one or more receiving information disengaged instructions i1181, one or more receiving information prevent instructions i1182, one or more receiving information remained instructions i1183, one or more receiving information cap instructions i1184, one or more, one or more receiving information lid instructions i1185, one or more receiving information tear instructions i1186, one or more receiving information deform instructions i1187, and one or more receiving information lock instructions i1188.

Figure 56:
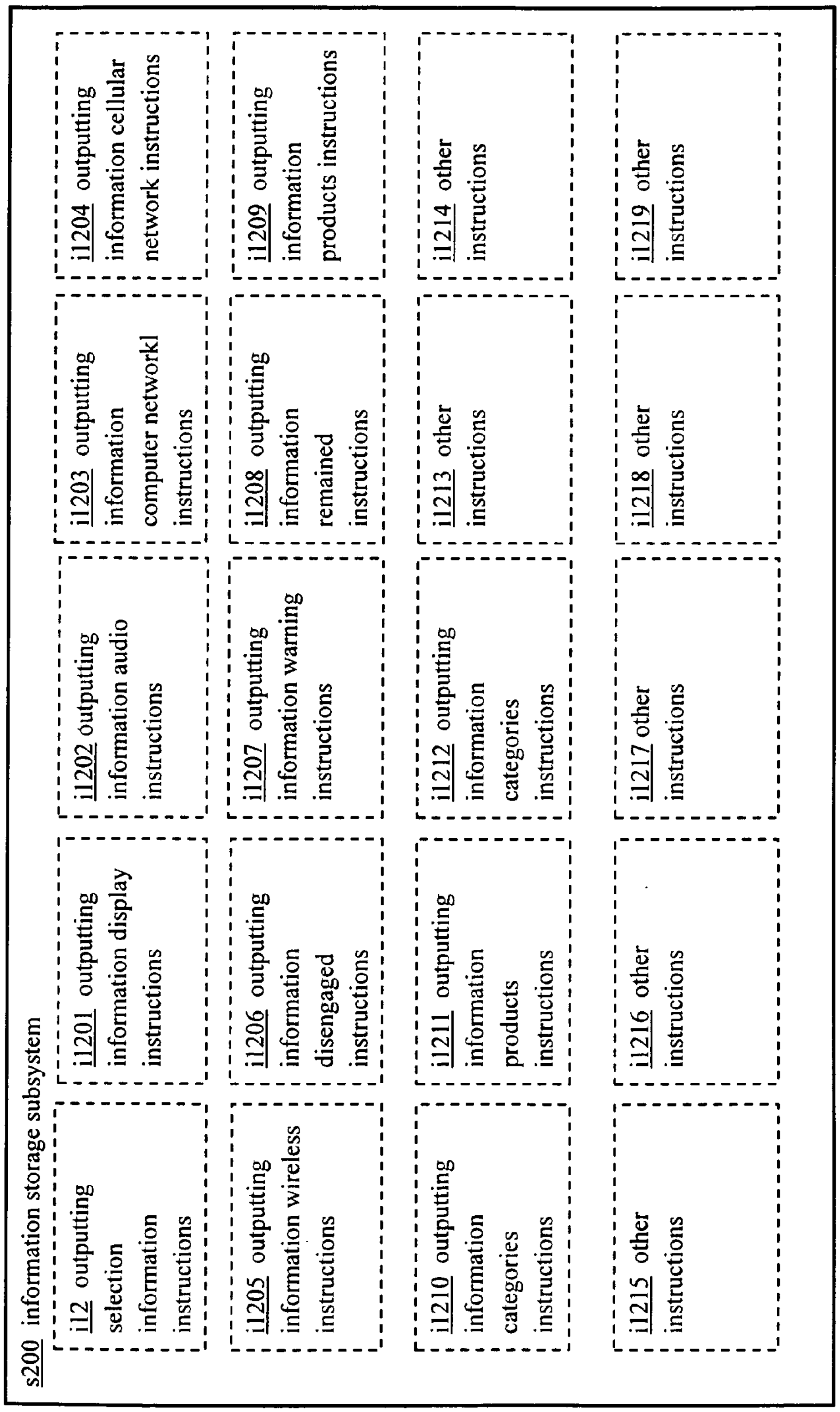
FIG. 56 is a block diagram depicting one or more exemplary instructions of the information storage subsystem s200 of the substance control dispensing system 10 of FIG. 1.

One or more exemplary instructions depicted in FIG. 56 as being borne in an exemplary version of the non-transitory signal bearing medium n100 include one or more outputting selection information instructions i12, one or more outputting information display instructions i1201, one or more outputting information audio instructions i1202, one or more outputting information computer instructions i1203, one or more outputting information cellular network instructions i1204, one or more outputting information wireless instructions i1205, one or more outputting information disengaged instructions i1206, one or more outputting information warning instructions i1207, one or more outputting information remained instructions i1208, one or more outputting information products instructions i1209, one or more outputting information categories instructions i1210, one or more outputting information products instructions i1211, one or more outputting information categories instructions i1212.

Figure 57:
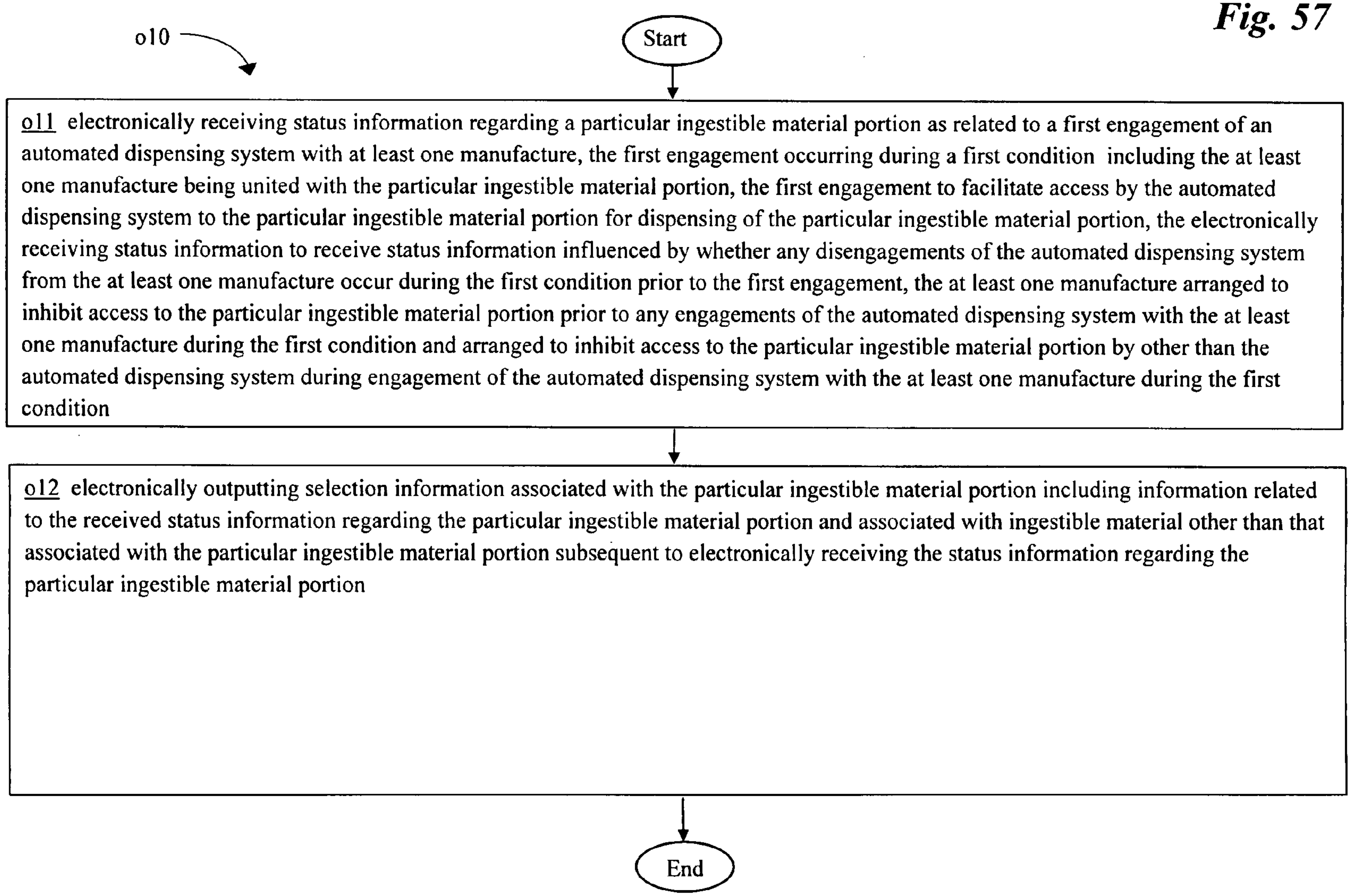
FIG. 57 is a high-level flowchart illustrating an operational flow o10 representing exemplary operations related to electronically receiving status information regarding a particular ingestible material portion as related to a first engagement of an automated dispensing system with at least one manufacture, the first engagement occurring during a first condition including the at least one manufacture being united with the particular ingestible material portion, the first engagement to facilitate access by the automated dispensing system to the particular ingestible material portion for dispensing of the particular ingestible material portion, the electronically receiving status information to receive status information influenced by whether any disengagements of the automated dispensing system from the at least one manufacture occur during the first condition prior to the first engagement, the at least one manufacture arranged to inhibit access to the particular ingestible material portion prior to any engagements of the automated dispensing system with the at least one manufacture during the first condition and arranged to inhibit access to the particular ingestible material portion by other than the automated dispensing system during engagement of the automated dispensing system with the at least one manufacture during the first condition, and electronically outputting selection information associated with the particular ingestible material portion including information related to the received status information regarding the particular ingestible material portion and associated with ingestible material other than that associated with the particular ingestible material portion subsequent to electronically receiving the status information regarding the particular ingestible material portion at least associated with the depicted exemplary implementations of the system.

An operational flow o10 as shown in FIG. 57 represents example operations related to receiving authorization information and directing fabrication of ingestible products based upon verification of the authorization.

FIG. 57 and those figures that follow may have various examples of operational flows, and explanation may be provided with respect to the above-described examples of FIGS. 1-36 and/or with respect to other examples and contexts. Nonetheless, it should be understood that the operational flows may be executed in a number of other environments and contexts, and/or in modified versions of FIGS. 1-36. Furthermore, although the various operational flows are presented in the sequence(s) illustrated, it should be understood that the various operations may be performed in other orders than those which are illustrated, or may be performed concurrently.

In FIG. 57 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

As shown in FIG. 57, the operational flow o10 proceeds to operation o11 for electronically receiving status information regarding a particular ingestible material portion as related to a first engagement of an automated dispensing system with at least one manufacture, the first engagement occurring during a first condition including the at least one manufacture being united with the particular ingestible material portion, the first engagement to facilitate access by the automated dispensing system to the particular ingestible material portion for dispensing of the particular ingestible material portion, the electronically receiving status information to receive status information influenced by whether any disengagements of the automated dispensing system from the at least one manufacture occur during the first condition prior to the first engagement, the at least one manufacture arranged to inhibit access to the particular ingestible material portion prior to any engagements of the automated dispensing system with the at least one manufacture during the first condition and arranged to inhibit access to the particular ingestible material portion by other than the automated dispensing system during engagement of the automated dispensing system with the at least one manufacture during the first condition. An exemplary version of the non-transitory signal bearing medium n100 is depicted as bearing one or more receiving status information instructions i11 that when executed will direct performance of the operation o11. In an implementation, the one or more receiving status information instructions i11 when executed direct electronically receiving status information (e.g. microprocessor component s102 receives status information via controlled substance receiving assembly s736 electronic interaction with controlled substance containing assembly s738, etc.) regarding a particular ingestible material portion (e.g. that portion of ingestible material 42 contained in the controlled substance containing assembly s738, etc.) as related to a first engagement of an automated dispensing system with at least one manufacture (e.g. engagement, such as via physical insertion of the controlled substance containing assembly s736 into the controlled substance receiving assembly s738 such, etc.), the first engagement occurring during a first condition including the at least one manufacture being united with the particular ingestible material portion (e.g. the controlled substance containing assembly s736 containing the controlled substance such as dehydrated certified organic vegetable matter, etc.), the first engagement to facilitate access by the automated dispensing system to the particular ingestible material portion for dispensing of the particular ingestible material portion (e.g. dispensing dehydrated certified organic vegetable matter as part of a soup mix prepared to be eaten by a consumer making a selection from a vending machine, etc.), the electronically receiving status information to receive status information influenced by whether any disengagements of the automated dispensing system from the at least one manufacture occur during the first condition prior to the first engagement (e.g. if the first engagement is the first time that the controlled substance containing assembly s736 has been engaged subsequent to being filled with the controlled substance, then there would have been no disengagements of the controlled substance containing assembly as well and thus, the status information could include that it is less likely, for instance, that the controlled substance has been tampered with and more likely that the controlled substance is what an associated label claims it to be, etc.), the at least one manufacture arranged to inhibit access to the particular ingestible material portion (e.g. inhibition to access could be had in a case where the controlled substance containing assembly s736 contains the controlled substance, etc.) prior to any engagements of the automated dispensing system with the at least one manufacture during the first condition and arranged to inhibit access to the particular ingestible material portion by other than the automated dispensing system during engagement of the automated dispensing system with the at least one manufacture during the first condition (e.g. before engagement, in some implementations the controlled substance containing assembly s736 could fully contain the controlled substance to prevent access from both the substance control dispensing system 10 and other things as well, furthermore, engagement with the substance control dispensing system could be such that the controlled substance containing assembly s736 could still prevent access to the controlled substance by entities other than the substance control dispensing system 10 itself, etc.). Furthermore, the receiving status information electrical circuitry arrangement ("elec circ arrange") e11 when activated will perform the operation oil. In an implementation, the receiving status information electrical circuitry arrangement ell, when activated performs electronically receiving status information (e.g. microprocessor component s102 receives status information via controlled substance receiving assembly s736 electronic interaction with controlled substance containing assembly s738, etc.) regarding a particular ingestible material portion (e.g. that portion of ingestible material 42 contained in the controlled substance containing assembly s738, etc.) as related to a first engagement of an automated dispensing system with at least one manufacture (e.g. engagement, such as via physical insertion of the controlled substance containing assembly s736 into the controlled substance receiving assembly s738 such, etc.), the first engagement occurring during a first condition including the at least one manufacture being united with the particular ingestible material portion (e.g. the controlled substance containing assembly s736 containing the controlled substance such as dehydrated certified organic vegetable matter, etc.), the first engagement to facilitate access by the automated dispensing system to the particular ingestible material portion for dispensing of the particular ingestible material portion (e.g. dispensing dehydrated certified organic vegetable matter as part of a soup mix prepared to be eaten by a consumer making a selection from a vending machine, etc.), the electronically receiving status information to receive status information influenced by whether any disengagements of the automated dispensing system from the at least one manufacture occur during the first condition prior to the first engagement (e.g. if the first engagement is the first time that the controlled substance containing assembly s736 has been engaged subsequent to being filled with the controlled substance, then there would have been no disengagements of the controlled substance containing assembly as well and thus, the status information could include that it is less likely, for instance, that the controlled substance has been tampered with and more likely that the controlled substance is what an associated label claims it to be, etc.), the at least one manufacture arranged to inhibit access to the particular ingestible material portion (e.g. inhibition to access could be had in a case where the controlled substance containing assembly s736 contains the controlled substance, etc.) prior to any engagements of the automated dispensing system with the at least one manufacture during the first condition and arranged to inhibit access to the particular ingestible material portion by other than the automated dispensing system during engagement of the automated dispensing system with the at least one manufacture during the first condition (e.g. before engagement, in some implementations the controlled substance containing assembly s736 could fully contain the controlled substance to prevent access from both the substance control dispensing system 10 and other things as well, furthermore, engagement with the substance control dispensing system could be such that the controlled substance containing assembly s736 could still prevent access to the controlled substance by entities other than the substance control dispensing system 10 itself, etc.). In an implementation, the electronically receiving status information regarding a particular ingestible material portion as related to a first engagement of an automated dispensing system with at least one manufacture, the first engagement occurring during a first condition including the at least one manufacture being united with the particular ingestible material portion, the first engagement to facilitate access by the automated dispensing system to the particular ingestible material portion for dispensing of the particular ingestible material portion, the electronically receiving status information to receive status information influenced by whether any disengagements of the automated dispensing system from the at least one manufacture occur during the first condition prior to the first engagement, the at least one manufacture arranged to inhibit access to the particular ingestible material portion prior to any engagements of the automated dispensing system with the at least one manufacture during the first condition and arranged to inhibit access to the particular ingestible material portion by other than the automated dispensing system during engagement of the automated dispensing system with the at least one manufacture during the first condition is carried out by electronically receiving status information (e.g. microprocessor component s102 receives status information via controlled substance receiving assembly s736 electronic interaction with controlled substance containing assembly s738, etc.) regarding a particular ingestible material portion (e.g. that portion of ingestible material 42 contained in the controlled substance containing assembly s738, etc.) as related to a first engagement of an automated dispensing system with at least one manufacture (e.g. engagement, such as via physical insertion of the controlled substance containing assembly s736 into the controlled substance receiving assembly s738 such, etc.), the first engagement occurring during a first condition including the at least one manufacture being united with the particular ingestible material portion (e.g. the controlled substance containing assembly s736 containing the controlled substance such as dehydrated certified organic vegetable matter, etc.), the first engagement to facilitate access by the automated dispensing system to the particular ingestible material portion for dispensing of the particular ingestible material portion (e.g. dispensing dehydrated certified organic vegetable matter as part of a soup mix prepared to be eaten by a consumer making a selection from a vending machine, etc.), the electronically receiving status information to receive status information influenced by whether any disengagements of the automated dispensing system from the at least one manufacture occur during the first condition prior to the first engagement (e.g. if the first engagement is the first time that the controlled substance containing assembly s736 has been engaged subsequent to being filled with the controlled substance, then there would have been no disengagements of the controlled substance containing assembly as well and thus, the status information could include that it is less likely, for instance, that the controlled substance has been tampered with and more likely that the controlled substance is what an associated label claims it to be, etc.), the at least one manufacture arranged to inhibit access to the particular ingestible material portion(e g inhibition to access could be had in a case where the controlled substance containing assembly s736 contains the controlled substance, etc.) prior to any engagements of the automated dispensing system with the at least one manufacture during the first condition and arranged to inhibit access to the particular ingestible material portion by other than the automated dispensing system during engagement of the automated dispensing system with the at least one manufacture during the first condition (e.g. before engagement, in some implementations the controlled substance containing assembly s736 could fully contain the controlled substance to prevent access from both the substance control dispensing system 10 and other things as well, furthermore, engagement with the substance control dispensing system could be such that the controlled substance containing assembly s736 could still prevent access to the controlled substance by entities other than the substance control dispensing system 10 itself, etc.).

Figure 58:
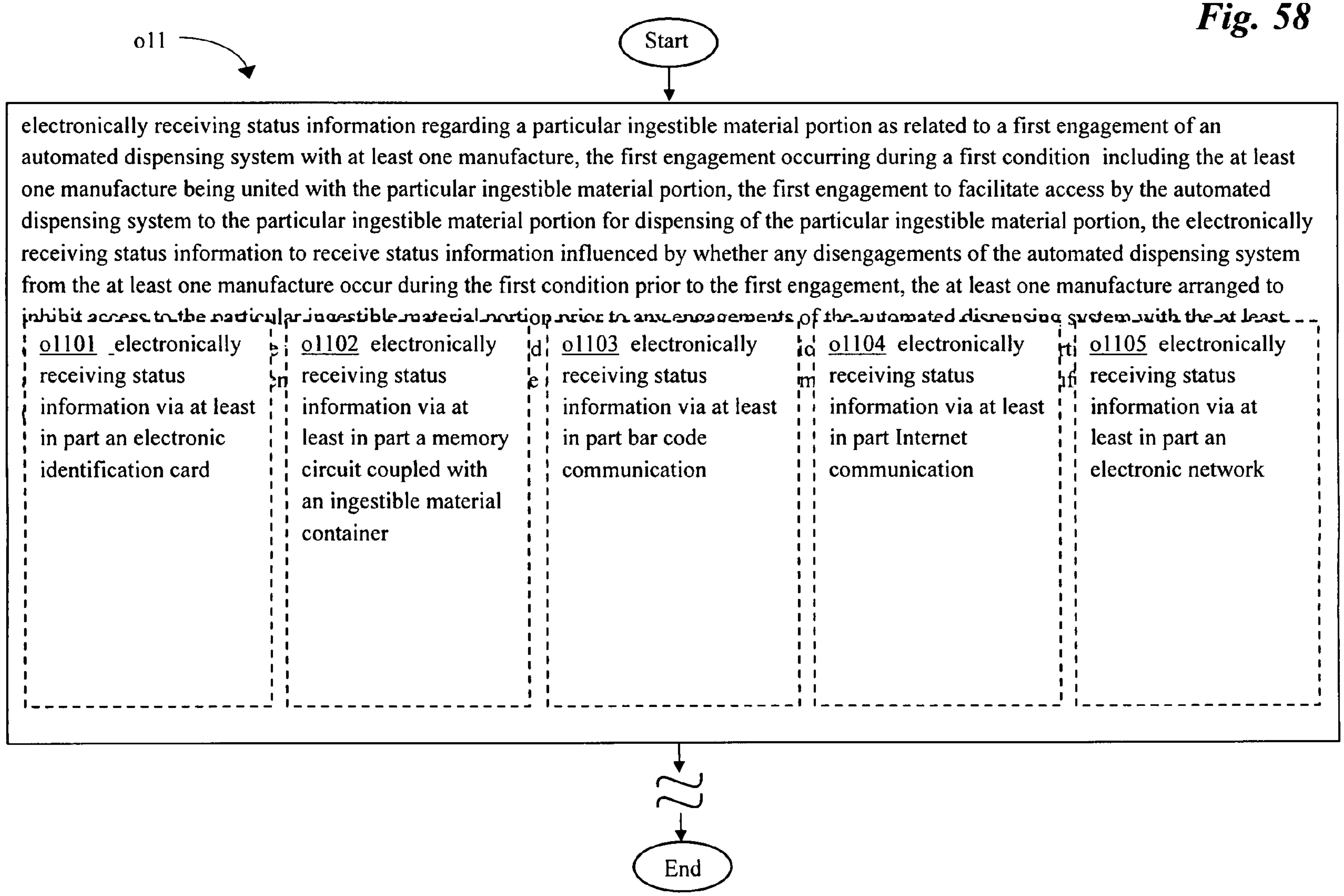
FIG. 58 is a high-level flowchart including exemplary implementations of operation O11 of FIG. 57.

In one or more implementations, as shown in FIG. 58, operation o11 includes an operation o1101 for electronically receiving status information via at least in part an electronic identification card. An exemplary version of the non-transitory signal bearing medium n100 is depicted as bearing one or more receiving information ID card instructions i1101 that when executed will direct performance of the operation o1101. In an implementation, the one or more receiving information ID card instructions i1101 when executed direct electronically receiving status information via at least in part an electronic identification card (e.g. electronic memory 52 coupled to containing assembly 44 could include an electronic identification card including information as to source of and constituents of the controlled substance which is read by the receiver 54 when the containing assembly is engaged with the receiving assembly 48 to be passed on to the microprocessor component s102, which subsequently displays the information on selection indicators 20, etc.). Furthermore, the receiving information ID card electrical circuitry arrangement ("elec circ arrange") e1101 when activated will perform the operation o1101. In an implementation, the receiving information ID card electrical circuitry arrangement e1101, when activated performs electronically receiving status information via at least in part an electronic identification card (e.g. electronic memory 52 coupled to containing assembly 44 could include an electronic identification card including information as to source of and constituents of the controlled substance which is read by the receiver 54 when the containing assembly is engaged with the receiving assembly 48 to be passed on to the microprocessor component s102, which subsequently displays the information on selection indicators 20, etc.). In an implementation, the electronically receiving status information via at least in part an electronic identification card is carried out by electronically receiving status information via at least in part an electronic identification card (e.g. electronic memory 52 coupled to containing assembly 44 could include an electronic identification card including information as to source of and constituents of the controlled substance which is read by the receiver 54 when the containing assembly is engaged with the receiving assembly 48 to be passed on to the microprocessor component s102, which subsequently displays the information on selection indicators 20, etc.).

In one or more implementations, operation o11 includes an operation o1102 for electronically receiving status information via at least in part a memory circuit coupled with an ingestible material container. An exemplary version of the non-transitory signal bearing medium n100 is depicted as bearing one or more receiving information memory circuit instructions i1102 that when executed will direct performance of the operation o1102. In an implementation, the one or more receiving information memory circuit instructions i1102 when executed direct electronically receiving status information via at least in part a memory circuit coupled with an ingestible material container (e.g. electronic memory 52 coupled to containing assembly 44 includes information as to certification details of the controlled substance which is read by the receiver when the containing assembly is engaged with the receiving assembly 48 to be passed on to the microprocessor component s102, which subsequently displays the information on selection indicators 20, etc.). Furthermore, the receiving information memory circuit electrical circuitry arrangement e1102 when activated will perform the operation o1102. In an implementation, the receiving information memory circuit electrical circuitry arrangement e1102, when activated performs electronically receiving status information via at least in part a memory circuit coupled with an ingestible material container (e.g. electronic memory 52 coupled to containing assembly 44 includes information as to certification details of the controlled substance which is read by the receiver when the containing assembly is engaged with the receiving assembly 48 to be passed on to the microprocessor component s102, which subsequently displays the information on selection indicators 20, etc.). In an implementation, the electronically receiving status information via at least in part a memory circuit coupled with an ingestible material container is carried out by electronically receiving status information via at least in part a memory circuit coupled with an ingestible material container (e.g. electronic memory 52 coupled to containing assembly 44 includes information as to certification details of the controlled substance which is read by the receiver when the containing assembly is engaged with the receiving assembly 48 to be passed on to the microprocessor component s102, which subsequently displays the information on selection indicators 20, etc.).

In one or more implementations, operation o11 includes an operation o1103 for electronically receiving status information via at least in part bar code communication. An exemplary version of the non-transitory signal bearing medium n100 is depicted as bearing one or more receiving information bar code instructions i1103 that when executed will direct performance of the operation o1103. In an implementation, the one or more receiving information bar code instructions i1103 when executed direct electronically receiving status information via at least in part bar code communication (e.g. electronic memory 52 can include a bar code label coupled to containing assembly 44 having information as to allergen-free status of the controlled substance which is read by the receiver when the containing assembly is engaged with the receiving assembly 48 to be passed on to the microprocessor component s102, which subsequently displays the information on selection indicators 20, etc.). Furthermore, the receiving information bar code electrical circuitry arrangement e1103 when activated will perform the operation o1103. In an implementation, the receiving information bar code electrical circuitry arrangement e1103, when activated performs electronically receiving status information via at least in part bar code communication (e.g. electronic memory 52 can include a bar code label coupled to containing assembly 44 having information as to allergen-free status of the controlled substance which is read by the receiver when the containing assembly is engaged with the receiving assembly 48 to be passed on to the microprocessor component s102, which subsequently displays the information on selection indicators 20, etc.). In an implementation, the is electronically receiving status information via at least in part bar code communication carried out by electronically receiving status information via at least in part bar code communication (e.g. electronic memory 52 can include a bar code label coupled to containing assembly 44 having information as to allergen-free status of the controlled substance which is read by the receiver when the containing assembly is engaged with the receiving assembly 48 to be passed on to the microprocessor component s102, which subsequently displays the information on selection indicators 20, etc.).

In one or more implementations, operation o11 includes an operation o1104 for electronically receiving status information via at least in part Internet communication. An exemplary version of the non-transitory signal bearing medium n100 is depicted as bearing one or more receiving information Internet instructions i1104 that when executed will direct performance of the operation o1104. In an implementation, the one or more receiving information Internet instructions i1104 when executed direct electronically receiving status information via at least in part Internet communication (e.g. electronic memory 52 coupled to containing assembly 44 includes information as to an Internet address to access updated certification details of the controlled substance which is read by the receiver when the containing assembly is engaged with the receiving assembly 48 to be passed on to the microprocessor component s102, which subsequently accesses the Internet through the internet network component s508 and displays the information on selection indicators 20, etc.). Furthermore, the receiving information Internet electrical circuitry arrangement e1104 when activated will perform the operation o1104. In an implementation, the receiving information Internet electrical circuitry arrangement e1104, when activated performs electronically receiving status information via at least in part Internet communication (e.g. electronic memory 52 coupled to containing assembly 44 includes information as to an Internet address to access updated certification details of the controlled substance which is read by the receiver when the containing assembly is engaged with the receiving assembly 48 to be passed on to the microprocessor component s102, which subsequently accesses the Internet through the internet network component s508 and displays the information on selection indicators 20, etc.). In an implementation, the is electronically receiving status information via at least in part Internet communication carried out by electronically receiving status information via at least in part Internet communication (e.g. electronic memory 52 coupled to containing assembly 44 includes information as to an Internet address to access updated certification details of the controlled substance which is read by the receiver when the containing assembly is engaged with the receiving assembly 48 to be passed on to the microprocessor component s102, which subsequently accesses the Internet through the interne network component s508 and displays the information on selection indicators 20, etc.).

In one or more implementations, operation o11 includes an operation o1105 for electronically receiving status information via at least in part an electronic network. An exemplary version of the non-transitory signal bearing medium n100 is depicted as bearing one or more receiving information network instructions i1105 that when executed will direct performance of the operation o1105. In an implementation, the one or more receiving information network instructions i1105 when executed direct electronically receiving status information via at least in part an electronic network (e.g. electronic memory 52 coupled to containing assembly 44 includes information as to an electronic network address to access updated certification details of the controlled substance which is read by the receiver when the containing assembly is engaged with the receiving assembly 48 to be passed on to the microprocessor component s102, which subsequently accesses the electronic network through the network cable component s502 and displays the information on selection indicators 20, etc.). Furthermore, the receiving information network electrical circuitry arrangement e1105 when activated will perform the operation o1105. In an implementation, the receiving information network electrical circuitry arrangement e1105, when activated performs electronically receiving status information via at least in part an electronic network (e.g. electronic memory 52 coupled to containing assembly 44 includes information as to an electronic network address to access updated certification details of the controlled substance which is read by the receiver when the containing assembly is engaged with the receiving assembly 48 to be passed on to the microprocessor component s102, which subsequently accesses the electronic network through the network cable component s502 and displays the information on selection indicators 20, etc.). In an implementation, the electronically receiving status information via at least in part an electronic network is carried out by electronically receiving status information via at least in part an electronic network (e.g. electronic memory 52 coupled to containing assembly 44 includes information as to an electronic network address to access updated certification details of the controlled substance which is read by the receiver when the containing assembly is engaged with the receiving assembly 48 to be passed on to the microprocessor component s102, which subsequently accesses the electronic network through the network cable component s502 and displays the information on selection indicators 20, etc.).

Figure 59:
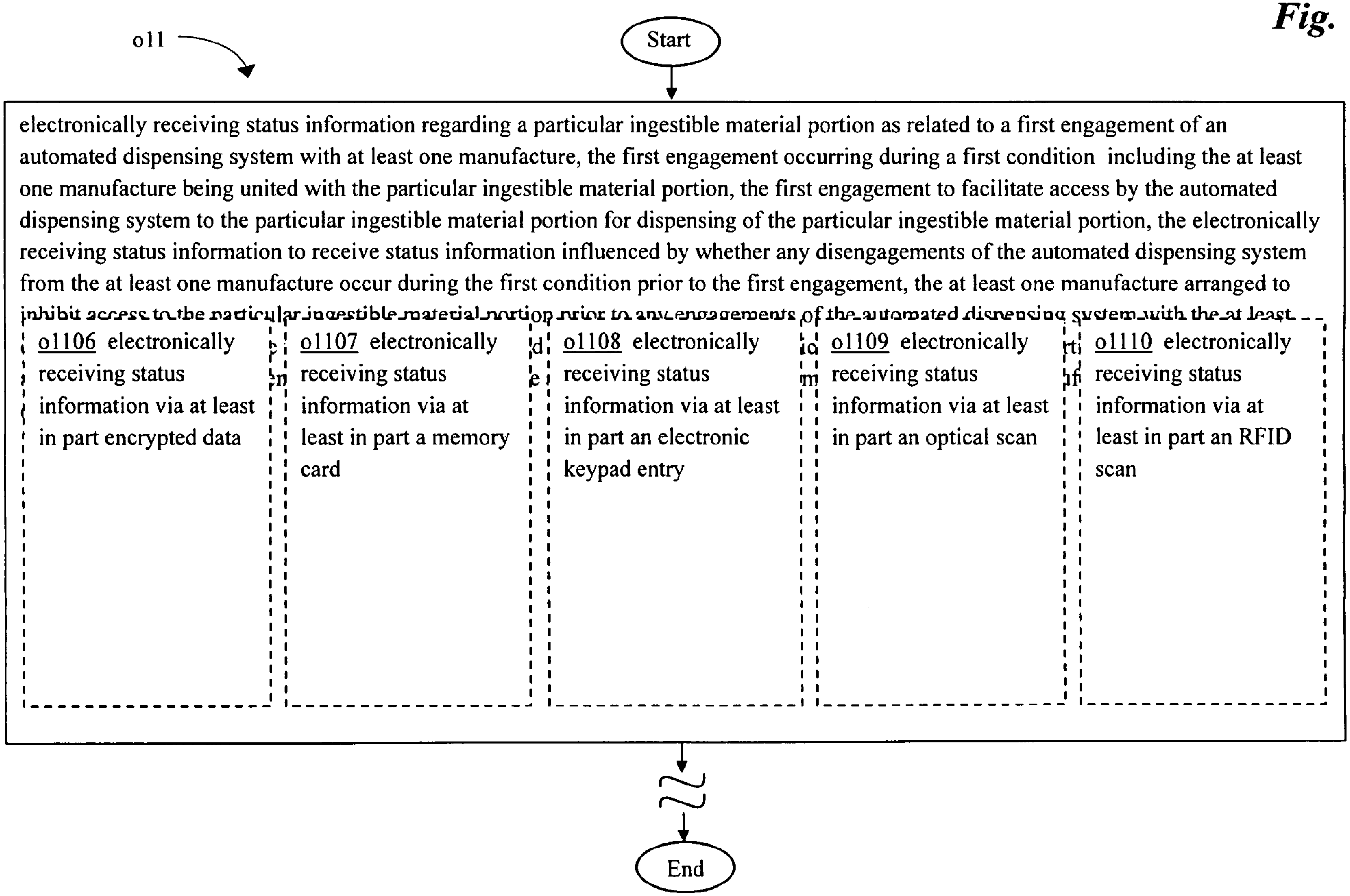
FIG. 59 is a high-level flowchart including exemplary implementations of operation O11 of FIG. 57.

In one or more implementations, as shown in FIG. 59, operation o11 includes an operation o1106 for electronically receiving status information via at least in part encrypted data. An exemplary version of the non-transitory signal bearing medium n100 is depicted as bearing one or more receiving information encrypted instructions i1106 that when executed will direct performance of the operation o1106. In an implementation, the one or more receiving information encrypted instructions i1106 when executed direct electronically receiving status information via at least in part encrypted data (e.g. electronic memory 52 coupled to containing assembly 44 includes encrypted information as to origination details of the controlled substance which is read by the receiver when the containing assembly is engaged with the receiving assembly 48 to be passed on to the microprocessor component s102, which decrypts and displays the information on selection indicators 20, etc.). Furthermore, the receiving information encrypted electrical circuitry arrangement e1106 when activated will perform the operation o1106. In an implementation, the receiving information encrypted electrical circuitry arrangement e1106, when activated performs electronically receiving status information via at least in part encrypted data (e.g. electronic memory 52 coupled to containing assembly 44 includes encrypted information as to origination details of the controlled substance which is read by the receiver when the containing assembly is engaged with the receiving assembly 48 to be passed on to the microprocessor component s102, which decrypts and displays the information on selection indicators 20, etc.). In an implementation, the electronically receiving status information via at least in part encrypted data is carried out by electronically receiving status information via at least in part encrypted data (e.g. electronic memory 52 coupled to containing assembly 44 includes encrypted information as to origination details of the controlled substance which is read by the receiver when the containing assembly is engaged with the receiving assembly 48 to be passed on to the microprocessor component s102, which decrypts and displays the information on selection indicators 20, etc.).

In one or more implementations, operation o11 includes an operation o1107 for electronically receiving status information via at least in part a memory card. An exemplary version of the non-transitory signal bearing medium n100 is depicted as bearing one or more receiving information memory card instructions i1107 that when executed will direct performance of the operation o1107. In an implementation, the one or more receiving information memory card instructions i1107 when executed direct electronically receiving status information via at least in part a memory card (e.g. electronic memory 52 in the form of a memory card is coupled to containing assembly 44 includes information as to endorsements by various authorities of the controlled substance which is read by the receiver when the containing assembly is engaged with the receiving assembly 48 to be passed on to the microprocessor component s102, which displays the information on selection indicators 20, etc.). Furthermore, the receiving information memory card electrical circuitry arrangement e1107 when activated will perform the operation o1107. In an implementation, the receiving information memory card electrical circuitry arrangement e1107, when activated performs electronically receiving status information via at least in part a memory card (e.g. electronic memory 52 in the form of a memory card is coupled to containing assembly 44 includes information as to endorsements by various authorities of the controlled substance which is read by the receiver when the containing assembly is engaged with the receiving assembly 48 to be passed on to the microprocessor component s102, which displays the information on selection indicators 20, etc.). In an implementation, the electronically receiving status information via at least in part a memory card is carried out by electronically receiving status information via at least in part a memory card (e.g. electronic memory 52 in the form of a memory card is coupled to containing assembly 44 includes information as to endorsements by various authorities of the controlled substance which is read by the receiver when the containing assembly is engaged with the receiving assembly 48 to be passed on to the microprocessor component s102, which displays the information on selection indicators 20, etc.).

In one or more implementations, operation o11 includes an operation o1108 for electronically receiving status information via at least in part an electronic keypad entry. An exemplary version of the non-transitory signal bearing medium n100 is depicted as bearing one or more receiving information keypad instructions i1108 that when executed will direct performance of the operation o1108. In an implementation, the one or more receiving information keypad instructions i1108 when executed direct electronically receiving status information via at least in part an electronic keypad entry (e.g. electronic memory 52 coupled to containing assembly 44 includes indication that information is to be entered by delivery personnel through keypad component s308 to provide delivery details of the controlled substance which is read by the receiver when the containing assembly is engaged with the receiving assembly 48 to be passed on to the microprocessor component s102, which subsequently accesses keypad data and displays the information on selection indicators 20, etc.). Furthermore, the receiving information keypad electrical circuitry arrangement e1108 when activated will perform the operation o1108. In an implementation, the receiving information keypad electrical circuitry arrangement e1108, when activated performs electronically receiving status information via at least in part an electronic keypad entry (e.g. electronic memory 52 coupled to containing assembly 44 includes indication that information is to be entered by delivery personnel through keypad component s308 to provide delivery details of the controlled substance which is read by the receiver when the containing assembly is engaged with the receiving assembly 48 to be passed on to the microprocessor component s102, which subsequently accesses keypad data and displays the information on selection indicators 20, etc.). In an implementation, the electronically receiving status information via at least in part an electronic keypad entry is carried out by electronically receiving status information via at least in part an electronic keypad entry (e.g. electronic memory 52 coupled to containing assembly 44 includes indication that information is to be entered by delivery personnel through keypad component s308 to provide delivery details of the controlled substance which is read by the receiver when the containing assembly is engaged with the receiving assembly 48 to be passed on to the microprocessor component s102, which subsequently accesses keypad data and displays the information on selection indicators 20, etc.).

In one or more implementations, operation o11 includes an operation o1109 for electronically receiving status information via at least in part an optical scan. An exemplary version of the non-transitory signal bearing medium n100 is depicted as bearing one or more receiving information optical scan instructions i1109 that when executed will direct performance of the operation o1109. In an implementation, the one or more receiving information optical scan instructions i1109 when executed direct electronically receiving status information via at least in part an optical scan (e.g. electronic memory 52 coupled to containing assembly 44 includes indication that information is to be entered by delivery personnel through scanner component s338 to provide delivery details of the controlled substance which is read by the receiver when the containing assembly is engaged with the receiving assembly 48 to be passed on to the microprocessor component s102, which subsequently displays the information on selection indicators 20, etc.). Furthermore, the receiving information optical scan electrical circuitry arrangement e1109 when activated will perform the operation o1109. In an implementation, the receiving information optical scan electrical circuitry arrangement e1109, when activated performs electronically receiving status information via at least in part an optical scan (e.g. electronic memory 52 coupled to containing assembly 44 includes indication that information is to be entered by delivery personnel through scanner component s338 to provide delivery details of the controlled substance which is read by the receiver when the containing assembly is engaged with the receiving assembly 48 to be passed on to the microprocessor component s102, which subsequently displays the information on selection indicators 20, etc.). In an implementation, the electronically receiving status information via at least in part an optical scan is carried out by electronically receiving status information via at least in part an optical scan (e.g. electronic memory 52 coupled to containing assembly 44 includes indication that information is to be entered by delivery personnel through scanner component s338 to provide delivery details of the controlled substance which is read by the receiver when the containing assembly is engaged with the receiving assembly 48 to be passed on to the microprocessor component s102, which subsequently displays the information on selection indicators 20, etc.).

In one or more implementations, operation o11 includes an operation o1110 for electronically receiving status information via at least in part an RFID scan. An exemplary version of the non-transitory signal bearing medium n100 is depicted as bearing one or more receiving information RFID instructions i1110 that when executed will direct performance of the operation o1110. In an implementation, the one or more receiving information RFID instructions i1110 when executed direct electronically receiving status information via at least in part an RFID scan (e.g. electronic memory 52 coupled to containing assembly 44 includes an radio frequency identification (RFID) tag containing delivery details of the controlled substance which is read by the RFID sensing component when the containing assembly is engaged with the receiving assembly 48 to be passed on to the microprocessor component s102, which subsequently displays the information on selection indicators 20, etc.). Furthermore, the receiving information RFID electrical circuitry arrangement e1110 when activated will perform the operation o1110. In an implementation, the receiving information RFID electrical circuitry arrangement e1110, when activated performs electronically receiving status information via at least in part an RFID scan (e.g. electronic memory 52 coupled to containing assembly 44 includes an radio frequency identification (RFID) tag containing delivery details of the controlled substance which is read by the RFID sensing component when the containing assembly is engaged with the receiving assembly 48 to be passed on to the microprocessor component s102, which subsequently displays the information on selection indicators 20, etc.). In an implementation, the electronically receiving status information via at least in part an RFID scan is carried out by electronically receiving status information via at least in part an RFID scan (e.g. electronic memory 52 coupled to containing assembly 44 includes an radio frequency identification (RFID) tag containing delivery details of the controlled substance which is read by the RFID sensing component when the containing assembly is engaged with the receiving assembly 48 to be passed on to the microprocessor component s102, which subsequently displays the information on selection indicators 20, etc.).

Figure 60:
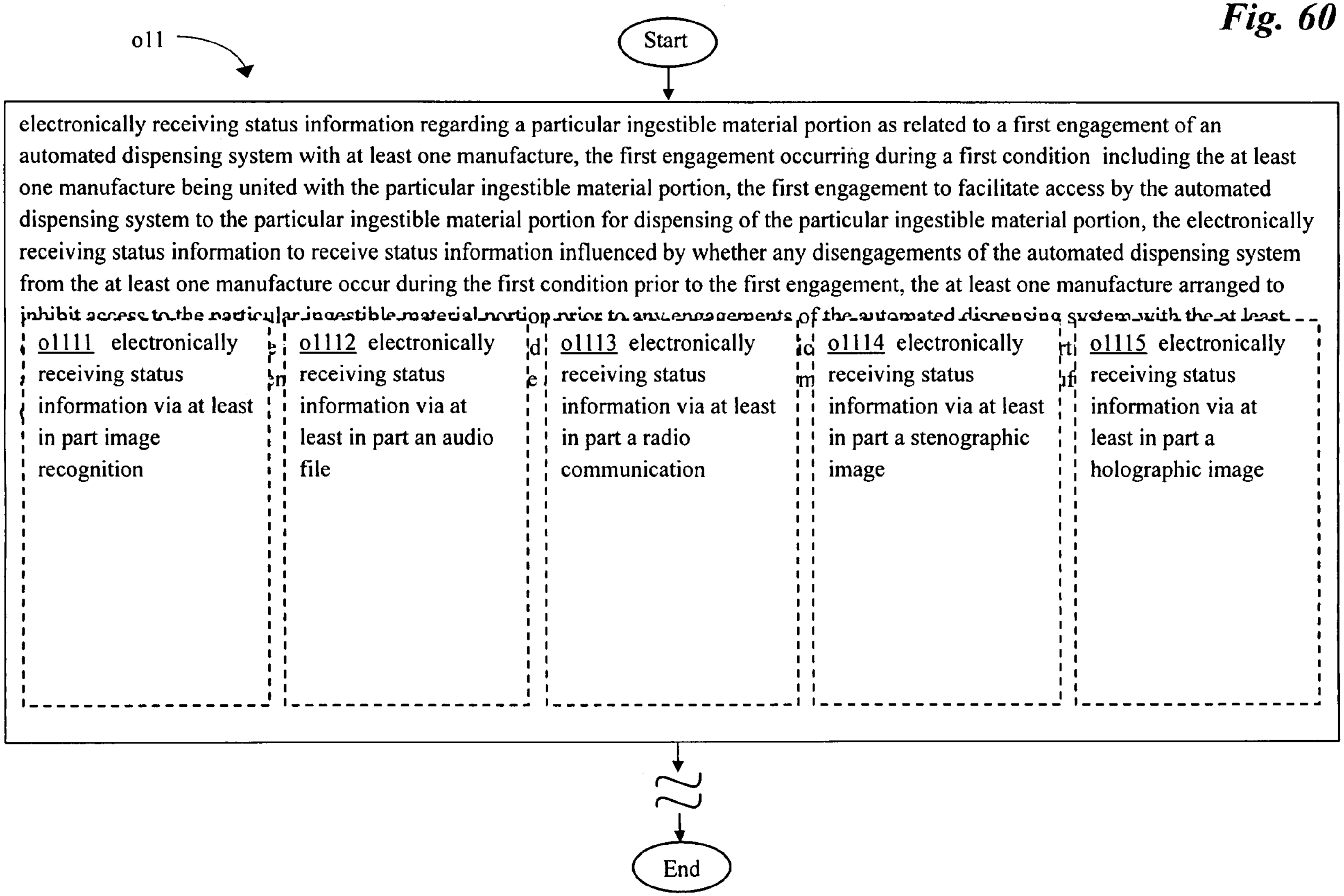
FIG. 60 is a high-level flowchart including exemplary implementations of operation O11 of FIG. 57.

In one or more implementations, as shown in FIG. 60, operation o11 includes an operation o1111 for electronically receiving status information via at least in part image recognition. An exemplary version of the non-transitory signal bearing medium n100 is depicted as bearing one or more receiving information image recognition instructions i1111 that when executed will direct performance of the operation o1111. In an implementation, the one or more receiving information image recognition instructions i1111 when executed direct electronically receiving status information via at least in part image recognition (e.g. electronic memory 52 coupled to containing assembly 44 includes information to be entered by delivery personnel through the optical sensing component s418 to provide delivery details of the controlled substance which is read by the receiver when the containing assembly is engaged with the receiving assembly 48 to be passed on to the microprocessor component s102, which subsequently performs image recognition and displays the information on selection indicators 20, etc.). Furthermore, the receiving information image recognition electrical circuitry arrangement e1111 when activated will perform the operation o1111. In an implementation, the receiving information image recognition electrical circuitry arrangement e1111, when activated performs electronically receiving status information via at least in part image recognition (e.g. electronic memory 52 coupled to containing assembly 44 includes information to be entered by delivery personnel through the optical sensing component s418 to provide delivery details of the controlled substance which is read by the receiver when the containing assembly is engaged with the receiving assembly 48 to be passed on to the microprocessor component s102, which subsequently performs image recognition and displays the information on selection indicators 20, etc.). In an implementation, the electronically receiving status information via at least in part image recognition is carried out by electronically receiving status information via at least in part image recognition (e.g. electronic memory 52 coupled to containing assembly 44 includes information to be entered by delivery personnel through the optical sensing component s418 to provide delivery details of the controlled substance which is read by the receiver when the containing assembly is engaged with the receiving assembly 48 to be passed on to the microprocessor component s102, which subsequently performs image recognition and displays the information on selection indicators 20, etc.).

In one or more implementations, operation o11 includes an operation o1112 for electronically receiving status information via at least in part an audio file. An exemplary version of the non-transitory signal bearing medium n100 is depicted as bearing one or more receiving information audio file instructions i1112 that when executed will direct performance of the operation o1112. In an implementation, the one or more receiving information audio file instructions i1112 when executed direct electronically receiving status information via at least in part an audio file (e.g. electronic memory 52 coupled to containing assembly 44 includes an audio file of delivery details of the controlled substance which is read by the receiver when the containing assembly is engaged with the receiving assembly 48 to be passed on to the microprocessor component s102, which subsequently translates the audio file to a text file and displays the information on selection indicators 20, etc.). Furthermore, the receiving information audio file electrical circuitry arrangement e1112 when activated will perform the operation o1112. In an implementation, the receiving information audio file electrical circuitry arrangement e1112, when activated performs electronically receiving status information via at least in part an audio file (e.g. electronic memory 52 coupled to containing assembly 44 includes an audio file of delivery details of the controlled substance which is read by the receiver when the containing assembly is engaged with the receiving assembly 48 to be passed on to the microprocessor component s102, which subsequently translates the audio file to a text file and displays the information on selection indicators 20, etc.). In an implementation, the electronically receiving status information via at least in part an audio file is carried out by electronically receiving status information via at least in part an audio file (e.g. electronic memory 52 coupled to containing assembly 44 includes an audio file of delivery details of the controlled substance which is read by the receiver when the containing assembly is engaged with the receiving assembly 48 to be passed on to the microprocessor component s102, which subsequently translates the audio file to a text file and displays the information on selection indicators 20, etc.).

In one or more implementations, operation o11 includes an operation o1113 for electronically receiving status information via at least in part a radio communication. An exemplary version of the non-transitory signal bearing medium n100 is depicted as bearing one or more receiving information radio communication instructions i1113 that when executed will direct performance of the operation o1113. In an implementation, the one or more receiving information radio communication instructions i1113 when executed direct electronically receiving status information via at least in part a radio communication (e.g. electronic memory 52 coupled to containing assembly 44 includes indication as to information to be received by the electromagnetic sensing component s402 to provide delivery details of the controlled substance which is read by the receiver when the containing assembly is engaged with the receiving assembly 48 to be passed on to the microprocessor component s102, which subsequently accesses data received by the electromagnetic sensing component to display the information on selection indicators 20, etc.). Furthermore, the receiving information radio communication electrical circuitry arrangement e1113 when activated will perform the operation o1113. In an implementation, the receiving information radio communication electrical circuitry arrangement e1113, when activated performs electronically receiving status information via at least in part a radio communication (e.g. electronic memory 52 coupled to containing assembly 44 includes indication as to information to be received by the electromagnetic sensing component s402 to provide delivery details of the controlled substance which is read by the receiver when the containing assembly is engaged with the receiving assembly 48 to be passed on to the microprocessor component s102, which subsequently accesses data received by the electromagnetic sensing component to display the information on selection indicators 20, etc.). In an implementation, the electronically receiving status information via at least in part a radio communication is carried out by electronically receiving status information via at least in part a radio communication (e.g. electronic memory 52 coupled to containing assembly 44 includes indication as to information to be received by the electromagnetic sensing component s402 to provide delivery details of the controlled substance which is read by the receiver when the containing assembly is engaged with the receiving assembly 48 to be passed on to the microprocessor component s102, which subsequently accesses data received by the electromagnetic sensing component to display the information on selection indicators 20, etc.).

In one or more implementations, operation o11 includes an operation o1114 for electronically receiving status information via at least in part a stenographic image. An exemplary version of the non-transitory signal bearing medium n100 is depicted as bearing one or more receiving information stenographic instructions i1114 that when executed will direct performance of the operation o1114. In an implementation, the one or more receiving information stenographic instructions i1114 when executed direct electronically receiving status information via at least in part a stenographic image (e.g. electronic memory 52 coupled to containing assembly 44 includes a stenographic image to provide delivery details of the controlled substance which is read by photodetecting component s406 when the containing assembly is engaged with the receiving assembly 48 to be passed on to the microprocessor component s102, which converts the stenographic image to text and subsequently displays the information on selection indicators 20, etc.). Furthermore, the receiving information stenographic electrical circuitry arrangement e1114 when activated will perform the operation o1114. In an implementation, the receiving information stenographic electrical circuitry arrangement e1114, when activated performs electronically receiving status information via at least in part a stenographic image (e.g. electronic memory 52 coupled to containing assembly 44 includes a stenographic image to provide delivery details of the controlled substance which is read by photodetecting component s406 when the containing assembly is engaged with the receiving assembly 48 to be passed on to the microprocessor component s102, which converts the stenographic image to text and subsequently displays the information on selection indicators 20, etc.). In an implementation, the electronically receiving status information via at least in part a stenographic image is carried out by electronically receiving status information via at least in part a stenographic image (e.g. electronic memory 52 coupled to containing assembly 44 includes a stenographic image to provide delivery details of the controlled substance which is read by photodetecting component s406 when the containing assembly is engaged with the receiving assembly 48 to be passed on to the microprocessor component s102, which converts the stenographic image to text and subsequently displays the information on selection indicators 20, etc.).

In one or more implementations, operation o11 includes an operation o1115 for electronically receiving status information via at least in part a holographic image. An exemplary version of the non-transitory signal bearing medium n100 is depicted as bearing one or more receiving information holographic instructions i1115 that when executed will direct performance of the operation o1115. In an implementation, the one or more receiving information holographic instructions i1115 when executed direct electronically receiving status information via at least in part a holographic image (e.g. electronic memory 52 coupled to containing assembly 44 includes a holographic image to provide delivery details of the controlled substance which is read by optical sensing component s418 when the containing assembly is engaged with the receiving assembly 48 to be passed on to the microprocessor component s102, which converts the holographic image to text and subsequently displays the information on selection indicators 20, etc.). Furthermore, the receiving information holographic electrical circuitry arrangement e1115 when activated will perform the operation o1115. In an implementation, the receiving information holographic electrical circuitry arrangement e1115, when activated performs electronically receiving status information via at least in part a holographic image (e.g. electronic memory 52 coupled to containing assembly 44 includes a holographic image to provide delivery details of the controlled substance which is read by optical sensing component s418 when the containing assembly is engaged with the receiving assembly 48 to be passed on to the microprocessor component s102, which converts the holographic image to text and subsequently displays the information on selection indicators 20, etc.). In an implementation, the electronically receiving status information via at least in part a holographic image is carried out by electronically receiving status information via at least in part a holographic image (e.g. electronic memory 52 coupled to containing assembly 44 includes a holographic image to provide delivery details of the controlled substance which is read by optical sensing component s418 when the containing assembly is engaged with the receiving assembly 48 to be passed on to the microprocessor component s102, which converts the holographic image to text and subsequently displays the information on selection indicators 20, etc.).

Figure 61:
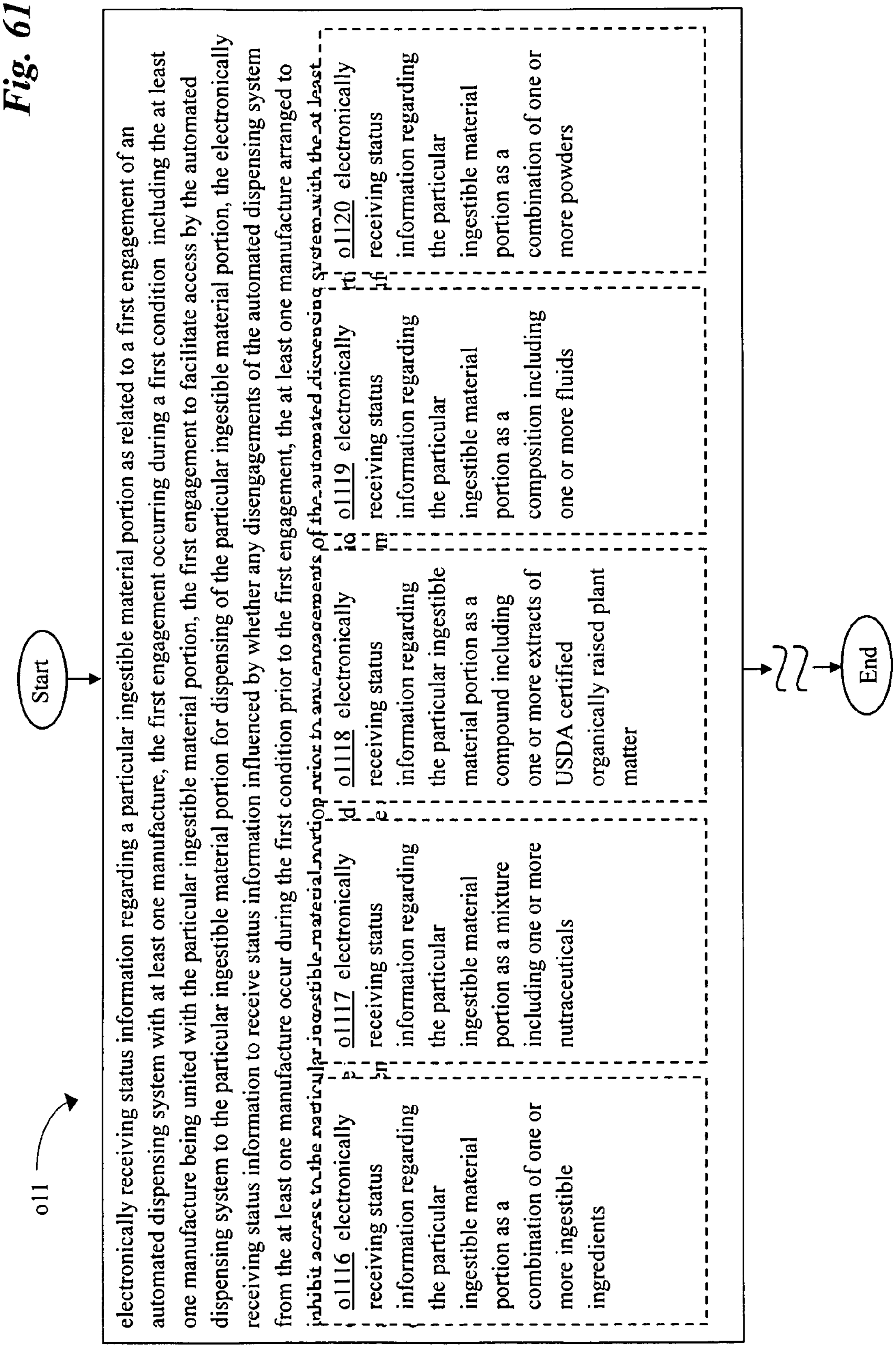
FIG. 61 is a high-level flowchart including exemplary implementations of operation O11 of FIG. 57.

In one or more implementations, as shown in FIG. 61, operation o11 includes an operation o1116 for electronically receiving status information regarding the particular ingestible material portion as a combination of one or more ingestible ingredients. An exemplary version of the non-transitory signal bearing medium n100 is depicted as bearing one or more receiving information combination instructions i1116 that when executed will direct performance of the operation o1116. In an implementation, the one or more receiving information combination instructions i1116 when executed direct electronically receiving status information regarding the particular ingestible material portion as a combination of one or more ingestible ingredients (e.g. electronic memory 52 coupled to containing assembly 44 is read by receiver 54 to obtain information as to point of origin of various ingredients of a pasta sauce when the containing assembly is engaged with the receiving assembly 48 to be passed on to the microprocessor component s102, which subsequently displays the information on selection indicators 20, etc.). Furthermore, the receiving information combination electrical circuitry arrangement e1116 when activated will perform the operation o1116. In an implementation, the receiving information combination electrical circuitry arrangement e1116, when activated performs electronically receiving status information regarding the particular ingestible material portion as a combination of one or more ingestible ingredients (e.g. electronic memory 52 coupled to containing assembly 44 is read by receiver 54 to obtain information as to point of origin of various ingredients of a pasta sauce when the containing assembly is engaged with the receiving assembly 48 to be passed on to the microprocessor component s102, which subsequently displays the information on selection indicators 20, etc.). In an implementation, the electronically receiving status information regarding the particular ingestible material portion as a combination of one or more ingestible ingredients is carried out by electronically receiving status information regarding the particular ingestible material portion as a combination of one or more ingestible ingredients (e.g. electronic memory 52 coupled to containing assembly 44 is read by receiver 54 to obtain information as to point of origin of various ingredients of a pasta sauce when the containing assembly is engaged with the receiving assembly 48 to be passed on to the microprocessor component s102, which subsequently displays the information on selection indicators 20, etc.).

In one or more implementations, operation o11 includes an operation o1117 for electronically receiving status information regarding the particular ingestible material portion as a mixture including one or more nutraceuticals. An exemplary version of the non-transitory signal bearing medium n100 is depicted as bearing one or more receiving information nutraceuticals instructions i1117 that when executed will direct performance of the operation o1117. In an implementation, the one or more receiving information nutraceuticals instructions i1117 when executed direct electronically receiving status information regarding the particular ingestible material portion as a mixture including one or more nutraceuticals (e.g. electronic memory 52 coupled to containing assembly 44 is read by receiver 54 to obtain information as to amounts of vitamin B12 and bilberry extract when the containing assembly is engaged with the receiving assembly 48 to be passed on to the microprocessor component s102, which subsequently displays the information on selection indicators 20, etc.). Furthermore, the receiving information nutraceuticals electrical circuitry arrangement e1117 when activated will perform the operation o1117. In an implementation, the receiving information nutraceuticals electrical circuitry arrangement e1117, when activated performs electronically receiving status information regarding the particular ingestible material portion as a mixture including one or more nutraceuticals (e.g. electronic memory 52 coupled to containing assembly 44 is read by receiver 54 to obtain information as to amounts of vitamin B12 and bilberry extract when the containing assembly is engaged with the receiving assembly 48 to be passed on to the microprocessor component s102, which subsequently displays the information on selection indicators 20, etc.). In an implementation, the electronically receiving status information regarding the particular ingestible material portion as a mixture including one or more nutraceuticals is carried out by electronically receiving status information regarding the particular ingestible material portion as a mixture including one or more nutraceuticals (e.g. electronic memory 52 coupled to containing assembly 44 is read by receiver 54 to obtain information as to amounts of vitamin B12 and bilberry extract when the containing assembly is engaged with the receiving assembly 48 to be passed on to the microprocessor component s102, which subsequently displays the information on selection indicators 20, etc.).

In one or more implementations, operation o11 includes an operation o1118 for electronically receiving status information regarding the particular ingestible material portion as a compound including one or more extracts of USDA certified organically raised plant matter. An exemplary version of the non-transitory signal bearing medium n100 is depicted as bearing one or more receiving information organic instructions i1118 that when executed will direct performance of the operation o1118. In an implementation, the one or more receiving information organic instructions i1118 when executed direct electronically receiving status information regarding the particular ingestible material portion as a compound including one or more extracts of USDA certified organically raised plant matter (e.g. electronic memory 52 coupled to containing assembly 44 is read by receiver 54 to obtain information as to amounts of dehydrated organically raised tomatoes and broccoli when the containing assembly is engaged with the receiving assembly 48 to be passed on to the microprocessor component s102, which subsequently displays the information on selection indicators 20, etc.). Furthermore, the receiving information organic electrical circuitry arrangement e1118 when activated will perform the operation o1118. In an implementation, the receiving information organic electrical circuitry arrangement e1118, when activated performs electronically receiving status information regarding the particular ingestible material portion as a compound including one or more extracts of USDA certified organically raised plant matter (e.g. electronic memory 52 coupled to containing assembly 44 is read by receiver 54 to obtain information as to amounts of dehydrated organically raised tomatoes and broccoli when the containing assembly is engaged with the receiving assembly 48 to be passed on to the microprocessor component s102, which subsequently displays the information on selection indicators 20, etc.). In an implementation, the electronically receiving status information regarding the particular ingestible material portion as a compound including one or more extracts of USDA certified organically raised plant matter is carried out by electronically receiving status information regarding the particular ingestible material portion as a compound including one or more extracts of USDA certified organically raised plant matter (e.g. electronic memory 52 coupled to containing assembly 44 is read by receiver 54 to obtain information as to amounts of dehydrated organically raised tomatoes and broccoli when the containing assembly is engaged with the receiving assembly 48 to be passed on to the microprocessor component s102, which subsequently displays the information on selection indicators 20, etc.).

In one or more implementations, operation o11 includes an operation o1119 for electronically receiving status information regarding the particular ingestible material portion as a composition including one or more fluids. An exemplary version of the non-transitory signal bearing medium n100 is depicted as bearing one or more receiving information fluids instructions i1119 that when executed will direct performance of the operation o1119. In an implementation, the one or more receiving information fluids instructions i1119 when executed direct electronically receiving status information regarding the particular ingestible material portion as a composition including one or more fluids (e.g. electronic memory 52 coupled to containing assembly 44 is read by receiver 54 to obtain shipping date information as to artesian well water and juice from specially raised pomegranates when the containing assembly is engaged with the receiving assembly 48 to be passed on to the microprocessor component s102, which subsequently displays the information on selection indicators 20, etc.). Furthermore, the receiving information fluids electrical circuitry arrangement e1119 when activated will perform the operation o1119. In an implementation, the receiving information fluids electrical circuitry arrangement e1119, when activated performs electronically receiving status information regarding the particular ingestible material portion as a composition including one or more fluids (e.g. electronic memory 52 coupled to containing assembly 44 is read by receiver 54 to obtain shipping date information as to artesian well water and juice from specially raised pomegranates when the containing assembly is engaged with the receiving assembly 48 to be passed on to the microprocessor component s102, which subsequently displays the information on selection indicators 20, etc.). In an implementation, the electronically receiving status information regarding the particular ingestible material portion as a composition including one or more fluids is carried out by electronically receiving status information regarding the particular ingestible material portion as a composition including one or more fluids (e.g. electronic memory 52 coupled to containing assembly 44 is read by receiver 54 to obtain shipping date information as to artesian well water and juice from specially raised pomegranates when the containing assembly is engaged with the receiving assembly 48 to be passed on to the microprocessor component s102, which subsequently displays the information on selection indicators 20, etc.).

In one or more implementations, operation o11 includes an operation o1120 for electronically receiving status information regarding the particular ingestible material portion as a combination of one or more powders. An exemplary version of the non-transitory signal bearing medium n100 is depicted as bearing one or more receiving information powders instructions i1120 that when executed will direct performance of the operation o1120. In an implementation, the one or more receiving information powders instructions i1120 when executed direct electronically receiving status information regarding the particular ingestible material portion as a combination of one or more powders (e.g. electronic memory 52 coupled to containing assembly 44 is read by receiver 54 to obtain information as to origination of powdered stevia extract and powdered nondenatured whey protein extract when the containing assembly is engaged with the receiving assembly 48 to be passed on to the microprocessor component s102, which subsequently displays the information on selection indicators 20, etc.). Furthermore, the receiving information powders electrical circuitry arrangement e1120 when activated will perform the operation electronically receiving status information regarding the particular ingestible material portion as a combination of one or more powders. In an implementation, the receiving information powders electrical circuitry arrangement e1120, when activated performs electronically receiving status information regarding the particular ingestible material portion as a combination of one or more powders (e.g. electronic memory 52 coupled to containing assembly 44 is read by receiver 54 to obtain information as to origination of powdered stevia extract and powdered nondenatured whey protein extract when the containing assembly is engaged with the receiving assembly 48 to be passed on to the microprocessor component s102, which subsequently displays the information on selection indicators 20, etc.). In an implementation, the electronically receiving status information regarding the particular ingestible material portion as a combination of one or more powders is carried out by electronically receiving status information regarding the particular ingestible material portion as a combination of one or more powders (e.g. electronic memory 52 coupled to containing assembly 44 is read by receiver 54 to obtain information as to origination of powdered stevia extract and powdered nondenatured whey protein extract when the containing assembly is engaged with the receiving assembly 48 to be passed on to the microprocessor component s102, which subsequently displays the information on selection indicators 20, etc.).

Figure 62:
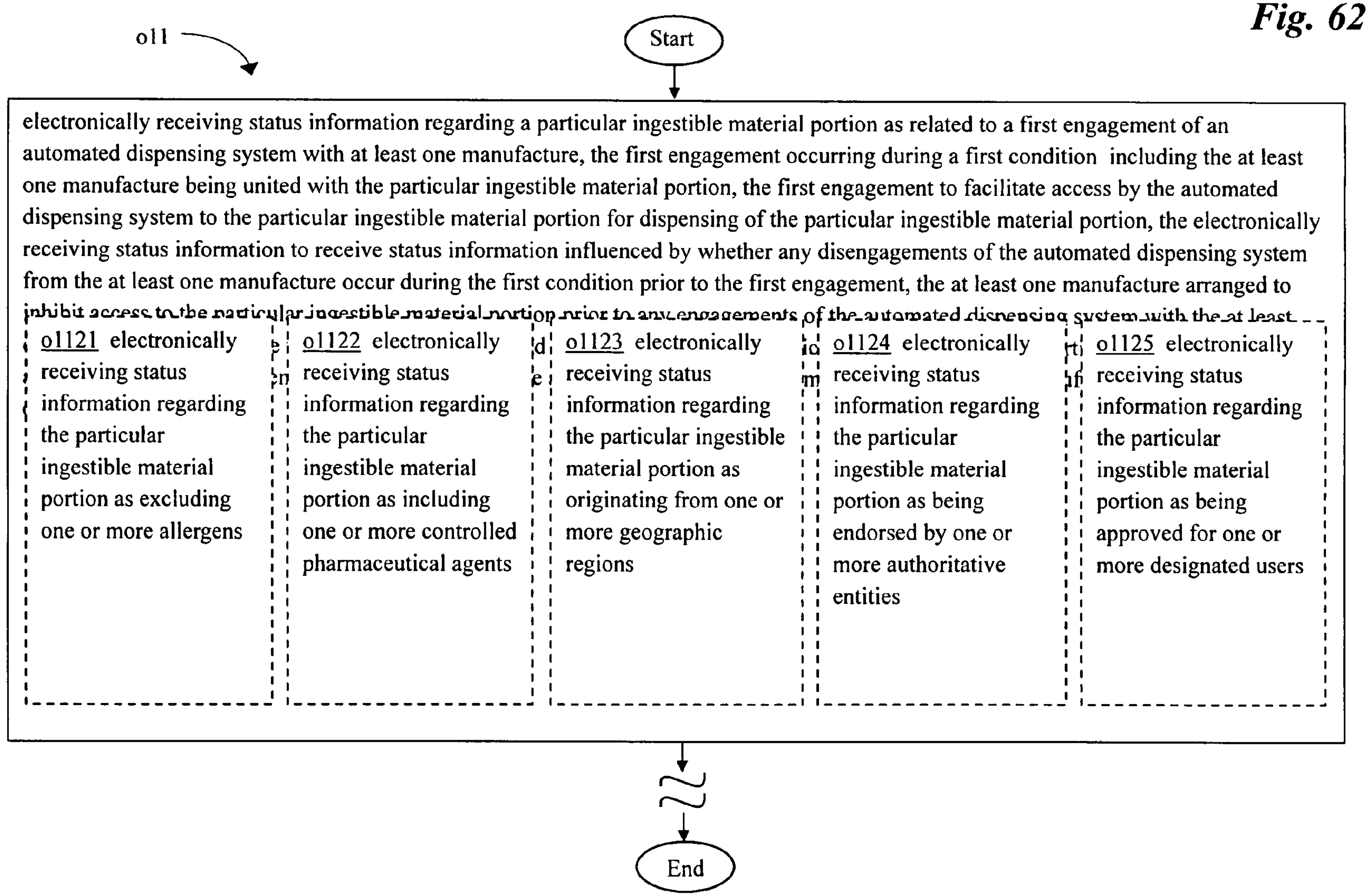
FIG. 62 is a high-level flowchart including exemplary implementations of operation O11 of FIG. 57.

In one or more implementations, as shown in FIG. 62, operation o11 includes an operation o1121 for electronically receiving status information regarding the particular ingestible material portion as excluding one or more allergens. An exemplary version of the non-transitory signal bearing medium n100 is depicted as bearing one or more receiving information allergens instructions i1121 that when executed will direct performance of the operation o1121. In an implementation, the one or more receiving information allergens instructions i1121 when executed direct electronically receiving status information regarding the particular ingestible material portion as excluding one or more allergens (e.g. electronic memory 52 coupled to containing assembly 44 is read by receiver 54 to obtain information as to the absence of peanuts, wheat, eggs, and diary to be passed on to the microprocessor component s102, which subsequently displays the information on selection indicators 20, etc.). Furthermore, the receiving information allergens electrical circuitry arrangement e1121 when activated will perform the operation o1121. In an implementation, the receiving information allergens electrical circuitry arrangement e1121, when activated performs electronically receiving status information regarding the particular ingestible material portion as excluding one or more allergens (e.g. electronic memory 52 coupled to containing assembly 44 is read by receiver 54 to obtain information as to the absence of peanuts, wheat, eggs, and diary to be passed on to the microprocessor component s102, which subsequently displays the information on selection indicators 20, etc.). In an implementation, the electronically receiving status information regarding the particular ingestible material portion as excluding one or more allergens is carried out by electronically receiving status information regarding the particular ingestible material portion as excluding one or more allergens (e.g. electronic memory 52 coupled to containing assembly 44 is read by receiver 54 to obtain information as to the absence of peanuts, wheat, eggs, and diary to be passed on to the microprocessor component s102, which subsequently displays the information on selection indicators 20, etc.).

In one or more implementations, operation o11 includes an operation o1122 for electronically receiving status information regarding the particular ingestible material portion as including one or more controlled pharmaceutical agents. An exemplary version of the non-transitory signal bearing medium n100 is depicted as bearing one or more receiving information pharmaceutical instructions i1122 that when executed will direct performance of the operation o1122. In an implementation, the one or more receiving information pharmaceutical instructions i1122 when executed direct electronically receiving status information regarding the particular ingestible material portion as including one or more controlled pharmaceutical agents (e.g. electronic memory 52 coupled to containing assembly 44 is read by receiver 54 to obtain information as to amounts of vicodin and benadryl when the containing assembly is engaged with the receiving assembly 48 to be passed on to the microprocessor component s102, which subsequently displays the information on selection indicators 20, etc.). Furthermore, the receiving information pharmaceutical electrical circuitry arrangement e1122 when activated will perform the operation o1122. In an implementation, the receiving information pharmaceutical electrical circuitry arrangement e1122, when activated performs electronically receiving status information regarding the particular ingestible material portion as including one or more controlled pharmaceutical agents (e.g. electronic memory 52 coupled to containing assembly 44 is read by receiver 54 to obtain information as to amounts of vicodin and benadryl when the containing assembly is engaged with the receiving assembly 48 to be passed on to the microprocessor component s102, which subsequently displays the information on selection indicators 20, etc.). In an implementation, the electronically receiving status information regarding the particular ingestible material portion as including one or more controlled pharmaceutical agents is carried out by electronically receiving status information regarding the particular ingestible material portion as including one or more controlled pharmaceutical agents (e.g. electronic memory 52 coupled to containing assembly 44 is read by receiver 54 to obtain information as to amounts of vicodin and benadryl when the containing assembly is engaged with the receiving assembly 48 to be passed on to the microprocessor component s102, which subsequently displays the information on selection indicators 20, etc.).

In one or more implementations, operation o11 includes an operation o1123 for electronically receiving status information regarding the particular ingestible material portion as originating from one or more geographic regions. An exemplary version of the non-transitory signal bearing medium n100 is depicted as bearing one or more receiving information geographic instructions i1123 that when executed will direct performance of the operation o1123. In an implementation, the one or more receiving information geographic instructions i1123 when executed direct electronically receiving status information regarding the particular ingestible material portion as originating from one or more geographic regions (e.g. electronic memory 52 coupled to containing assembly 44 is read by receiver 54 to obtain information as to country of origin of ingredients in a pizza pie when the containing assembly is engaged with the receiving assembly 48 to be passed on to the microprocessor component s102, which subsequently displays the information on selection indicators 20, etc.). Furthermore, the receiving information geographic electrical circuitry arrangement e1123 when activated will perform the operation o1123. In an implementation, the receiving information geographic electrical circuitry arrangement e1123, when activated performs electronically receiving status information regarding the particular ingestible material portion as originating from one or more geographic regions (e.g. electronic memory 52 coupled to containing assembly 44 is read by receiver 54 to obtain information as to country of origin of ingredients in a pizza pie when the containing assembly is engaged with the receiving assembly 48 to be passed on to the microprocessor component s102, which subsequently displays the information on selection indicators 20, etc.). In an implementation, the electronically receiving status information regarding the particular ingestible material portion as originating from one or more geographic regions is carried out by electronically receiving status information regarding the particular ingestible material portion as originating from one or more geographic regions (e.g. electronic memory 52 coupled to containing assembly 44 is read by receiver 54 to obtain information as to country of origin of ingredients in a pizza pie when the containing assembly is engaged with the receiving assembly 48 to be passed on to the microprocessor component s102, which subsequently displays the information on selection indicators 20, etc.).

In one or more implementations, operation o11 includes an operation o1124 for electronically receiving status information regarding the particular ingestible material portion as being endorsed by one or more authoritative entities. An exemplary version of the non-transitory signal bearing medium n100 is depicted as bearing one or more receiving information endorsed instructions i1124 that when executed will direct performance of the operation o1124. In an implementation, the one or more receiving information endorsed instructions i1124 when executed direct electronically receiving status information regarding the particular ingestible material portion as being endorsed by one or more authoritative entities (e.g. electronic memory 52 coupled to containing assembly 44 is read by receiver 54 to obtain information as to which nutrition center formulated an energy drink as the particular ingestible material portion when the containing assembly is engaged with the receiving assembly 48 to be passed on to the microprocessor component s102, which subsequently displays the information on selection indicators 20, etc.). Furthermore, the receiving information endorsed electrical circuitry arrangement e1124 when activated will perform the operation o1124. In an implementation, the receiving information endorsed electrical circuitry arrangement e1124, when activated performs electronically receiving status information regarding the particular ingestible material portion as being endorsed by one or more authoritative entities (e.g. electronic memory 52 coupled to containing assembly 44 is read by receiver 54 to obtain information as to which nutrition center formulated an energy drink as the particular ingestible material portion when the containing assembly is engaged with the receiving assembly 48 to be passed on to the microprocessor component s102, which subsequently displays the information on selection indicators 20, etc.). In an implementation, the electronically receiving status information regarding the particular ingestible material portion as being endorsed by one or more authoritative entities is carried out by electronically receiving status information regarding the particular ingestible material portion as being endorsed by one or more authoritative entities (e.g. electronic memory 52 coupled to containing assembly 44 is read by receiver 54 to obtain information as to which nutrition center formulated an energy drink as the particular ingestible material portion when the containing assembly is engaged with the receiving assembly 48 to be passed on to the microprocessor component s102, which subsequently displays the information on selection indicators 20, etc.).

In one or more implementations, operation o11 includes an operation o1125 for electronically receiving status information regarding the particular ingestible material portion as being approved for one or more designated users. An exemplary version of the non-transitory signal bearing medium n100 is depicted as bearing one or more receiving information approved instructions i1125 that when executed will direct performance of the operation o1125. In an implementation, the one or more receiving information approved instructions i1125 when executed direct electronically receiving status information regarding the particular ingestible material portion as being approved for one or more designated users (e.g. electronic memory 52 coupled to containing assembly 44 is read by receiver 54 to obtain information as to what individual human being is authorized to obtain meal replacement bars when the containing assembly is engaged with the receiving assembly 48 to be passed on to the microprocessor component s102, which subsequently displays the information on selection indicators 20, etc.). Furthermore, the receiving information approved electrical circuitry arrangement e1125 when activated will perform the operation o1125. In an implementation, the receiving information approved electrical circuitry arrangement e1125, when activated performs electronically receiving status information regarding the particular ingestible material portion as being approved for one or more designated users (e.g. electronic memory 52 coupled to containing assembly 44 is read by receiver 54 to obtain information as to what individual human being is authorized to obtain meal replacement bars when the containing assembly is engaged with the receiving assembly 48 to be passed on to the microprocessor component s102, which subsequently displays the information on selection indicators 20, etc.). In an implementation, the electronically receiving status information regarding the particular ingestible material portion as being approved for one or more designated users is carried out by electronically receiving status information regarding the particular ingestible material portion as being approved for one or more designated users (e.g. electronic memory 52 coupled to containing assembly 44 is read by receiver 54 to obtain information as to what individual human being is authorized to obtain meal replacement bars when the containing assembly is engaged with the receiving assembly 48 to be passed on to the microprocessor component s102, which subsequently displays the information on selection indicators 20, etc.).

Figure 63:
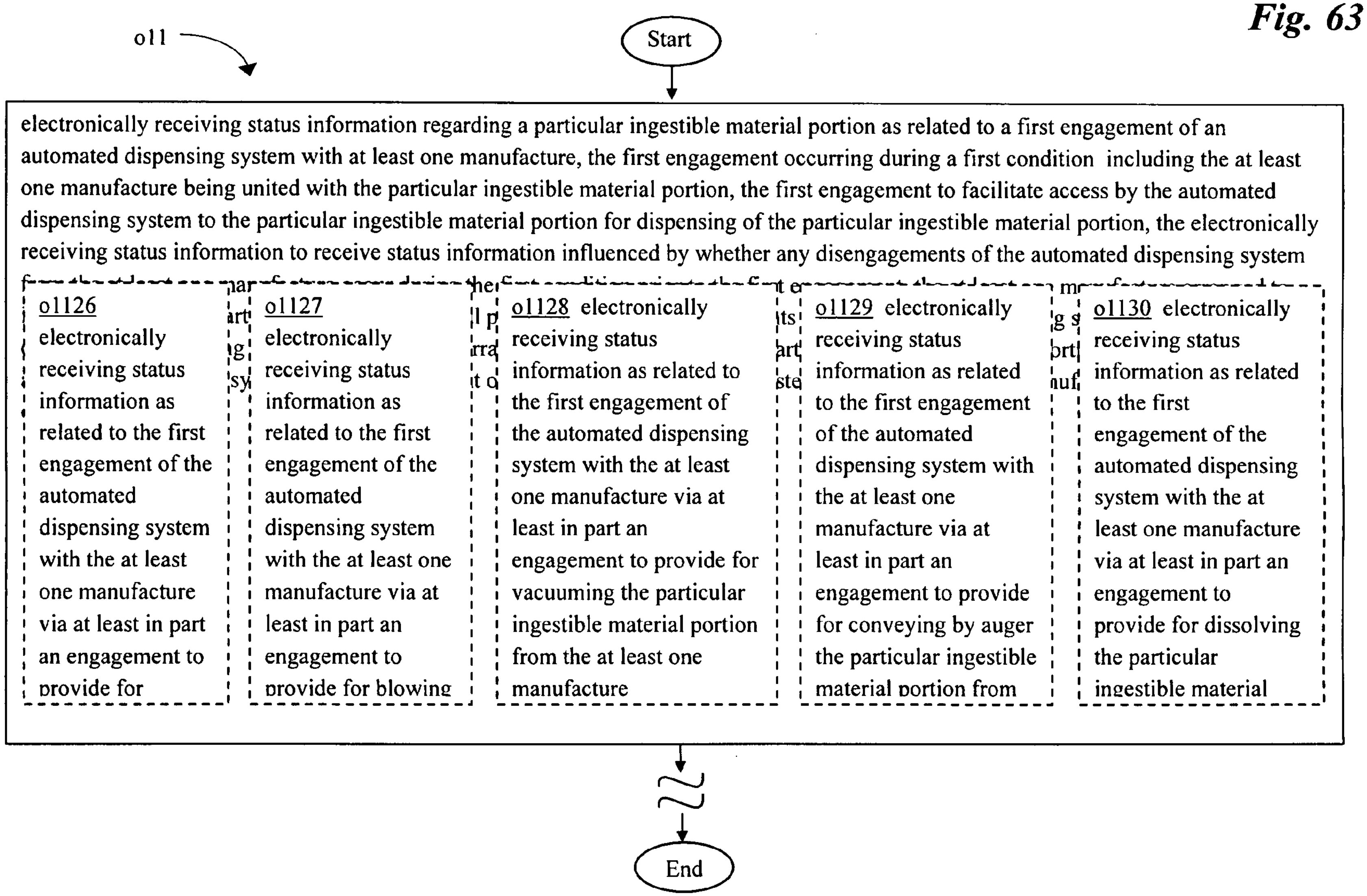
FIG. 63 is a high-level flowchart including exemplary implementations of operation O11 of FIG. 57.

In one or more implementations, as shown in FIG. 63, operation o11 includes an operation o1126 for electronically receiving status information as related to the first engagement of the automated dispensing system with the at least one manufacture via at least in part an engagement to provide for pouring the particular ingestible material portion from the at least one manufacture. An exemplary version of the non-transitory signal bearing medium n100 is depicted as bearing one or more receiving information pouring instructions i1126 that when executed will direct performance of the operation o1126. In an implementation, the one or more receiving information pouring instructions i1126 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) via at least in part an engagement to provide for pouring the particular ingestible material portion from the at least one manufacture (e.g. as shown in FIGS. 10-12, upon engagement of the containing assembly 44, including container 46 with sliding barrier 68, protrusion 66 pushes on the sliding barrier allowing ingestible material 42 to be poured from the containing assembly to flow through orifice 70 into chamber 71 thereby mixing with other ingestible material 69, etc.). Furthermore, the receiving information pouring electrical circuitry arrangement e1126 when activated will perform the operation o1126. In an implementation, the receiving information pouring electrical circuitry arrangement e1126, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) via at least in part an engagement to provide for pouring the particular ingestible material portion from the at least one manufacture (e.g. as shown in FIGS. 10-12, upon engagement of the containing assembly 44, including container 46 with sliding barrier 68, protrusion 66 pushes on the sliding barrier allowing ingestible material 42 to be poured from the containing assembly to flow through orifice 70 into chamber 71 thereby mixing with other ingestible material 69, etc.). In an implementation, the electronically receiving status information as related to the first engagement of the automated dispensing system with the at least one manufacture via at least in part an engagement to provide for pouring the particular ingestible material portion from the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) via at least in part an engagement to provide for pouring the particular ingestible material portion from the at least one manufacture (e.g. as shown in FIGS. 10-12, upon engagement of the containing assembly 44, including container 46 with sliding barrier 68, protrusion 66 pushes on the sliding barrier allowing ingestible material 42 to be poured from the containing assembly to flow through orifice 70 into chamber 71 thereby mixing with other ingestible material 69, etc.).

In one or more implementations, operation o11 includes an operation o1127 for electronically receiving status information as related to the first engagement of the automated dispensing system with the at least one manufacture via at least in part an engagement to provide for blowing the particular ingestible material portion from the at least one manufacture. An exemplary version of the non-transitory signal bearing medium n100 is depicted as bearing one or more receiving information blowing instructions i1127 that when executed will direct performance of the operation o1127. In an implementation, the one or more receiving information blowing instructions i1127 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) via at least in part an engagement to provide for blowing the particular ingestible material portion from the at least one manufacture (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as blowing, etc.). Furthermore, the receiving information blowing electrical circuitry arrangement e1127 when activated will perform the operation o1127. In an implementation, the receiving information blowing electrical circuitry arrangement e1127, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) via at least in part an engagement to provide for blowing the particular ingestible material portion from the at least one manufacture (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as blowing, etc.). In an implementation, the electronically receiving status information as related to the first engagement of the automated dispensing system with the at least one manufacture via at least in part an engagement to provide for blowing the particular ingestible material portion from the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) via at least in part an engagement to provide for blowing the particular ingestible material portion from the at least one manufacture (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as blowing, etc.).

In one or more implementations, operation o11 includes an operation o1128 for electronically receiving status information as related to the first engagement of the automated dispensing system with the at least one manufacture via at least in part an engagement to provide for vacuuming the particular ingestible material portion from the at least one manufacture. An exemplary version of the non-transitory signal bearing medium n100 is depicted as bearing one or more receiving information vacuuming instructions i1128 that when executed will direct performance of the operation o1128. In an implementation, the one or more receiving information vacuuming instructions i1128 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) via at least in part an engagement to provide for vacuuming the particular ingestible material portion from the at least one manufacture (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by vacuum, or other means of force, etc.). Furthermore, the receiving information vacuuming electrical circuitry arrangement e1128 when activated will perform the operation o1128. In an implementation, the receiving information vacuuming electrical circuitry arrangement e1128, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) via at least in part an engagement to provide for vacuuming the particular ingestible material portion from the at least one manufacture (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by vacuum, or other means of force, etc.). In an implementation, the electronically receiving status information as related to the first engagement of the automated dispensing system with the at least one manufacture via at least in part an engagement to provide for vacuuming the particular ingestible material portion from the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) via at least in part an engagement to provide for vacuuming the particular ingestible material portion from the at least one manufacture (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by vacuum, or other means of force, etc.).

In one or more implementations, operation o11 includes an operation o1129 for electronically receiving status information as related to the first engagement of the automated dispensing system with the at least one manufacture via at least in part an engagement to provide for conveying by auger the particular ingestible material portion from the at least one manufacture. An exemplary version of the non-transitory signal bearing medium n100 is depicted as bearing one or more receiving information auger instructions i1129 that when executed will direct performance of the operation o1129. In an implementation, the one or more receiving information auger instructions i1129 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) via at least in part an engagement to provide for conveying by auger the particular ingestible material portion from the at least one manufacture (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). Furthermore, the receiving information auger electrical circuitry arrangement e1129 when activated will perform the operation o1129. In an implementation, the receiving information auger electrical circuitry arrangement e1129, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) via at least in part an engagement to provide for conveying by auger the particular ingestible material portion from the at least one manufacture (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). In an implementation, the electronically receiving status information as related to the first engagement of the automated dispensing system with the at least one manufacture via at least in part an engagement to provide for conveying by auger the particular ingestible material portion from the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) via at least in part an engagement to provide for conveying by auger the particular ingestible material portion from the at least one manufacture (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.).

In one or more implementations, operation o11 includes an operation o1130 for electronically receiving status information as related to the first engagement of the automated dispensing system with the at least one manufacture via at least in part an engagement to provide for dissolving the particular ingestible material portion in a solution to be transported from the at least one manufacture. An exemplary version of the non-transitory signal bearing medium n100 is depicted as bearing one or more receiving information dissolving instructions i1130 that when executed will direct performance of the operation o1130. In an implementation, the one or more receiving information dissolving instructions i1130 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) via at least in part an engagement to provide for dissolving the particular ingestible material portion in a solution to be transported from the at least one manufacture (e.g. as shown in FIGS. 7-9, upon engagement of the containing assembly 44, including container 46 with pierceable side portion 62, protrusion 60 pierces side portion 62 allowing ingestible material 42 to flow through orifice 64 to be dissolved in solution 63 held in chamber 65, etc.). Furthermore, the receiving information dissolving electrical circuitry arrangement e1130 when activated will perform the operation o1130. In an implementation, the receiving information dissolving electrical circuitry arrangement e1130, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) via at least in part an engagement to provide for dissolving the particular ingestible material portion in a solution to be transported from the at least one manufacture (e.g. as shown in FIGS. 7-9, upon engagement of the containing assembly 44, including container 46 with pierceable side portion 62, protrusion 60 pierces side portion 62 allowing ingestible material 42 to flow through orifice 64 to be dissolved in solution 63 held in chamber 65, etc.). In an implementation, the electronically receiving status information as related to the first engagement of the automated dispensing system with the at least one manufacture via at least in part an engagement to provide for dissolving the particular ingestible material portion in a solution to be transported from the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) via at least in part an engagement to provide for dissolving the particular ingestible material portion in a solution to be transported from the at least one manufacture (e.g. as shown in FIGS. 7-9, upon engagement of the containing assembly 44, including container 46 with pierceable side portion 62, protrusion 60 pierces side portion 62 allowing ingestible material 42 to flow through orifice 64 to be dissolved in solution 63 held in chamber 65, etc.).

Figure 64:
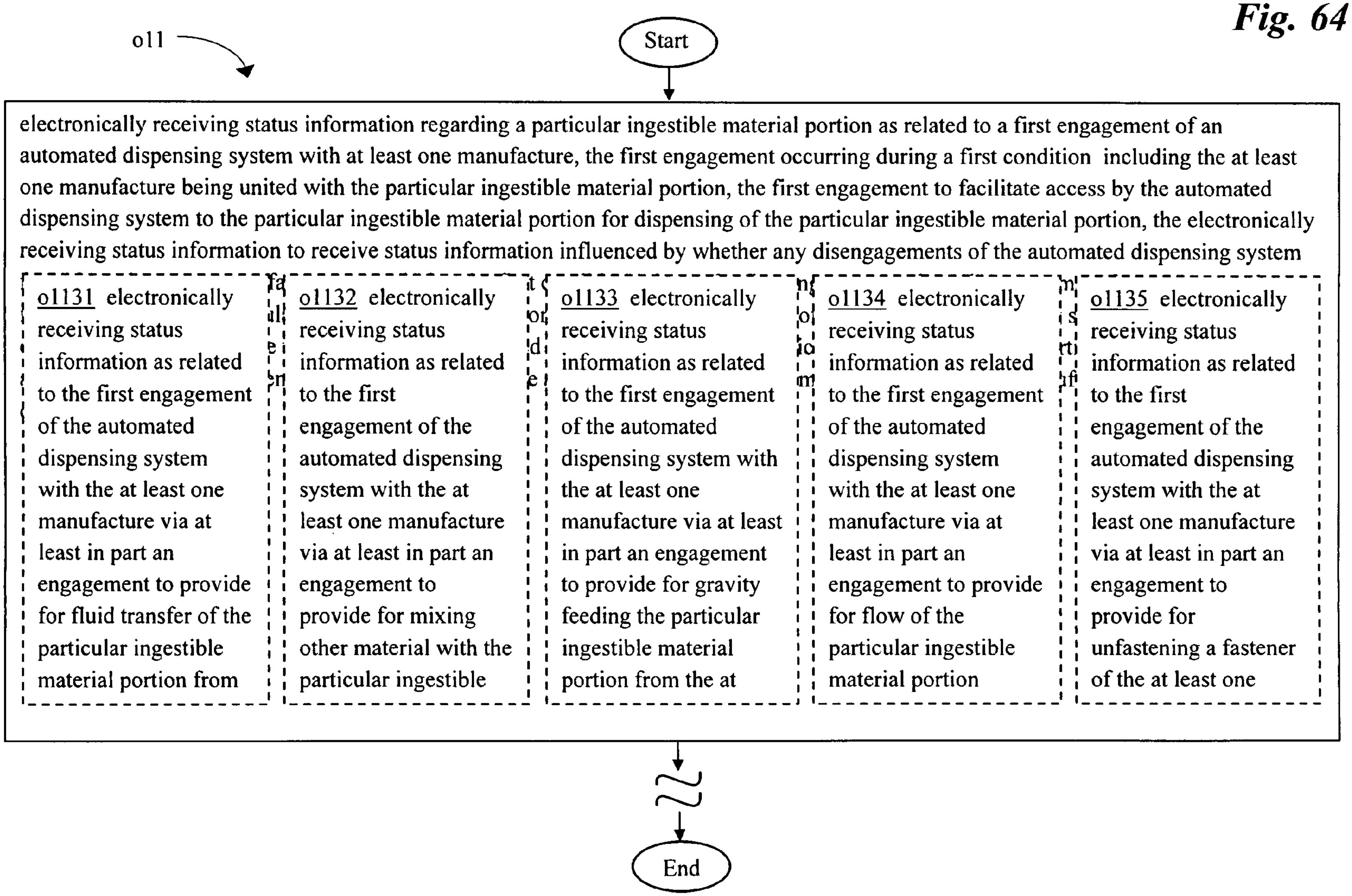
FIG. 64 is a high-level flowchart including exemplary implementations of operation O11 of FIG. 57.

In one or more implementations, as shown in FIG. 64, operation o11 includes an operation o1131 for electronically receiving status information as related to the first engagement of the automated dispensing system with the at least one manufacture via at least in part an engagement to provide for fluid transfer of the particular ingestible material portion from the at least one manufacture. An exemplary version of the non-transitory signal bearing medium n100 is depicted as bearing one or more receiving information fluid transfer instructions i1131 that when executed will direct performance of the operation o1131. In an implementation, the one or more receiving information fluid transfer instructions i1131 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) via at least in part an engagement to provide for fluid transfer of the particular ingestible material portion from the at least one manufacture (e.g. as shown in FIGS. 19-21, upon engagement of the containing assembly 44, including container 46 with pierceable wall 84, syringe needle 86 pierces pierceable wall 84 allowing ingestible material 42 to be sucked into the syringe needle, etc.). Furthermore, the receiving information fluid transfer electrical circuitry arrangement e1131 when activated will perform the operation o1131. In an implementation, the receiving information fluid transfer electrical circuitry arrangement e1131, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) via at least in part an engagement to provide for fluid transfer of the particular ingestible material portion from the at least one manufacture (e.g. as shown in FIGS. 19-21, upon engagement of the containing assembly 44, including container 46 with pierceable wall 84, syringe needle 86 pierces pierceable wall 84 allowing ingestible material 42 to be sucked into the syringe needle, etc.). In an implementation, the electronically receiving status information as related to the first engagement of the automated dispensing system with the at least one manufacture via at least in part an engagement to provide for fluid transfer of the particular ingestible material portion from the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) via at least in part an engagement to provide for fluid transfer of the particular ingestible material portion from the at least one manufacture (e.g. as shown in FIGS. 19-21, upon engagement of the containing assembly 44, including container 46 with pierceable wall 84, syringe needle 86 pierces pierceable wall 84 allowing ingestible material 42 to be sucked into the syringe needle, etc.).

In one or more implementations, operation o11 includes an operation o1132 for electronically receiving status information as related to the first engagement of the automated dispensing system with the at least one manufacture via at least in part an engagement to provide for mixing other material with the particular ingestible material portion from the at least one manufacture. An exemplary version of the non-transitory signal bearing medium n100 is depicted as bearing one or more receiving information mixing other instructions i1132 that when executed will direct performance of the operation o1132. In an implementation, the one or more receiving information mixing other instructions i1132 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) via at least in part an engagement to provide for mixing other material with the particular ingestible material portion from the at least one manufacture (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.). Furthermore, the receiving information mixing other electrical circuitry arrangement e1132 when activated will perform the operation o1132. In an implementation, the receiving information mixing other electrical circuitry arrangement e1132, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) via at least in part an engagement to provide for mixing other material with the particular ingestible material portion from the at least one manufacture (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.). In an implementation, the electronically receiving status information as related to the first engagement of the automated dispensing system with the at least one manufacture via at least in part an engagement to provide for mixing other material with the particular ingestible material portion from the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) via at least in part an engagement to provide for mixing other material with the particular ingestible material portion from the at least one manufacture (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.).

In one or more implementations, operation o11 includes an operation o1133 for electronically receiving status information as related to the first engagement of the automated dispensing system with the at least one manufacture via at least in part an engagement to provide for gravity feeding the particular ingestible material portion from the at least one manufacture. An exemplary version of the non-transitory signal bearing medium n100 is depicted as bearing one or more receiving information gravity instructions i1133 that when executed will direct performance of the operation o1133. In an implementation, the one or more receiving information gravity instructions i1133 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) via at least in part an engagement to provide for gravity feeding the particular ingestible material portion from the at least one manufacture (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by gravity, etc.). Furthermore, the receiving information gravity electrical circuitry arrangement e1133 when activated will perform the operation o1133. In an implementation, the receiving information gravity electrical circuitry arrangement e1133, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) via at least in part an engagement to provide for gravity feeding the particular ingestible material portion from the at least one manufacture (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by gravity, etc.). In an implementation, the electronically receiving status information as related to the first engagement of the automated dispensing system with the at least one manufacture via at least in part an engagement to provide for gravity feeding the particular ingestible material portion from the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) via at least in part an engagement to provide for gravity feeding the particular ingestible material portion from the at least one manufacture (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by gravity, etc.).

In one or more implementations, operation o11 includes an operation o1134 for electronically receiving status information as related to the first engagement of the automated dispensing system with the at least one manufacture via at least in part an engagement to provide for flow of the particular ingestible material portion through a valve from the at least one manufacture. An exemplary version of the non-transitory signal bearing medium n100 is depicted as bearing one or more receiving information flow instructions i1134 that when executed will direct performance of the operation o1134. In an implementation, the one or more receiving information flow instructions i1134 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 34-36 as the first engagement of the automated dispensing system with the at least one manufacture, the information to be passed on to the microprocessor component s102, which subsequently displays the information on selection indicators 20, etc.) via at least in part an engagement to provide for flow of the particular ingestible material portion through a valve from the at least one manufacture (e.g. as shown in FIGS. 34-36, upon engagement of the containing assembly 44, including container 46 with valve 110, as containing assembly 44 is inserted into receiving assembly 48 of the substance control dispensing system 10, valve 110 is opened by member 112 thereby allowing ingestible material 42 to move through orifice 114, etc.). Furthermore, the receiving information flow electrical circuitry arrangement e1134 when activated will perform the operation o1134. In an implementation, the receiving information flow electrical circuitry arrangement e1134, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 34-36 as the first engagement of the automated dispensing system with the at least one manufacture, the information to be passed on to the microprocessor component s102, which subsequently displays the information on selection indicators 20, etc.) via at least in part an engagement to provide for flow of the particular ingestible material portion through a valve from the at least one manufacture (e.g. as shown in FIGS. 34-36, upon engagement of the containing assembly 44, including container 46 with valve 110, as containing assembly 44 is inserted into receiving assembly 48 of the substance control dispensing system 10, valve 110 is opened by member 112 thereby allowing ingestible material 42 to move through orifice 114, etc.). In an implementation, the electronically receiving status information as related to the first engagement of the automated dispensing system with the at least one manufacture via at least in part an engagement to provide for flow of the particular ingestible material portion through a valve from the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 34-36 as the first engagement of the automated dispensing system with the at least one manufacture, the information to be passed on to the microprocessor component s102, which subsequently displays the information on selection indicators 20, etc.) via at least in part an engagement to provide for flow of the particular ingestible material portion through a valve from the at least one manufacture (e.g. as shown in FIGS. 34-36, upon engagement of the containing assembly 44, including container 46 with valve 110, as containing assembly 44 is inserted into receiving assembly 48 of the substance control dispensing system 10, valve 110 is opened by member 112 thereby allowing ingestible material 42 to move through orifice 114, etc.).

In one or more implementations, operation o11 includes an operation o1135 for electronically receiving status information as related to the first engagement of the automated dispensing system with the at least one manufacture via at least in part an engagement to provide for unfastening a fastener of the at least one manufacture. An exemplary version of the non-transitory signal bearing medium n100 is depicted as bearing one or more receiving information fastener instructions i1135 that when executed will direct performance of the operation o1135. In an implementation, the one or more receiving information fastener instructions i1135 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) via at least in part an engagement to provide for unfastening a fastener of the at least one manufacture (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container, etc.). Furthermore, the receiving information fastener electrical circuitry arrangement e1135 when activated will perform the operation o1135. In an implementation, the receiving information fastener electrical circuitry arrangement e1135, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) via at least in part an engagement to provide for unfastening a fastener of the at least one manufacture (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container, etc.). In an implementation, the electronically receiving status information as related to the first engagement of the automated dispensing system with the at least one manufacture via at least in part an engagement to provide for unfastening a fastener of the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) via at least in part an engagement to provide for unfastening a fastener of the at least one manufacture (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container, etc.).

Figure 65:
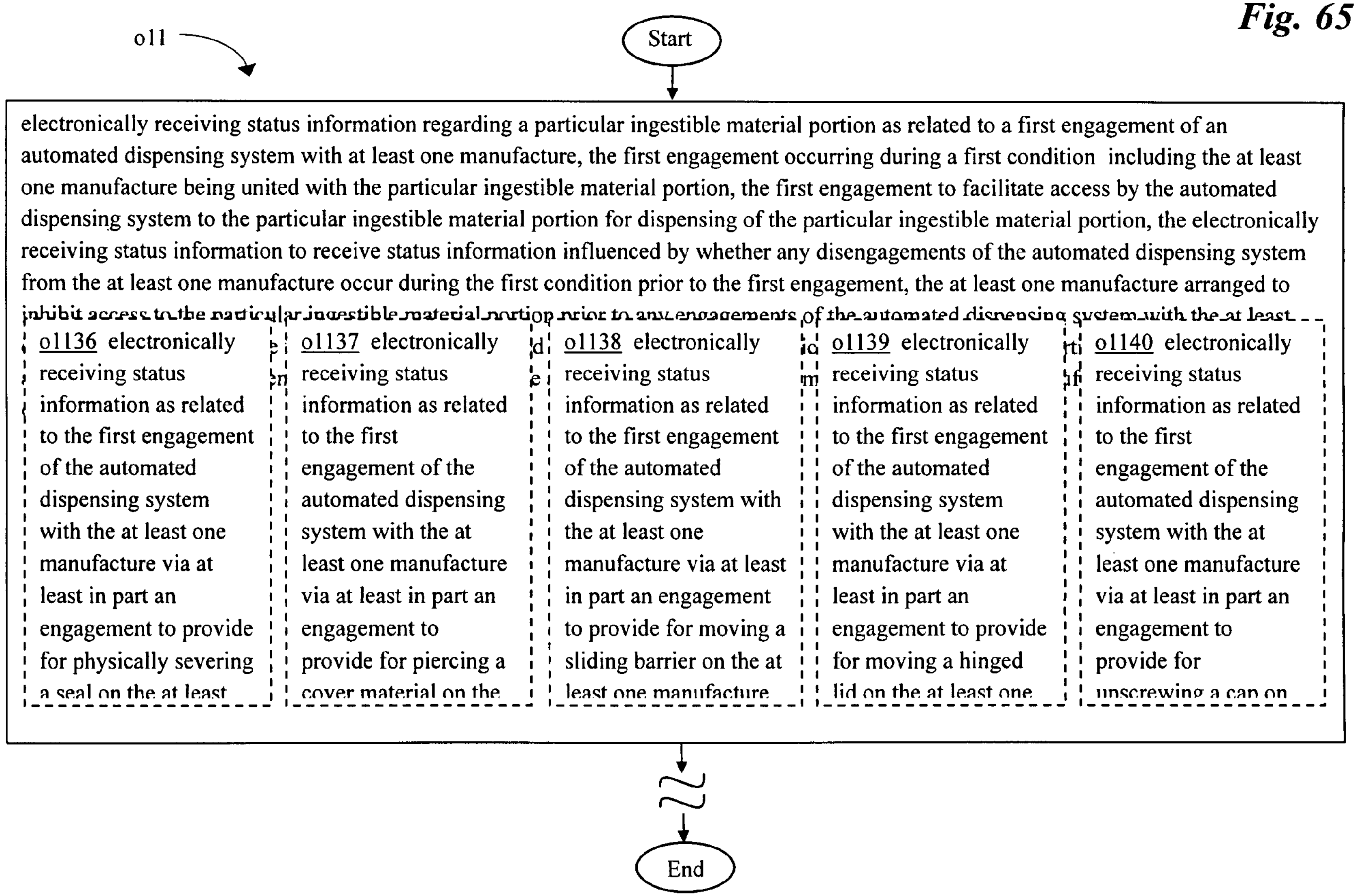
FIG. 65 is a high-level flowchart including exemplary implementations of operation O11 of FIG. 57.

In one or more implementations, as shown in FIG. 65, operation o11 includes an operation o1136 for electronically receiving status information as related to the first engagement of the automated dispensing system with the at least one manufacture via at least in part an engagement to provide for physically severing a seal on the at least one manufacture. An exemplary version of the non-transitory signal bearing medium n100 is depicted as bearing one or more receiving information seal instructions i1136 that when executed will direct performance of the operation o1136. In an implementation, the one or more receiving information seal instructions i1136 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) via at least in part an engagement to provide for physically severing a seal on the at least one manufacture (e.g. as shown in FIGS. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.). Furthermore, the receiving information seal electrical circuitry arrangement e1136 when activated will perform the operation o1136. In an implementation, the receiving information seal electrical circuitry arrangement e1136, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) via at least in part an engagement to provide for physically severing a seal on the at least one manufacture (e.g. as shown in FIGS. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.). In an implementation, the electronically receiving status information as related to the first engagement of the automated dispensing system with the at least one manufacture via at least in part an engagement to provide for physically severing a seal on the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) via at least in part an engagement to provide for physically severing a seal on the at least one manufacture (e.g. as shown in FIGS. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.).

In one or more implementations, operation o11 includes an operation o1137 for electronically receiving status information as related to the first engagement of the automated dispensing system with the at least one manufacture via at least in part an engagement to provide for piercing a cover material on the at least one manufacture. An exemplary version of the non-transitory signal bearing medium n100 is depicted as bearing one or more receiving information piercing instructions i1137 that when executed will direct performance of the operation o1137. In an implementation, the one or more receiving information piercing instructions i1137 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) via at least in part an engagement to provide for piercing a cover material on the at least one manufacture (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by gravity, vacuum, or other means of force, etc.). Furthermore, the receiving information piercing electrical circuitry arrangement e1137 when activated will perform the operation o1137. In an implementation, the receiving information piercing electrical circuitry arrangement e1137, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) via at least in part an engagement to provide for piercing a cover material on the at least one manufacture (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by gravity, vacuum, or other means of force, etc.). In an implementation, the electronically receiving status information as related to the first engagement of the automated dispensing system with the at least one manufacture via at least in part an engagement to provide for piercing a cover material on the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) via at least in part an engagement to provide for piercing a cover material on the at least one manufacture (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by gravity, vacuum, or other means of force, etc.).

In one or more implementations, operation o11 includes an operation o1138 for electronically receiving status information as related to the first engagement of the automated dispensing system with the at least one manufacture via at least in part an engagement to provide for moving a sliding barrier on the at least one manufacture. An exemplary version of the non-transitory signal bearing medium n100 is depicted as bearing one or more receiving information sliding instructions i1138 that when executed will direct performance of the operation o1138. In an implementation, the one or more receiving information sliding instructions i1138 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) via at least in part an engagement to provide for moving a sliding barrier on the at least one manufacture (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.). Furthermore, the receiving information sliding electrical circuitry arrangement e1138 when activated will perform the operation o1138. In an implementation, the receiving information sliding electrical circuitry arrangement e1138, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) via at least in part an engagement to provide for moving a sliding barrier on the at least one manufacture (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.). In an implementation, the electronically receiving status information as related to the first engagement of the automated dispensing system with the at least one manufacture via at least in part an engagement to provide for moving a sliding barrier on the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) via at least in part an engagement to provide for moving a sliding barrier on the at least one manufacture (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.).

In one or more implementations, operation o11 includes an operation o1139 for electronically receiving status information as related to the first engagement of the automated dispensing system with the at least one manufacture via at least in part an engagement to provide for moving a hinged lid on the at least one manufacture. An exemplary version of the non-transitory signal bearing medium n100 is depicted as bearing one or more receiving information lid instructions i1139 that when executed will direct performance of the operation o1139. In an implementation, the one or more receiving information lid instructions i1139 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 13-15 as the first engagement of the automated dispensing system with the at least one manufacture, the information to be passed on to the microprocessor component s102, which subsequently displays the information on selection indicators 20, etc.) via at least in part an engagement to provide for moving a hinged lid on the at least one manufacture (e.g. as shown in FIGS. 13-15, upon engagement of the containing assembly 44, including container 46 with hinged lid 74, as containing assembly 44 is inserted into receiving assembly 48 of the substance control dispensing system 10, protrusion 72 opens hinged lid 74 allowing ingestible material 42 to be collected through orifice 76 as encouraged by gravity, vacuum, or other means of force, etc.). Furthermore, the receiving information lid electrical circuitry arrangement e1139 when activated will perform the operation o1139. In an implementation, the receiving information lid electrical circuitry arrangement e1139, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 13-15 as the first engagement of the automated dispensing system with the at least one manufacture, the information to be passed on to the microprocessor component s102, which subsequently displays the information on selection indicators 20, etc.) via at least in part an engagement to provide for moving a hinged lid on the at least one manufacture (e.g. as shown in FIGS. 13-15, upon engagement of the containing assembly 44, including container 46 with hinged lid 74, as containing assembly 44 is inserted into receiving assembly 48 of the substance control dispensing system 10, protrusion 72 opens hinged lid 74 allowing ingestible material 42 to be collected through orifice 76 as encouraged by gravity, vacuum, or other means of force, etc.). In an implementation, the electronically receiving status information as related to the first engagement of the automated dispensing system with the at least one manufacture via at least in part an engagement to provide for moving a hinged lid on the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 13-15 as the first engagement of the automated dispensing system with the at least one manufacture, the information to be passed on to the microprocessor component s102, which subsequently displays the information on selection indicators 20, etc.) via at least in part an engagement to provide for moving a hinged lid on the at least one manufacture (e.g. as shown in FIGS. 13-15, upon engagement of the containing assembly 44, including container 46 with hinged lid 74, as containing assembly 44 is inserted into receiving assembly 48 of the substance control dispensing system 10, protrusion 72 opens hinged lid 74 allowing ingestible material 42 to be collected through orifice 76 as encouraged by gravity, vacuum, or other means of force, etc.).

In one or more implementations, operation o11 includes an operation o1140 for electronically receiving status information as related to the first engagement of the automated dispensing system with the at least one manufacture via at least in part an engagement to provide for unscrewing a cap on the at least one manufacture. An exemplary version of the non-transitory signal bearing medium n100 is depicted as bearing one or more receiving information cap instructions i1140 that when executed will direct performance of the operation o1140. In an implementation, the one or more receiving information cap instructions i1140 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) via at least in part an engagement to provide for unscrewing a cap on the at least one manufacture (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). Furthermore, the receiving information cap electrical circuitry arrangement e1140 when activated will perform the operation o1140. In an implementation, the receiving information cap electrical circuitry arrangement e1140, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) via at least in part an engagement to provide for unscrewing a cap on the at least one manufacture (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). In an implementation, the electronically receiving status information as related to the first engagement of the automated dispensing system with the at least one manufacture via at least in part an engagement to provide for unscrewing a cap on the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) via at least in part an engagement to provide for unscrewing a cap on the at least one manufacture (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.).

Figure 66:
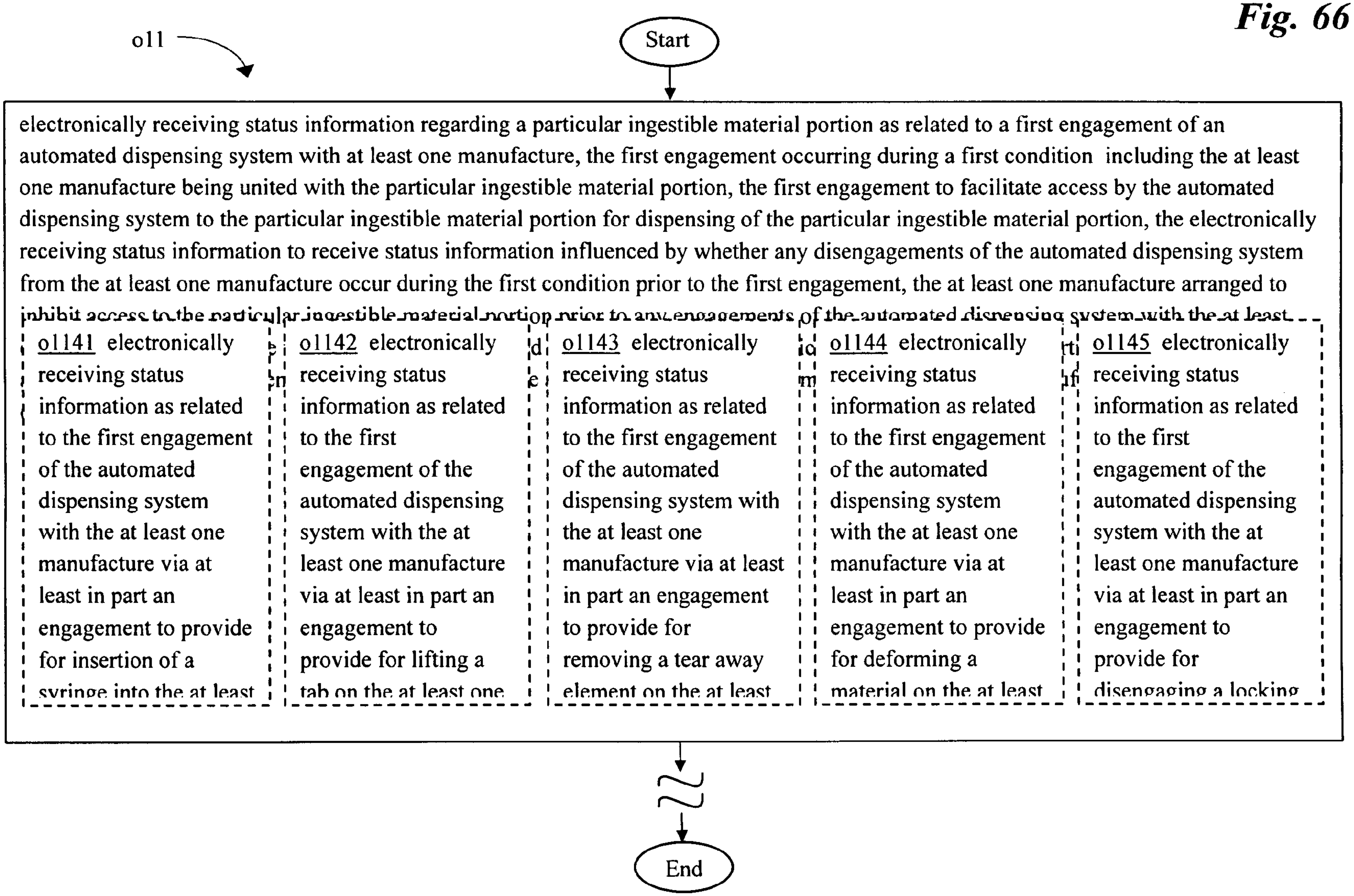
FIG. 66 is a high-level flowchart including exemplary implementations of operation O11 of FIG. 57.

In one or more implementations, as shown in FIG. 66, operation o11 includes an operation o1141 for electronically receiving status information as related to the first engagement of the automated dispensing system with the at least one manufacture via at least in part an engagement to provide for insertion of a syringe into the at least one manufacture. An exemplary version of the non-transitory signal bearing medium n100 is depicted as bearing one or more receiving information syringe instructions i1141 that when executed will direct performance of the operation o1141. In an implementation, the one or more receiving information syringe instructions i1141 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) via at least in part an engagement to provide for insertion of a syringe into the at least one manufacture (e.g. as shown in FIGS. 19-21, upon engagement of the containing assembly 44, including container 46 with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.). Furthermore, the receiving information syringe electrical circuitry arrangement e1141 when activated will perform the operation o1141. In an implementation, the receiving information syringe electrical circuitry arrangement e1141, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) via at least in part an engagement to provide for insertion of a syringe into the at least one manufacture (e.g. as shown in FIGS. 19-21, upon engagement of the containing assembly 44, including container 46 with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.). In an implementation, the electronically receiving status information as related to the first engagement of the automated dispensing system with the at least one manufacture via at least in part an engagement to provide for insertion of a syringe into the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) via at least in part an engagement to provide for insertion of a syringe into the at least one manufacture (e.g. as shown in FIGS. 19-21, upon engagement of the containing assembly 44, including container 46 with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.).

In one or more implementations, operation o11 includes an operation o1142 for electronically receiving status information as related to the first engagement of the automated dispensing system with the at least one manufacture via at least in part an engagement to provide for lifting a tab on the at least one manufacture. An exemplary version of the non-transitory signal bearing medium n100 is depicted as bearing one or more receiving information tab instructions i1142 that when executed will direct performance of the operation o1142. In an implementation, the one or more receiving information tab instructions i1142 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 22-24 as the first engagement of the automated dispensing system with the at least one manufacture, the information to be passed on to the microprocessor component s102, which subsequently displays the information on selection indicators 20, etc.) via at least in part an engagement to provide for lifting a tab on the at least one manufacture (e.g. as shown in FIGS. 22-24, upon engagement of the containing assembly 44, including container 46 with lifting tab 88, as containing assembly 44 is inserted into receiving assembly 48 of the substance control dispensing system 10, lifting tab 88 is opened allowing ingestible material 42 to move through orifice 90, etc.). Furthermore, the receiving information tab electrical circuitry arrangement e1142 when activated will perform the operation o1142. In an implementation, the receiving information tab electrical circuitry arrangement e1142, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 22-24 as the first engagement of the automated dispensing system with the at least one manufacture, the information to be passed on to the microprocessor component s102, which subsequently displays the information on selection indicators 20, etc.) via at least in part an engagement to provide for lifting a tab on the at least one manufacture (e.g. as shown in FIGS. 22-24, upon engagement of the containing assembly 44, including container 46 with lifting tab 88, as containing assembly 44 is inserted into receiving assembly 48 of the substance control dispensing system 10, lifting tab 88 is opened allowing ingestible material 42 to move through orifice 90, etc.). In an implementation, the electronically receiving status information as related to the first engagement of the automated dispensing system with the at least one manufacture via at least in part an engagement to provide for lifting a tab on the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 22-24 as the first engagement of the automated dispensing system with the at least one manufacture, the information to be passed on to the microprocessor component s102, which subsequently displays the information on selection indicators 20, etc.) via at least in part an engagement to provide for lifting a tab on the at least one manufacture (e.g. as shown in FIGS. 22-24, upon engagement of the containing assembly 44, including container 46 with lifting tab 88, as containing assembly 44 is inserted into receiving assembly 48 of the substance control dispensing system 10, lifting tab 88 is opened allowing ingestible material 42 to move through orifice 90, etc.).

In one or more implementations, operation o11 includes an operation o1143 for electronically receiving status information as related to the first engagement of the automated dispensing system with the at least one manufacture via at least in part an engagement to provide for removing a tear away element on the at least one manufacture. An exemplary version of the non-transitory signal bearing medium n100 is depicted as bearing one or more receiving information tear instructions i1143 that when executed will direct performance of the operation o1143. In an implementation, the one or more receiving information tear instructions i1143 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 25-27 as the first engagement of the automated dispensing system with the at least one manufacture, the information to be passed on to the microprocessor component s102, which subsequently displays the information on selection indicators 20, etc.) via at least in part an engagement to provide for removing a tear away element on the at least one manufacture (e.g. as shown in FIGS. 25-27, upon engagement of the containing assembly 44, including container 46 tear away barrier 92, as containing assembly 44 is inserted into receiving assembly 48 of the substance control dispensing system 10, shearing member 94 scraps across barrier 92 thereby tearing it away and allowing ingestible material 42 to move through orifice 96, etc.). Furthermore, the receiving information tear electrical circuitry arrangement e1143 when activated will perform the operation o1143. In an implementation, the receiving information tear electrical circuitry arrangement e1143, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 25-27 as the first engagement of the automated dispensing system with the at least one manufacture, the information to be passed on to the microprocessor component s102, which subsequently displays the information on selection indicators 20, etc.) via at least in part an engagement to provide for removing a tear away element on the at least one manufacture (e.g. as shown in FIGS. 25-27, upon engagement of the containing assembly 44, including container 46 tear away barrier 92, as containing assembly 44 is inserted into receiving assembly 48 of the substance control dispensing system 10, shearing member 94 scraps across barrier 92 thereby tearing it away and allowing ingestible material 42 to move through orifice 96, etc.). In an implementation, the electronically receiving status information as related to the first engagement of the automated dispensing system with the at least one manufacture via at least in part an engagement to provide for removing a tear away element on the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 25-27 as the first engagement of the automated dispensing system with the at least one manufacture, the information to be passed on to the microprocessor component s102, which subsequently displays the information on selection indicators 20, etc.) via at least in part an engagement to provide for removing a tear away element on the at least one manufacture (e.g. as shown in FIGS. 25-27, upon engagement of the containing assembly 44, including container 46 tear away barrier 92, as containing assembly 44 is inserted into receiving assembly 48 of the substance control dispensing system 10, shearing member 94 scraps across barrier 92 thereby tearing it away and allowing ingestible material 42 to move through orifice 96, etc.).

In one or more implementations, operation o11 includes an operation o1144 for electronically receiving status information as related to the first engagement of the automated dispensing system with the at least one manufacture via at least in part an engagement to provide for deforming a material on the at least one manufacture. An exemplary version of the non-transitory signal bearing medium n100 is depicted as bearing one or more receiving information deform instructions i1144 that when executed will direct performance of the operation o1144. In an implementation, the one or more receiving information deform instructions i1144 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 28-30 as the first engagement of the automated dispensing system with the at least one manufacture, the information to be passed on to the microprocessor component s102, which subsequently displays the information on selection indicators 20, etc.) via at least in part an engagement to provide for deforming a material on the at least one manufacture (e.g. as shown in FIGS. 28-30, upon engagement of the containing assembly 44, including container 46 with deformable portion 98, As containing assembly 44 is inserted into receiving assembly 48 of the substance control dispensing system 10, deformable portion 98 is deformed to open thereby allowing ingestible material 42 to move through orifice 100, etc.). Furthermore, the receiving information deform electrical circuitry arrangement e1144 when activated will perform the operation o1144. In an implementation, the receiving information deform electrical circuitry arrangement e1144, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 28-30 as the first engagement of the automated dispensing system with the at least one manufacture, the information to be passed on to the microprocessor component s102, which subsequently displays the information on selection indicators 20, etc.) via at least in part an engagement to provide for deforming a material on the at least one manufacture (e.g. as shown in FIGS. 28-30, upon engagement of the containing assembly 44, including container 46 with deformable portion 98, As containing assembly 44 is inserted into receiving assembly 48 of the substance control dispensing system 10, deformable portion 98 is deformed to open thereby allowing ingestible material 42 to move through orifice 100, etc.). In an implementation, the electronically receiving status information as related to the first engagement of the automated dispensing system with the at least one manufacture via at least in part an engagement to provide for deforming a material on the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 28-30 as the first engagement of the automated dispensing system with the at least one manufacture, the information to be passed on to the microprocessor component s102, which subsequently displays the information on selection indicators 20, etc.) via at least in part an engagement to provide for deforming a material on the at least one manufacture (e.g. as shown in FIGS. 28-30, upon engagement of the containing assembly 44, including container 46 with deformable portion 98, As containing assembly 44 is inserted into receiving assembly 48 of the substance control dispensing system 10, deformable portion 98 is deformed to open thereby allowing ingestible material 42 to move through orifice 100, etc.).

In one or more implementations, operation o11 includes an operation o1145 for electronically receiving status information as related to the first engagement of the automated dispensing system with the at least one manufacture via at least in part an engagement to provide for disengaging a locking mechanism on the at least one manufacture. An exemplary version of the non-transitory signal bearing medium n100 is depicted as bearing one or more receiving information lock instructions i1145 that when executed will direct performance of the operation o1145. In an implementation, the one or more receiving information lock instructions i1145 when executed direct electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, etc.) via at least in part an engagement to provide for disengaging a locking mechanism on the at least one manufacture (e.g. as shown in FIGS. 31-33, upon engagement of the containing assembly 44, including container 46 with lockable portion 102, as containing assembly 44 is inserted into receiving assembly 48 of the substance control dispensing system 10, lockable portion 102 is unlocked and opened upon verification by code verifiers 106 electronically coupling with code transmitters 108 that receiving assembly 48 is authorized to accept ingestible material 42, etc.). Furthermore, the receiving information lock electrical circuitry arrangement e1145 when activated will perform the operation o1145. In an implementation, the receiving information lock electrical circuitry arrangement e1145, when activated performs electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, etc.) via at least in part an engagement to provide for disengaging a locking mechanism on the at least one manufacture (e.g. as shown in FIGS. 31-33, upon engagement of the containing assembly 44, including container 46 with lockable portion 102, as containing assembly 44 is inserted into receiving assembly 48 of the substance control dispensing system 10, lockable portion 102 is unlocked and opened upon verification by code verifiers 106 electronically coupling with code transmitters 108 that receiving assembly 48 is authorized to accept ingestible material 42, etc.). In an implementation, the electronically receiving status information as related to the first engagement of the automated dispensing system with the at least one manufacture via at least in part an engagement to provide for disengaging a locking mechanism on the at least one manufacture is carried out by electronically receiving status information as related to the first engagement of the automated dispensing system with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, etc.) via at least in part an engagement to provide for disengaging a locking mechanism on the at least one manufacture (e.g. as shown in FIGS. 31-33, upon engagement of the containing assembly 44, including container 46 with lockable portion 102, as containing assembly 44 is inserted into receiving assembly 48 of the substance control dispensing system 10, lockable portion 102 is unlocked and opened upon verification by code verifiers 106 electronically coupling with code transmitters 108 that receiving assembly 48 is authorized to accept ingestible material 42, etc.).

Figure 67:
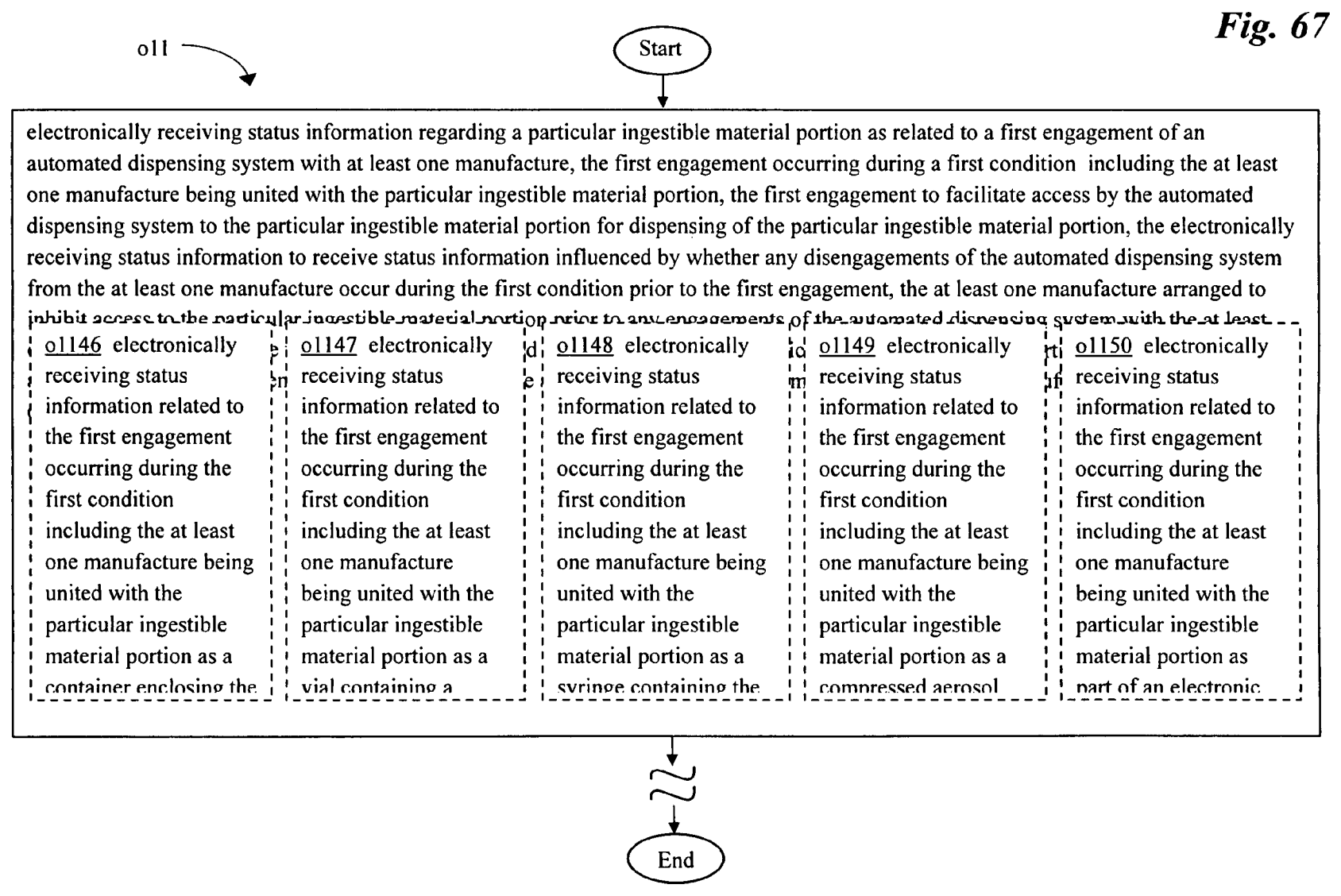

In one or more implementations, as shown in FIG. 67, operation o11 includes an operation o1146 for electronically receiving status information related to the first engagement occurring during the first condition including the at least one manufacture being united with the particular ingestible material portion as a container enclosing the particular ingestible material portion. An exemplary version of the non-transitory signal bearing medium n100 is depicted as bearing one or more receiving information container instructions i1146 that when executed will direct performance of the operation o1146. In an implementation, the one or more receiving information container instructions i1146 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a container enclosing the particular ingestible material portion (e.g. as shown in FIGS. 16-18, upon engagement of the containing assembly 44, including container 46 with screw cap 80 is containing the ingestible material 42 until protrusion 78 receives, unscrews, and pulls off screw cap 80 from container 46 allowing ingestible material 42 to flow through orifice 82 from the container, etc.). Furthermore, the receiving information container electrical circuitry arrangement e1146 when activated will perform the operation o1146. In an implementation, the receiving information container electrical circuitry arrangement e1146, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a container enclosing the particular ingestible material portion (e.g. as shown in FIGS. 16-18, upon engagement of the containing assembly 44, including container 46 with screw cap 80 is containing the ingestible material 42 until protrusion 78 receives, unscrews, and pulls off screw cap 80 from container 46 allowing ingestible material 42 to flow through orifice 82 from the container, etc.). In an implementation, the electronically receiving status information related to the first engagement occurring during the first condition including the at least one manufacture being united with the particular ingestible material portion as a container enclosing the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a container enclosing the particular ingestible material portion (e.g. as shown in FIGS. 16-18, upon engagement of the containing assembly 44, including container 46 with screw cap 80 is containing the ingestible material 42 until protrusion 78 receives, unscrews, and pulls off screw cap 80 from container 46 allowing ingestible material 42 to flow through orifice 82 from the container, etc.).

In one or more implementations, operation o11 includes an operation o1147 for electronically receiving status information related to the first engagement occurring during the first condition including the at least one manufacture being united with the particular ingestible material portion as a vial containing a solution with the particular ingestible material portion dissolved therein. An exemplary version of the non-transitory signal bearing medium n100 is depicted as bearing one or more receiving information vial instructions i1147 that when executed will direct performance of the operation o1147. In an implementation, the one or more receiving information vial instructions i1147 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a vial containing a solution with the particular ingestible material portion dissolved therein (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.). Furthermore, the receiving information vial electrical circuitry arrangement e1147 when activated will perform the operation o1147. In an implementation, the receiving information vial electrical circuitry arrangement e1147, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a vial containing a solution with the particular ingestible material portion dissolved therein (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.). In an implementation, the electronically receiving status information related to the first engagement occurring during the first condition including the at least one manufacture being united with the particular ingestible material portion as a vial containing a solution with the particular ingestible material portion dissolved therein is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a vial containing a solution with the particular ingestible material portion dissolved therein (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.).

In one or more implementations, operation o11 includes an operation o1148 for electronically receiving status information related to the first engagement occurring during the first condition including the at least one manufacture being united with the particular ingestible material portion as a syringe containing the particular ingestible material portion. An exemplary version of the non-transitory signal bearing medium n100 is depicted as bearing one or more receiving information syringe instructions i1148 that when executed will direct performance of the operation o1148. In an implementation, the one or more receiving information syringe instructions i1148 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a syringe containing the particular ingestible material portion (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.). Furthermore, the receiving information syringe electrical circuitry arrangement e1148 when activated will perform the operation o1148. In an implementation, the receiving information syringe electrical circuitry arrangement e1148, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a syringe containing the particular ingestible material portion (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.). In an implementation, the electronically receiving status information related to the first engagement occurring during the first condition including the at least one manufacture being united with the particular ingestible material portion as a syringe containing the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a syringe containing the particular ingestible material portion (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.).

In one or more implementations, operation o11 includes an operation o1149 for electronically receiving status information related to the first engagement occurring during the first condition including the at least one manufacture being united with the particular ingestible material portion as a compressed aerosol container having the particular ingestible material portion contained therein. An exemplary version of the non-transitory signal bearing medium n100 is depicted as bearing one or more receiving information aerosol instructions i1149 that when executed will direct performance of the operation o1149. In an implementation, the one or more receiving information aerosol instructions i1149 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a compressed aerosol container having the particular ingestible material portion contained therein (e.g. as shown in FIGS. 16-18, upon engagement of the containing assembly 44, including container 46 as a pressurized aerosol container holding the ingestible material 42 under a pressurized aerosol with screw cap 80, protrusion 78 receives, unscrews, and pulls off screw cap 80 from container 46 thereby releasing allowing ingestible material 42 under aerosol pressure to flow through orifice 82, etc.). Furthermore, the receiving information aerosol electrical circuitry arrangement e1149 when activated will perform the operation o1149. In an implementation, the receiving information aerosol electrical circuitry arrangement e1149, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a compressed aerosol container having the particular ingestible material portion contained therein (e.g. as shown in FIGS. 16-18, upon engagement of the containing assembly 44, including container 46 as a pressurized aerosol container holding the ingestible material 42 under a pressurized aerosol with screw cap 80, protrusion 78 receives, unscrews, and pulls off screw cap 80 from container 46 thereby releasing allowing ingestible material 42 under aerosol pressure to flow through orifice 82, etc.). In an implementation, the electronically receiving status information related to the first engagement occurring during the first condition including the at least one manufacture being united with the particular ingestible material portion as a compressed aerosol container having the particular ingestible material portion contained therein is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a compressed aerosol container having the particular ingestible material portion contained therein (e.g. as shown in FIGS. 16-18, upon engagement of the containing assembly 44, including container 46 as a pressurized aerosol container holding the ingestible material 42 under a pressurized aerosol with screw cap 80, protrusion 78 receives, unscrews, and pulls off screw cap 80 from container 46 thereby releasing allowing ingestible material 42 under aerosol pressure to flow through orifice 82, etc.).

In one or more implementations, operation o11 includes an operation o1150 for electronically receiving status information related to the first engagement occurring during the first condition including the at least one manufacture being united with the particular ingestible material portion as part of an electronic locking mechanism coupled to a container containing the particular ingestible material portion. An exemplary version of the non-transitory signal bearing medium n100 is depicted as bearing one or more receiving information lock instructions i1150 that when executed will direct performance of the operation o1150. In an implementation, the one or more receiving information lock instructions i1150 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as part of an electronic locking mechanism coupled to a container containing the particular ingestible material portion (e.g. as shown in FIGS. 31-33, upon engagement of the containing assembly 44, including container 46 with lockable portion 102, as containing assembly 44 is inserted into receiving assembly 48 of the substance control dispensing system 10, lockable portion 102 is unlocked and opened upon verification by code verifiers 106 electronically coupling with code transmitters 108 that receiving assembly 48 is authorized to accept ingestible material 42, etc.). Furthermore, the receiving information lock electrical circuitry arrangement e1150 when activated will perform the operation o1150. In an implementation, the receiving information lock electrical circuitry arrangement e1150, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as part of an electronic locking mechanism coupled to a container containing the particular ingestible material portion (e.g. as shown in FIGS. 31-33, upon engagement of the containing assembly 44, including container 46 with lockable portion 102, as containing assembly 44 is inserted into receiving assembly 48 of the substance control dispensing system 10, lockable portion 102 is unlocked and opened upon verification by code verifiers 106 electronically coupling with code transmitters 108 that receiving assembly 48 is authorized to accept ingestible material 42, etc.). In an implementation, the electronically receiving status information related to the first engagement occurring during the first condition including the at least one manufacture being united with the particular ingestible material portion as part of an electronic locking mechanism coupled to a container containing the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as part of an electronic locking mechanism coupled to a container containing the particular ingestible material portion (e.g. as shown in FIGS. 31-33, upon engagement of the containing assembly 44, including container 46 with lockable portion 102, as containing assembly 44 is inserted into receiving assembly 48 of the substance control dispensing system 10, lockable portion 102 is unlocked and opened upon verification by code verifiers 106 electronically coupling with code transmitters 108 that receiving assembly 48 is authorized to accept ingestible material 42, etc.).

Figure 68:
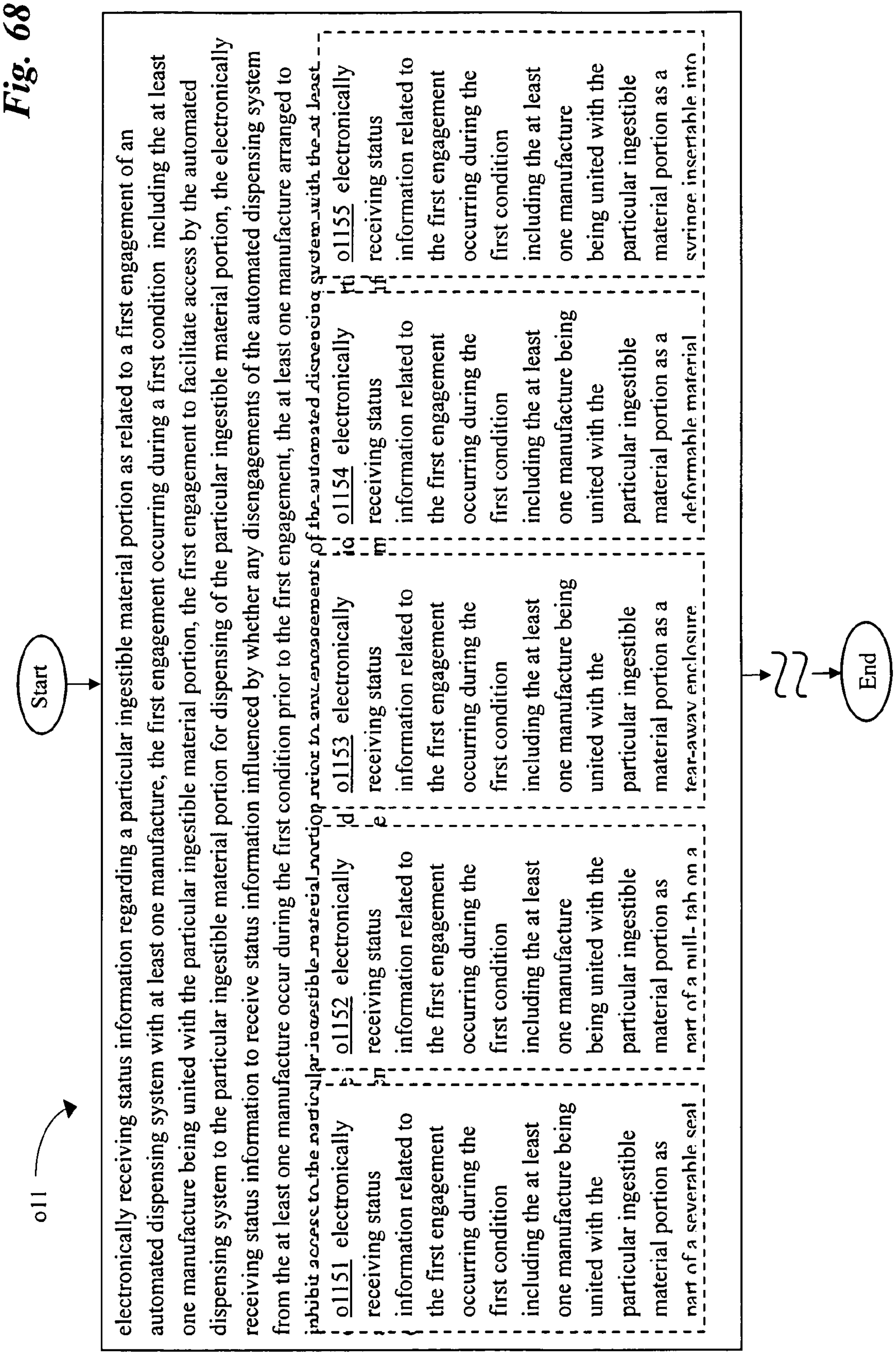
FIG. 68 is a high-level flowchart including exemplary implementations of operation O11 of FIG. 57.

In one or more implementations, as shown in FIG. 68, operation o11 includes an operation o1151 for electronically receiving status information related to the first engagement occurring during the first condition including the at least one manufacture being united with the particular ingestible material portion as part of a severable seal coupled to a container containing the particular ingestible material portion. An exemplary version of the non-transitory signal bearing medium n100 is depicted as bearing one or more receiving information seal instructions i1151 that when executed will direct performance of the operation o1151. In an implementation, the one or more receiving information seal instructions i1151 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as part of a severable seal coupled to a container containing the particular ingestible material portion (e.g. as shown in FIGS. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.). Furthermore, the receiving information seal electrical circuitry arrangement e1151 when activated will perform the operation o1151. In an implementation, the receiving information seal electrical circuitry arrangement e1151, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as part of a severable seal coupled to a container containing the particular ingestible material portion (e.g. as shown in FIGS. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.). In an implementation, the electronically receiving status information related to the first engagement occurring during the first condition including the at least one manufacture being united with the particular ingestible material portion as part of a severable seal coupled to a container containing the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as part of a severable seal coupled to a container containing the particular ingestible material portion (e.g. as shown in FIGS. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.).

In one or more implementations, operation o11 includes an operation o1152 for electronically receiving status information related to the first engagement occurring during the first condition including the at least one manufacture being united with the particular ingestible material portion as part of a pull-tab on a container holding the particular ingestible material portion. An exemplary version of the non-transitory signal bearing medium n100 is depicted as bearing one or more receiving information tab instructions i1152 that when executed will direct performance of the operation o1152. In an implementation, the one or more receiving information tab instructions i1152 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 22-24 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as part of a pull-tab on a container holding the particular ingestible material portion (e.g. as shown in FIGS. 22-24, upon engagement of the containing assembly 44, including container 46 with lifting tab 88, as containing assembly 44 is inserted into receiving assembly 48 of the substance control dispensing system 10, lifting tab 88 is opened allowing ingestible material 42 to move through orifice 90, etc.). Furthermore, the receiving information tab electrical circuitry arrangement e1152 when activated will perform the operation o1152. In an implementation, the receiving information tab electrical circuitry arrangement e1152, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 22-24 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as part of a pull-tab on a container holding the particular ingestible material portion (e.g. as shown in FIGS. 22-24, upon engagement of the containing assembly 44, including container 46 with lifting tab 88, as containing assembly 44 is inserted into receiving assembly 48 of the substance control dispensing system 10, lifting tab 88 is opened allowing ingestible material 42 to move through orifice 90, etc.). In an implementation, the electronically receiving status information related to the first engagement occurring during the first condition including the at least one manufacture being united with the particular ingestible material portion as part of a pull-tab on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 22-24 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as part of a pull-tab on a container holding the particular ingestible material portion (e.g. as shown in FIGS. 22-24, upon engagement of the containing assembly 44, including container 46 with lifting tab 88, as containing assembly 44 is inserted into receiving assembly 48 of the substance control dispensing system 10, lifting tab 88 is opened allowing ingestible material 42 to move through orifice 90, etc.).

In one or more implementations, operation o11 includes an operation o1153 for electronically receiving status information related to the first engagement occurring during the first condition including the at least one manufacture being united with the particular ingestible material portion as a tear-away enclosure element on a container holding the particular ingestible material portion. An exemplary version of the non-transitory signal bearing medium n100 is depicted as bearing one or more receiving information tear instructions i1153 that when executed will direct performance of the operation o1153. In an implementation, the one or more receiving information tear instructions i1153 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 25-27 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a tear-away enclosure element on a container holding the particular ingestible material portion (e.g. as shown in FIGS. 25-27, upon engagement of the containing assembly 44, including container 46 tear away barrier 92, as containing assembly 44 is inserted into receiving assembly 48 of the substance control dispensing system 10, shearing member 94 scraps across barrier 92 thereby tearing it away and allowing ingestible material 42 to move through orifice 96, etc.). Furthermore, the receiving information tear electrical circuitry arrangement e1153 when activated will perform the operation o1153. In an implementation, the receiving information tear electrical circuitry arrangement e1153, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 25-27 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a tear-away enclosure element on a container holding the particular ingestible material portion (e.g. as shown in FIGS. 25-27, upon engagement of the containing assembly 44, including container 46 tear away barrier 92, as containing assembly 44 is inserted into receiving assembly 48 of the substance control dispensing system 10, shearing member 94 scraps across barrier 92 thereby tearing it away and allowing ingestible material 42 to move through orifice 96, etc.). In an implementation, the electronically receiving status information related to the first engagement occurring during the first condition including the at least one manufacture being united with the particular ingestible material portion as a tear-away enclosure element on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 25-27 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a tear-away enclosure element on a container holding the particular ingestible material portion (e.g. as shown in FIGS. 25-27, upon engagement of the containing assembly 44, including container 46 tear away barrier 92, as containing assembly 44 is inserted into receiving assembly 48 of the substance control dispensing system 10, shearing member 94 scraps across barrier 92 thereby tearing it away and allowing ingestible material 42 to move through orifice 96, etc.).

In one or more implementations, operation o11 includes an operation o1154 for electronically receiving status information related to the first engagement occurring during the first condition including the at least one manufacture being united with the particular ingestible material portion as a deformable material coupled with a container holding the particular ingestible material portion. An exemplary version of the non-transitory signal bearing medium n100 is depicted as bearing one or more receiving information deform instructions i1154 that when executed will direct performance of the operation o1154. In an implementation, the one or more receiving information deform instructions i1154 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 28-30 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a deformable material coupled with a container holding the particular ingestible material portion (e.g. as shown in FIGS. 28-30, upon engagement of the containing assembly 44, including container 46 with deformable portion 98, As containing assembly 44 is inserted into receiving assembly 48 of the substance control dispensing system 10, deformable portion 98 is deformed to open thereby allowing ingestible material 42 to move through orifice 100, etc.). Furthermore, the receiving information deform electrical circuitry arrangement e1154 when activated will perform the operation o1154. In an implementation, the receiving information deform electrical circuitry arrangement e1154, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 28-30 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a deformable material coupled with a container holding the particular ingestible material portion (e.g. as shown in FIGS. 28-30, upon engagement of the containing assembly 44, including container 46 with deformable portion 98, As containing assembly 44 is inserted into receiving assembly 48 of the substance control dispensing system 10, deformable portion 98 is deformed to open thereby allowing ingestible material 42 to move through orifice 100, etc.). In an implementation, the electronically receiving status information related to the first engagement occurring during the first condition including the at least one manufacture being united with the particular ingestible material portion as a deformable material coupled with a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 28-30 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a deformable material coupled with a container holding the particular ingestible material portion (e.g. as shown in FIGS. 28-30, upon engagement of the containing assembly 44, including container 46 with deformable portion 98, As containing assembly 44 is inserted into receiving assembly 48 of the substance control dispensing system 10, deformable portion 98 is deformed to open thereby allowing ingestible material 42 to move through orifice 100, etc.).

In one or more implementations, operation o11 includes an operation o1155 for electronically receiving status information related to the first engagement occurring during the first condition including the at least one manufacture being united with the particular ingestible material portion as a syringe insertable into a container holding the particular ingestible material portion. An exemplary version of the non-transitory signal bearing medium n100 is depicted as bearing one or more receiving information syringe instructions i1155 that when executed will direct performance of the operation o1155. In an implementation, the one or more receiving information syringe instructions i1155 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a syringe insertable into a container holding the particular ingestible material portion (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.). Furthermore, the receiving information syringe electrical circuitry arrangement e1155 when activated will perform the operation o1155. In an implementation, the receiving information syringe electrical circuitry arrangement e1155, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a syringe insertable into a container holding the particular ingestible material portion (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.). In an implementation, the electronically receiving status information related to the first engagement occurring during the first condition including the at least one manufacture being united with the particular ingestible material portion as a syringe insertable into a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) occurring during the first condition including the at least one manufacture being united with the particular ingestible material portion as a syringe insertable into a container holding the particular ingestible material portion (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.).

Figure 69:
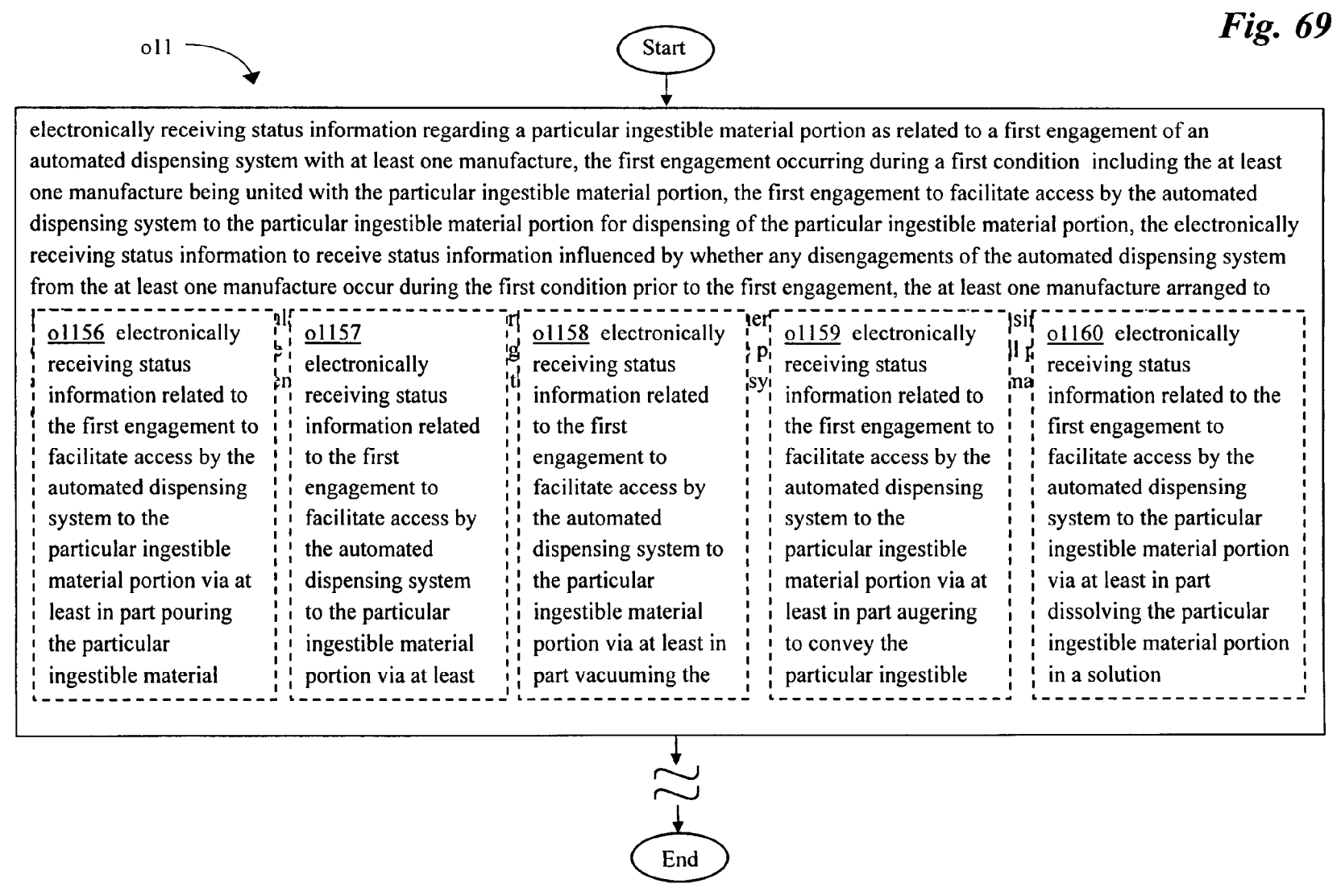

In one or more implementations, as shown in FIG. 69, operation o11 includes an operation o1156 for electronically receiving status information related to the first engagement to facilitate access by the automated dispensing system to the particular ingestible material portion via at least in part pouring the particular ingestible material portion from an interior volume. An exemplary version of the non-transitory signal bearing medium n100 is depicted as bearing one or more receiving information poured instructions i1156 that when executed will direct performance of the operation o1156. In an implementation, the one or more receiving information poured instructions i1156 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part pouring the particular ingestible material portion from an interior volume (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.). Furthermore, the receiving information poured electrical circuitry arrangement e1156 when activated will perform the operation o1156. In an implementation, the receiving information poured electrical circuitry arrangement e1156, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part pouring the particular ingestible material portion from an interior volume (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.). In an implementation, the electronically receiving status information related to the first engagement to facilitate access by the automated dispensing system to the particular ingestible material portion via at least in part pouring the particular ingestible material portion from an interior volume is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part pouring the particular ingestible material portion from an interior volume (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.).

In one or more implementations, operation o11 includes an operation o1157 for electronically receiving status information related to the first engagement to facilitate access by the automated dispensing system to the particular ingestible material portion via at least in part blowing the particular ingestible material portion into an interior volume. An exemplary version of the non-transitory signal bearing medium n100 is depicted as bearing one or more receiving information blowing instructions i1157 that when executed will direct performance of the operation o1157. In an implementation, the one or more receiving information blowing instructions i1157 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part blowing the particular ingestible material portion into an interior volume (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as blowing, etc.). Furthermore, the receiving information blowing electrical circuitry arrangement e1157 when activated will perform the operation o1157. In an implementation, the receiving information blowing electrical circuitry arrangement e1157, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part blowing the particular ingestible material portion into an interior volume (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as blowing, etc.). In an implementation, the electronically receiving status information related to the first engagement to facilitate access by the automated dispensing system to the particular ingestible material portion via at least in part blowing the particular ingestible material portion into an interior volume is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part blowing the particular ingestible material portion into an interior volume (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as blowing, etc.).

In one or more implementations, operation o11 includes an operation o1158 for electronically receiving status information related to the first engagement to facilitate access by the automated dispensing system to the particular ingestible material portion via at least in part vacuuming the particular ingestible material portion into an interior volume. An exemplary version of the non-transitory signal bearing medium n100 is depicted as bearing one or more receiving information vacuum instructions i1158 that when executed will direct performance of the operation o1158. In an implementation, the one or more receiving information vacuum instructions i1158 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part vacuuming the particular ingestible material portion into an interior volume (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by vacuum, or other means of force, etc.). Furthermore, the receiving information vacuum electrical circuitry arrangement e1158 when activated will perform the operation o1158. In an implementation, the receiving information vacuum electrical circuitry arrangement e1158, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part vacuuming the particular ingestible material portion into an interior volume (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by vacuum, or other means of force, etc.). In an implementation, the electronically receiving status information related to the first engagement to facilitate access by the automated dispensing system to the particular ingestible material portion via at least in part vacuuming the particular ingestible material portion into an interior volume is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part vacuuming the particular ingestible material portion into an interior volume (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by vacuum, or other means of force, etc.).

In one or more implementations, operation o11 includes an operation o1159 for electronically receiving status information related to the first engagement to facilitate access by the automated dispensing system to the particular ingestible material portion via at least in part augering to convey the particular ingestible material portion into an interior volume. An exemplary version of the non-transitory signal bearing medium n100 is depicted as bearing one or more receiving information auger instructions i1159 that when executed will direct performance of the operation o1159. In an implementation, the one or more receiving information auger instructions i1159 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part augering to convey the particular ingestible material portion into an interior volume (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). Furthermore, the receiving information auger electrical circuitry arrangement e1159 when activated will perform the operation o1159. In an implementation, the receiving information auger electrical circuitry arrangement e1159, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part augering to convey the particular ingestible material portion into an interior volume (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). In an implementation, the electronically receiving status information related to the first engagement to facilitate access by the automated dispensing system to the particular ingestible material portion via at least in part augering to convey the particular ingestible material portion into an interior volume is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part augering to convey the particular ingestible material portion into an interior volume (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.).

In one or more implementations, operation o11 includes an operation o1160 for electronically receiving status information related to the first engagement to facilitate access by the automated dispensing system to the particular ingestible material portion via at least in part dissolving the particular ingestible material portion in a solution. An exemplary version of the non-transitory signal bearing medium n100 is depicted as bearing one or more receiving information dissolving instructions i1160 that when executed will direct performance of the operation o1160. In an implementation, the one or more receiving information dissolving instructions i1160 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part dissolving the particular ingestible material portion in a solution (e.g. as shown in FIGS. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.). Furthermore, the receiving information dissolving electrical circuitry arrangement e1160 when activated will perform the operation o1160. In an implementation, the receiving information dissolving electrical circuitry arrangement e1160, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part dissolving the particular ingestible material portion in a solution (e.g. as shown in FIGS. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.). In an implementation, the electronically receiving status information related to the first engagement to facilitate access by the automated dispensing system to the particular ingestible material portion via at least in part dissolving the particular ingestible material portion in a solution is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part dissolving the particular ingestible material portion in a solution (e.g. as shown in FIGS. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.).

Figure 70:
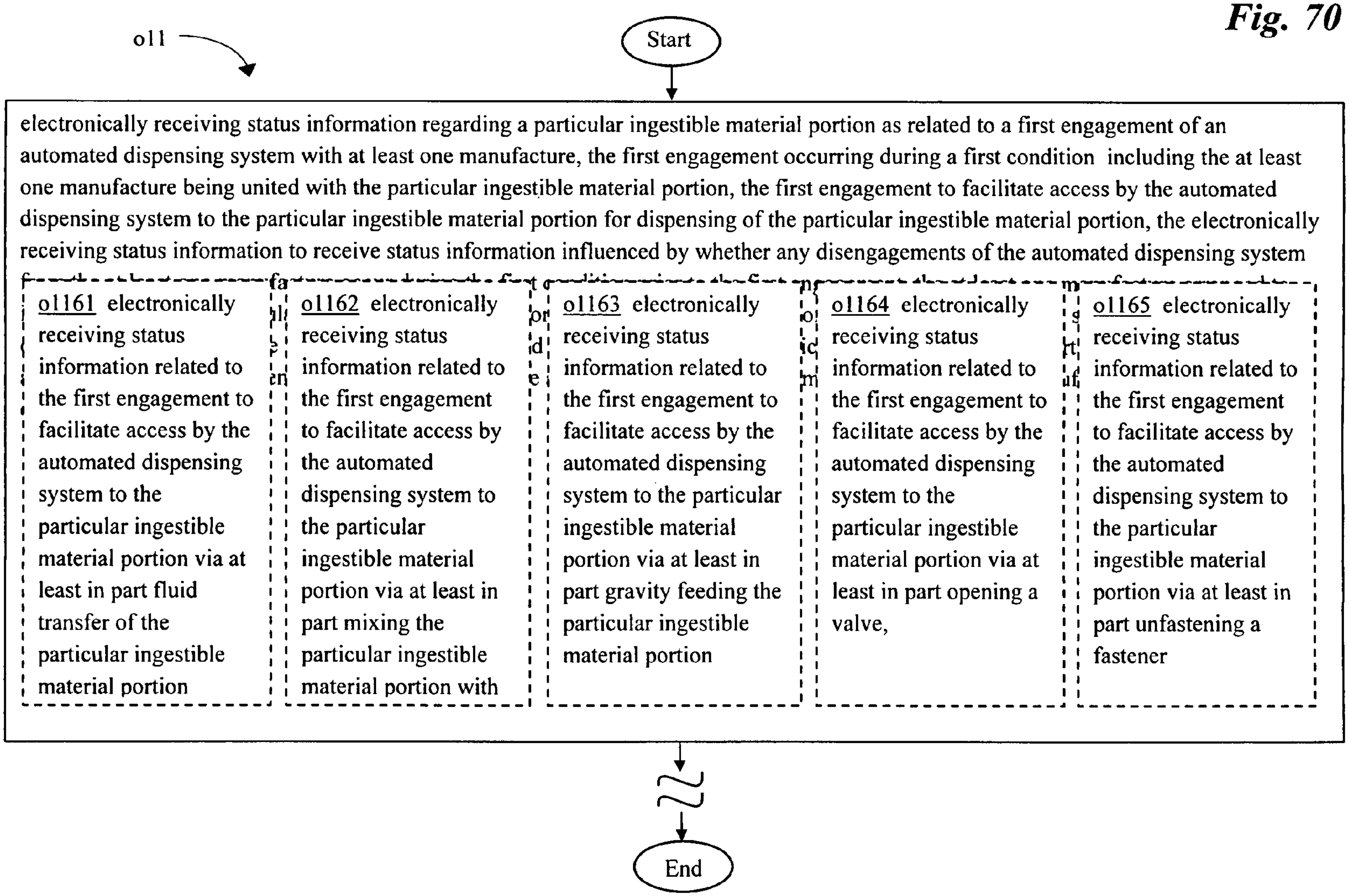
FIG. 70 is a high-level flowchart including exemplary implementations of operation O11 of FIG. 57.

In one or more implementations, as shown in FIG. 70, operation o11 includes an operation o1161 for electronically receiving status information related to the first engagement to facilitate access by the automated dispensing system to the particular ingestible material portion via at least in part fluid transfer of the particular ingestible material portion. An exemplary version of the non-transitory signal bearing medium n100 is depicted as bearing one or more receiving information fluid transfer instructions i1161 that when executed will direct performance of the operation o1161. In an implementation, the one or more receiving information fluid transfer instructions i1161 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part fluid transfer of the particular ingestible material portion (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.). Furthermore, the receiving information fluid transfer electrical circuitry arrangement e1161 when activated will perform the operation o1161. In an implementation, the receiving information fluid transfer electrical circuitry arrangement e1161, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part fluid transfer of the particular ingestible material portion (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.). In an implementation, the electronically receiving status information related to the first engagement to facilitate access by the automated dispensing system to the particular ingestible material portion via at least in part fluid transfer of the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part fluid transfer of the particular ingestible material portion (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.).

In one or more implementations, operation o11 includes an operation o1162 for electronically receiving status information related to the first engagement to facilitate access by the automated dispensing system to the particular ingestible material portion via at least in part mixing the particular ingestible material portion with other material. An exemplary version of the non-transitory signal bearing medium n100 is depicted as bearing one or more receiving information mixing instructions i1162 that when executed will direct performance of the operation o1162. In an implementation, the one or more receiving information mixing instructions i1162 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part mixing the particular ingestible material portion with other material (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.). Furthermore, the receiving information mixing electrical circuitry arrangement e1162 when activated will perform the operation o1162. In an implementation, the receiving information mixing electrical circuitry arrangement e1162, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part mixing the particular ingestible material portion with other material (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.). In an implementation, the electronically receiving status information related to the first engagement to facilitate access by the automated dispensing system to the particular ingestible material portion via at least in part mixing the particular ingestible material portion with other material is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part mixing the particular ingestible material portion with other material (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.).

In one or more implementations, operation o11 includes an operation o1163 for electronically receiving status information related to the first engagement to facilitate access by the automated dispensing system to the particular ingestible material portion via at least in part gravity feeding the particular ingestible material portion. An exemplary version of the non-transitory signal bearing medium n100 is depicted as bearing one or more receiving information gravity instructions i1163 that when executed will direct performance of the operation o1163. In an implementation, the one or more receiving information gravity instructions i1163 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part gravity feeding the particular ingestible material portion (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.). Furthermore, the receiving information gravity electrical circuitry arrangement e1163 when activated will perform the operation o1163. In an implementation, the receiving information gravity electrical circuitry arrangement e1163, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part gravity feeding the particular ingestible material portion (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.). In an implementation, the electronically receiving status information related to the first engagement to facilitate access by the automated dispensing system to the particular ingestible material portion via at least in part gravity feeding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part gravity feeding the particular ingestible material portion (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.).

In one or more implementations, operation o11 includes an operation o1164 for electronically receiving status information related to the first engagement to facilitate access by the automated dispensing system to the particular ingestible material portion via at least in part opening a valve. An exemplary version of the non-transitory signal bearing medium n100 is depicted as bearing one or more receiving information valve instructions i1164 that when executed will direct performance of the operation o1164. In an implementation, the one or more receiving information valve instructions i1164 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 34-36 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part opening a valve (e.g. as shown in FIGS. 34-36, upon engagement of the containing assembly 44, including container 46 with valve 110, as containing assembly 44 is inserted into receiving assembly 48 of the substance control dispensing system 10, valve 110 is opened by member 112 thereby allowing ingestible material 42 to move through orifice 114, etc.). Furthermore, the receiving information valve electrical circuitry arrangement e1164 when activated will perform the operation o1164. In an implementation, the receiving information valve electrical circuitry arrangement e1164, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 34-36 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part opening a valve (e.g. as shown in FIGS. 34-36, upon engagement of the containing assembly 44, including container 46 with valve 110, as containing assembly 44 is inserted into receiving assembly 48 of the substance control dispensing system 10, valve 110 is opened by member 112 thereby allowing ingestible material 42 to move through orifice 114, etc.). In an implementation, the electronically receiving status information related to the first engagement to facilitate access by the automated dispensing system to the particular ingestible material portion via at least in part opening a valve, is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 34-36 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part opening a valve (e.g. as shown in FIGS. 34-36, upon engagement of the containing assembly 44, including container 46 with valve 110, as containing assembly 44 is inserted into receiving assembly 48 of the substance control dispensing system 10, valve 110 is opened by member 112 thereby allowing ingestible material 42 to move through orifice 114, etc.).

In one or more implementations, operation o11 includes an operation o1165 for electronically receiving status information related to the first engagement to facilitate access by the automated dispensing system to the particular ingestible material portion via at least in part unfastening a fastener. A non-transitory signal bearing medium includes one or more receiving information fastener instructions i1165 that when executed will direct performance of the operation o1165. In an implementation, the one or more receiving information fastener instructions i1165 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part unfastening a fastener (e.g. as shown in FIGS. 16-18, upon engagement of the containing assembly 44, including container 46 with screw cap 80, protrusion 78 receives, unscrews, and unfastens screw cap 80, as a fastener, from container 46 thereby allowing ingestible material 42 to flow through orifice 82, etc.). Furthermore, the receiving information fastener electrical circuitry arrangement e1165 when activated will perform the operation o1165. In an implementation, the receiving information fastener electrical circuitry arrangement e1165, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part unfastening a fastener (e.g. as shown in FIGS. 16-18, upon engagement of the containing assembly 44, including container 46 with screw cap 80, protrusion 78 receives, unscrews, and unfastens screw cap 80, as a fastener, from container 46 thereby allowing ingestible material 42 to flow through orifice 82, etc.). In an implementation, the electronically receiving status information related to the first engagement to facilitate access by the automated dispensing system to the particular ingestible material portion via at least in part unfastening a fastener is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part unfastening a fastener (e.g. as shown in FIGS. 16-18, upon engagement of the containing assembly 44, including container 46 with screw cap 80, protrusion 78 receives, unscrews, and unfastens screw cap 80, as a fastener, from container 46 thereby allowing ingestible material 42 to flow through orifice 82, etc.).

Figure 71:
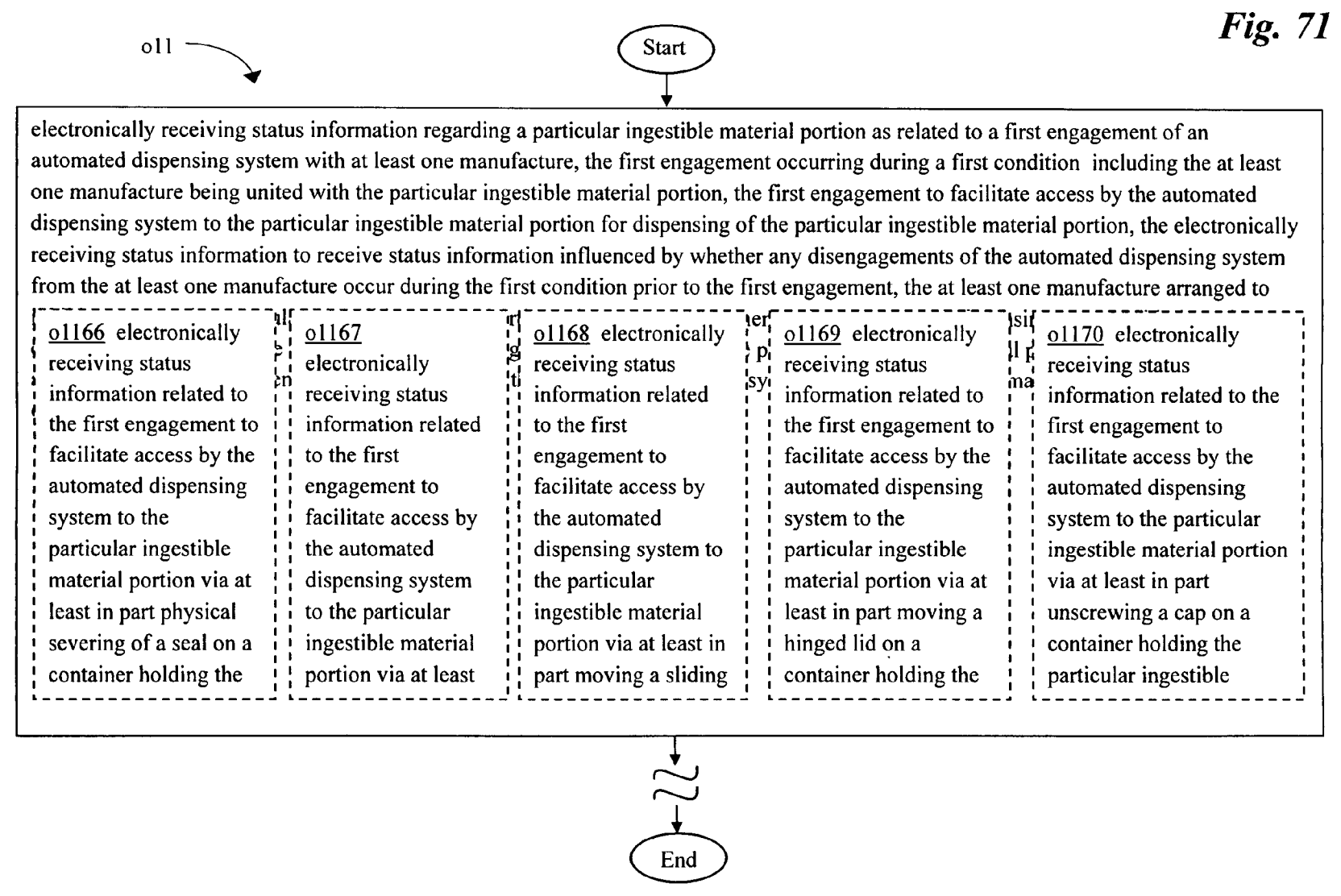

In one or more implementations, as shown in FIG. 71, operation o11 includes an operation o1166 for electronically receiving status information related to the first engagement to facilitate access by the automated dispensing system to the particular ingestible material portion via at least in part physical severing of a seal on a container holding the particular ingestible material portion. A non-transitory signal bearing medium includes one or more receiving information seal instructions i1166 that when executed will direct performance of the operation o1166. In an implementation, the one or more receiving information seal instructions i1166 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part physical severing of a seal on a container holding the particular ingestible material portion (e.g. as shown in FIGS. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.). Furthermore, the receiving information seal electrical circuitry arrangement e1166 when activated will perform the operation o1166. In an implementation, the receiving information seal electrical circuitry arrangement e1166, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part physical severing of a seal on a container holding the particular ingestible material portion (e.g. as shown in FIGS. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.). In an implementation, the electronically receiving status information related to the first engagement to facilitate access by the automated dispensing system to the particular ingestible material portion via at least in part physical severing of a seal on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part physical severing of a seal on a container holding the particular ingestible material portion (e.g. as shown in FIGS. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.).

In one or more implementations, operation o11 includes an operation o1167 for electronically receiving status information related to the first engagement to facilitate access by the automated dispensing system to the particular ingestible material portion via at least in part piercing a cover material on a container holding the particular ingestible material portion. A non-transitory signal bearing medium includes one or more receiving information piercing instructions i1167 that when executed will direct performance of the operation o1167. In an implementation, the one or more receiving information piercing instructions i1167 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part piercing a cover material on a container holding the particular ingestible material portion (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by gravity, vacuum, or other means of force, etc.). Furthermore, the receiving information piercing electrical circuitry arrangement e1167 when activated will perform the operation o1167. In an implementation, the receiving information piercing electrical circuitry arrangement e1167, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part piercing a cover material on a container holding the particular ingestible material portion (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by gravity, vacuum, or other means of force, etc.). In an implementation, the electronically receiving status information related to the first engagement to facilitate access by the automated dispensing system to the particular ingestible material portion via at least in part piercing a cover material on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part piercing a cover material on a container holding the particular ingestible material portion (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by gravity, vacuum, or other means of force, etc.).

In one or more implementations, operation o11 includes an operation o1168 for electronically receiving status information related to the first engagement to facilitate access by the automated dispensing system to the particular ingestible material portion via at least in part moving a sliding barrier on a container holding the particular ingestible material portion. A non-transitory signal bearing medium includes one or more receiving information sliding instructions i1168 that when executed will direct performance of the operation o1168. In an implementation, the one or more receiving information sliding instructions i1168 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part moving a sliding barrier on a container holding the particular ingestible material portion (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.). Furthermore, the receiving information sliding electrical circuitry arrangement e1168 when activated will perform the operation o1168. In an implementation, the receiving information sliding electrical circuitry arrangement e1168, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part moving a sliding barrier on a container holding the particular ingestible material portion (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.). In an implementation, the electronically receiving status information related to the first engagement to facilitate access by the automated dispensing system to the particular ingestible material portion via at least in part moving a sliding barrier on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part moving a sliding barrier on a container holding the particular ingestible material portion (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.).

In one or more implementations, operation o11 includes an operation o1169 for electronically receiving status information related to the first engagement to facilitate access by the automated dispensing system to the particular ingestible material portion via at least in part moving a hinged lid on a container holding the particular ingestible material portion. A non-transitory signal bearing medium includes one or more receiving information lid instructions i1169 that when executed will direct performance of the operation o1169. In an implementation, the one or more receiving information lid instructions i1169 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 13-15 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part moving a hinged lid on a container holding the particular ingestible material portion (e.g. as shown in FIGS. 13-15, upon engagement of the containing assembly 44, including container 46 with hinged lid 74, as containing assembly 44 is inserted into receiving assembly 48 of the substance control dispensing system 10, protrusion 72 opens hinged lid 74 allowing ingestible material 42 to be collected through orifice 76 as encouraged by gravity, vacuum, or other means of force, etc.). Furthermore, the receiving information lid electrical circuitry arrangement e1169 when activated will perform the operation o1169. In an implementation, the receiving information lid electrical circuitry arrangement e1169, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 13-15 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part moving a hinged lid on a container holding the particular ingestible material portion (e.g. as shown in FIGS. 13-15, upon engagement of the containing assembly 44, including container 46 with hinged lid 74, as containing assembly 44 is inserted into receiving assembly 48 of the substance control dispensing system 10, protrusion 72 opens hinged lid 74 allowing ingestible material 42 to be collected through orifice 76 as encouraged by gravity, vacuum, or other means of force, etc.). In an implementation, the electronically receiving status information related to the first engagement to facilitate access by the automated dispensing system to the particular ingestible material portion via at least in part moving a hinged lid on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 13-15 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part moving a hinged lid on a container holding the particular ingestible material portion (e.g. as shown in FIGS. 13-15, upon engagement of the containing assembly 44, including container 46 with hinged lid 74, as containing assembly 44 is inserted into receiving assembly 48 of the substance control dispensing system 10, protrusion 72 opens hinged lid 74 allowing ingestible material 42 to be collected through orifice 76 as encouraged by gravity, vacuum, or other means of force, etc.).

In one or more implementations, operation o11 includes an operation o1170 for electronically receiving status information related to the first engagement to facilitate access by the automated dispensing system to the particular ingestible material portion via at least in part unscrewing a cap on a container holding the particular ingestible material portion. A non-transitory signal bearing medium includes one or more receiving information cap instructions i1170 that when executed will direct performance of the operation o1170. In an implementation, the one or more receiving information cap instructions i1170 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part unscrewing a cap on a container holding the particular ingestible material portion (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). Furthermore, the receiving information cap electrical circuitry arrangement e1170 when activated will perform the operation o1170. In an implementation, the receiving information cap electrical circuitry arrangement e1170, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part unscrewing a cap on a container holding the particular ingestible material portion (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). In an implementation, the electronically receiving status information related to the first engagement to facilitate access by the automated dispensing system to the particular ingestible material portion via at least in part unscrewing a cap on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part unscrewing a cap on a container holding the particular ingestible material portion (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.).

In one or more implementations, operation o11 includes an operation o1165 for electronically receiving status information related to the first engagement to facilitate access by the automated dispensing system to the particular ingestible material portion via at least in part unfastening a fastener. A non-transitory signal bearing medium includes one or more receiving information fastener instructions i1165 that when executed will direct performance of the operation o1165. In an implementation, the one or more receiving information fastener instructions i1165 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part unfastening a fastener (e.g. as shown in FIGS. 16-18, upon engagement of the containing assembly 44, including container 46 with screw cap 80, protrusion 78 receives, unscrews, and unfastens screw cap 80, as a fastener, from container 46 thereby allowing ingestible material 42 to flow through orifice 82, etc.). Furthermore, the receiving information fastener electrical circuitry arrangement e1165 when activated will perform the operation o1165. In an implementation, the receiving information fastener electrical circuitry arrangement e1165, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part unfastening a fastener (e.g. as shown in FIGS. 16-18, upon engagement of the containing assembly 44, including container 46 with screw cap 80, protrusion 78 receives, unscrews, and unfastens screw cap 80, as a fastener, from container 46 thereby allowing ingestible material 42 to flow through orifice 82, etc.). In an implementation, the electronically receiving status information related to the first engagement to facilitate access by the automated dispensing system to the particular ingestible material portion via at least in part unfastening a fastener is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part unfastening a fastener (e.g. as shown in FIGS. 16-18, upon engagement of the containing assembly 44, including container 46 with screw cap 80, protrusion 78 receives, unscrews, and unfastens screw cap 80, as a fastener, from container 46 thereby allowing ingestible material 42 to flow through orifice 82, etc.).

In one or more implementations, as shown in FIG. 71, operation o11 includes an operation o1166 for electronically receiving status information related to the first engagement to facilitate access by the automated dispensing system to the particular ingestible material portion via at least in part physical severing of a seal on a container holding the particular ingestible material portion. A non-transitory signal bearing medium includes one or more receiving information seal instructions i1166 that when executed will direct performance of the operation o1166. In an implementation, the one or more receiving information seal instructions i1166 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part physical severing of a seal on a container holding the particular ingestible material portion (e.g. as shown in FIGS. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.). Furthermore, the receiving information seal electrical circuitry arrangement e1166 when activated will perform the operation o1166. In an implementation, the receiving information seal electrical circuitry arrangement e1166, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part physical severing of a seal on a container holding the particular ingestible material portion (e.g. as shown in FIG. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.). In an implementation, the electronically receiving status information related to the first engagement to facilitate access by the automated dispensing system to the particular ingestible material portion via at least in part physical severing of a seal on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 7-9 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part physical severing of a seal on a container holding the particular ingestible material portion (e.g. as shown in FIGS. 7-9, upon engagement of the containing assembly 44, including container 46 with pierceable side portion 62, as containing assembly 44 is inserted into receiving assembly 48 of the substance control dispensing system 10, protrusion 60 pierces side portion 62 allowing ingestible material 42 to flow through orifice 64, etc.).

In one or more implementations, operation o11 includes an operation o1167 for electronically receiving status information related to the first engagement to facilitate access by the automated dispensing system to the particular ingestible material portion via at least in part piercing a cover material on a container holding the particular ingestible material portion. A non-transitory signal bearing medium includes one or more receiving information piercing instructions i1167 that when executed will direct performance of the operation o1167. In an implementation, the one or more receiving information piercing instructions i1167 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part piercing a cover material on a container holding the particular ingestible material portion (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by gravity, vacuum, or other means of force, etc.). Furthermore, the receiving information piercing electrical circuitry arrangement e1167 when activated will perform the operation o1167. In an implementation, the receiving information piercing electrical circuitry arrangement e1167, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part piercing a cover material on a container holding the particular ingestible material portion (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by gravity, vacuum, or other means of force, etc.). In an implementation, the electronically receiving status information related to the first engagement to facilitate access by the automated dispensing system to the particular ingestible material portion via at least in part piercing a cover material on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 4-6 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part piercing a cover material on a container holding the particular ingestible material portion (e.g. as shown in FIGS. 4-6, upon engagement of the containing assembly 44, including container 46 with pierceable lid 50, protrusion 56 pierces lid 50 allowing ingestible material 42 to be collected through orifice 58 as encouraged by gravity, vacuum, or other means of force, etc.).

In one or more implementations, operation o11 includes an operation o1168 for electronically receiving status information related to the first engagement to facilitate access by the automated dispensing system to the particular ingestible material portion via at least in part moving a sliding barrier on a container holding the particular ingestible material portion. A non-transitory signal bearing medium includes one or more receiving information sliding instructions i1168 that when executed will direct performance of the operation o1168. In an implementation, the one or more receiving information sliding instructions i1168 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part moving a sliding barrier on a container holding the particular ingestible material portion (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.). Furthermore, the receiving information sliding electrical circuitry arrangement e1168 when activated will perform the operation o1168. In an implementation, the receiving information sliding electrical circuitry arrangement e1168, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part moving a sliding barrier on a container holding the particular ingestible material portion (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.). In an implementation, the electronically receiving status information related to the first engagement to facilitate access by the automated dispensing system to the particular ingestible material portion via at least in part moving a sliding barrier on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 10-12 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part moving a sliding barrier on a container holding the particular ingestible material portion (e.g. as shown in FIGS. 10-12, upon engagement of the containing assembly 44, including container 46 with sliding barrier 68, protrusion 66 pushes on sliding barrier 68 allowing ingestible material 42 to flow through orifice 70 to be poured into chamber 71 thereby mixing with other ingestible material 69, etc.).

In one or more implementations, operation o11 includes an operation o1169 for electronically receiving status information related to the first engagement to facilitate access by the automated dispensing system to the particular ingestible material portion via at least in part moving a hinged lid on a container holding the particular ingestible material portion. A non-transitory signal bearing medium includes one or more receiving information lid instructions i1169 that when executed will direct performance of the operation o1169. In an implementation, the one or more receiving information lid instructions i1169 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 13-15 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part moving a hinged lid on a container holding the particular ingestible material portion (e.g. as shown in FIGS. 13-15, upon engagement of the containing assembly 44, including container 46 with hinged lid 74, as containing assembly 44 is inserted into receiving assembly 48 of the substance control dispensing system 10, protrusion 72 opens hinged lid 74 allowing ingestible material 42 to be collected through orifice 76 as encouraged by gravity, vacuum, or other means of force, etc.). Furthermore, the receiving information lid electrical circuitry arrangement e1169 when activated will perform the operation o1169. In an implementation, the receiving information lid electrical circuitry arrangement e1169, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 13-15 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part moving a hinged lid on a container holding the particular ingestible material portion (e.g. as shown in FIGS. 13-15, upon engagement of the containing assembly 44, including container 46 with hinged lid 74, as containing assembly 44 is inserted into receiving assembly 48 of the substance control dispensing system 10, protrusion 72 opens hinged lid 74 allowing ingestible material 42 to be collected through orifice 76 as encouraged by gravity, vacuum, or other means of force, etc.). In an implementation, the electronically receiving status information related to the first engagement to facilitate access by the automated dispensing system to the particular ingestible material portion via at least in part moving a hinged lid on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 13-15 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part moving a hinged lid on a container holding the particular ingestible material portion (e.g. as shown in FIGS. 13-15, upon engagement of the containing assembly 44, including container 46 with hinged lid 74, as containing assembly 44 is inserted into receiving assembly 48 of the substance control dispensing system 10, protrusion 72 opens hinged lid 74 allowing ingestible material 42 to be collected through orifice 76 as encouraged by gravity, vacuum, or other means of force, etc.).

In one or more implementations, operation o11 includes an operation o1170 for electronically receiving status information related to the first engagement to facilitate access by the automated dispensing system to the particular ingestible material portion via at least in part unscrewing a cap on a container holding the particular ingestible material portion. A non-transitory signal bearing medium includes one or more receiving information cap instructions i1170 that when executed will direct performance of the operation o1170. In an implementation, the one or more receiving information cap instructions i1170 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part unscrewing a cap on a container holding the particular ingestible material portion (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). Furthermore, the receiving information cap electrical circuitry arrangement e1170 when activated will perform the operation o1170. In an implementation, the receiving information cap electrical circuitry arrangement e1170, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part unscrewing a cap on a container holding the particular ingestible material portion (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). In an implementation, the electronically receiving status information related to the first engagement to facilitate access by the automated dispensing system to the particular ingestible material portion via at least in part unscrewing a cap on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part unscrewing a cap on a container holding the particular ingestible material portion (e.g. as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.).

Figure 72:
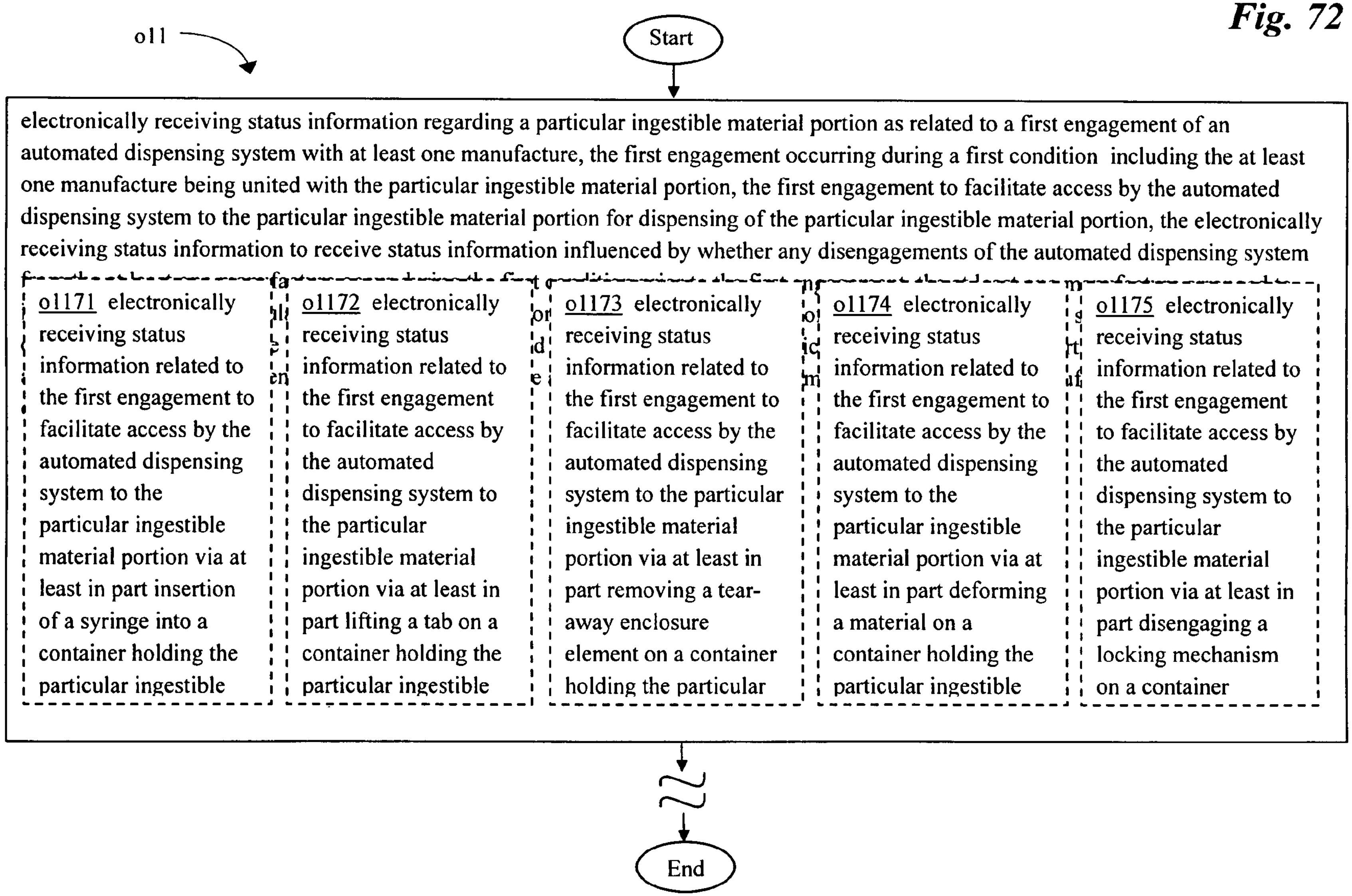
FIG. 72 is a high-level flowchart including exemplary implementations of operation O11 of FIG. 57.

In one or more implementations, as shown in FIG. 72, operation o11 includes an operation o1171 for electronically receiving status information related to the first engagement to facilitate access by the automated dispensing system to the particular ingestible material portion via at least in part insertion of a syringe into a container holding the particular ingestible material portion. A non-transitory signal bearing medium includes one or more receiving information syringe instructions i1171 that when executed will direct performance of the operation o1171. In an implementation, the one or more receiving information syringe instructions i1171 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part insertion of a syringe into a container holding the particular ingestible material portion (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.). Furthermore, the receiving information syringe electrical circuitry arrangement e1171 when activated will perform the operation o1171. In an implementation, the receiving information syringe electrical circuitry arrangement e1171, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part insertion of a syringe into a container holding the particular ingestible material portion (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.). In an implementation, the electronically receiving status information related to the first engagement to facilitate access by the automated dispensing system to the particular ingestible material portion via at least in part insertion of a syringe into a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 19-21 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part insertion of a syringe into a container holding the particular ingestible material portion (e.g. as shown in FIGS. 19-21, upon engagement of the containing assembly 44, including container 46 as a vial containing a solution with ingestible material 42 dissolved therein with pierceable wall 84, as containing assembly 44 is inserted into receiving assembly 48 of the substance control dispensing system 10, syringe needle 86 pierces pierceable wall 84 allowing ingestible material 42 to be sucked into the syringe needle, etc.).

In one or more implementations, operation o11 includes an operation o1172 for electronically receiving status information related to the first engagement to facilitate access by the automated dispensing system to the particular ingestible material portion via at least in part lifting a tab on a container holding the particular ingestible material portion. A non-transitory signal bearing medium includes one or more receiving information tab instructions i1172 that when executed will direct performance of the operation o1172. In an implementation, the one or more receiving information tab instructions i1172 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 22-24 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part lifting a tab on a container holding the particular ingestible material portion (e.g. as shown in FIGS. 22-24, upon engagement of the containing assembly 44, including container 46 with lifting tab 88, as containing assembly 44 is inserted into receiving assembly 48 of the substance control dispensing system 10, lifting tab 88 is opened allowing ingestible material 42 to move through orifice 90, etc.). Furthermore, the receiving information tab electrical circuitry arrangement e1172 when activated will perform the operation o1172. In an implementation, the receiving information tab electrical circuitry arrangement e1172, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 22-24 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part lifting a tab on a container holding the particular ingestible material portion (e.g. as shown in FIGS. 22-24, upon engagement of the containing assembly 44, including container 46 with lifting tab 88, as containing assembly 44 is inserted into receiving assembly 48 of the substance control dispensing system 10, lifting tab 88 is opened allowing ingestible material 42 to move through orifice 90, etc.). In an implementation, the electronically receiving status information related to the first engagement to facilitate access by the automated dispensing system to the particular ingestible material portion via at least in part lifting a tab on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 22-24 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part lifting a tab on a container holding the particular ingestible material portion (e.g. as shown in FIGS. 22-24, upon engagement of the containing assembly 44, including container 46 with lifting tab 88, as containing assembly 44 is inserted into receiving assembly 48 of the substance control dispensing system 10, lifting tab 88 is opened allowing ingestible material 42 to move through orifice 90, etc.).

In one or more implementations, operation o11 includes an operation o1173 for electronically receiving status information related to the first engagement to facilitate access by the automated dispensing system to the particular ingestible material portion via at least in part removing a tear-away enclosure element on a container holding the particular ingestible material portion. A non-transitory signal bearing medium includes one or more receiving information tear instructions i1173 that when executed will direct performance of the operation o1173. In an implementation, the one or more receiving information tear instructions i1173 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 25-27 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part removing a tear-away enclosure element on a container holding the particular ingestible material portion (e.g. as shown in FIGS. 25-27, upon engagement of the containing assembly 44, including container 46 tear away barrier 92, as containing assembly 44 is inserted into receiving assembly 48 of the substance control dispensing system 10, shearing member 94 scraps across barrier 92 thereby tearing it away and allowing ingestible material 42 to move through orifice 96, etc.). Furthermore, the receiving information tear electrical circuitry arrangement e1173 when activated will perform the operation o1173. In an implementation, the receiving information tear electrical circuitry arrangement e1173, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 25-27 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part removing a tear-away enclosure element on a container holding the particular ingestible material portion (e.g. as shown in FIGS. 25-27, upon engagement of the containing assembly 44, including container 46 tear away barrier 92, as containing assembly 44 is inserted into receiving assembly 48 of the substance control dispensing system 10, shearing member 94 scraps across barrier 92 thereby tearing it away and allowing ingestible material 42 to move through orifice 96, etc.). In an implementation, the electronically receiving status information related to the first engagement to facilitate access by the automated dispensing system to the particular ingestible material portion via at least in part removing a tear-away enclosure element on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 25-27 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part removing a tear-away enclosure element on a container holding the particular ingestible material portion (e.g. as shown in FIGS. 25-27, upon engagement of the containing assembly 44, including container 46 tear away barrier 92, as containing assembly 44 is inserted into receiving assembly 48 of the substance control dispensing system 10, shearing member 94 scraps across barrier 92 thereby tearing it away and allowing ingestible material 42 to move through orifice 96, etc.).

In one or more implementations, operation o11 includes an operation o1174 for electronically receiving status information related to the first engagement to facilitate access by the automated dispensing system to the particular ingestible material portion via at least in part deforming a material on a container holding the particular ingestible material portion. A non-transitory signal bearing medium includes one or more receiving information deform instructions i1174 that when executed will direct performance of the operation o1174. In an implementation, the one or more receiving information deform instructions i1174 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 28-30 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part deforming a material on a container holding the particular ingestible material portion (e.g. as shown in FIGS. 28-30, upon engagement of the containing assembly 44, including container 46 with deformable portion 98, As containing assembly 44 is inserted into receiving assembly 48 of the substance control dispensing system 10, deformable portion 98 is deformed to open thereby allowing ingestible material 42 to move through orifice 100, etc.). Furthermore, the receiving information deform electrical circuitry arrangement e1174 when activated will perform the operation o1174. In an implementation, the receiving information deform electrical circuitry arrangement e1174, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 28-30 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part deforming a material on a container holding the particular ingestible material portion (e.g. as shown in FIGS. 28-30, upon engagement of the containing assembly 44, including container 46 with deformable portion 98, As containing assembly 44 is inserted into receiving assembly 48 of the substance control dispensing system 10, deformable portion 98 is deformed to open thereby allowing ingestible material 42 to move through orifice 100, etc.). In an implementation, the electronically receiving status information related to the first engagement to facilitate access by the automated dispensing system to the particular ingestible material portion via at least in part deforming a material on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 28-30 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part deforming a material on a container holding the particular ingestible material portion (e.g. as shown in FIGS. 28-30, upon engagement of the containing assembly 44, including container 46 with deformable portion 98, As containing assembly 44 is inserted into receiving assembly 48 of the substance control dispensing system 10, deformable portion 98 is deformed to open thereby allowing ingestible material 42 to move through orifice 100, etc.).

In one or more implementations, operation o11 includes an operation o1175 for electronically receiving status information related to the first engagement to facilitate access by the automated dispensing system to the particular ingestible material portion via at least in part disengaging a locking mechanism on a container holding the particular ingestible material portion. A non-transitory signal bearing medium includes one or more receiving information lock instructions i1175 that when executed will direct performance of the operation o1175. In an implementation, the one or more receiving information lock instructions i1175 when executed direct electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part disengaging a locking mechanism on a container holding the particular ingestible material portion (e.g. as shown in FIGS. 31-33, upon engagement of the containing assembly 44, including container 46 with lockable portion 102, as containing assembly 44 is inserted into receiving assembly 48 of the substance control dispensing system 10, lockable portion 102 is unlocked and opened upon verification by code verifiers 106 electronically coupling with code transmitters 108 that receiving assembly 48 is authorized to accept ingestible material 42, etc.). Furthermore, the receiving information lock electrical circuitry arrangement e1175 when activated will perform the operation o1175. In an implementation, the receiving information lock electrical circuitry arrangement e1175, when activated performs electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part disengaging a locking mechanism on a container holding the particular ingestible material portion (e.g. as shown in FIGS. 31-33, upon engagement of the containing assembly 44, including container 46 with lockable portion 102, as containing assembly 44 is inserted into receiving assembly 48 of the substance control dispensing system 10, lockable portion 102 is unlocked and opened upon verification by code verifiers 106 electronically coupling with code transmitters 108 that receiving assembly 48 is authorized to accept ingestible material 42, etc.). In an implementation, the electronically receiving status information related to the first engagement to facilitate access by the automated dispensing system to the particular ingestible material portion via at least in part disengaging a locking mechanism on a container holding the particular ingestible material portion is carried out by electronically receiving status information related to the first engagement (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, etc.) to facilitate access by the automated dispensing system to the particular ingestible material portion via at least in part disengaging a locking mechanism on a container holding the particular ingestible material portion (e.g. as shown in FIGS. 31-33, upon engagement of the containing assembly 44, including container 46 with lockable portion 102, as containing assembly 44 is inserted into receiving assembly 48 of the substance control dispensing system 10, lockable portion 102 is unlocked and opened upon verification by code verifiers 106 electronically coupling with code transmitters 108 that receiving assembly 48 is authorized to accept ingestible material 42, etc.).

Figure 73:
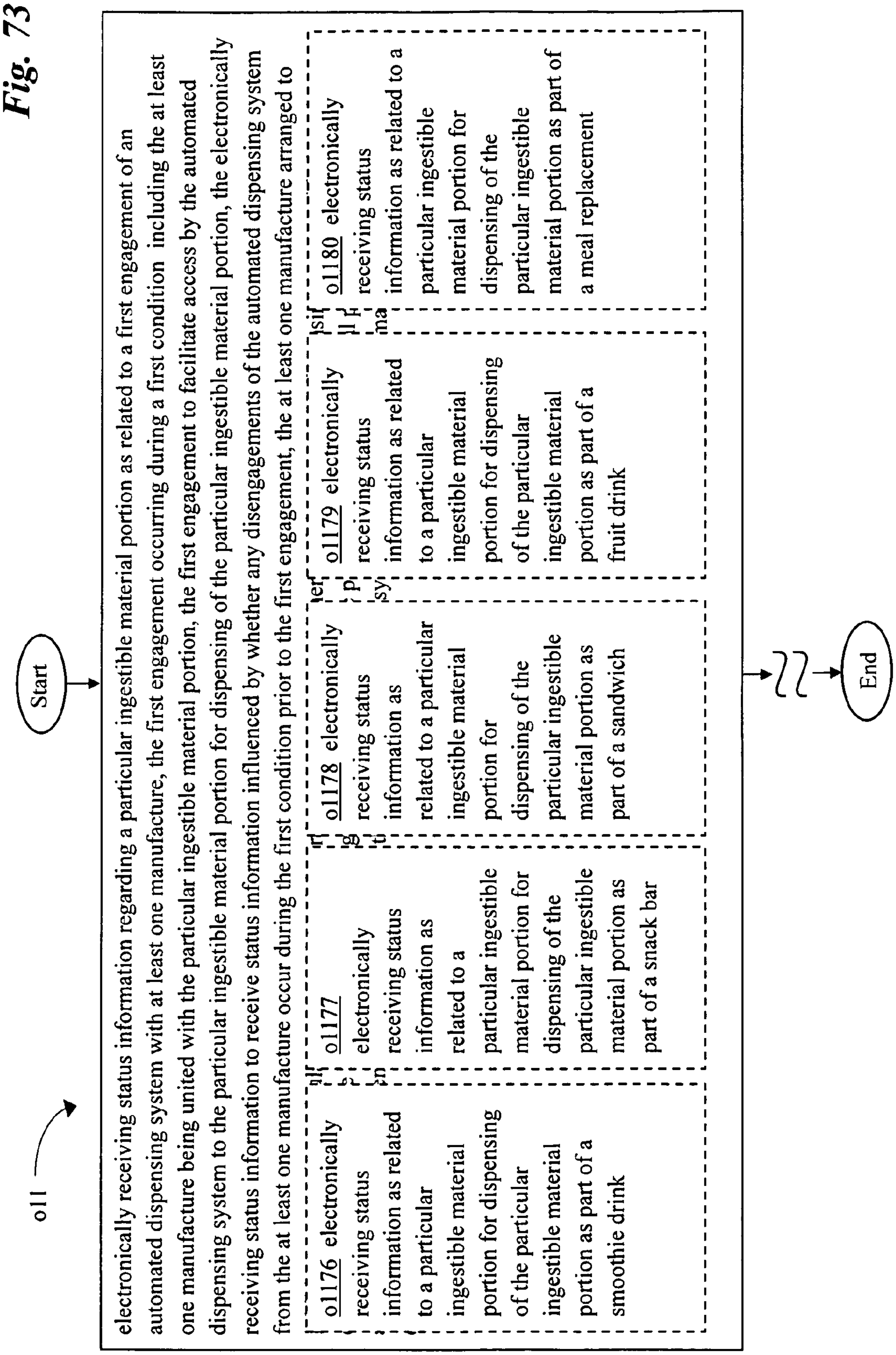
FIG. 73 is a high-level flowchart including exemplary implementations of operation O11 of FIG. 57.

In one or more implementations, as shown in FIG. 73, operation o11 includes an operation o1176 for electronically receiving status information as related to a particular ingestible material portion for dispensing of the particular ingestible material portion as part of a smoothie drink. A non-transitory signal bearing medium includes one or more receiving information smoothie instructions i1176 that when executed will direct performance of the operation o1176. In an implementation, the one or more receiving information smoothie instructions i1176 when executed direct electronically receiving status information as related to a particular ingestible material portion for dispensing of the particular ingestible material portion as part of a smoothie drink (e.g. electronic memory 52 coupled to containing assembly 44 as a manufacture is read by receiver 54 to obtain status information regarding ingestible material 42 as part of a smoothie drink contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.). Furthermore, the receiving information smoothie electrical circuitry arrangement e1176 when activated will perform the operation o1176. In an implementation, the receiving information smoothie electrical circuitry arrangement e1176, when activated performs electronically receiving status information as related to a particular ingestible material portion for dispensing of the particular ingestible material portion as part of a smoothie drink (e.g. electronic memory 52 coupled to containing assembly 44 as a manufacture is read by receiver 54 to obtain status information regarding ingestible material 42 as part of a smoothie drink contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.). In an implementation, the electronically receiving status information as related to a particular ingestible material portion for dispensing of the particular ingestible material portion as part of a smoothie drink is carried out by electronically receiving status information as related to a particular ingestible material portion for dispensing of the particular ingestible material portion as part of a smoothie drink (e.g. electronic memory 52 coupled to containing assembly 44 as a manufacture is read by receiver 54 to obtain status information regarding ingestible material 42 as part of a smoothie drink contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.).

In one or more implementations, operation o11 includes an operation o1177 for electronically receiving status information as related to a particular ingestible material portion for dispensing of the particular ingestible material portion as part of a snack bar. A non-transitory signal bearing medium includes one or more receiving information bar instructions i1177 that when executed will direct performance of the operation o1177. In an implementation, the one or more receiving information bar instructions i1177 when executed direct electronically receiving status information as related to a particular ingestible material portion for dispensing of the particular ingestible material portion as part of a snack bar (e.g. electronic memory 52 coupled to containing assembly 44 as a manufacture is read by receiver 54 to obtain status information regarding ingestible material 42 as part of a snack bar contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.). Furthermore, the receiving information bar electrical circuitry arrangement e1177 when activated will perform the operation o1177. In an implementation, the receiving information bar electrical circuitry arrangement e1177, when activated performs electronically receiving status information as related to a particular ingestible material portion for dispensing of the particular ingestible material portion as part of a snack bar (e.g. electronic memory 52 coupled to containing assembly 44 as a manufacture is read by receiver 54 to obtain status information regarding ingestible material 42 as part of a snack bar contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.). In an implementation, the electronically receiving status information as related to a particular ingestible material portion for dispensing of the particular ingestible material portion as part of a snack bar is carried out by electronically receiving status information as related to a particular ingestible material portion for dispensing of the particular ingestible material portion as part of a snack bar (e.g. electronic memory 52 coupled to containing assembly 44 as a manufacture is read by receiver 54 to obtain status information regarding ingestible material 42 as part of a snack bar contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.).

In one or more implementations, operation o11 includes an operation o1178 for electronically receiving status information as related to a particular ingestible material portion for dispensing of the particular ingestible material portion as part of a sandwich. A non-transitory signal bearing medium includes one or more receiving information sandwich instructions i1178 that when executed will direct performance of the operation o1178. In an implementation, the one or more receiving information sandwich instructions i1178 when executed direct electronically receiving status information as related to a particular ingestible material portion for dispensing of the particular ingestible material portion as part of a sandwich (e.g. electronic memory 52 coupled to containing assembly 44 as a manufacture is read by receiver 54 to obtain status information regarding ingestible material 42 as part of a sandwich contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.). Furthermore, the receiving information sandwich electrical circuitry arrangement e1178 when activated will perform the operation o1178. In an implementation, the receiving information sandwich electrical circuitry arrangement e1178, when activated performs electronically receiving status information as related to a particular ingestible material portion for dispensing of the particular ingestible material portion as part of a sandwich (e.g. electronic memory 52 coupled to containing assembly 44 as a manufacture is read by receiver 54 to obtain status information regarding ingestible material 42 as part of a sandwich contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.). In an implementation, the electronically receiving status information as related to a particular ingestible material portion for dispensing of the particular ingestible material portion as part of a sandwich is carried out by electronically receiving status information as related to a particular ingestible material portion for dispensing of the particular ingestible material portion as part of a sandwich (e.g. electronic memory 52 coupled to containing assembly 44 as a manufacture is read by receiver 54 to obtain status information regarding ingestible material 42 as part of a sandwich contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.).

In one or more implementations, operation o11 includes an operation o1179 for electronically receiving status information as related to a particular ingestible material portion for dispensing of the particular ingestible material portion as part of a fruit drink. A non-transitory signal bearing medium includes one or more receiving information drink instructions i1179 that when executed will direct performance of the operation o1179. In an implementation, the one or more receiving information drink instructions i1179 when executed direct electronically receiving status information as related to a particular ingestible material portion for dispensing of the particular ingestible material portion as part of a fruit drink (e.g. electronic memory 52 coupled to containing assembly 44 as a manufacture is read by receiver 54 to obtain status information regarding ingestible material 42 as part of a fruit drink contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.). Furthermore, the receiving information drink electrical circuitry arrangement e1179 when activated will perform the operation o1179. In an implementation, the receiving information drink electrical circuitry arrangement e1179, when activated performs electronically receiving status information as related to a particular ingestible material portion for dispensing of the particular ingestible material portion as part of a fruit drink (e.g. electronic memory 52 coupled to containing assembly 44 as a manufacture is read by receiver 54 to obtain status information regarding ingestible material 42 as part of a fruit drink contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.). In an implementation, the electronically receiving status information as related to a particular ingestible material portion for dispensing of the particular ingestible material portion as part of a fruit drink is carried out by electronically receiving status information as related to a particular ingestible material portion for dispensing of the particular ingestible material portion as part of a fruit drink (e.g. electronic memory 52 coupled to containing assembly 44 as a manufacture is read by receiver 54 to obtain status information regarding ingestible material 42 as part of a fruit drink contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.).

In one or more implementations, operation o11 includes an operation o1180 for electronically receiving status information as related to a particular ingestible material portion for dispensing of the particular ingestible material portion as part of a meal replacement. A non-transitory signal bearing medium includes one or more receiving information meal instructions i1180 that when executed will direct performance of the operation o1180. In an implementation, the one or more receiving information meal instructions i1180 when executed direct electronically receiving status information as related to a particular ingestible material portion for dispensing of the particular ingestible material portion as part of a meal replacement (e.g. electronic memory 52 coupled to containing assembly 44 as a manufacture is read by receiver 54 to obtain status information regarding ingestible material 42 as part of a meal replacement contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.). Furthermore, the receiving information meal electrical circuitry arrangement e1180 when activated will perform the operation o1180. In an implementation, the receiving information meal electrical circuitry arrangement e1180, when activated performs electronically receiving status information as related to a particular ingestible material portion for dispensing of the particular ingestible material portion as part of a meal replacement (e.g. electronic memory 52 coupled to containing assembly 44 as a manufacture is read by receiver 54 to obtain status information regarding ingestible material 42 as part of a meal replacement contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.). In an implementation, the electronically receiving status information as related to a particular ingestible material portion for dispensing of the particular ingestible material portion as part of a meal replacement is carried out by electronically receiving status information as related to a particular ingestible material portion for dispensing of the particular ingestible material portion as part of a meal replacement (e.g. electronic memory 52 coupled to containing assembly 44 as a manufacture is read by receiver 54 to obtain status information regarding ingestible material 42 as part of a meal replacement contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.).

Figure 74:
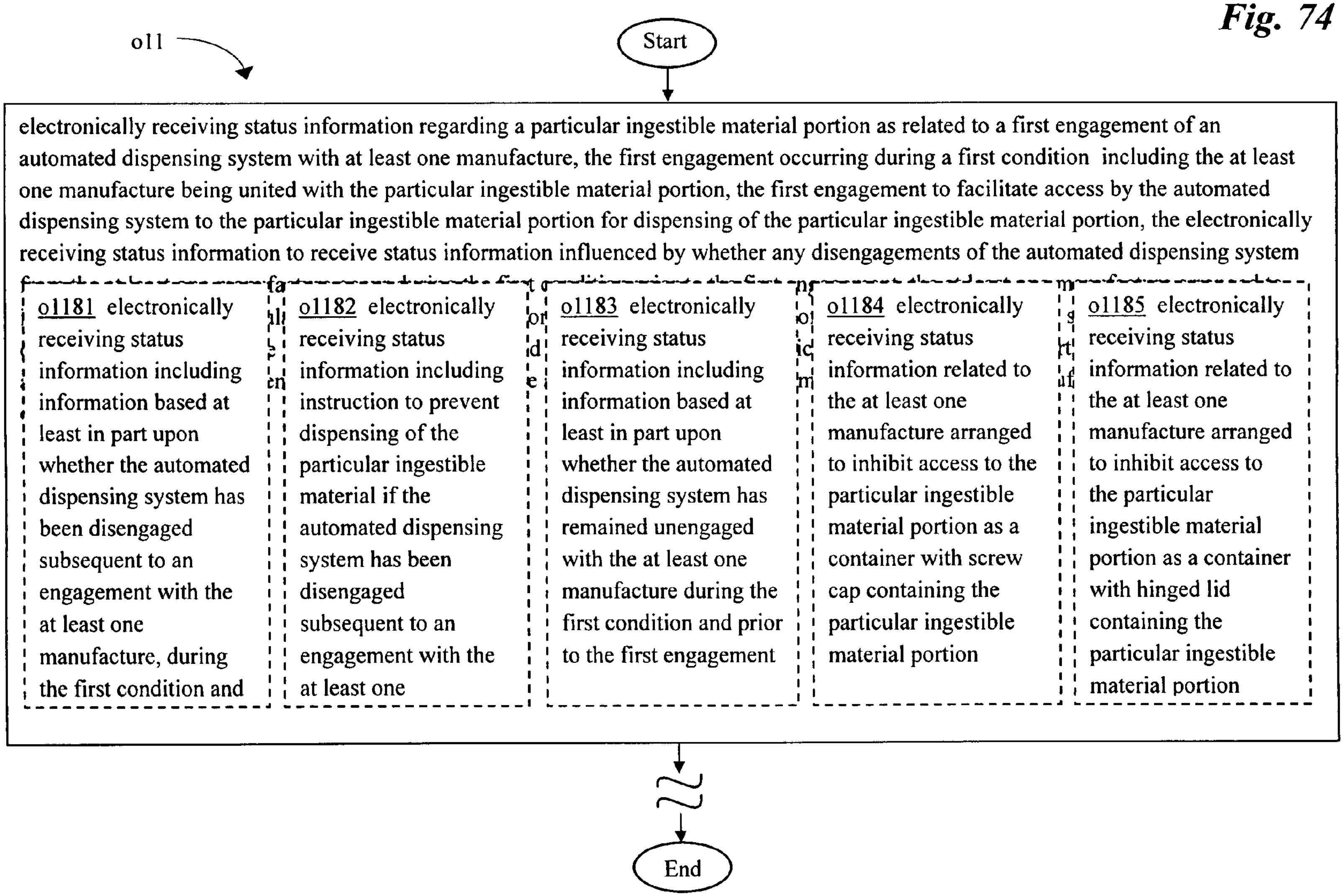
FIG. 74 is a high-level flowchart including exemplary implementations of operation O11 of FIG. 57.

In one or more implementations, as shown in FIG. 74, operation o11 includes an operation o1181 for electronically receiving status information including information based at least in part upon whether the automated dispensing system has been disengaged subsequent to an engagement with the at least one manufacture, during the first condition and prior to the first engagement. A non-transitory signal bearing medium includes one or more receiving information disengaged instructions i1181 that when executed will direct performance of the operation o1181. In an implementation, the one or more receiving information disengaged instructions i1181 when executed direct electronically receiving status information including information based at least in part upon whether the automated dispensing system has been disengaged subsequent to an engagement with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture without any prior engagements with the containing assembly 44 containing the ingestible material, the information to be passed on to the microprocessor component s102, which subsequently displays the information on selection indicators 20, etc.), during the first condition and prior to the first engagement (e.g. prior to the first engagement as prior to as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). Furthermore, the receiving information disengaged electrical circuitry arrangement e1181 when activated will perform the operation o1181. In an implementation, the receiving information disengaged electrical circuitry arrangement e1181, when activated performs electronically receiving status information including information based at least in part upon whether the automated dispensing system has been disengaged subsequent to an engagement with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture without any prior engagements with the containing assembly 44 containing the ingestible material, the information to be passed on to the microprocessor component s102, which subsequently displays the information on selection indicators 20, etc.), during the first condition and prior to the first engagement (e.g. prior to the first engagement as prior to as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). In an implementation, the electronically receiving status information including information based at least in part upon whether the automated dispensing system has been disengaged subsequent to an engagement with the at least one manufacture, during the first condition and prior to the first engagement is carried out by electronically receiving status information including information based at least in part upon whether the automated dispensing system has been disengaged subsequent to an engagement with the at least one manufacture (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture without any prior engagements with the containing assembly 44 containing the ingestible material, the information to be passed on to the microprocessor component s102, which subsequently displays the information on selection indicators 20, etc.), during the first condition and prior to the first engagement (e.g. prior to the first engagement as prior to as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.).

In one or more implementations, operation o11 includes an operation o1182 for electronically receiving status information including instruction to prevent dispensing of the particular ingestible material if the automated dispensing system has been disengaged subsequent to an engagement with the at least one manufacture, during the first condition and prior to the first engagement. A non-transitory signal bearing medium includes one or more receiving information prevent instructions i1182 that when executed will direct performance of the operation o1182. In an implementation, the one or more receiving information prevent instructions i1182 when executed direct electronically receiving status information including instruction to prevent dispensing of the particular ingestible material if the automated dispensing system has been disengaged subsequent to an engagement with the at least one manufacture (e.g. electronic memory 52 coupled to containing assembly 44 as a manufacture is read by receiver 54 to obtain status information including instructions not to dispense the ingestible material 42 contained by containing assembly 44 when the containing assembly containing the ingestible material has already been engaged and disengaged with the receiving assembly 48 prior to the present engagement as shown in FIGS. 16-18 as the first engagement of the automated dispensing system with the at least one manufacture, the information to be passed on to the microprocessor component s102, which subsequently displays the information on selection indicators 20, etc.), during the first condition and prior to the first engagement (e.g. as shown in FIGS. 16-18, as the first engagement whereupon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). Furthermore, the receiving information prevent electrical circuitry arrangement e1182 when activated will perform the operation o1182. In an implementation, the receiving information prevent electrical circuitry arrangement e1182, when activated performs electronically receiving status information including instruction to prevent dispensing of the particular ingestible material if the automated dispensing system has been disengaged subsequent to an engagement with the at least one manufacture (e.g. electronic memory 52 coupled to containing assembly 44 as a manufacture is read by receiver 54 to obtain status information including instructions not to dispense the ingestible material 42 contained by containing assembly 44 when the containing assembly containing the ingestible material has already been engaged and disengaged with the receiving assembly 48 prior to the present engagement as shown in FIGS. 16-18 as the first engagement of the automated dispensing system with the at least one manufacture, the information to be passed on to the microprocessor component s102, which subsequently displays the information on selection indicators 20, etc.), during the first condition and prior to the first engagement (e.g. as shown in FIGS. 16-18, as the first engagement whereupon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). In an implementation, the electronically receiving status information including instruction to prevent dispensing of the particular ingestible material if the automated dispensing system has been disengaged subsequent to an engagement with the at least one manufacture, during the first condition and prior to the first engagement is carried out by electronically receiving status information including instruction to prevent dispensing of the particular ingestible material if the automated dispensing system has been disengaged subsequent to an engagement with the at least one manufacture (e.g. electronic memory 52 coupled to containing assembly 44 as a manufacture is read by receiver 54 to obtain status information including instructions not to dispense the ingestible material 42 contained by containing assembly 44 when the containing assembly containing the ingestible material has already been engaged and disengaged with the receiving assembly 48 prior to the present engagement as shown in FIGS. 16-18 as the first engagement of the automated dispensing system with the at least one manufacture, the information to be passed on to the microprocessor component s102, which subsequently displays the information on selection indicators 20, etc.), during the first condition and prior to the first engagement (e.g. as shown in FIGS. 16-18, as the first engagement whereupon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.).

In one or more implementations, operation o11 includes an operation o1183 for electronically receiving status information including information based at least in part upon whether the automated dispensing system has remained unengaged with the at least one manufacture during the first condition and prior to the first engagement. A non-transitory signal bearing medium includes one or more receiving information remained instructions i1183 that when executed will direct performance of the operation o1183. In an implementation, the one or more receiving information remained instructions i1183 when executed direct electronically receiving status information including information based at least in part upon whether the automated dispensing system has remained unengaged with the at least one manufacture (e.g. electronic memory 52 coupled to containing assembly 44 as a manufacture is read by receiver 54 to obtain status information regarding ingestible material 42 contained by containing assembly 44 when the containing assembly is engaged for the first time while it has contained the ingestible material with the receiving assembly 48 as shown in FIGS. 16-18 as the first engagement of the automated dispensing system with the at least one manufacture, the information to be passed on to the microprocessor component s102, which subsequently displays the information on selection indicators 20, etc.), during the first condition and prior to the first engagement (e.g. during the first condition as the ingestible material 42 being contained by the containing assembly 44 and the first engagement as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). Furthermore, the receiving information remained electrical circuitry arrangement e1183 when activated will perform the operation o1183. In an implementation, the receiving information remained electrical circuitry arrangement e1183, when activated performs electronically receiving status information including information based at least in part upon whether the automated dispensing system has remained unengaged with the at least one manufacture (e.g. electronic memory 52 coupled to containing assembly 44 as a manufacture is read by receiver 54 to obtain status information regarding ingestible material 42 contained by containing assembly 44 when the containing assembly is engaged for the first time while it has contained the ingestible material with the receiving assembly 48 as shown in FIGS. 16-18 as the first engagement of the automated dispensing system with the at least one manufacture, the information to be passed on to the microprocessor component s102, which subsequently displays the information on selection indicators 20, etc.), during the first condition and prior to the first engagement (e.g. during the first condition as the ingestible material 42 being contained by the containing assembly 44 and the first engagement as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.). In an implementation, the electronically receiving status information including information based at least in part upon whether the automated dispensing system has remained unengaged with the at least one manufacture during the first condition and prior to the first engagement is carried out by electronically receiving status information including information based at least in part upon whether the automated dispensing system has remained unengaged with the at least one manufacture (e.g. electronic memory 52 coupled to containing assembly 44 as a manufacture is read by receiver 54 to obtain status information regarding ingestible material 42 contained by containing assembly 44 when the containing assembly is engaged for the first time while it has contained the ingestible material with the receiving assembly 48 as shown in FIGS. 16-18 as the first engagement of the automated dispensing system with the at least one manufacture, the information to be passed on to the microprocessor component s102, which subsequently displays the information on selection indicators 20, etc.), during the first condition and prior to the first engagement (e.g. during the first condition as the ingestible material 42 being contained by the containing assembly 44 and the first engagement as shown in FIGS. 16-18, upon engagement of the containing assembly 44, including container 46 with screw cap 80, protrusion 78 receives, unscrews, and pulls off screw cap 80 from container 46 allowing ingestible material 42 to flow through orifice 82 from the container as encouraged by means of force such as augering with a portion of the screw cap, etc.).

In one or more implementations, operation o11 includes an operation o1184 for electronically receiving status information related to the at least one manufacture arranged to inhibit access to the particular ingestible material portion as a container with screw cap containing the particular ingestible material portion. A non-transitory signal bearing medium includes one or more receiving information cap instructions i1184 that when executed will direct performance of the operation o1184. In an implementation, the one or more receiving information cap instructions i1184 when executed direct electronically receiving status information related to the at least one manufacture arranged to inhibit access to the particular ingestible material portion as a container with screw cap containing the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20 and as shown in FIGS. 16-18, upon engagement of the containing assembly 44, including container 46 holding the ingestible material 42 with screw cap 80, protrusion 78 receives, unscrews, and pulls off screw cap 80 from container 46 thereby releasing allowing ingestible material 42 under aerosol pressure to flow through orifice 82, etc.). Furthermore, the receiving information cap electrical circuitry arrangement e1184 when activated will perform the operation o1184. In an implementation, the receiving information cap electrical circuitry arrangement e1184, when activated performs electronically receiving status information related to the at least one manufacture arranged to inhibit access to the particular ingestible material portion as a container with screw cap containing the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20 and as shown in FIGS. 16-18, upon engagement of the containing assembly 44, including container 46 holding the ingestible material 42 with screw cap 80, protrusion 78 receives, unscrews, and pulls off screw cap 80 from container 46 thereby releasing allowing ingestible material 42 under aerosol pressure to flow through orifice 82, etc.). In an implementation, the electronically receiving status information related to the at least one manufacture arranged to inhibit access to the particular ingestible material portion as a container with screw cap containing the particular ingestible material portion is carried out by electronically receiving status information related to the at least one manufacture arranged to inhibit access to the particular ingestible material portion as a container with screw cap containing the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20 and as shown in FIGS. 16-18, upon engagement of the containing assembly 44, including container 46 holding the ingestible material 42 with screw cap 80, protrusion 78 receives, unscrews, and pulls off screw cap 80 from container 46 thereby releasing allowing ingestible material 42 under aerosol pressure to flow through orifice 82, etc.).

In one or more implementations, operation o11 includes an operation o1185 for electronically receiving status information related to the at least one manufacture arranged to inhibit access to the particular ingestible material portion as a container with hinged lid containing the particular ingestible material portion. A non-transitory signal bearing medium includes one or more receiving information lid instructions i1185 that when executed will direct performance of the operation o1185. In an implementation, the one or more receiving information lid instructions i1185 when executed direct electronically receiving status information related to the at least one manufacture arranged to inhibit access to the particular ingestible material portion as a container with hinged lid containing the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 13-15 as the first engagement of the automated dispensing system with the at least one manufacture, the information to be passed on to the microprocessor component s102, which subsequently displays the information on selection indicators 20, and as shown in FIGS. 13-15, upon engagement of the containing assembly 44, including container 46 with hinged lid 74, as containing assembly 44 is inserted into receiving assembly 48 of the substance control dispensing system 10, protrusion 72 opens hinged lid 74 allowing ingestible material 42 to be collected through orifice 76 as encouraged by gravity, vacuum, or other means of force, etc.). Furthermore, the receiving information lid electrical circuitry arrangement e1185 when activated will perform the operation o1185. In an implementation, the receiving information lid electrical circuitry arrangement e1185, when activated performs electronically receiving status information related to the at least one manufacture arranged to inhibit access to the particular ingestible material portion as a container with hinged lid containing the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 13-15 as the first engagement of the automated dispensing system with the at least one manufacture, the information to be passed on to the microprocessor component s102, which subsequently displays the information on selection indicators 20, and as shown in FIGS. 13-15, upon engagement of the containing assembly 44, including container 46 with hinged lid 74, as containing assembly 44 is inserted into receiving assembly 48 of the substance control dispensing system 10, protrusion 72 opens hinged lid 74 allowing ingestible material 42 to be collected through orifice 76 as encouraged by gravity, vacuum, or other means of force, etc.). In an implementation, the electronically receiving status information related to the at least one manufacture arranged to inhibit access to the particular ingestible material portion as a container with hinged lid containing the particular ingestible material portion is carried out by electronically receiving status information related to the at least one manufacture arranged to inhibit access to the particular ingestible material portion as a container with hinged lid containing the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 13-15 as the first engagement of the automated dispensing system with the at least one manufacture, the information to be passed on to the microprocessor component s102, which subsequently displays the information on selection indicators 20, and as shown in FIGS. 13-15, upon engagement of the containing assembly 44, including container 46 with hinged lid 74, as containing assembly 44 is inserted into receiving assembly 48 of the substance control dispensing system 10, protrusion 72 opens hinged lid 74 allowing ingestible material 42 to be collected through orifice 76 as encouraged by gravity, vacuum, or other means of force, etc.).

Figure 75:
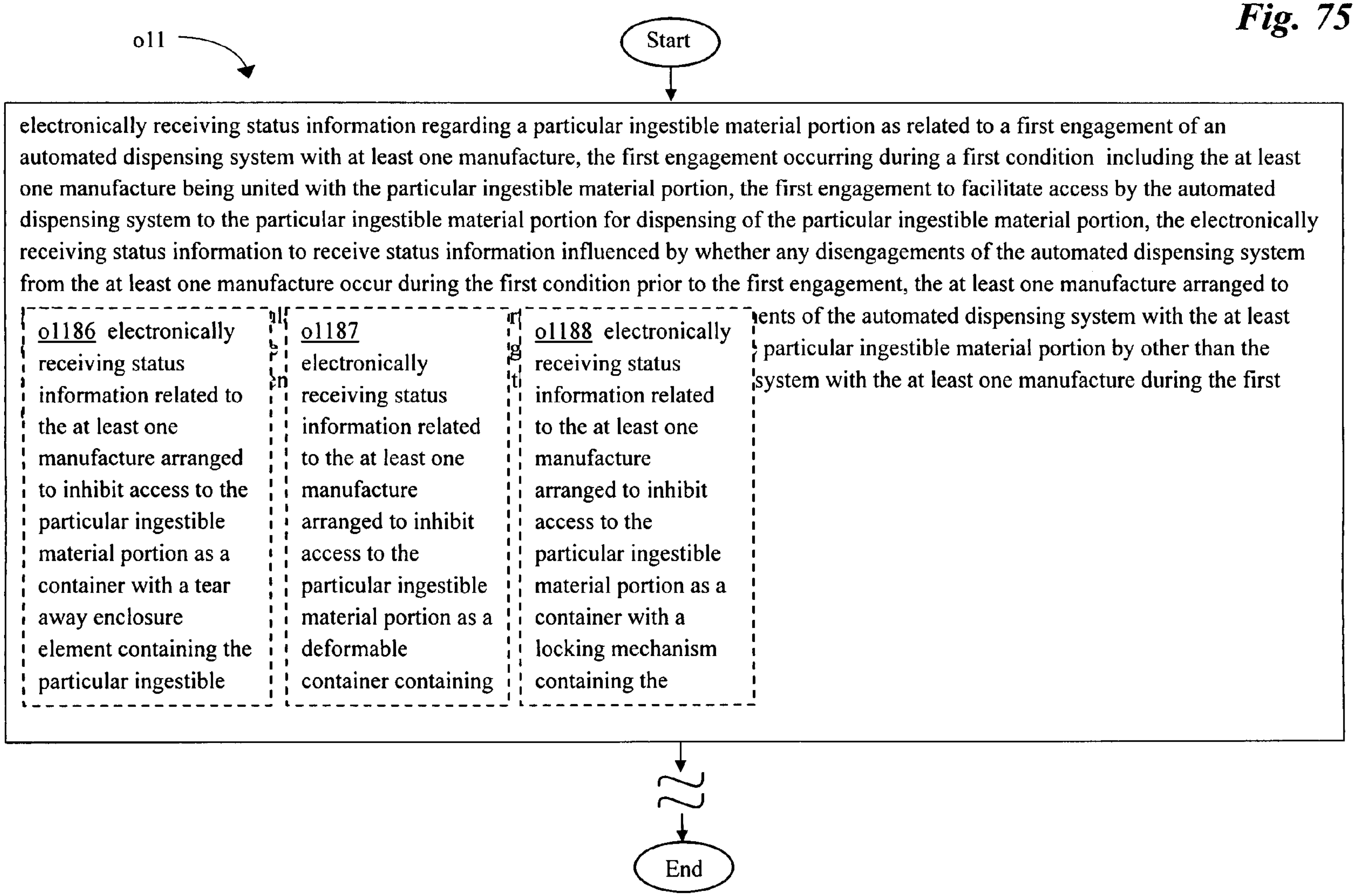
FIG. 75 is a high-level flowchart including exemplary implementations of operation O11 of FIG. 57.

In one or more implementations, as shown in FIG. 75, operation o11 includes an operation o1186 for electronically receiving status information related to the at least one manufacture arranged to inhibit access to the particular ingestible material portion as a container with a tear away enclosure element containing the particular ingestible material portion. A non-transitory signal bearing medium includes one or more receiving information tear instructions i1186 that when executed will direct performance of the operation o1186. In an implementation, the one or more receiving information tear instructions i1186 when executed direct electronically receiving status information related to the at least one manufacture arranged to inhibit access to the particular ingestible material portion as a container with a tear away enclosure element containing the particular ingestible material portion (e.g. electronic memory 52 coupled to containing assembly 44 as a manufacture is read by receiver 54 to obtain status information regarding ingestible material 42 contained and inhibited access to by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.). Furthermore, the receiving information tear electrical circuitry arrangement e1186 when activated will perform the operation o1186. In an implementation, the receiving information tear electrical circuitry arrangement e1186, when activated performs electronically receiving status information related to the at least one manufacture arranged to inhibit access to the particular ingestible material portion as a container with a tear away enclosure element containing the particular ingestible material portion (e.g. electronic memory 52 coupled to containing assembly 44 as a manufacture is read by receiver 54 to obtain status information regarding ingestible material 42 contained and inhibited access to by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.). In an implementation, the electronically receiving status information related to the at least one manufacture arranged to inhibit access to the particular ingestible material portion as a container with a tear away enclosure element containing the particular ingestible material portion is carried out by electronically receiving status information related to the at least one manufacture arranged to inhibit access to the particular ingestible material portion as a container with a tear away enclosure element containing the particular ingestible material portion (e.g. electronic memory 52 coupled to containing assembly 44 as a manufacture is read by receiver 54 to obtain status information regarding ingestible material 42 contained and inhibited access to by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, etc.).

In one or more implementations, operation o11 includes an operation o1187 for electronically receiving status information related to the at least one manufacture arranged to inhibit access to the particular ingestible material portion as a deformable container containing the particular ingestible material portion. A non-transitory signal bearing medium includes one or more receiving information deform instructions i1187 that when executed will direct performance of the operation o1187. In an implementation, the one or more receiving information deform instructions i1187 when executed direct electronically receiving status information related to the at least one manufacture arranged to inhibit access to the particular ingestible material portion as a deformable container containing the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, and as shown in FIGS. 28-30, upon engagement of the containing assembly 44, including container 46 with deformable portion 98, as containing assembly 44 is inserted into receiving assembly 48 of the substance control dispensing system 10, deformable portion 98 is deformed to open thereby allowing ingestible material 42 to move through orifice 100, etc.). Furthermore, the receiving information deform electrical circuitry arrangement e1187 when activated will perform the operation o1187. In an implementation, the receiving information deform electrical circuitry arrangement e1187, when activated performs electronically receiving status information related to the at least one manufacture arranged to inhibit access to the particular ingestible material portion as a deformable container containing the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, and as shown in FIGS. 28-30, upon engagement of the containing assembly 44, including container 46 with deformable portion 98, as containing assembly 44 is inserted into receiving assembly 48 of the substance control dispensing system 10, deformable portion 98 is deformed to open thereby allowing ingestible material 42 to move through orifice 100, etc.). In an implementation, the electronically receiving status information related to the at least one manufacture arranged to inhibit access to the particular ingestible material portion as a deformable container containing the particular ingestible material portion is carried out by electronically receiving status information related to the at least one manufacture arranged to inhibit access to the particular ingestible material portion as a deformable container containing the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 16-18 as the first engagement of the automated dispensing system with the at least one manufacture, the information to be passed on to the microprocessor component s102, which subsequently displays the information on selection indicators 20, and as shown in FIGS. 28-30, upon engagement of the containing assembly 44, including container 46 with deformable portion 98, as containing assembly 44 is inserted into receiving assembly 48 of the substance control dispensing system 10, deformable portion 98 is deformed to open thereby allowing ingestible material 42 to move through orifice 100, etc.).

In one or more implementations, operation o11 includes an operation o1188 for electronically receiving status information related to the at least one manufacture arranged to inhibit access to the particular ingestible material portion as a container with a locking mechanism containing the particular ingestible material portion. A non-transitory signal bearing medium includes one or more receiving information lock instructions i1188 that when executed will direct performance of the operation o1188. In an implementation, the one or more receiving information lock instructions i1188 when executed direct electronically receiving status information related to the at least one manufacture arranged to inhibit access to the particular ingestible material portion as a container with a locking mechanism containing the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, and as shown in FIGS. 31-33, upon engagement of the containing assembly 44, including container 46 with lockable portion 102, as containing assembly 44 is inserted into receiving assembly 48 of the substance control dispensing system 10, lockable portion 102 is unlocked and opened upon verification by code verifiers 106 electronically coupling with code transmitters 108 that receiving assembly 48 is authorized to accept ingestible material 42, etc.). Furthermore, the receiving information lock electrical circuitry arrangement e1188 when activated will perform the operation o1188. In an implementation, the receiving information lock electrical circuitry arrangement e1188, when activated performs electronically receiving status information related to the at least one manufacture arranged to inhibit access to the particular ingestible material portion as a container with a locking mechanism containing the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, and as shown in FIGS. 31-33, upon engagement of the containing assembly 44, including container 46 with lockable portion 102, as containing assembly 44 is inserted into receiving assembly 48 of the substance control dispensing system 10, lockable portion 102 is unlocked and opened upon verification by code verifiers 106 electronically coupling with code transmitters 108 that receiving assembly 48 is authorized to accept ingestible material 42, etc.). In an implementation, the electronically receiving status information related to the at least one manufacture arranged to inhibit access to the particular ingestible material portion as a container with a locking mechanism containing the particular ingestible material portion is carried out by electronically receiving status information related to the at least one manufacture arranged to inhibit access to the particular ingestible material portion as a container with a locking mechanism containing the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, and as shown in FIGS. 31-33, upon engagement of the containing assembly 44, including container 46 with lockable portion 102, as containing assembly 44 is inserted into receiving assembly 48 of the substance control dispensing system 10, lockable portion 102 is unlocked and opened upon verification by code verifiers 106 electronically coupling with code transmitters 108 that receiving assembly 48 is authorized to accept ingestible material 42, etc.).

As shown in FIG. 57, the operational flow o10 proceeds to operation o12 for electronically outputting selection information associated with the particular ingestible material portion including information related to the received status information regarding the particular ingestible material portion and associated with ingestible material other than that associated with the particular ingestible material portion subsequent to electronically receiving the status information regarding the particular ingestible material portion. An exemplary version of the non-transitory signal bearing medium n100 is depicted as bearing one or more outputting selection information instructions i12 that when executed will direct performance of the operation o12. In an implementation, the one or more outputting selection information instructions i12 when executed direct electronically outputting selection information associated with the particular ingestible material portion (e.g. the microprocessor component s102, which subsequently displays information concerning point of origin and authority endorsements for ingestible material 42 such as a spirulina extract contained as an ingredient a product to be selected display by the selection indicators 20, etc.) including information related to the received status information regarding the particular ingestible material portion (e.g. point of origin and authority endorsements can be related to received status information by being included in the received status information, etc.) and associated with ingestible material other than that associated with the particular ingestible material portion (e.g. information concerning ingestible material as other ingredients in the product containing the ingestible material 42 or as ingredients of other products can also be displayed by the microprocessor component s102 via the selection indicators 20, etc.) subsequent to electronically receiving the status information regarding the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, etc.). Furthermore, the outputting selection information electrical circuitry arrangement e12 when activated will perform the operation o12. In an implementation, the outputting selection information electrical circuitry arrangement e12, when activated performs electronically outputting selection information associated with the particular ingestible material portion (e.g. the microprocessor component s102, which subsequently displays information concerning point of origin and authority endorsements for ingestible material 42 such as a spirulina extract contained as an ingredient a product to be selected display by the selection indicators 20, etc.) including information related to the received status information regarding the particular ingestible material portion (e.g. point of origin and authority endorsements can be related to received status information by being included in the received status information, etc.) and associated with ingestible material other than that associated with the particular ingestible material portion (e.g. information concerning ingestible material as other ingredients in the product containing the ingestible material 42 or as ingredients of other products can also be displayed by the microprocessor component s102 via the selection indicators 20, etc.) subsequent to electronically receiving the status information regarding the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, etc.). In an implementation, the electronically outputting selection information associated with the particular ingestible material portion including information related to the received status information regarding the particular ingestible material portion and associated with ingestible material other than that associated with the particular ingestible material portion subsequent to electronically receiving the status information regarding the particular ingestible material portion is carried out by electronically outputting selection information associated with the particular ingestible material portion (e.g. the microprocessor component s102, which subsequently displays information concerning point of origin and authority endorsements for ingestible material 42 such as a spirulina extract contained as an ingredient a product to be selected display by the selection indicators 20, etc.) including information related to the received status information regarding the particular ingestible material portion (e.g. point of origin and authority endorsements can be related to received status information by being included in the received status information, etc.) and associated with ingestible material other than that associated with the particular ingestible material portion (e.g. information concerning ingestible material as other ingredients in the product containing the ingestible material 42 or as ingredients of other products can also be displayed by the microprocessor component s102 via the selection indicators 20, etc.) subsequent to electronically receiving the status information regarding the particular ingestible material portion (e.g. electronic memory 52 coupled to containing assembly 44 as a manufacture is read by receiver 54 to obtain status information regarding ingestible material 42 contained by containing assembly 44 when the containing assembly is engaged with the receiving assembly 48 as shown in FIGS. 31-33 as the first engagement of the automated dispensing system with the at least one manufacture, the information to be passed on to the microprocessor component s102, which subsequently displays the information on selection indicators 20, etc.).

Figure 76:
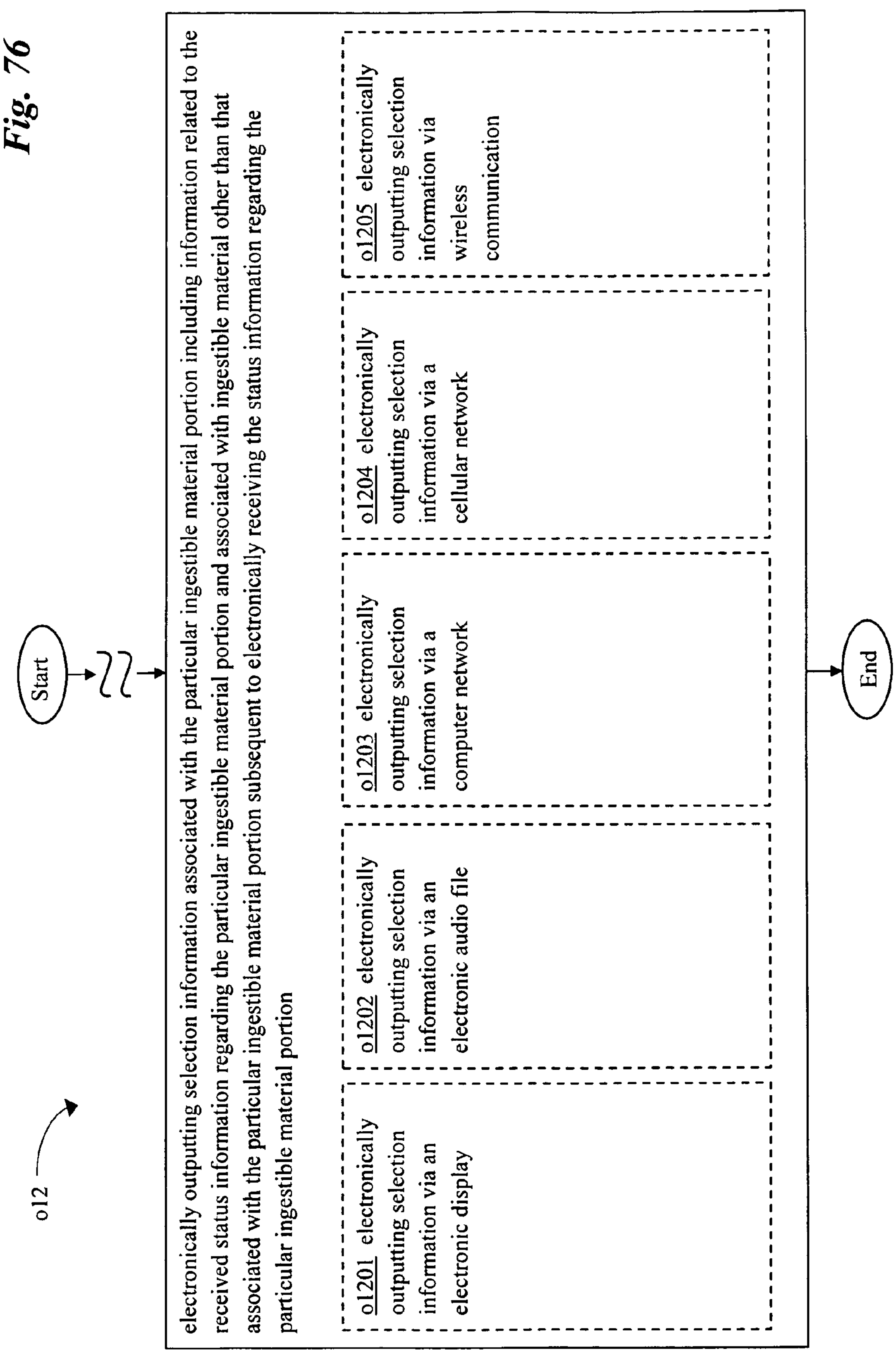
FIG. 76 is a high-level flowchart including exemplary implementations of operation O12 of FIG. 57.

In one or more implementations, as shown in FIG. 76, operation o12 includes an operation o1201 for electronically outputting selection information via an electronic display. An exemplary version of the non-transitory signal bearing medium n100 is depicted as bearing one or more outputting information display instructions i1201 that when executed will direct performance of the operation o1201. In an implementation, the one or more outputting information display instructions i1201 when executed direct electronically outputting selection information via an electronic display (e.g. the selection indicators 20 can include graphical user interface (GUI) component s302 to electronically outputting the selection information, etc.). Furthermore, the outputting information display electrical circuitry arrangement e1201 when activated will perform the operation o1201. In an implementation, the outputting information display electrical circuitry arrangement e1201, when activated performs electronically outputting selection information via an electronic display (e.g. the selection indicators 20 can include graphical user interface (GUI) component s302 to electronically outputting the selection information, etc.). In an implementation, the electronically outputting selection information via an electronic display is carried out by electronically outputting selection information via an electronic display (e.g. the selection indicators 20 can include graphical user interface (GUI) component s302 to electronically outputting the selection information, etc.).

In one or more implementations, operation o12 includes an operation o1202 for electronically outputting selection information via an electronic audio file. An exemplary version of the non-transitory signal bearing medium n100 is depicted as bearing one or more outputting information audio instructions i1202 that when executed will direct performance of the operation o1202. In an implementation, the one or more outputting information audio instructions i1202 when executed direct electronically outputting selection information via an electronic audio file (e.g. the selection indicators 20 can include audio in/out component s328 to electronically outputting the selection information, etc.). Furthermore, the outputting information audio electrical circuitry arrangement e1202 when activated will perform the operation o1202. In an implementation, the outputting information audio electrical circuitry arrangement e1202, when activated performs electronically outputting selection information via an electronic audio file (e.g. the selection indicators 20 can include audio in/out component s328 to electronically outputting the selection information, etc.). In an implementation, the electronically outputting selection information via an electronic audio file is carried out by electronically outputting selection information via an electronic audio file (e.g. the selection indicators 20 can include audio in/out component s328 to electronically outputting the selection information, etc.).

In one or more implementations, operation o12 includes an operation o1203 for electronically outputting selection information via a computer network. An exemplary version of the non-transitory signal bearing medium n100 is depicted as bearing one or more outputting information computer instructions i1203 that when executed will direct performance of the operation o1203. In an implementation, the one or more outputting information computer instructions i1203 when executed direct electronically outputting selection information via a computer network (e.g. the microprocessor component s102 can be electronically coupled to the local area network component s518 to electronically output selection information through a local area network in addition to the selection indicators 20, etc.). Furthermore, the outputting information computer electrical circuitry arrangement e1203 when activated will perform the operation o1203. In an implementation, the outputting information computer electrical circuitry arrangement e1203, when activated performs electronically outputting selection information via a computer network (e.g. the microprocessor component s102 can be electronically coupled to the local area network component s518 to electronically output selection information through a local area network in addition to the selection indicators 20, etc.). In an implementation, the electronically outputting selection information via a computer network is carried out by electronically outputting selection information via a computer network (e.g. the microprocessor component s102 can be electronically coupled to the local area network component s518 to electronically output selection information through a local area network in addition to the selection indicators 20, etc.).

In one or more implementations, operation o12 includes an operation o1204 for electronically outputting selection information via a cellular network. An exemplary version of the non-transitory signal bearing medium n100 is depicted as bearing one or more outputting information cellular network instructions i1204 that when executed will direct performance of the operation o1204. In an implementation, the one or more outputting information cellular network instructions i1204 when executed direct electronically outputting selection information via a cellular network (e.g. the microprocessor component s102 can be electronically coupled to the cellular network component s514 to electronically output selection information through a cellular network in addition to the selection indicators 20, etc.). Furthermore, the outputting information display electrical circuitry arrangement e1204 when activated will perform the operation o1204. In an implementation, the outputting information cellular network electrical circuitry arrangement e1204, when activated performs electronically outputting selection information via a cellular network (e.g. the microprocessor component s102 can be electronically coupled to the cellular network component s514 to electronically output selection information through a cellular network in addition to the selection indicators 20, etc.). In an implementation, the electronically outputting selection information via a cellular network is carried out by electronically outputting selection information via a cellular network (e.g. the microprocessor component s102 can be electronically coupled to the cellular network component s514 to electronically output selection information through a cellular network in addition to the selection indicators 20, etc.).

In one or more implementations, operation o12 includes an operation o1205 for electronically outputting selection information via wireless communication. An exemplary version of the non-transitory signal bearing medium n100 is depicted as bearing one or more outputting information wireless instructions i1205 that when executed will direct performance of the operation o1205. In an implementation, the one or more outputting information wireless instructions i1205 when executed direct electronically outputting selection information via wireless communication (e.g. the microprocessor component s102 can be electronically coupled to the wireless network component s510 to electronically output selection information through a wireless network in addition to the selection indicators 20, etc.). Furthermore, the outputting information wireless electrical circuitry arrangement e1205 when activated will perform the operation o1205. In an implementation, the outputting information wireless electrical circuitry arrangement e1205, when activated performs electronically outputting selection information via wireless communication (e.g. the microprocessor component s102 can be electronically coupled to the wireless network component s510 to electronically output selection information through a wireless network in addition to the selection indicators 20, etc.). In an implementation, the electronically outputting selection information via wireless communication is carried out by electronically outputting selection information via wireless communication (e.g. the microprocessor component s102 can be electronically coupled to the wireless network component s510 to electronically output selection information through a wireless network in addition to the selection indicators 20, etc.).

Figure 77:
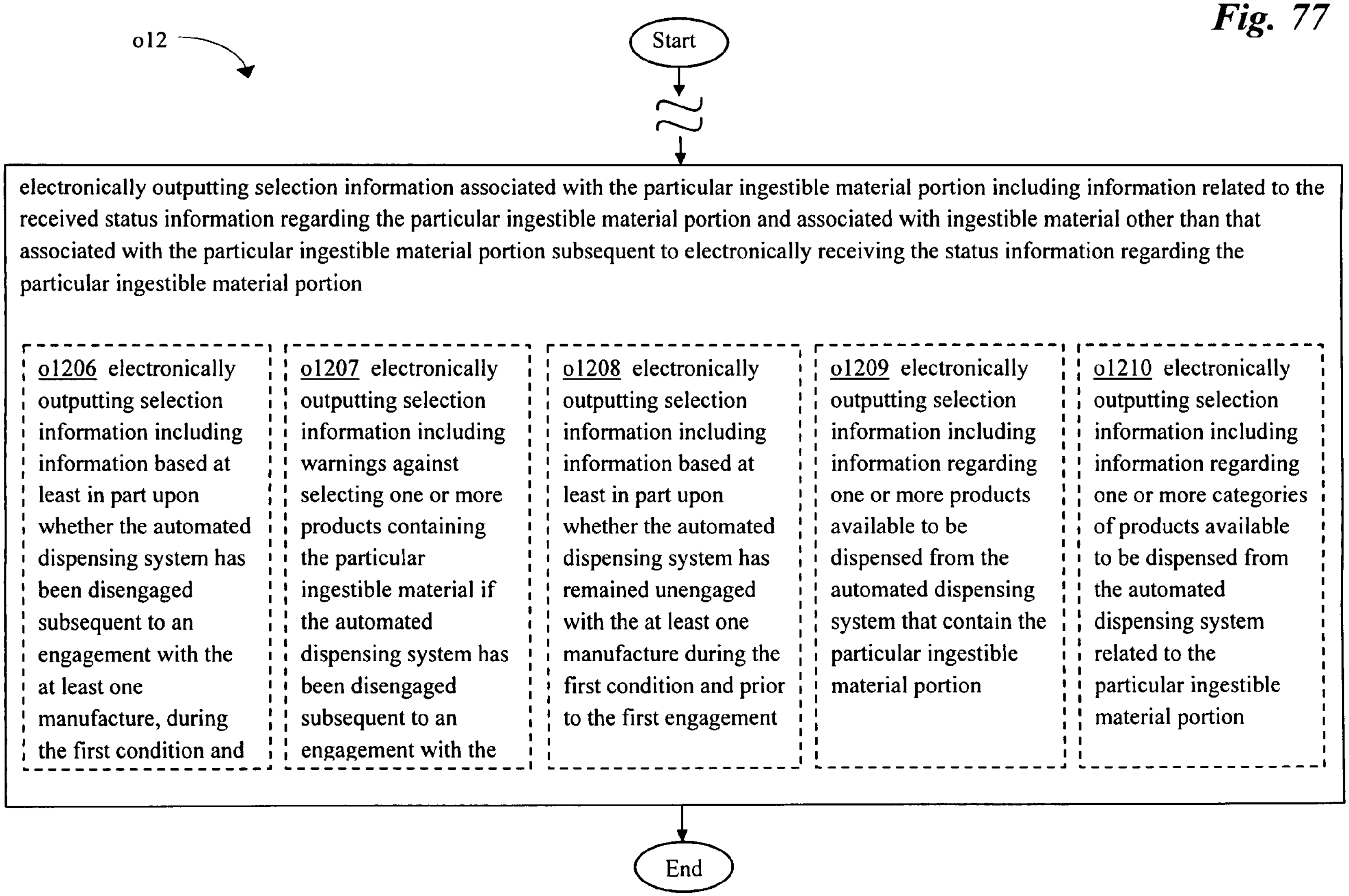
FIG. 77 is a high-level flowchart including exemplary implementations of operation O12 of FIG. 57.

In one or more implementations, as shown in FIG. 77, operation o12 includes an operation o1206 for electronically outputting selection information including information based at least in part upon whether the automated dispensing system has been disengaged subsequent to an engagement with the at least one manufacture, during the first condition and prior to the first engagement. An exemplary version of the non-transitory signal bearing medium n100 is depicted as bearing one or more outputting information disengaged instructions i1206 that when executed will direct performance of the operation o1206. In an implementation, the one or more outputting information disengaged instructions i1206 when executed direct electronically outputting selection information including information based at least in part upon whether the automated dispensing system has been disengaged subsequent to an engagement with the at least one manufacture, during the first condition and prior to the first engagement (e.g. the microprocessor s102 can direct the selection indicators 20 to display selection information to indicate that the ingestible material 42 has been contained in the containing assembly 44 while the containing assembly only been engaged once with the substance control dispensing system 10, etc.). Furthermore, the outputting information disengaged electrical circuitry arrangement e1206 when activated will perform the operation o1205. In an implementation, the outputting information disengaged electrical circuitry arrangement e1206, when activated performs electronically outputting selection information including information based at least in part upon whether the automated dispensing system has been disengaged subsequent to an engagement with the at least one manufacture, during the first condition and prior to the first engagement (e.g. the microprocessor s102 can direct the selection indicators 20 to display selection information to indicate that the ingestible material 42 has been contained in the containing assembly 44 while the containing assembly only been engaged once with the substance control dispensing system 10, etc.). In an implementation, the electronically outputting selection information including information based at least in part upon whether the automated dispensing system has been disengaged subsequent to an engagement with the at least one manufacture, during the first condition and prior to the first engagement is carried out by electronically outputting selection information including information based at least in part upon whether the automated dispensing system has been disengaged subsequent to an engagement with the at least one manufacture, during the first condition and prior to the first engagement (e.g. the microprocessor s102 can direct the selection indicators 20 to display selection information to indicate that the ingestible material 42 has been contained in the containing assembly 44 while the containing assembly only been engaged once with the substance control dispensing system 10, etc.).

In one or more implementations, operation o12 includes an operation o1207 for electronically outputting selection information including warnings against selecting one or more products containing the particular ingestible material if the automated dispensing system has been disengaged subsequent to an engagement with the at least one manufacture, during the first condition and prior to the first engagement. An exemplary version of the non-transitory signal bearing medium n100 is depicted as bearing one or more outputting information warning instructions i1207 that when executed will direct performance of the operation o1207. In an implementation, the one or more outputting information warning instructions i1207 when executed direct electronically outputting selection information including warnings against selecting one or more products containing the particular ingestible material if the automated dispensing system has been disengaged subsequent to an engagement with the at least one manufacture, during the first condition and prior to the first engagement (e.g. the microprocessor s102 can direct the selection indicators 20 to display selection information to indicate a warning that the ingestible material 42 has been contained in the containing assembly 44 while the containing assembly been engaged more than once with the substance control dispensing system 10, etc.). Furthermore, the outputting information warning electrical circuitry arrangement e1207 when activated will perform the operation o1207. In an implementation, the outputting information warning electrical circuitry arrangement e1207, when activated performs electronically outputting selection information including warnings against selecting one or more products containing the particular ingestible material if the automated dispensing system has been disengaged subsequent to an engagement with the at least one manufacture, during the first condition and prior to the first engagement (e.g. the microprocessor s102 can direct the selection indicators 20 to display selection information to indicate a warning that the ingestible material 42 has been contained in the containing assembly 44 while the containing assembly been engaged more than once with the substance control dispensing system 10, etc.). In an implementation, the electronically outputting selection information including warnings against selecting one or more products containing the particular ingestible material if the automated dispensing system has been disengaged subsequent to an engagement with the at least one manufacture, during the first condition and prior to the first engagement is carried out by electronically outputting selection information including warnings against selecting one or more products containing the particular ingestible material if the automated dispensing system has been disengaged subsequent to an engagement with the at least one manufacture, during the first condition and prior to the first engagement (e.g. the microprocessor s102 can direct the selection indicators 20 to display selection information to indicate a warning that the ingestible material 42 has been contained in the containing assembly 44 while the containing assembly been engaged more than once with the substance control dispensing system 10, etc.).

In one or more implementations, operation o12 includes an operation o1208 for electronically outputting selection information including information based at least in part upon whether the automated dispensing system has remained unengaged with the at least one manufacture during the first condition and prior to the first engagement. An exemplary version of the non-transitory signal bearing medium n100 is depicted as bearing one or more outputting information remained instructions i1208 that when executed will direct performance of the operation o1208. In an implementation, the one or more outputting information remained instructions i1208 when executed direct electronically outputting selection information including information based at least in part upon whether the automated dispensing system has remained unengaged with the at least one manufacture during the first condition and prior to the first engagement (e.g. the microprocessor s102 can direct the selection indicators 20 to display selection information to indicate that the ingestible material 42 has been contained in the containing assembly 44 while the containing assembly only been engaged once with the substance control dispensing system 10, etc.). Furthermore, the outputting information remained electrical circuitry arrangement e1208 when activated will perform the operation o1208. In an implementation, the outputting information remained electrical circuitry arrangement e1208, when activated performs electronically outputting selection information including information based at least in part upon whether the automated dispensing system has remained unengaged with the at least one manufacture during the first condition and prior to the first engagement (e.g. the microprocessor s102 can direct the selection indicators 20 to display selection information to indicate that the ingestible material 42 has been contained in the containing assembly 44 while the containing assembly only been engaged once with the substance control dispensing system 10, etc.). In an implementation, the electronically outputting selection information including information based at least in part upon whether the automated dispensing system has remained unengaged with the at least one manufacture during the first condition and prior to the first engagement is carried out by electronically outputting selection information including information based at least in part upon whether the automated dispensing system has remained unengaged with the at least one manufacture during the first condition and prior to the first engagement (e.g. the microprocessor s102 can direct the selection indicators 20 to display selection information to indicate that the ingestible material 42 has been contained in the containing assembly 44 while the containing assembly only been engaged once with the substance control dispensing system 10, etc.).

In one or more implementations, operation o12 includes an operation o1209 for electronically outputting selection information including information regarding one or more products available to be dispensed from the automated dispensing system that contain the particular ingestible material portion. An exemplary version of the non-transitory signal bearing medium n100 is depicted as bearing one or more outputting information products instructions i1209 that when executed will direct performance of the operation o1209. In an implementation, the one or more outputting information products instructions i1209 when executed direct electronically outputting selection information including information regarding one or more products available to be dispensed from the automated dispensing system that contains the particular ingestible material portion (e.g. the microprocessor s102 can direct the selection indicators 20 to display selection information to indicate that the ingestible material 42, such as organic stevia, is an ingredient of fruit drink and a snack bar being dispensed by the substance control dispensing system 10, etc.). Furthermore, the outputting information products electrical circuitry arrangement e1209 when activated will perform the operation o1209. In an implementation, the outputting information products electrical circuitry arrangement e1209, when activated performs electronically outputting selection information including information regarding one or more products available to be dispensed from the automated dispensing system that contains the particular ingestible material portion (e.g. the microprocessor s102 can direct the selection indicators 20 to display selection information to indicate that the ingestible material 42, such as organic stevia, is an ingredient of fruit drink and a snack bar being dispensed by the substance control dispensing system 10, etc.). In an implementation, the electronically outputting selection information including information regarding one or more products available to be dispensed from the automated dispensing system that contain the particular ingestible material portion is carried out by electronically outputting selection information including information regarding one or more products available to be dispensed from the automated dispensing system that contains the particular ingestible material portion (e.g. the microprocessor s102 can direct the selection indicators 20 to display selection information to indicate that the ingestible material 42, such as organic stevia, is an ingredient of fruit drink and a snack bar being dispensed by the substance control dispensing system 10, etc.).

In one or more implementations, operation o12 includes an operation o1210 for electronically outputting selection information including information regarding one or more categories of products available to be dispensed from the automated dispensing system related to the particular ingestible material portion. An exemplary version of the non-transitory signal bearing medium n100 is depicted as bearing one or more outputting information categories instructions i1210 that when executed will direct performance of the operation o1210. In an implementation, the one or more outputting information categories instructions i1210 when executed direct electronically outputting selection information including information regarding one or more categories of products available to be dispensed from the automated dispensing system related to the particular ingestible material portion (e.g. the microprocessor s102 can direct the selection indicators 20 to display selection information to indicate that the ingestible material 42, such as vitamin B12 is an ingredient found in product categories including snack products, athletic performance products, and weight loss products, etc.). Furthermore, the outputting information categories electrical circuitry arrangement e1210 when activated will perform the operation o1210. In an implementation, the outputting information categories electrical circuitry arrangement e1210, when activated performs electronically outputting selection information including information regarding one or more categories of products available to be dispensed from the automated dispensing system related to the particular ingestible, material portion (e.g. the microprocessor s102 can direct the selection indicators 20 to display selection information to indicate that the ingestible material 42, such as vitamin B12 is an ingredient found in product categories including snack products, athletic performance products, and weight loss products, etc.). In an implementation, the electronically outputting selection information including information regarding one or more categories of products available to be dispensed from the automated dispensing system related to the particular ingestible material portion is carried out by electronically outputting selection information including information regarding one or more categories of products available to be dispensed from the automated dispensing system related to the particular ingestible material portion (e.g. the microprocessor s102 can direct the selection indicators 20 to display selection information to indicate that the ingestible material 42, such as vitamin B12 is an ingredient found in product categories including snack products, athletic performance products, and weight loss products, etc.).

Figure 78:
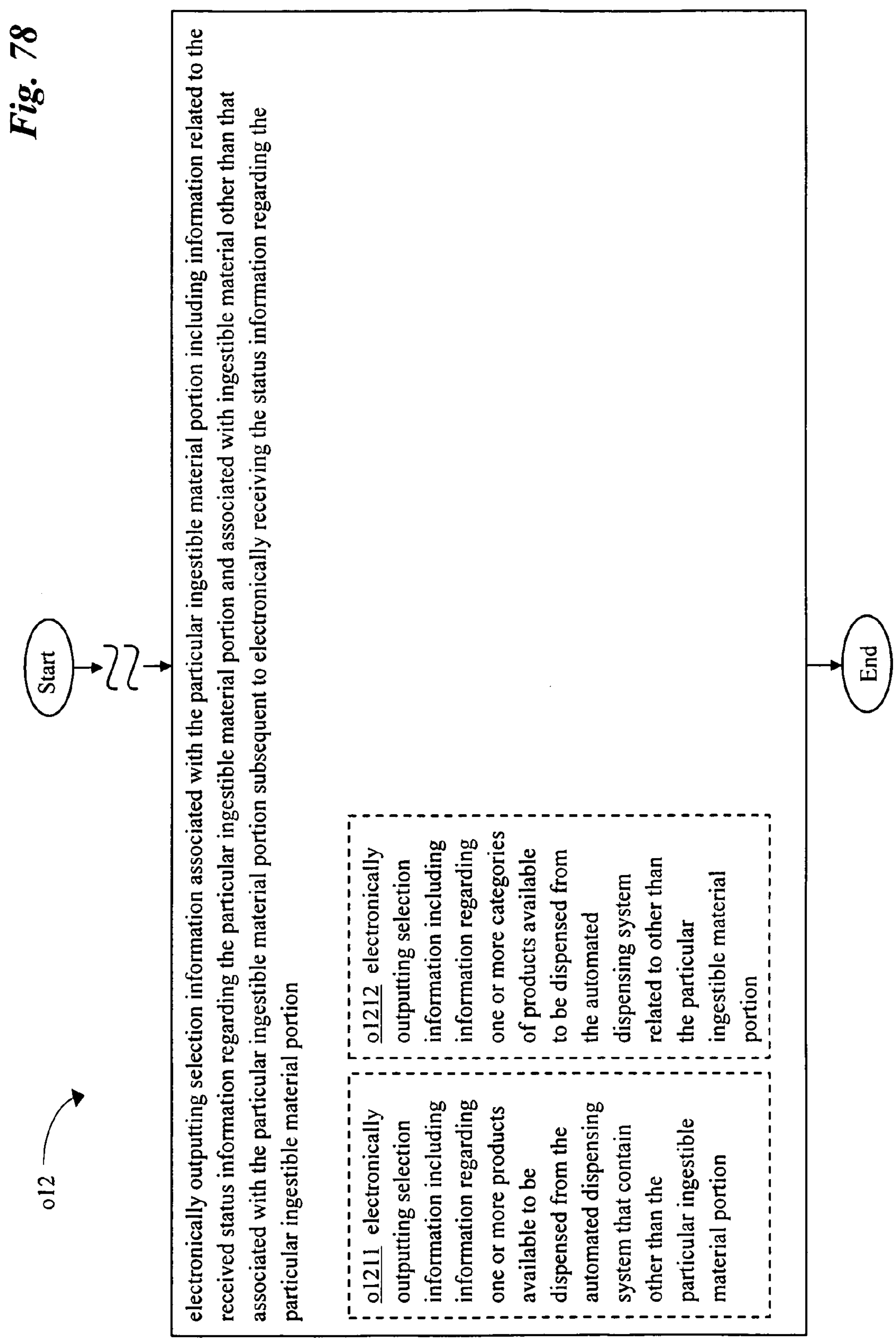
FIG. 78 is a high-level flowchart including exemplary implementations of operation O12 of FIG. 57.

In one or more implementations, as shown in FIG. 78, operation o12 includes an operation o1211 for electronically outputting selection information including information regarding one or more products available to be dispensed from the automated dispensing system that contain other than the particular ingestible material portion. An exemplary version of the non-transitory signal bearing medium n100 is depicted as bearing one or more outputting information products instructions i1211 that when executed will direct performance of the operation o1211. In an implementation, the one or more outputting information products instructions i1211 when executed direct electronically outputting selection information including information regarding one or more products available to be dispensed from the automated dispensing system that contain other than the particular ingestible material portion (e.g. the microprocessor s102 can direct the selection indicators 20 to display selection information to indicate that the ingestible material 42, such as organic stevia, is an ingredient of fruit drink and a snack bar being dispensed by the substance control dispensing system 10, etc.). Furthermore, the outputting information products electrical circuitry arrangement e1211 when activated will perform the operation o1211. In an implementation, the outputting information products electrical circuitry arrangement e1211, when activated performs electronically outputting selection information including information regarding one or more products available to be dispensed from the automated dispensing system that contain other than the particular ingestible material portion (e.g. the microprocessor s102 can direct the selection indicators 20 to display selection information to indicate that the ingestible material 42, such as organic stevia, is an ingredient of fruit drink and a snack bar being dispensed by the substance control dispensing system 10, etc.). In an implementation, the electronically outputting selection information including information regarding one or more products available to be dispensed from the automated dispensing system that contain other than the particular ingestible material portion is carried out by electronically outputting selection information including information regarding one or more products available to be dispensed from the automated dispensing system that contain other than the particular ingestible material portion (e.g. the microprocessor s102 can direct the selection indicators 20 to display selection information to indicate that the ingestible material 42, such as organic stevia, is an ingredient of fruit drink and a snack bar being dispensed by the substance control dispensing system 10, etc.).

In one or more implementations, operation o12 includes an operation o1212 for electronically outputting selection information including information regarding one or more categories of products available to be dispensed from the automated dispensing system related to other than the particular ingestible material portion. An exemplary version of the non-transitory signal bearing medium n100 is depicted as bearing one or more outputting information categories instructions i1212 that when executed will direct performance of the operation o1212. In an implementation, the one or more outputting information categories instructions i1212 when executed direct electronically outputting selection information including information regarding one or more categories of products available to be dispensed from the automated dispensing system related to other than the particular ingestible material portion (e.g. the microprocessor s102 can direct the selection indicators 20 to display selection information to indicate that the ingestible material 42, such as peanut extract is an ingredient not found in product categories including snack products, athletic performance products, and weight loss products, etc.). Furthermore, the outputting information categories electrical circuitry arrangement e1212 when activated will perform the operation o1212. In an implementation, the outputting information categories electrical circuitry arrangement e1212, when activated performs electronically outputting selection information including information regarding one or more categories of products available to be dispensed from the automated dispensing system related to other than the particular ingestible material portion (e.g. the microprocessor s102 can direct the selection indicators 20 to display selection information to indicate that the ingestible material 42, such as peanut extract is an ingredient not found in product categories including snack products, athletic performance products, and weight loss products, etc.). In an implementation, the electronically outputting selection information including information regarding one or more categories of products available to be dispensed from the automated dispensing system related to other than the particular ingestible material portion is carried out by electronically outputting selection information including information regarding one or more categories of products available to be dispensed from the automated dispensing system related to other than the particular ingestible material portion (e.g. the microprocessor s102 can direct the selection indicators 20 to display selection information to indicate that the ingestible material 42, such as peanut extract is an ingredient not found in product categories including snack products, athletic performance products, and weight loss products, etc.).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture (limited to patentable subject matter under 35 USC 101). Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof (limited to patentable subject matter under 35 U.S.C. 101). In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure (limited to patentable subject matter under 35 USC 101). In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof (limited to patentable subject matter under 35 U.S.C. 101) can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method comprising:

electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container;

electronically receiving status information indicative of at least one of integrity prior to engagement with the automated dispensing system of the at least one ingestible material container or a condition of the particular ingestible material portion of the at least one ingestible material container; and electronically outputting selection information associated with the particular ingestible material portion based at least in part on the engagement information and the status information.

2. The method of claim 1, wherein electronically receiving status information indicative of at least one of integrity prior to engagement with the automated dispensing system of the at least one ingestible material container or a condition of the particular ingestible material portion of the at least one ingestible material container comprises:

electronically receiving status information via at least in part an electronic identification card.

3. The method of claim 1, wherein electronically receiving status information indicative of at least one of integrity prior to engagement with the automated dispensing system of the at least one ingestible material container or a condition of the particular ingestible material portion of the at least one ingestible material container comprises:

electronically receiving status information via at least in part a memory circuit coupled with the ingestible material container.

4. The method of claim 1, wherein electronically receiving status information indicative of at least one of integrity prior to engagement with the automated dispensing system of the at least one ingestible material container or a condition of the particular ingestible material portion of the at least one ingestible material container comprises:

electronically receiving status information via at least in part Internet communication.

5. The method of claim 1, wherein electronically receiving status information indicative of at least one of integrity prior to engagement with the automated dispensing system of the at least one ingestible material container or a condition of the particular ingestible material portion of the at least one ingestible material container comprises:

electronically receiving status information via at least in part an optical scan.

6. The method of claim 1, wherein electronically receiving status information indicative of at least one of integrity prior to engagement with the automated dispensing system of the at least one ingestible material container or a condition of the particular ingestible material portion of the at least one ingestible material container comprises:

electronically receiving status information via at least in part image recognition.

7. The method of claim 1, wherein electronically receiving status information indicative of at least one of integrity prior to engagement with the automated dispensing system of the at least one ingestible material container or a condition of the particular ingestible material portion of the at least one ingestible material container comprises:

electronically receiving status information via at least in part a radio communication.

8. The method of claim 1, wherein electronically receiving status information indicative of at least one of integrity prior to engagement with the automated dispensing system of the at least one ingestible material container or a condition of the particular ingestible material portion of the at least one ingestible material container comprises:

electronically receiving status information regarding the particular ingestible material portion as a combination of one or more ingestible ingredients.

9. The method of claim 1, wherein electronically receiving status information indicative of at least one of integrity prior to engagement with the automated dispensing system of the at least one ingestible material container or a condition of the particular ingestible material portion of the at least one ingestible material container comprises:

electronically receiving status information regarding the particular ingestible material portion as a compound including one or more extracts of USDA certified organically raised plant matter.

10. The method of claim 1, wherein electronically receiving status information indicative of at least one of integrity prior to engagement with the automated dispensing system of the at least one ingestible material container or a condition of the particular ingestible material portion of the at least one ingestible material container comprises:

electronically receiving status information regarding the particular ingestible material portion as a combination of one or more powders.

11. The method of claim 1, wherein electronically receiving status information indicative of at least one of integrity prior to engagement with the automated dispensing system of the at least one ingestible material container or a condition of the particular ingestible material portion of the at least one ingestible material container comprises:

electronically receiving status information regarding the particular ingestible material portion as including one or more controlled pharmaceutical agents.

12. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving information as related to the first engagement of the automated dispensing system with the at least one ingestible material container via at least in part an engagement to provide for pouring the particular ingestible material portion from the at least one ingestible material container.

13. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving information as related to the first engagement of the automated dispensing system with the at least one ingestible material container via at least in part an engagement to provide for blowing the particular ingestible material portion from the at least one ingestible material container.

14. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving information as related to the first engagement of the automated dispensing system with the at least one ingestible material container via at least in part an engagement to provide for vacuuming the particular ingestible material portion from the at least one ingestible material container.

15. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system via at least in part an engagement to provide for dissolving the particular ingestible material portion in a solution to be transported from the at least one ingestible material container.

16. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system via at least in part an engagement to provide for mixing other material with the particular ingestible material portion from the at least one ingestible material container.

17. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system via at least in part an engagement to provide for gravity feeding the particular ingestible material portion from the at least one ingestible material container.

18. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system via at least in part an engagement to provide for flow of the particular ingestible material portion through a valve from the at least one ingestible material container.

19. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system via at least in part an engagement to provide for physically severing a seal on the at least one ingestible material container.

20. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system via at least in part an engagement to provide for moving a sliding barrier on the at least one ingestible material container.

21. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system via at least in part an engagement to provide for moving a hinged lid on the at least one ingestible material container.

22. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system via at least in part an engagement to provide for unscrewing a cap on the at least one ingestible material container.

23. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system via at least in part an engagement to provide for insertion of a syringe into the at least one ingestible material container.

24. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system via at least in part an engagement to provide for removing a tear away element on the at least one ingestible material container.

25. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system via at least in part an engagement to provide for deforming a material on the at least one ingestible material container.

26. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of integrity of the at least one ingestible material container prior to being engaged with an automated dispensing system and following the at least one ingestible material container being united with the particular ingestible material portion as a vial containing a solution with the particular ingestible material portion dissolved therein.

27. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of integrity of the at least one ingestible material container prior to being engaged with an automated dispensing system and following the at least one ingestible material container being united with the particular ingestible material portion as a compressed aerosol container having the particular ingestible material portion contained therein.

28. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of integrity of the at least one ingestible material container prior to being engaged with an automated dispensing system and following the at least one ingestible material container being united with the particular ingestible material portion as part of a severable seal coupled to a container containing the particular ingestible material portion.

29. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of integrity of the at least one ingestible material container prior to being engaged with an automated dispensing system and following the at least one ingestible material container being united with the particular ingestible material portion as a deformable material coupled with a container holding the particular ingestible material portion.

30. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system to facilitate access by the automated dispensing system to the particular ingestible material portion via at least in part pouring the particular ingestible material portion from an interior volume.

31. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system to facilitate access by the automated dispensing system to the particular ingestible material portion via at least in part augering to convey the particular ingestible material portion into an interior volume.

32. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system to facilitate access by the automated dispensing system to the particular ingestible material portion via at least in part fluid transfer of the particular ingestible material portion.

33. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system to facilitate access by the automated dispensing system to the particular ingestible material portion via at least in part mixing the particular ingestible material portion with other material.

34. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system to facilitate access by the automated dispensing system to the particular ingestible material portion via at least in part opening a valve.

35. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system to facilitate access by the automated dispensing system to the particular ingestible material portion via at least in part physical severing of a seal on a container holding the particular ingestible material portion.

36. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system to facilitate access by the automated dispensing system to the particular ingestible material portion via at least in part moving a sliding barrier on a container holding the particular ingestible material portion.

37. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system to facilitate access by the automated dispensing system to the particular ingestible material portion via at least in part moving a hinged lid on a container holding the particular ingestible material portion.

38. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system to facilitate access by the automated dispensing system to the particular ingestible material portion via at least in part insertion of a syringe into a container holding the particular ingestible material portion.

39. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system to facilitate access by the automated dispensing system to the particular ingestible material portion via at least in part lifting a tab on a container holding the particular ingestible material portion.

40. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information indicative of at least one ingestible material container being engaged with an automated dispensing system to facilitate access by the automated dispensing system to the particular ingestible material portion via at least in part disengaging a locking mechanism on a container holding the particular ingestible material portion.

41. The method of claim 1, wherein electronically receiving status information indicative of at least one of integrity prior to engagement with the automated dispensing system of the at least one ingestible material container or a condition of the particular ingestible material portion of the at least one ingestible material container comprises:

electronically receiving status information as related to a particular ingestible material portion for dispensing of the particular ingestible material portion as part of a smoothie drink.

42. The method of claim 1, wherein electronically receiving status information indicative of at least one of integrity prior to engagement with the automated dispensing system of the at least one ingestible material container or a condition of the particular ingestible material portion of the at least one ingestible material container comprises:

electronically receiving status information as related to a particular ingestible material portion for dispensing of the particular ingestible material portion as part of a sandwich.

43. The method of claim 1, wherein electronically receiving status information indicative of at least one of integrity prior to engagement with the automated dispensing system of the at least one ingestible material container or a condition of the particular ingestible material portion of the at least one ingestible material container comprises:

electronically receiving status information as related to a particular ingestible material portion for dispensing of the particular ingestible material portion as part of a fruit drink.

44. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information including information based at least in part upon whether the automated dispensing system has been disengaged subsequent to an engagement with the at least one ingestible material container subsequent to the particular ingestible material portion being united with the ingestible material container and prior to the engagement.

45. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information including instruction to prevent dispensing of the particular ingestible material if the automated dispensing system has been disengaged subsequent to an engagement with the at least one ingestible material container subsequent to the particular ingestible material portion being united with the ingestible material container and prior to the engagement.

46. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information related to the at least one ingestible material container arranged to inhibit access to the particular ingestible material portion as a container with hinged lid containing the particular ingestible material portion.

47. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information related to the at least one ingestible material container arranged to inhibit access to the particular ingestible material portion as a container with a tear away enclosure element containing the particular ingestible material portion.

48. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information related to the at least one ingestible material container arranged to inhibit access to the particular ingestible material portion as a deformable container containing the particular ingestible material portion.

49. The method of claim 1, wherein electronically receiving engagement information indicative of at least one ingestible material container being engaged with an automated dispensing system, the engagement of the at least one ingestible material container including at least electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container comprises:

electronically receiving engagement information related to the at least one ingestible material container arranged to inhibit access to the particular ingestible material portion as a container with a locking mechanism containing the particular ingestible material portion.

50. The method of claim 1, wherein electronically outputting selection information associated with the particular ingestible material portion based at least in part on the engagement information and the status information comprises:

electronically outputting selection information via an electronic audio file.

51. The method of claim 1, wherein electronically outputting selection information associated with the particular ingestible material portion based at least in part on the engagement information and the status information comprises:

electronically outputting selection information via a computer network.

52. The method of claim 1, wherein electronically outputting selection information associated with the particular ingestible material portion based at least in part on the engagement information and the status information comprises:

electronically outputting selection information via a cellular network.

53. The method of claim 1, wherein electronically outputting selection information associated with the particular ingestible material portion based at least in part on the engagement information and the status information comprises:

electronically outputting selection information via wireless communication.

54. The method of claim 1, wherein electronically outputting selection information associated with the particular ingestible material portion based at least in part on the engagement information and the status information comprises:

electronically outputting selection information including information based at least in part upon whether the automated dispensing system has been disengaged subsequent to an engagement with the at least one ingestible material container subsequent to the particular ingestible material portion being united with the ingestible material container and prior to the engagement.

55. The method of claim 1, wherein electronically outputting selection information associated with the particular ingestible material portion based at least in part on the engagement information and the status information comprises:

electronically outputting selection information including warnings against selecting one or more products containing the particular ingestible material if the automated dispensing system has been disengaged subsequent to an engagement with the at least one ingestible material container subsequent to the particular ingestible material portion being united with the ingestible material container and prior to the engagement.

56. The method of claim 1, wherein electronically outputting selection information associated with the particular ingestible material portion based at least in part on the engagement information and the status information comprises:

electronically outputting selection information including information based at least in part upon whether the automated dispensing system has remained unengaged with the at least one ingestible material container subsequent to the particular ingestible material portion being united with the ingestible material container and prior to the engagement.

57. A system comprising:

means for electronically receiving engagement information indicative of at least one ingestible material container being engaged with an automated dispensing system, the engagement of the at least one ingestible material container including at least means for electronically unlocking at least one lockable portion of the at least one ingestible material container based at least in part on at least one code verifier of the at least one ingestible material container electronically coupling with at least one code transmitter of one or more receiving assemblies of the automated dispensing system, the at least one code verifier operable to verify the at least one receiving assembly is authorized to accept one or more particular ingestible material portions of the at least one ingestible material container;

means for electronically receiving status information indicative of at least one of integrity prior to engagement with the automated dispensing system of the at least one ingestible material container or a condition of the particular ingestible material portion of the at least one ingestible material container; and means for electronically outputting selection information associated with the particular ingestible material portion based at least in part on the engagement information and the status information.

58. The method of claim 1, wherein electronically outputting selection information associated with the particular ingestible material portion based at least in part on the engagement information and the status information comprises:

electronically outputting a date that the particular ingestible material was united with the at least one ingestible material container, the date derived from the electronically received status information.

59. The method of claim 1, wherein electronically outputting selection information associated with the particular ingestible material portion based at least in part on the engagement information and the status information comprises:

electronically outputting a date that the at least one ingestible material container was engaged with the automated dispensing system, the date derived from the electronically received engagement information, the electronically outputting the date enabling a human to determine a freshness of the particular ingestible material portion.

60. An automated dispensing system, comprising:

one or more controlled substance receiving assemblies including at least one code transmitter of the one or more controlled substance receiving assemblies, the one or more controlled substance receiving assemblies configured for transmitting one or more codes to one or more code verifiers of one or more ingestible material containers, the one or more ingestible material containers operable to unlock at least one lockable portion of the one or more ingestible material containers based at least in part on a verification that the one or more controlled substance receiving assemblies are authorized to accept one or more particular ingestible material portions of the one or more ingestible material containers upon the one or more ingestible material containers being inserted into the one or more controlled substance receiving assemblies and electronically coupling the at least one code verifier with the at least one code transmitter;

one or more selection devices, the one or more selection devices configured to display selection information based at least in part upon the verification of authorization of at least one of the ingestible material containers; and one or more dispensing devices configured to dispense an ingestible item including at least a portion of a particular ingestible material portion from at least one of the ingestible material containers responsive to a selection input via the one or more selection devices.

61. The automated dispensing system of claim 60, wherein the automated dispensing system is configured to inhibit access to a content of an ingestible material container upon reading a status of the ingestible material container indicative of unauthorized access to the ingestible material container prior to being inserted into a controlled substance receiving assembly.

* * * * *